(12) United States Patent
Cable et al.

(10) Patent No.: US 10,602,874 B2
(45) Date of Patent: Mar. 31, 2020

(54) BEVERAGE PREPARATION SYSTEMS WITH BREW CHAMBER ACCESS MECHANISMS

(71) Applicant: Starbucks Corporation dba Starbucks Coffee Company, Seattle, WA (US)

(72) Inventors: Fred Cable, Springfield, IL (US); Peter Gale, Springfield, IL (US)

(73) Assignee: Starbucks Corporation dba Starbucks Coffee Company, Seattle, WA (US)

( * ) Notice: Subject to any disclaimer, the term of this patent is extended or adjusted under 35 U.S.C. 154(b) by 689 days.

(21) Appl. No.: 14/740,882

(22) Filed: Jun. 16, 2015

(65) Prior Publication Data

US 2016/0367068 A1 Dec. 22, 2016

(51) Int. Cl.
*A47J 31/40* (2006.01)
(52) U.S. Cl.
CPC .................... *A47J 31/407* (2013.01)
(58) Field of Classification Search
CPC .... A47J 31/407; A47J 31/4482; A47J 31/368; A47J 31/4467; A47J 31/0626; A47J 31/0663; A47J 31/0684; A47J 31/3685; A47J 31/4407; A47J 31/3666
USPC ................ 99/295, 291, 284, 309, 289 R
See application file for complete search history.

(56) References Cited

U.S. PATENT DOCUMENTS

| | | |
|---|---|---|
| 3,483,811 A | 12/1969 | Heier |
| 3,878,360 A | 4/1975 | Augustine et al. |
| 3,948,157 A | 4/1976 | Layre |
| 4,860,645 A | 8/1989 | van der Lijn et al. |
| 5,495,793 A | 3/1996 | Muis et al. |
| 5,520,093 A | 5/1996 | Ackermann |
| 5,551,988 A | 9/1996 | Reyhanloo et al. |
| 6,009,792 A | 1/2000 | Kraan |
| 6,021,705 A | 2/2000 | Dijs |
| 6,026,732 A | 2/2000 | Kollep et al. |
| 6,079,315 A | 6/2000 | Beaulieu et al. |
| 6,182,554 B1 | 2/2001 | Beaulieu et al. |
| 6,290,063 B1 | 9/2001 | Vogt et al. |
| 6,494,128 B1 | 12/2002 | Yu |
| 6,510,783 B1 | 1/2003 | Basile et al. |
| 6,607,762 B2 | 8/2003 | Lazaris et al. |
| 6,655,260 B2 | 12/2003 | Lazaris et al. |
| 6,685,365 B2 | 2/2004 | White |
| 6,725,762 B2 | 4/2004 | Kollep et al. |
| 6,763,759 B2 | 7/2004 | Denisart |

(Continued)

FOREIGN PATENT DOCUMENTS

| | | |
|---|---|---|
| CA | 2557883 C | 11/2009 |
| CA | 2429631 C | 1/2011 |

(Continued)

*Primary Examiner* — Ibrahime A Abraham
*Assistant Examiner* — Biniam B Asmelash
(74) *Attorney, Agent, or Firm* — Knobbe, Martens, Olson & Bear, LLP

(57) ABSTRACT

Various beverage preparation systems, components, and methods are disclosed. In some embodiments, the system includes a brewer machine and a beverage pod. The brewer machine can include a brew chamber unit, which can receive the beverage pod. The brew chamber unit can be adapted to receive multiple beverage pod types. Some embodiments include a drawer that includes the brew chamber and that moves to present the brew chamber unit to a user. Certain embodiments include locking mechanisms.

14 Claims, 90 Drawing Sheets

(56) References Cited

U.S. PATENT DOCUMENTS

| | | |
|---|---|---|
| 6,786,134 B2 | 9/2004 | Green |
| 6,832,542 B2 | 12/2004 | Hu et al. |
| 6,948,420 B2 | 9/2005 | Kirschner et al. |
| 6,955,116 B2 | 10/2005 | Hale |
| 6,978,682 B2 | 12/2005 | Foster et al. |
| 6,990,891 B2 | 1/2006 | Tebo |
| 7,028,604 B2 | 4/2006 | Cortese |
| 7,093,530 B2 | 8/2006 | Meister et al. |
| 7,165,488 B2 | 1/2007 | Bragg et al. |
| 7,216,582 B2 | 5/2007 | Yoakim et al. |
| 7,219,596 B2 | 5/2007 | Kief, Jr. |
| 7,243,867 B2 | 7/2007 | Steckhan |
| 7,255,039 B2 | 8/2007 | Halliday et al. |
| 7,320,274 B2 | 1/2008 | Castellani |
| 7,325,479 B2 | 2/2008 | Laigneau et al. |
| 7,347,138 B2 | 3/2008 | Bragg et al. |
| 7,464,636 B2 | 12/2008 | Mariller |
| 7,469,627 B2 | 12/2008 | Li |
| 7,543,527 B2 | 6/2009 | Schmed |
| 7,569,243 B2 | 8/2009 | Yoakim et al. |
| 7,592,027 B2 | 9/2009 | Halliday et al. |
| 7,650,831 B2 | 1/2010 | Denisart et al. |
| 7,669,518 B2 | 3/2010 | Bardazzi |
| 7,698,992 B2 | 4/2010 | Wei |
| 7,707,927 B2 | 5/2010 | Boussemart et al. |
| 7,726,233 B2 | 6/2010 | Kodden et al. |
| 7,798,054 B2 | 9/2010 | Evers et al. |
| 7,815,953 B2 | 10/2010 | Mastropasqua et al. |
| 7,823,501 B2 | 11/2010 | Rijskamp et al. |
| 7,827,905 B2 | 11/2010 | Bardazzi |
| 7,832,328 B2 | 11/2010 | Koeling et al. |
| 7,856,920 B2 | 12/2010 | Schmed et al. |
| 7,883,733 B2 | 2/2011 | Cortese |
| 7,946,217 B2 | 5/2011 | Favre et al. |
| 7,992,486 B2 | 8/2011 | Constantine et al. |
| 7,993,691 B2 | 8/2011 | Yoakim et al. |
| 8,002,146 B2 | 8/2011 | Cahen et al. |
| 8,028,616 B2 | 10/2011 | Van Der Meer et al. |
| 8,039,036 B2 | 10/2011 | Knitel et al. |
| 8,071,147 B2 | 12/2011 | Steenhof et al. |
| 8,074,560 B2 | 12/2011 | Levi et al. |
| 8,079,300 B2 | 12/2011 | Jing |
| 8,091,469 B2 | 1/2012 | Cahen et al. |
| 8,095,242 B2 | 1/2012 | Quah |
| 8,109,200 B2 | 2/2012 | Hansen |
| 8,191,463 B2 | 6/2012 | Spinelli |
| 8,202,560 B2 | 6/2012 | Yoakim et al. |
| 8,210,095 B2 | 7/2012 | Brezovnik et al. |
| 8,210,098 B2 | 7/2012 | Boussemart et al. |
| 8,225,710 B2 | 7/2012 | Kristiaan et al. |
| 8,272,319 B2 | 9/2012 | Jarisch et al. |
| 8,307,754 B2 | 11/2012 | Ternite et al. |
| 8,312,806 B2 | 11/2012 | De Graaf et al. |
| 8,327,754 B2 | 12/2012 | Kirschner et al. |
| 8,333,144 B2 | 12/2012 | Boussemart et al. |
| 8,409,646 B2 | 4/2013 | Yoakim et al. |
| 8,431,175 B2 | 4/2013 | Yoakim et al. |
| 8,468,934 B2 | 6/2013 | Epars et al. |
| 8,475,860 B2 | 7/2013 | Colantonio et al. |
| 8,512,776 B2 | 8/2013 | Yoakim et al. |
| 8,567,304 B2 | 10/2013 | Saxton et al. |
| 8,613,248 B2 | 12/2013 | Steenhof et al. |
| 8,616,117 B2 | 12/2013 | Evers et al. |
| 8,651,012 B2 | 2/2014 | Yoakim et al. |
| 8,656,827 B2 | 2/2014 | Vanni |
| 8,658,232 B2 | 2/2014 | Yoakim et al. |
| 8,695,484 B2 | 4/2014 | Möri |
| 8,733,229 B2 | 5/2014 | Jarisch et al. |
| 8,752,478 B2 | 6/2014 | Nocera |
| 8,758,844 B2 | 6/2014 | Nocera |
| 8,784,915 B2 | 7/2014 | Evers et al. |
| 8,800,433 B2 | 8/2014 | Cahen et al. |
| 8,808,777 B2 | 8/2014 | Kamerbeek et al. |
| 8,813,634 B2 | 8/2014 | Yoakim et al. |
| 8,833,238 B2 | 9/2014 | Hansen et al. |
| 8,844,427 B2 | 9/2014 | Beutlrock et al. |
| 8,846,121 B2 | 9/2014 | Hansen et al. |
| 8,887,622 B2 | 11/2014 | Bentley et al. |
| 8,906,435 B2 | 12/2014 | Kamerbeek et al. |
| 8,931,397 B2 | 1/2015 | Frigeri et al. |
| 8,950,317 B2 | 2/2015 | Tanner et al. |
| 8,956,672 B2 | 2/2015 | Yoakim et al. |
| 8,962,048 B2 | 2/2015 | Gerbaulet et al. |
| 8,974,846 B2 | 3/2015 | Burton-Wilcock et al. |
| 8,978,545 B2 | 3/2015 | Yoakim et al. |
| 8,986,764 B2 | 3/2015 | Yoakim et al. |
| 9,439,532 B2 | 9/2016 | Crarer et al. |
| 9,504,348 B2 | 11/2016 | Windier et al. |
| 9,968,217 B2 | 5/2018 | Cable et al. |
| 9,999,315 B2 | 6/2018 | Crarer et al. |
| 2002/0121198 A1 | 9/2002 | Kollep et al. |
| 2003/0066431 A1 | 4/2003 | Fanzutti et al. |
| 2003/0145736 A1 | 8/2003 | Green |
| 2004/0129145 A1 | 7/2004 | Denisart et al. |
| 2004/0244599 A1 | 12/2004 | Wei |
| 2004/0255790 A1 | 12/2004 | Green |
| 2005/0076786 A1 | 4/2005 | Meister et al. |
| 2005/0076787 A1 | 4/2005 | Grant et al. |
| 2005/0076788 A1 | 4/2005 | Grant et al. |
| 2005/0095158 A1 | 5/2005 | Kirschner et al. |
| 2005/0126400 A1 | 6/2005 | Bragg et al. |
| 2005/0172820 A1 | 8/2005 | Cortese |
| 2005/0188854 A1 | 9/2005 | Green et al. |
| 2005/0223904 A1 | 10/2005 | Laigneau et al. |
| 2005/0241489 A1 | 11/2005 | Kirschner et al. |
| 2006/0075903 A1 | 4/2006 | Dijs |
| 2006/0196364 A1 | 9/2006 | Kirschner |
| 2006/0266225 A1 | 11/2006 | Hammad |
| 2007/0144355 A1 | 6/2007 | Denisart et al. |
| 2007/0148290 A1 | 6/2007 | Ternite et al. |
| 2007/0158366 A1 | 7/2007 | Van Deer Meer et al. |
| 2007/0261564 A1 | 11/2007 | Liverani et al. |
| 2008/0041234 A1 | 2/2008 | Cortese |
| 2008/0089982 A1 | 4/2008 | Brouwer et al. |
| 2008/0105131 A1 | 5/2008 | Castellani |
| 2008/0115673 A1 | 5/2008 | Zelioli et al. |
| 2008/0121111 A1 | 5/2008 | Paget et al. |
| 2008/0173181 A1 | 7/2008 | Startz |
| 2008/0245236 A1 | 10/2008 | Ternite et al. |
| 2008/0250936 A1 | 10/2008 | Cortese |
| 2009/0022864 A1 | 1/2009 | Steenhof et al. |
| 2009/0130270 A1 | 5/2009 | Cortese |
| 2009/0211457 A1 | 8/2009 | Cortese |
| 2009/0293733 A1 | 12/2009 | Martin et al. |
| 2010/0147873 A1 | 7/2010 | Yoakim et al. |
| 2010/0173056 A1 | 7/2010 | Yoakim et al. |
| 2010/0178404 A1 | 7/2010 | Yoakim et al. |
| 2010/0203208 A1 | 8/2010 | Yoakim et al. |
| 2010/0258010 A1 | 10/2010 | Castellani |
| 2010/0282088 A1 | 11/2010 | Deuber et al. |
| 2010/0313766 A1 | 12/2010 | Liverani et al. |
| 2011/0100228 A1 | 5/2011 | Rivera |
| 2011/0110180 A1* | 5/2011 | Snider .................. A47J 31/407 366/142 |
| 2011/0113968 A1 | 5/2011 | Schmed et al. |
| 2011/0154993 A1 | 6/2011 | Bertolina |
| 2011/0162533 A1 | 7/2011 | Fumagalli |
| 2011/0183055 A1 | 7/2011 | Mariller |
| 2011/0274802 A1 | 11/2011 | Rivera |
| 2011/0277642 A1 | 11/2011 | Mariller |
| 2011/0297002 A1 | 12/2011 | Vitel et al. |
| 2012/0031279 A1 | 2/2012 | Mariller et al. |
| 2012/0055343 A1 | 3/2012 | Remo et al. |
| 2012/0104025 A1 | 5/2012 | Anselmino et al. |
| 2012/0121765 A1 | 5/2012 | Kamerbeek et al. |
| 2012/0148709 A1 | 6/2012 | Kamerbeek et al. |
| 2012/0171332 A1 | 7/2012 | Lai et al. |
| 2012/0171334 A1 | 7/2012 | Yoakim et al. |
| 2012/0199010 A1 | 8/2012 | Mariller |
| 2012/0207895 A1 | 8/2012 | Rivera |
| 2012/0207896 A1 | 8/2012 | Rivera |
| 2012/0210878 A1 | 8/2012 | Mariller |
| 2012/0251669 A1 | 10/2012 | Kamerbeek et al. |
| 2012/0251670 A1 | 10/2012 | Kamerbeek et al. |

(56) References Cited

U.S. PATENT DOCUMENTS

| | | |
|---|---|---|
| 2012/0251671 A1 | 10/2012 | Kamerbeek et al. |
| 2012/0312174 A1 | 12/2012 | Lambert |
| 2012/0328740 A1 | 12/2012 | Nocera |
| 2013/0008316 A1 | 1/2013 | Hoglauer et al. |
| 2013/0025465 A1 | 1/2013 | Schnyder |
| 2013/0045308 A1 | 2/2013 | Gorbatenko |
| 2013/0068108 A1 | 3/2013 | Rivera |
| 2013/0068110 A1 | 3/2013 | Pagano |
| 2013/0142931 A1 | 6/2013 | Fin et al. |
| 2013/0149424 A1 | 6/2013 | Fischer |
| 2013/0156898 A1 | 6/2013 | Fisk et al. |
| 2013/0183130 A1 | 7/2013 | Etter |
| 2013/0269535 A1 | 10/2013 | Colantonio et al. |
| 2013/0340387 A1 | 12/2013 | Mariller |
| 2014/0102306 A1 | 4/2014 | White et al. |
| 2014/0102310 A1 | 4/2014 | Aardenburg et al. |
| 2014/0120223 A1* | 5/2014 | Boubeddi ............ A47J 31/407 |
| | | 426/416 |
| 2014/0157993 A1 | 6/2014 | Brouwer et al. |
| 2014/0202338 A1 | 7/2014 | Remo et al. |
| 2014/0220205 A1 | 8/2014 | Kamerbeek et al. |
| 2014/0238249 A1 | 8/2014 | Mariller et al. |
| 2014/0290493 A1 | 10/2014 | Rivera |
| 2014/0302204 A1 | 10/2014 | Evers et al. |
| 2014/0328981 A1 | 11/2014 | Kamerbeek et al. |
| 2014/0360377 A1 | 12/2014 | Yoakim et al. |
| 2015/0060481 A1 | 3/2015 | Murray et al. |
| 2015/0068403 A1 | 3/2015 | Bentley et al. |
| 2015/0093484 A1 | 4/2015 | Kamerbeek et al. |
| 2015/0182063 A1* | 7/2015 | Mills .................... A47J 31/46 |
| | | 99/283 |
| 2015/0201789 A1* | 7/2015 | Smith .................. A47J 31/407 |
| | | 99/295 |
| 2015/0257580 A1 | 9/2015 | Crarer et al. |
| 2015/0257585 A1 | 9/2015 | Windler et al. |
| 2015/0257586 A1 | 9/2015 | DiNucci |
| 2016/0029833 A1* | 2/2016 | Lin ..................... A47J 31/446 |
| | | 99/284 |
| 2016/0309946 A1 | 10/2016 | Gunstone et al. |
| 2016/0367069 A1 | 12/2016 | Cable et al. |
| 2016/0367070 A1 | 12/2016 | Cable et al. |
| 2017/0042364 A1 | 2/2017 | Crarer et al. |

FOREIGN PATENT DOCUMENTS

| | | |
|---|---|---|
| CN | 1984823 A | 6/2007 |
| CN | 101010019 A | 8/2007 |
| CN | 101095597 A | 1/2008 |
| CN | 201192274 Y | 2/2009 |
| CN | 101888801 A | 11/2010 |
| CN | 102987921 A | 3/2013 |
| EP | 0468080 A1 | 1/1992 |
| EP | 1521541 B1 | 7/2003 |
| EP | 1631176 B1 | 5/2004 |
| EP | 1208782 B1 | 8/2004 |
| EP | 1522241 A2 | 4/2005 |
| EP | 1829467 A2 | 9/2007 |
| EP | 1502528 B1 | 5/2008 |
| EP | 1653832 B1 | 10/2008 |
| EP | 1912542 B1 | 2/2009 |
| EP | 1981377 B1 | 7/2009 |
| EP | 1854384 B1 | 12/2009 |
| EP | 2210539 A2 | 7/2010 |
| EP | 2000062 B1 | 8/2010 |
| EP | 2004028 B1 | 8/2010 |
| EP | 2413754 B1 | 1/2013 |
| FR | 2842090 A1 | 1/2004 |
| TW | 201540241 | 11/2015 |
| WO | WO 97/43937 A1 | 11/1997 |
| WO | WO 01/60220 A1 | 8/2001 |
| WO | WO 02/043541 A1 | 6/2002 |
| WO | WO 2007/016977 A1 | 2/2007 |
| WO | WO 2007/017455 A1 | 2/2007 |
| WO | WO 2007/045553 A1 | 4/2007 |
| WO | WO 2007/110842 A2 | 10/2007 |
| WO | WO 2007/138457 A2 | 12/2007 |
| WO | WO 2009/016444 A2 | 2/2009 |
| WO | WO 2010/081311 A1 | 7/2010 |
| WO | WO 2010/136601 A1 | 12/2010 |
| WO | WO 2011/051867 A1 | 5/2011 |
| WO | WO 2011/138723 A1 | 11/2011 |
| WO | WO 2012/123857 A1 | 9/2012 |
| WO | WO 2015/082662 A1 | 6/2015 |
| WO | WO 2015/138292 A1 | 9/2015 |
| WO | WO 2015/138293 A1 | 9/2015 |
| WO | WO 2016/205072 A2 | 12/2016 |

* cited by examiner

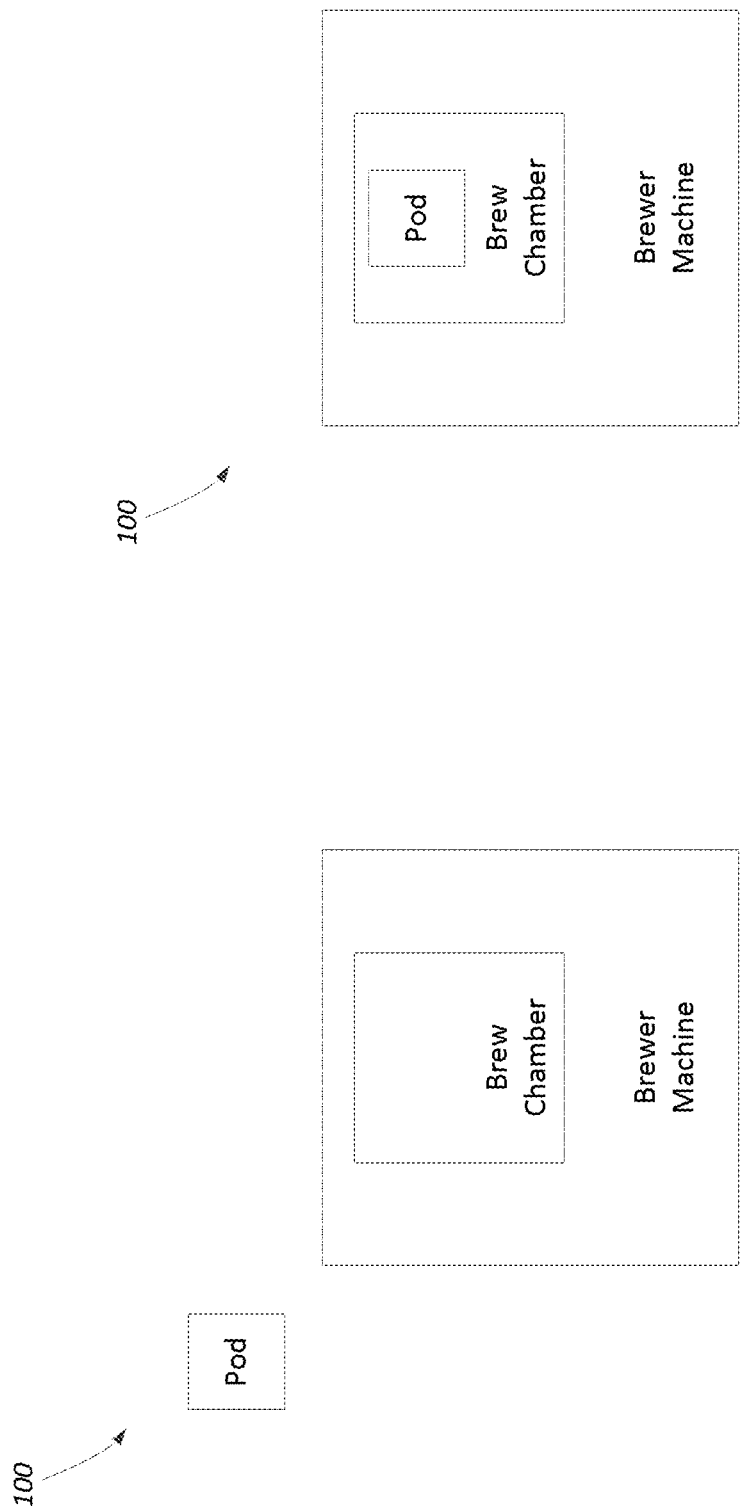

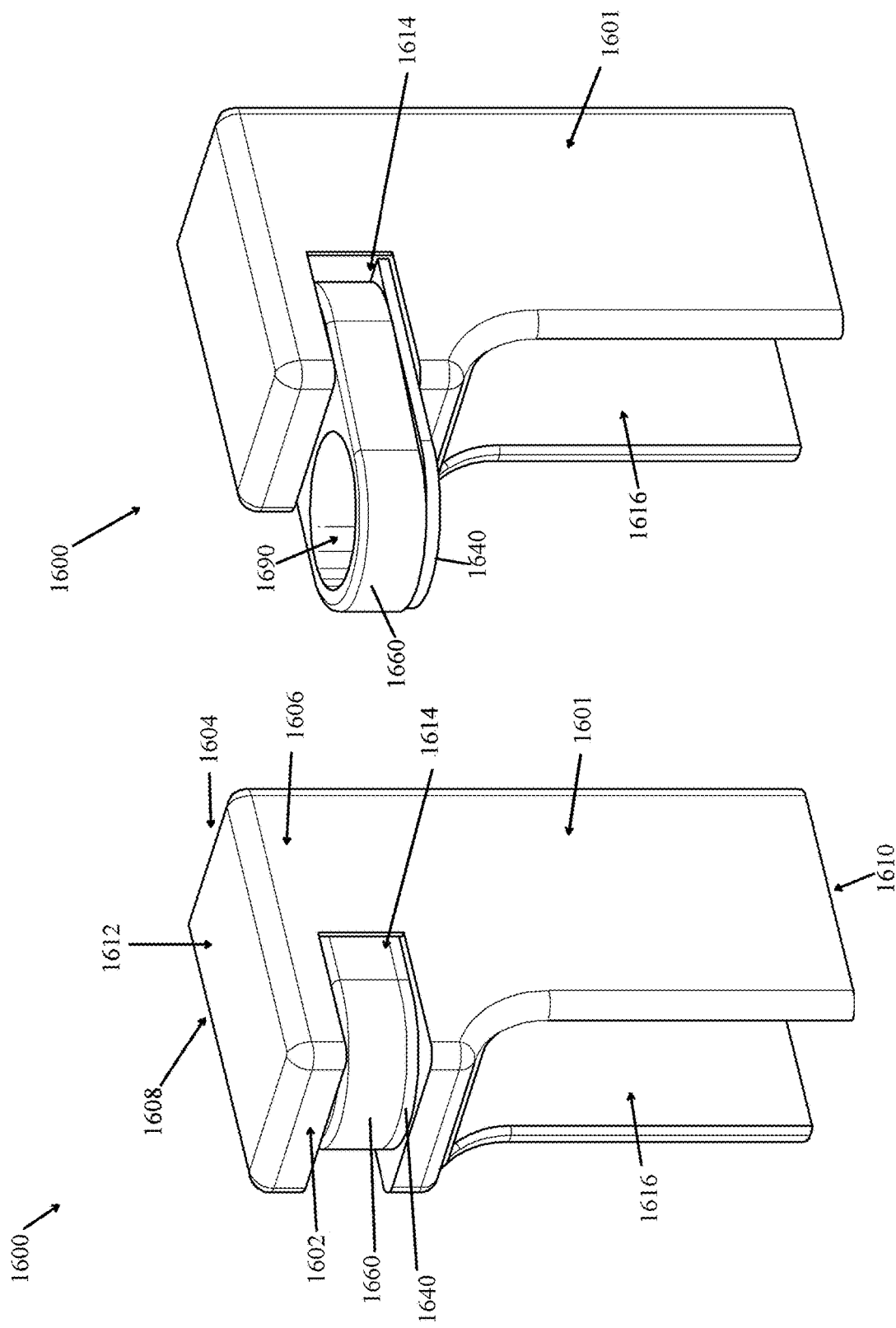

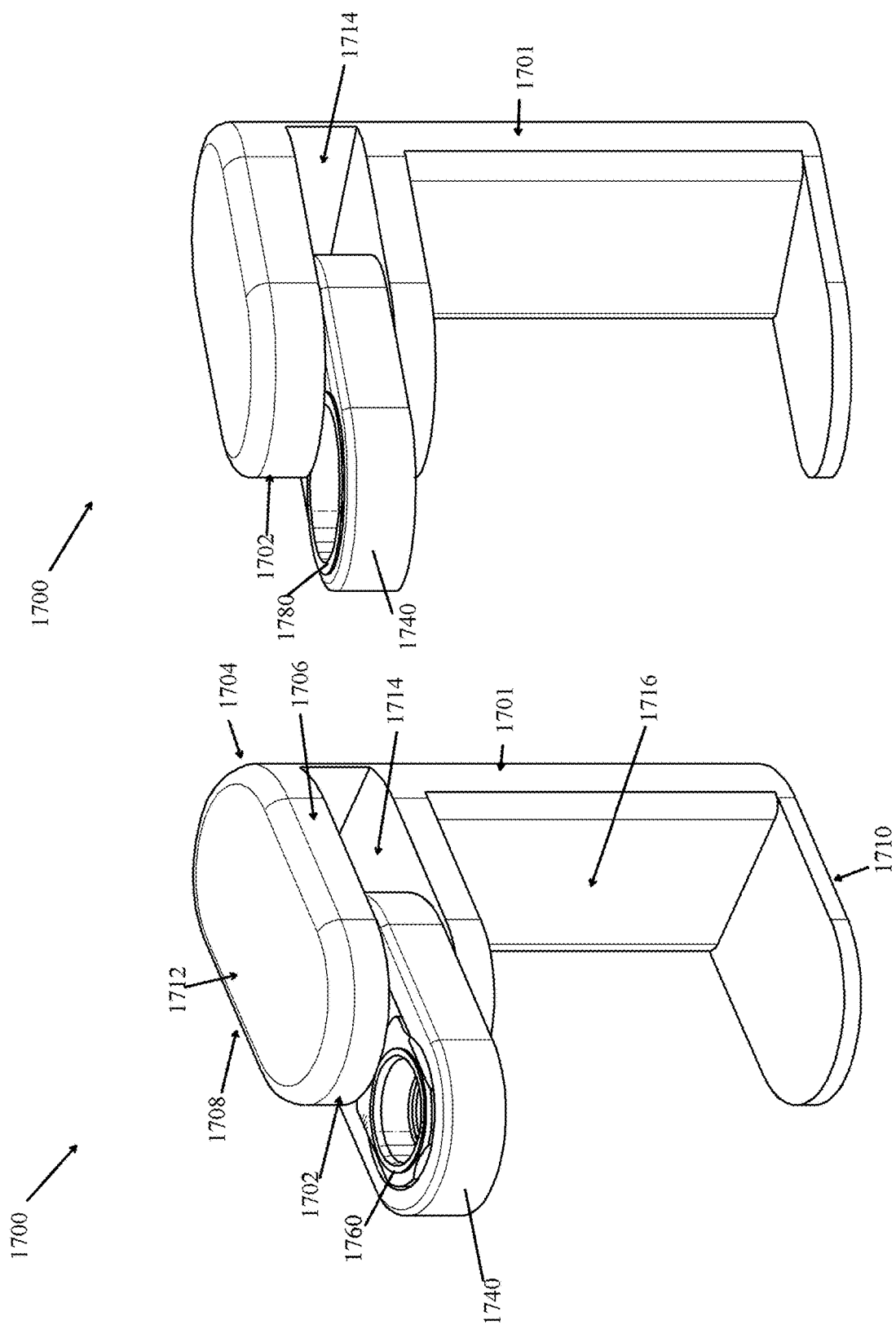

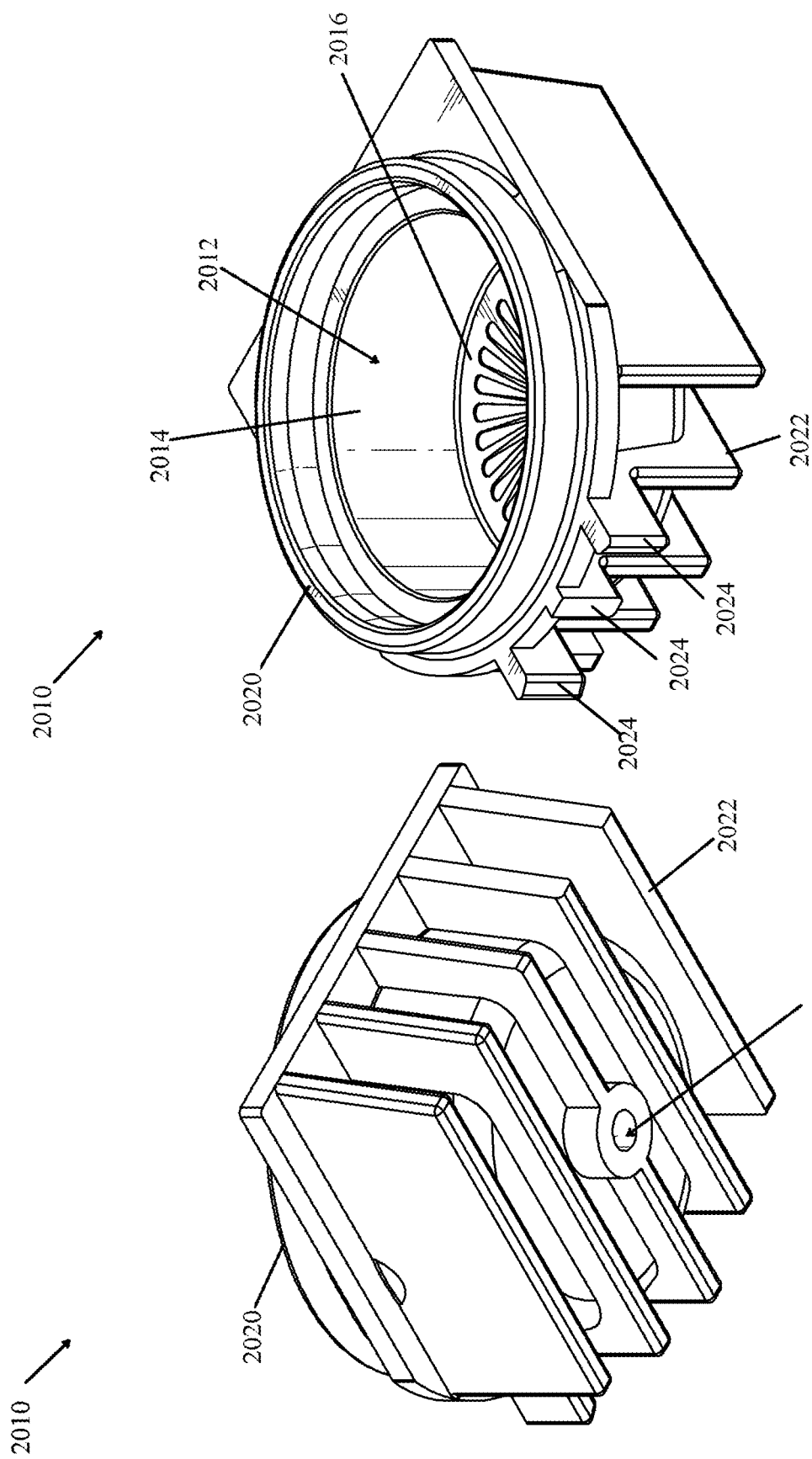

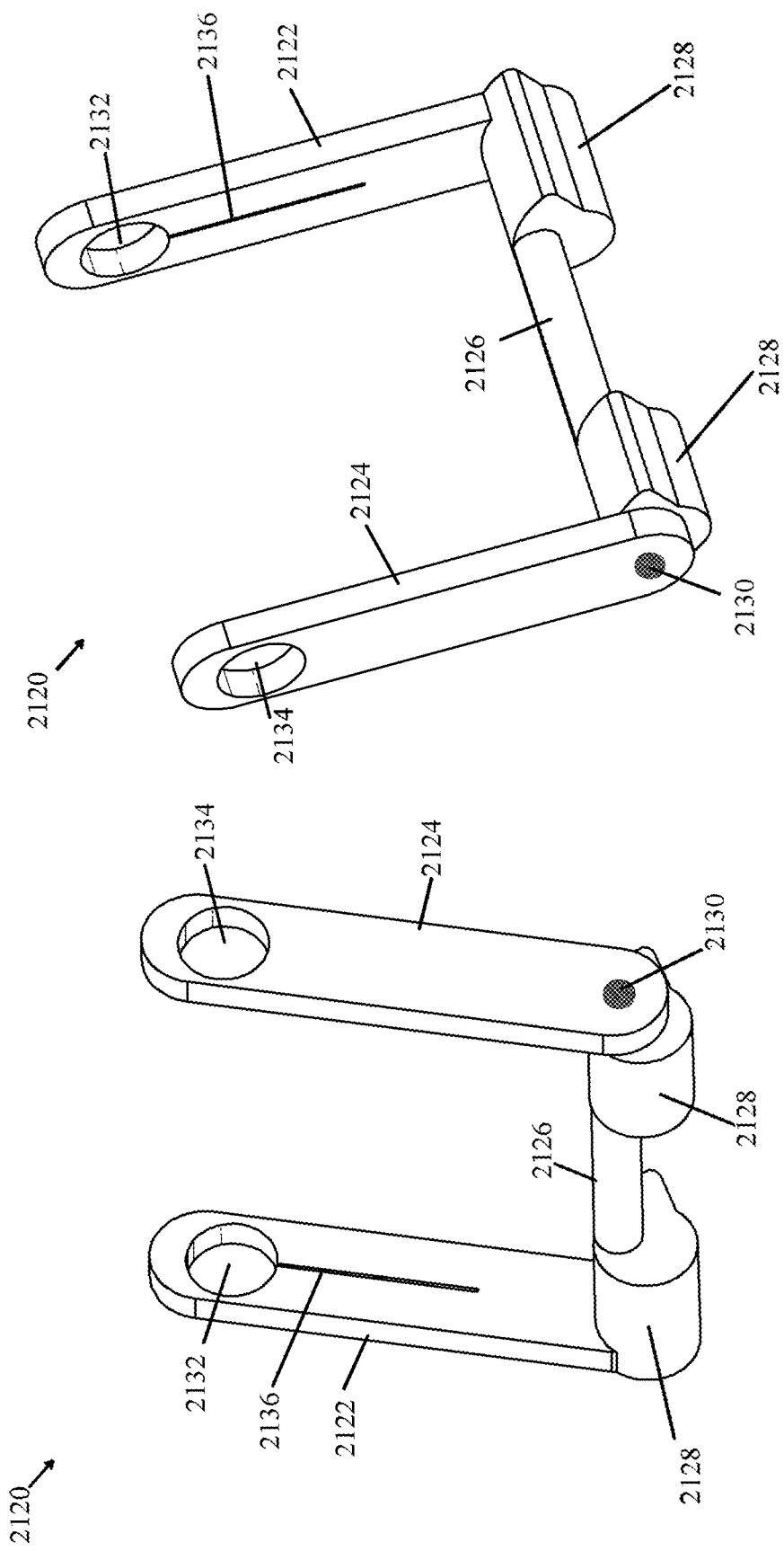

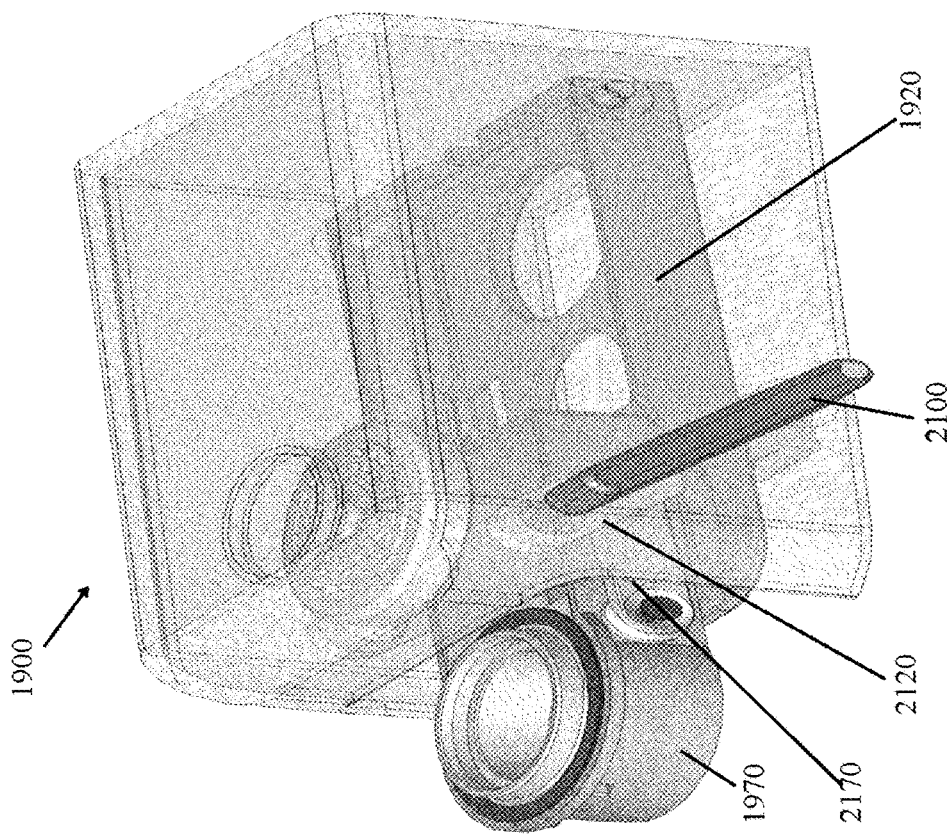
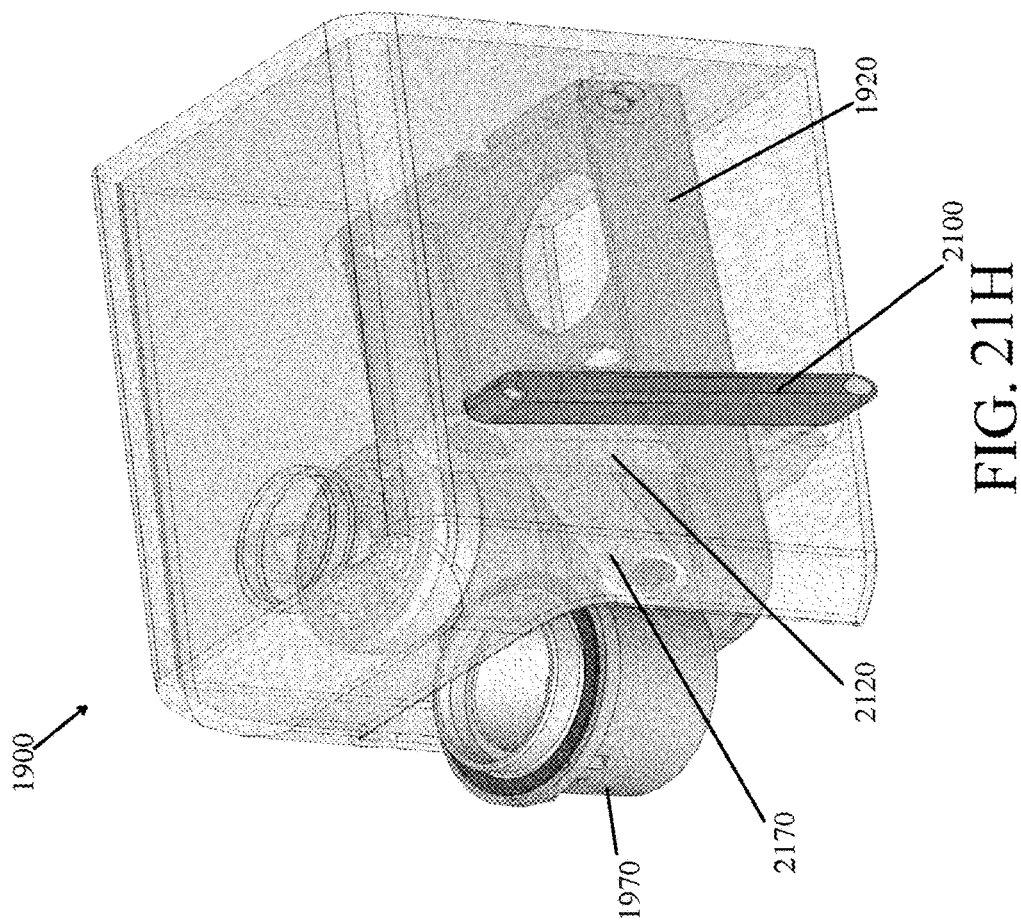
FIG. 21I
FIG. 21H

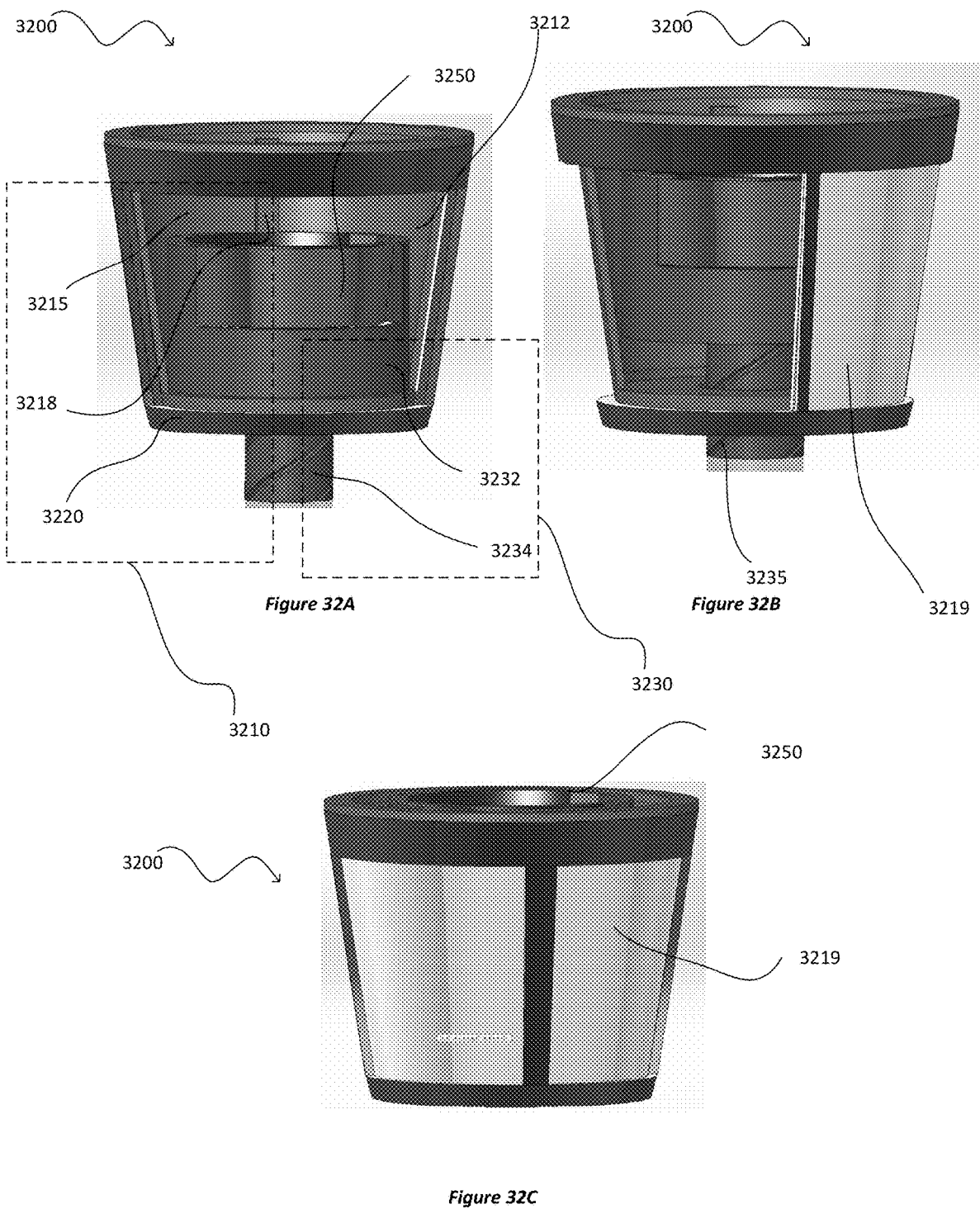

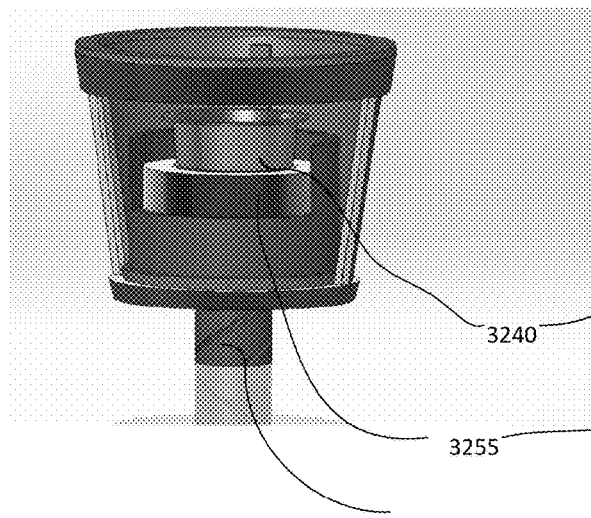
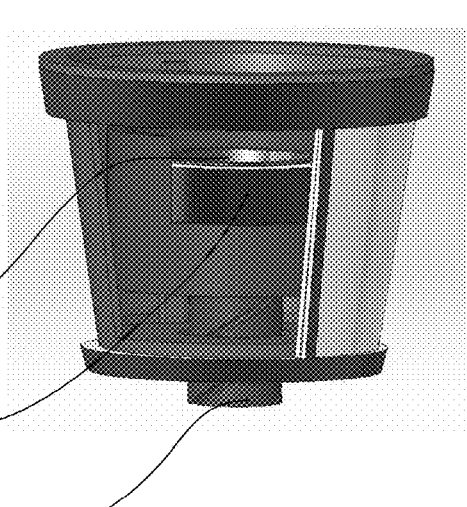
*Figure 34A*  *Figure 34B*
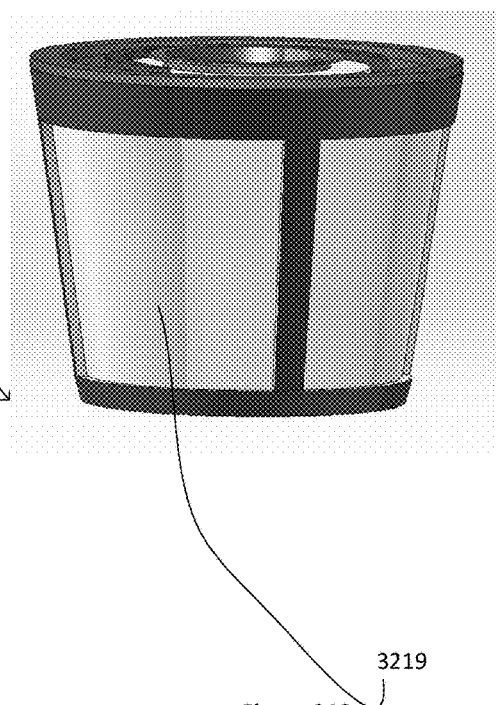
*Figure 34C*

BEVERAGE PREPARATION SYSTEMS WITH BREW CHAMBER ACCESS MECHANISMS

FIELD

This disclosure relates to systems for producing a beverage, such as systems that produce a single serving of a beverage.

DESCRIPTION OF CERTAIN RELATED ART

Single-serve beverage machines are devices that are designed to produce a single serving, or sometimes a single cup, of a desired beverage. In comparison to other types of beverage machines (such as drip coffee makers having a multi-cup carafe), single-serve beverage machines can enhance convenience by reducing the time to prepare the beverage.

Some single-serve beverage machines use a pod (also called a cartridge or capsule) containing one or more beverage components or precursors to produce the beverage. Generally, such pods are received in the single-serve beverage machine, are used to produce the single serving of the beverage, and are subsequently manually removed from the machine and discarded.

BRIEF DESCRIPTION OF THE DRAWINGS

Various embodiments are depicted in the accompanying drawings for illustrative purposes. The drawings should not be interpreted as limiting the scope of this disclosure. Various features of different disclosed embodiments can be combined to form additional embodiments, which are part of this disclosure. Any one feature, or any combination of features, of any embodiment can be included in any other embodiment.

FIGS. 1A and 1B schematically illustrate an embodiment of a beverage preparation system, including a brewer machine.

FIG. 16A illustrates a side perspective view of an example of a brewer machine in a first configuration.

FIG. 16B illustrates a side perspective view of an example of the brewer machine of FIG. 16A in a second configuration.

FIG. 17A illustrates a side perspective view of an example of a brewer machine in a first configuration.

FIG. 17B illustrates a side perspective view of an example of the brewer machine of FIG. 17A in a second configuration.

FIGS. 20A-20I illustrate examples of some components of the brewer machine portion of FIGS. 19A and 19B.

FIGS. 21A-21E illustrate examples of additional components of the brewer machine portion of FIGS. 19A and 19B.

FIGS. 21F-21I illustrate example movements of certain components of the brewer machine of FIGS. 19A and 19B.

FIGS. 32A-32C show perspective views of a sleeve mechanism for a brewer machine, with a first beverage pod size received in the sleeve.

FIGS. 34A-34C show perspective views of the sleeve mechanism of FIGS. 32A-32C, with a second beverage pod size received in the sleeve.

DETAILED DESCRIPTION OF CERTAIN EMBODIMENTS

Figure 2B:
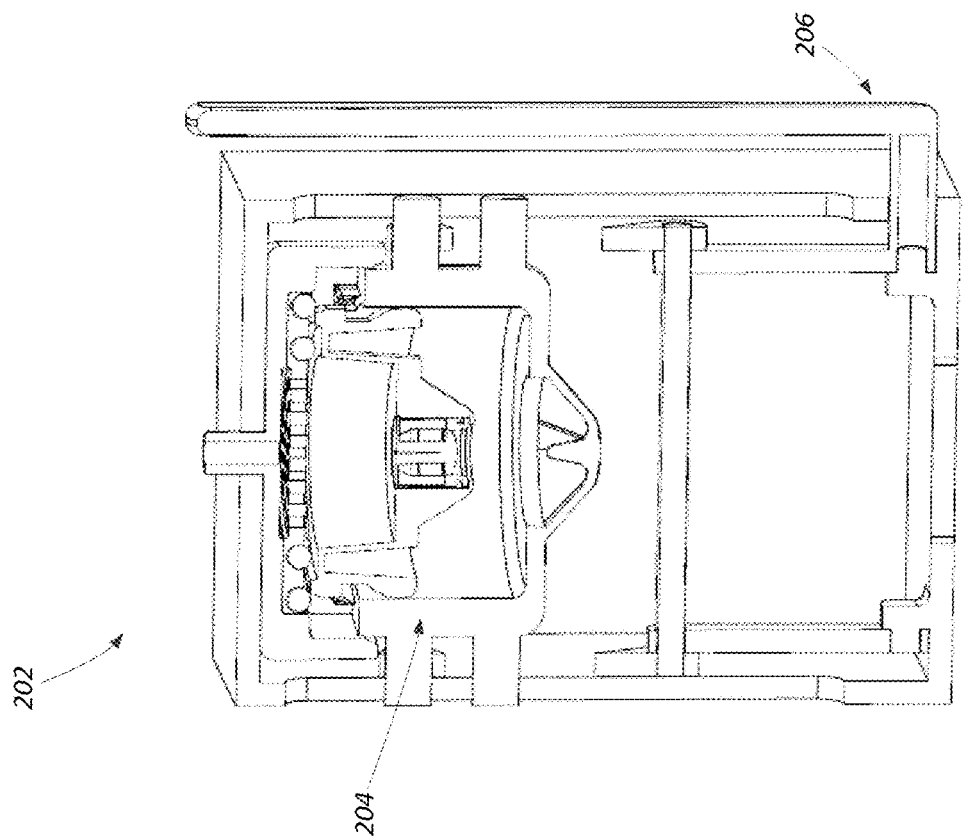
FIG. 2B illustrates a cross-sectional view of FIG. 2A.

Various beverage preparation systems, beverage pods, and brewer machines are described below to illustrate various examples that may be employed to achieve one or more desired improvements. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein.

Although certain aspects, advantages, and features are described herein, it is not necessary that any particular embodiment include or achieve any or all of those aspects, advantages, and features. For example, some embodiments may not achieve the advantages described herein, but may achieve other advantages instead. This disclosure contemplates all combinations of features from the various disclosed embodiments. Indeed, any structure, feature, or step in any embodiment can be used in place of, or in addition to, any structure, feature, or step in any other embodiment, or omitted. No feature, structure, or step is essential or indispensable.

Overview

FIG. 1A schematically illustrates an embodiment of a beverage preparation system 100. As shown, the system 100 can include a brewer machine. The brewer machine can include a brew chamber unit, in which some or all of the beverage preparation process (e.g., brewing) occurs. As also shown, the system 100 can include a beverage pod, such as a pod with a single serving of coffee grounds or beans. As illustrated in FIG. 1B, the beverage pod can be received into the brew chamber unit, such as by loading through a top or side of the brewer machine. During a beverage preparation operation, the brewer machine can introduce fluid (e.g., a liquid, such as water) into the beverage pod to produce a beverage in the pod. The beverage can flow out of the pod and be dispensed for consumption, such as into a cup or other vessel.

In some embodiments, the brew chamber unit is configured to receive multiple types of beverage pods. For example, the brew chamber unit can be configured to receive a first pod type with a smaller size (e.g., height, outside diameter, volume, etc.) and a second pod type with a larger size (e.g., height, outside diameter, volume, etc.). In certain variants, the brew chamber unit can convert from being configured to receive the first pod type to being configured to receive the second pod type, or vice versa. In some implementations, the first pod type is for preparing espresso drinks and the second pod type is for preparing brewed coffee drinks. Thus, the convertible brew chamber unit can enable the brewer machine to readily convert from being configured to prepare an espresso beverage to being configured to prepare a brewed coffee pod, or vice versa.

As will be discussed in more detail below, in some variants, the brew chamber unit includes an outer portion and an inner portion, such as an outer cup that receives an inner cup. In some implementations, the inner portion comprises an axially moving insert (also called a "floating insert") that facilitates the conversion from the brew chamber unit. For example, in some embodiments, when a second pod type is inserted into the brew chamber unit, the pod engages the floating insert, which moves the floating insert and converts the brew chamber unit into a configuration for preparing a brewed coffee drink. In some variants, the floating insert is configured to receive the first pod type and to engage (but not receive) the first pod type.

Various embodiments are configured to present the brew chamber unit to a user, which can promote loading a pod into, and/or removal of a pod from, the brew chamber unit. For example, in some embodiments, the brew chamber unit is part of a movable drawer of the brewer machine. In some implementations, the drawer can move (e.g., slide outward) to present a user with a first chamber, such as a chamber configured to receive an espresso coffee pod. In some embodiments, the drawer can move to present a user with a second chamber, such as a chamber configured to receive a brewed coffee pod. In certain variants, the drawer can move (e.g., slide and/or rotate) to present a user with both the first and the second chambers, which can allow the user to choose which chamber to use.

Some embodiments include a sliding portion, such as a tray that is received in and/or slides relative to the drawer. The sliding portion can be configured to aid in converting the brew chamber unit. For example, one of the first and second chambers can be located on the sliding portion, and can be slid into a use position relative to the other of the first and second chambers. In certain variants, the first chamber can be slid over (e.g., reside above) the second chamber.

Various embodiments are configured to secure the pod during a beverage preparation operation. For example, the pod can be secured within the brew chamber unit so as to inhibit or avoid escape of water (e.g., except via an beverage outlet of the pod). In that regard, some embodiments include one or more seals that sealingly engage the pod. In certain embodiments, the pod is secured inside the brew chamber unit, such as by the engagement of a lid with the outer portion of the brew chamber unit. In some embodiments, such engagement results in the inner portion of the brew chamber unit being secured (e.g., maintained generally stationary relative) to the outer portion of the brew chamber unit, as is discussed in more detail below.

In certain implementations, the brew chamber unit is connected with a securing mechanism, such as a linkage. The linkage can include cams that slide in tracks. The securing mechanism can move the brew chamber unit between a secured state (e.g., a state for brewing) and an unsecured state (e.g., a state for loading and/or unloading the pod). In some embodiments, the securing mechanism is configured to tilt the brew chamber unit generally toward a user in the unsecured state.

Figure 2A:
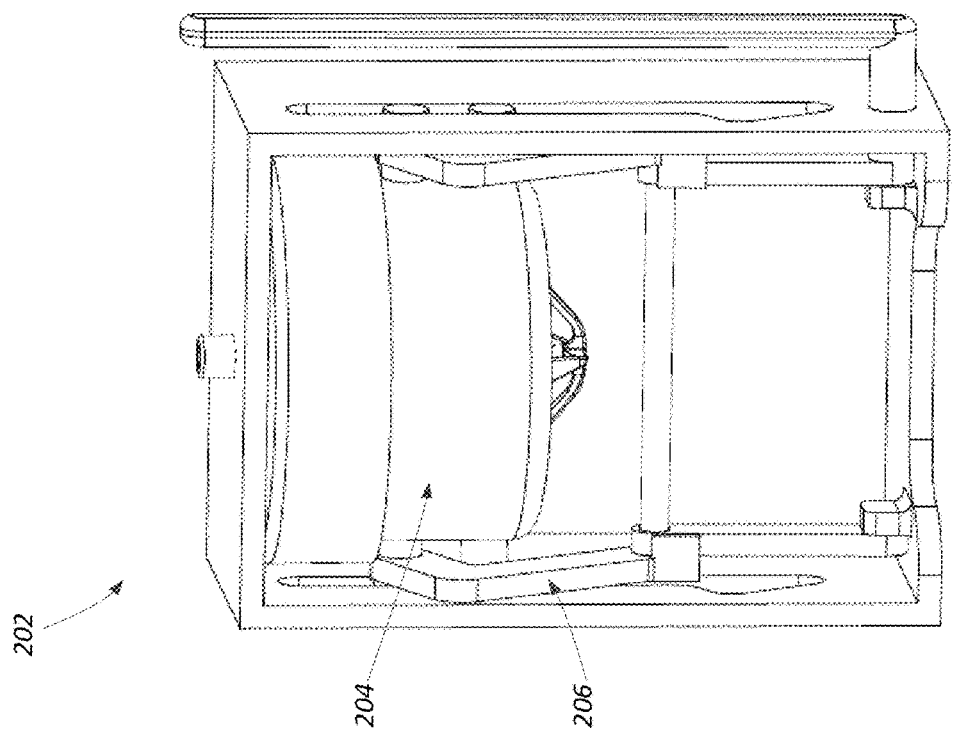
FIG. 2A illustrates a perspective view of an embodiment of a brewer machine.

An example of a brewer machine 202 is illustrated in FIGS. 2A and 2B. As shown, the brewer machine 202 can include a brew chamber unit 204 that can receive a beverage pod (not shown). The brewer machine 202 can include a linkage mechanism 206 configured to move the brew chamber unit 204 between open and closed positions, such as with a lever or other actuator. Fluid, such as water or another liquid, can be introduced into the pod in the brew chamber unit 204 to facilitate preparation of a beverage (e.g., coffee), which can be dispensed from the brewer machine 202 to a cup or other vessel.

Certain embodiments and examples are disclosed below in the context of coffee beverages, such as brewed coffee and/or espresso beverages. However, various aspects of this disclosure can be used in other contexts as well, such as tea or other types of beverages and/or foods. Moreover, while the embodiments and examples disclosed below are in the context of single-serve beverage pods, certain features may also be applied to multiple-cup applications. Furthermore, any one feature, or any combination of features, of any embodiment or example can be used in any other embodiment or example. For example, the brew chamber shown in FIGS. 3A-13D can be used in any of the brewer machines described herein, such as in any of the devices of FIGS. 16A-34C.

Certain Brew Chamber Units Configured to Receive Multiple Beverage Pod Sizes

Figure 3A:
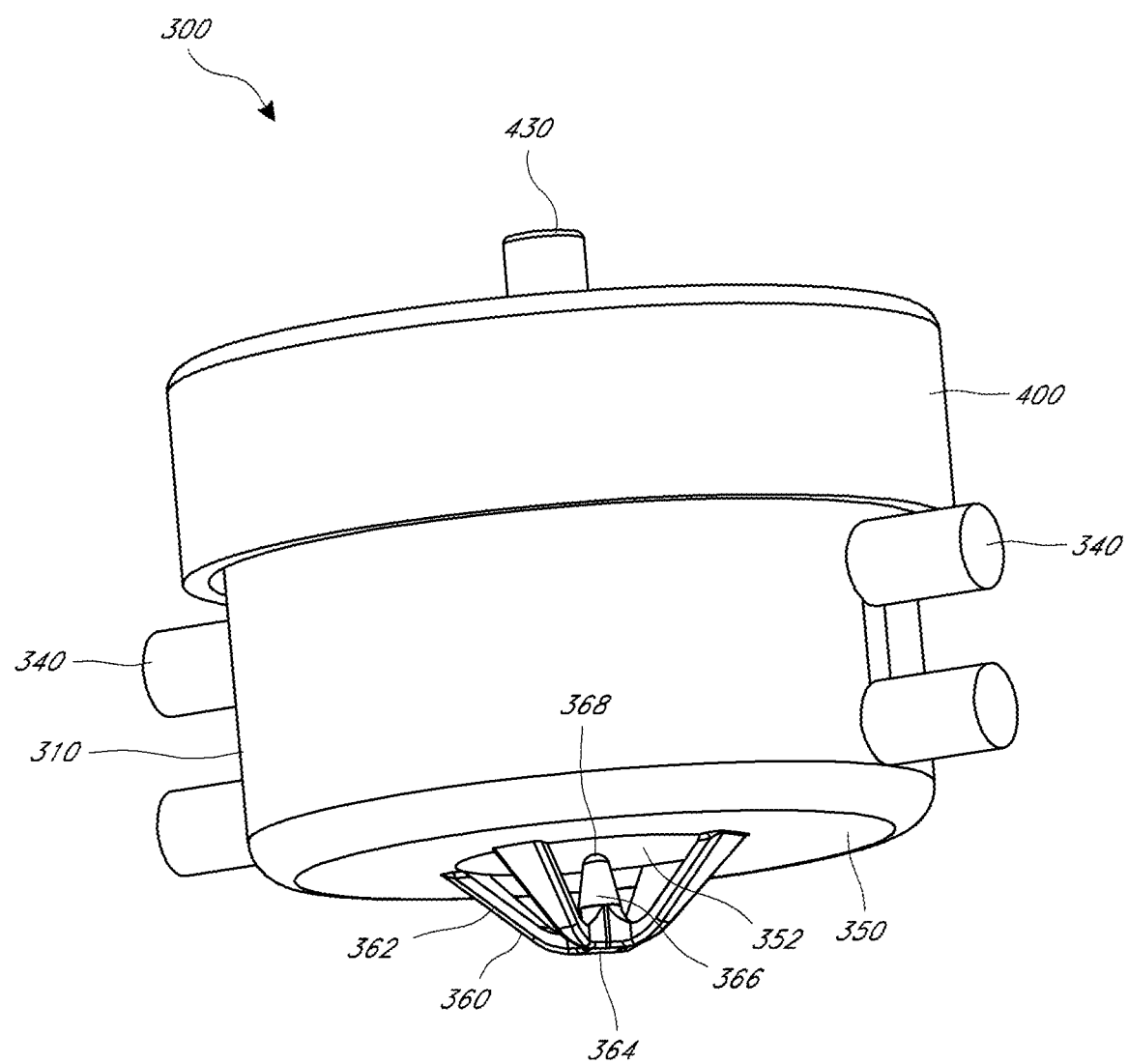
FIG. 3A illustrates a perspective view of an embodiment of a brew chamber unit.
Figure 3B:
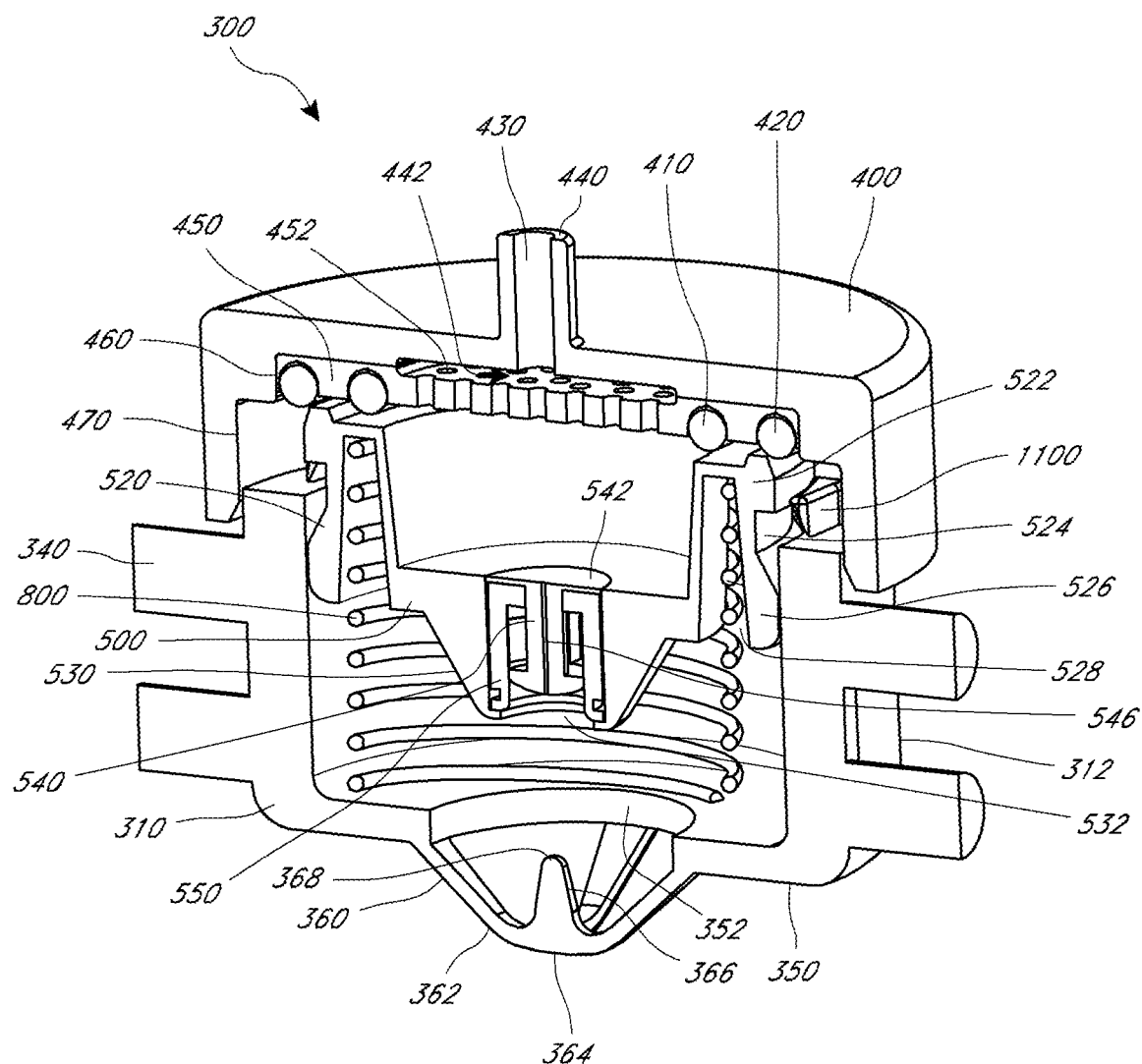
FIG. 3B illustrates a cross-sectional view of the brew chamber unit of FIG. 3A along a first axis.
Figure 3C:
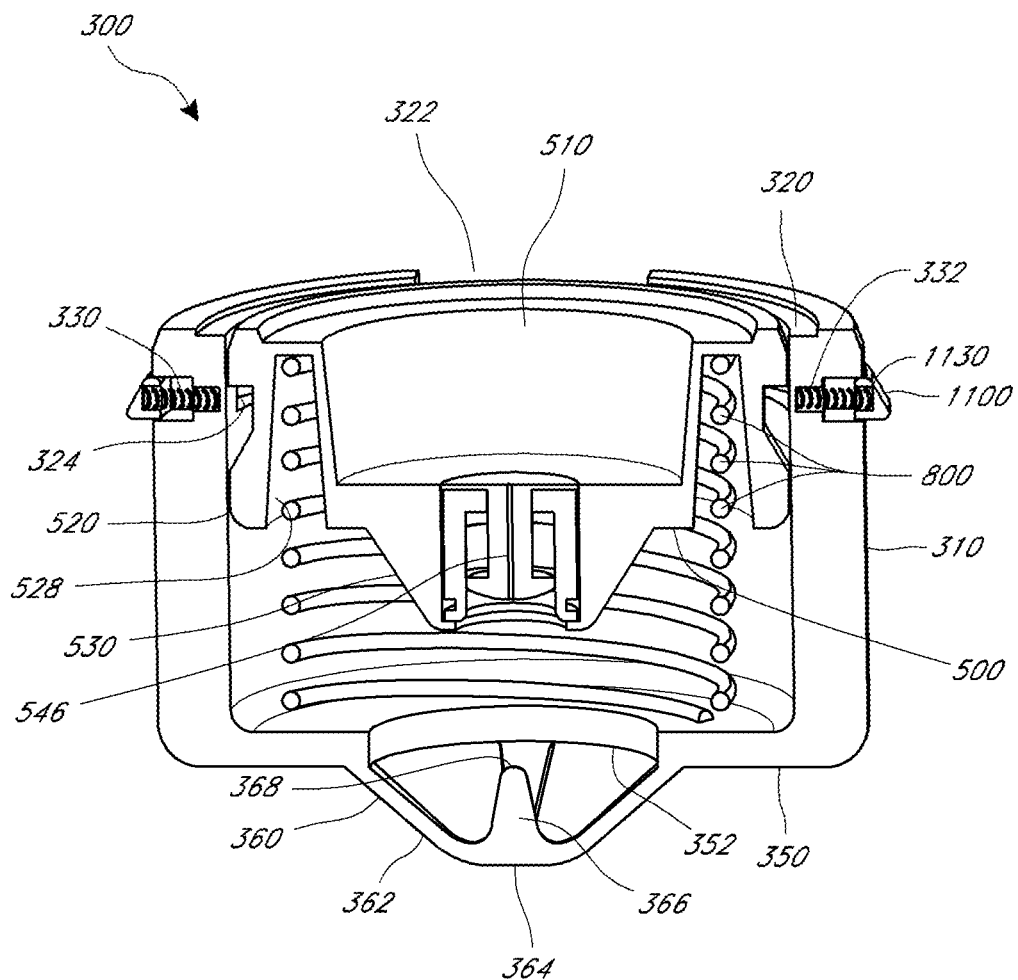
FIG. 3C illustrates a cross-sectional view of the brew chamber unit of FIG. 3A without a lid along a second axis.
Figure 4A:
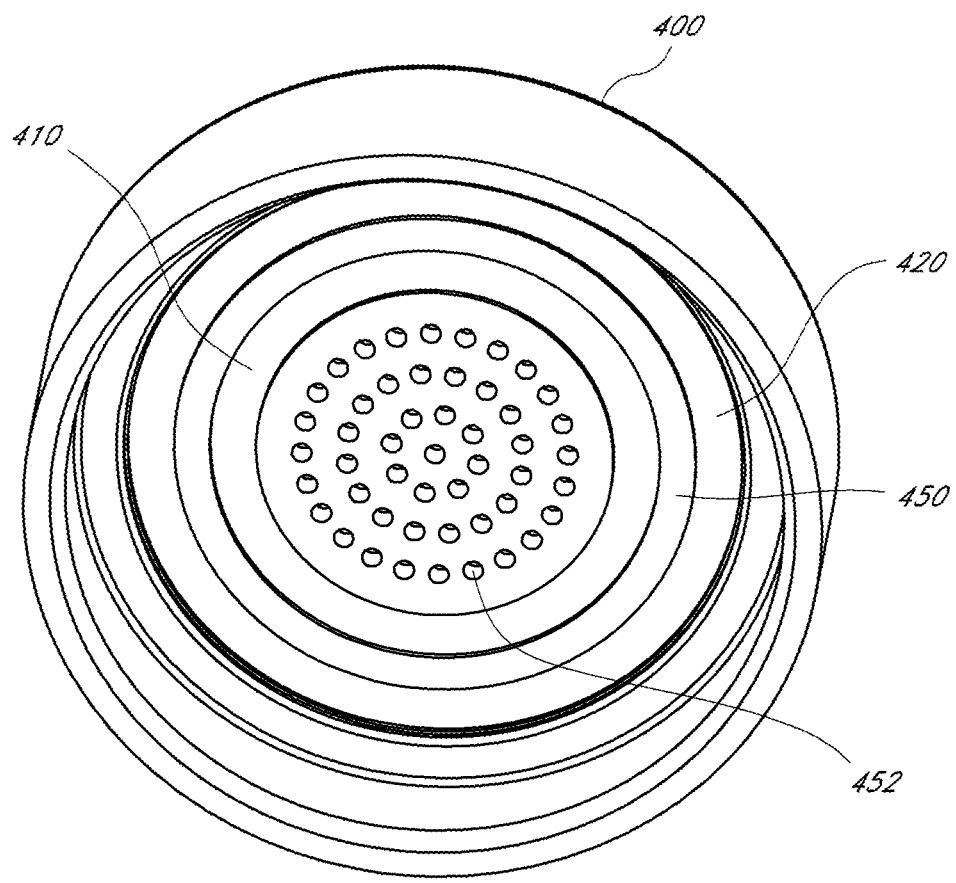
FIG. 4A illustrates a bottom perspective view of a lid of the brew chamber unit of FIG. 3A.
Figure 4B:
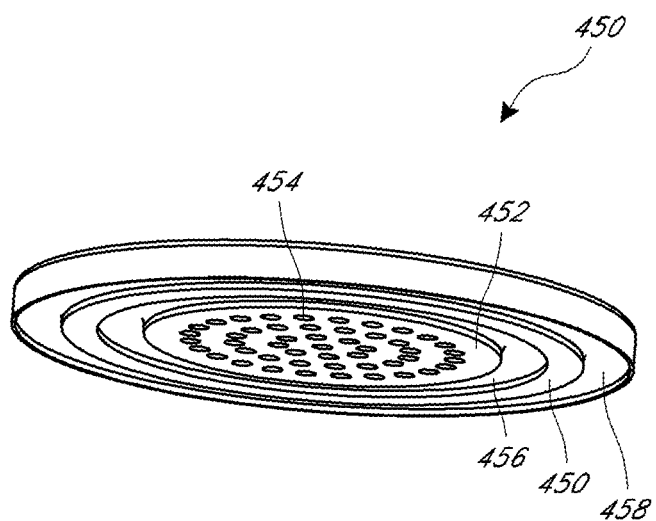
FIG. 4B illustrates a perspective view of a fenestrated inlet of the lid of FIG. 4A.
Figure 5A:
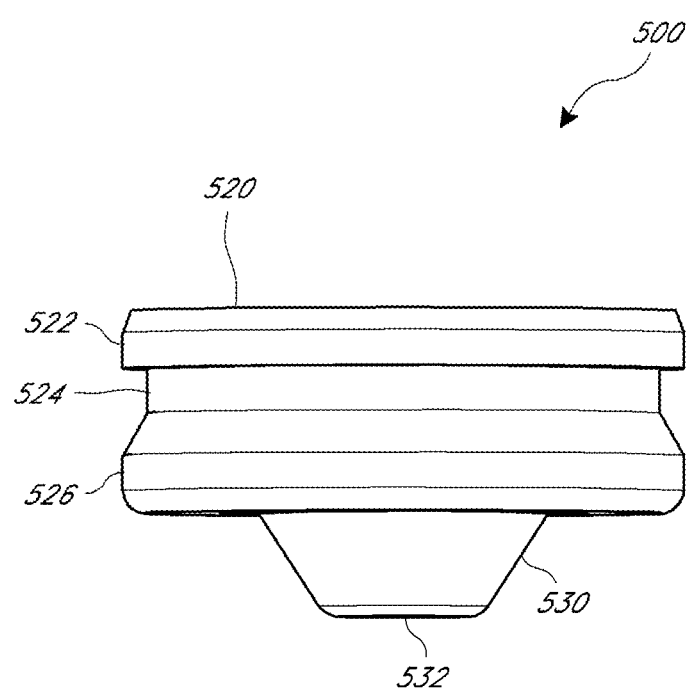
FIG. 5A illustrates a side view of the inner portion of the brew chamber unit of FIG. 3A.
Figure 5B:
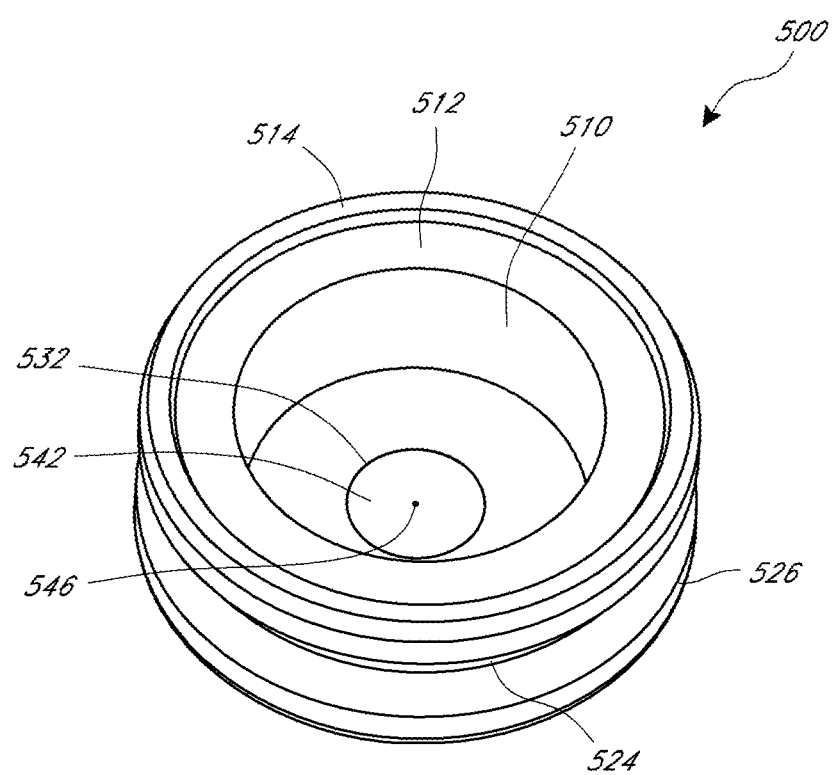
FIG. 5B illustrates a top perspective view of the inner portion of FIG. 5A.
Figure 5C:
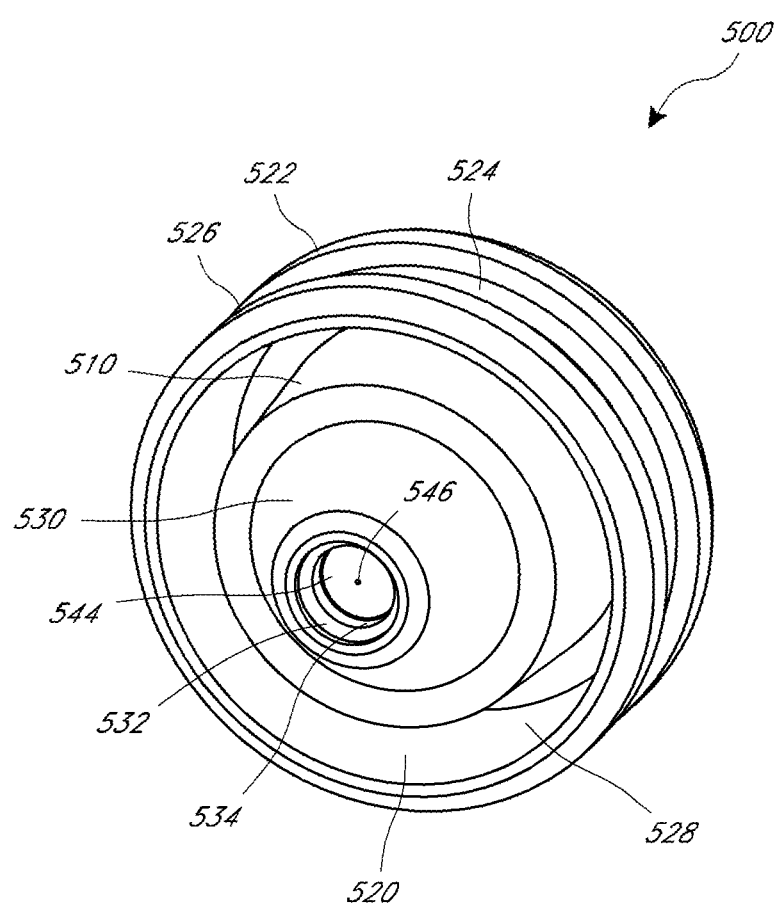
FIG. 5C illustrates a bottom perspective view of the inner portion of FIG. 5A.

FIGS. 3-5 illustrate a plurality of views of a brew chamber unit 300. FIG. 3A illustrates a perspective view of the brew chamber unit 300. FIGS. 3B and 3C provide two cross-sectional views of the brew chamber unit 300. The first cross-sectional view shown in FIG. 3B shows the cross-section along a first axis dividing the outer portion 310 along the securing structures 340 on the outside surface of the outer portion 310. The second cross-sectional view shown in FIG. 3C is a cross-section along a second axis perpendicular to that of the first axis in FIG. 3B. FIGS. 4A and 4B illustrate perspective views of a lid 400 and a fenestrated inlet 450 of the brew chamber unit 300. FIGS. 5A-5C illustrate side and top and bottom perspectives of an inner portion 500 of the brew chamber unit 300.

In some embodiments, the brew chamber unit 300 can be configured to receive multiple types of beverage pods. For example, the brew chamber unit 300 can be configured to receive a first pod type with a larger size (e.g., diameter, height, and/or volume) and a second pod type with a smaller size (e.g., diameter, height, and/or volume). In some embodiments, the brew chamber unit 300 includes an outer portion 310 that can accommodate a first pod type with a larger size. In some implementations, the brew chamber unit 300 can include an inner portion 500 that can accommodate a second pod type with a smaller size. As seen in FIGS. 3B and 3C, in some embodiments, the inner portion 500 can be configured to fit within the outer portion 310. In some variations, the outer surface of the inner portion 500 can be configured such that it lies flush against the inner surface of the outer portion 310.

Some embodiments can include a biasing member, such as a spring 800. As seen in FIGS. 3B and 3C, in some examples, the spring 800 can be located within the outer portion 310. In some embodiments, the inner portion 500 can be biased by the spring 800. For example, the spring 800 can be disposed about the body of the inner portion 500 and/or compressed between the outer and inner portions 310, 500. In some embodiments, this can enable the inner portion 500 to move within the outer portion 310. For example, the inner portion 500 can be moved toward a bottom surface of the outer portion 310, such as by sufficient load being applied to the inner portion 500 to overcome the bias of the spring 800. In some variants, when the load on the inner portion 500 is sufficiently reduced or removed, the bias of the spring 800 moves the inner portion 500 generally away from a bottom surface of the outer portion 310. In various embodiments, the inner portion 500 can be configured to serve as and/or described as "floating" in the outer portion 310. As will be discussed in more detail below, in some examples, the spring 800 can allow the inner portion 500 to be axially moveable within the outer portion 310 as the spring is compressed and expanded to accommodate pods of different sizes (e.g., a first pod type of a larger size and a second pod type with a smaller size.)

In some embodiments, the brew chamber unit 300 can include the lid 400. The lid 400 can be configured to attach to the outer portion 310. As will be discussed below, in some embodiments, the lid 400 can provide fluid communication between a fluid dispenser and the brew chamber unit 300. In some embodiments, the lid 400 can include one or more seals that can sealingly engage the pod to inhibit or avoid the escape of water (e.g., except via a beverage outlet of the pod). In certain implementations, the lid 400 can be configured to engage a securing mechanism that can, in some examples, engage the inner portion 500 or a first pod type with a larger size.

As discussed above, the brew chamber unit 300 can include an outer portion 310, which can engage with a lid 400 as the beverage is prepared. In some embodiments, the outer portion 310 can have a plurality of securing structures 340. In some embodiments, the securing structures 340 can interact with the brewer machine to secure the brew chamber unit 300 in place, as is described in more detail below. In some embodiments, the securing structures 340 can engage with structures within the brewer machine to allow the manipulation of the outer portion 310 (e.g., tilting, upward movement, downward movement).

As seen in FIGS. 3A-3C, in some examples, the outer portion 310 can include a body 312. In some examples, the body 312 is configured such that it can accommodate a first pod type and/or size, such as a pod for producing brewed coffee. The body 312 can be configured to accommodate the inner portion 500 and a biasing structure, such as a spring 800.

In some embodiments, the body 312 can include a distal shelf 320, such as a distal and/or upper end of the body 312. The lid 400 can be disposed about an outer surface of the distal shelf 320, such as is shown in FIGS. 3A and 3B. This can facilitate the preparation of the beverage within the brew chamber unit 300.

In some embodiments, the distal shelf 320 is configured to retain a locking mechanism 1100. For example, as illustrated in FIG. 3C, the distal shelf 320 can be configured to engage and retain the locking mechanism 1100. In some examples, the distal shelf 320 can include a plurality of holes 332 that can be aligned with a plurality of holes 1130 on the locking mechanism 1100. In some embodiments, the distal shelf 320 and locking mechanism 1100 can be engaged to allow the locking mechanism 1100 to move relative to the distal shelf 320 of the outer portion 310. In some examples, the engagement between the distal shelf 320 and locking mechanism 1100 can be provided by a spring 330. In some embodiments, the engagement can be any structure that retains the locking mechanism 1100 while providing movement within the distal shelf 320 of the outer portion 310. The configuration and function of the locking mechanism 1100 and the distal shelf 320 of the outer portion 310 are discussed in more detail below.

In some embodiments, the body 312 can include a base 350, such as on a proximal end. As shown, the base 350 can include an opening 352. As shown, the opening 352 can be located in or about the radial center of the base 350. In some variants, the opening 352 is located offset from a radial center of the base 350.

In some embodiments, the outer portion 310 can include a valve actuator 360. The valve actuator 360 can be attached to the base 350 about the opening 352. The valve actuator 360, as will be discussed below, can be configured to actuate the structure in the inner portion 500 that allows the dispensing of the beverage. In some embodiments, as seen in FIGS. 3A-3C, the valve actuator 360 can include a plurality of arms 362 and a protrusion 366. The plurality of arms 362 of the valve actuator 360 can be located about the opening 352 of the base 350. In some embodiments, the plurality of arms 362 can be spaced evenly about the opening 352. The plurality of arms 362 can extend downward such that they are connected at a point 364 that is coaxial with the opening 352. In some embodiments, a protrusion 366 can be attached to the point 364 such that the length of the protrusion 366 can extend towards the opening 352. In some embodiments, the protrusion 366 can be cone shaped and narrows to a tip 368. As mentioned above and will be discussed below in more detail, the tip 368 can interact with the structure in the inner portion 500 to dispense the beverage.

FIG. 4A illustrates a bottom perspective view of the lid 400. As can be seen, in some embodiments, the lid 400 can include a fenestrated inlet 450. In some examples, the fenestrated inlet 450 can be attached to the inside of the lid 400 and/or can be retained in the underside of the lid 400. FIG. 4B illustrates a perspective view of an example of the fenestrated inlet 450. As shown, in certain implementations, the fenestrated inlet 450 has a circular shape.

In some examples, the fenestrated inlet 450 can include a diffusing element 452 located at the center. The diffusing element 452 can be located at the center of the fenestrated inlet 450 and can include a plurality of openings 454. In some embodiments, the plurality of openings 454 can be arranged in a concentric circular pattern. In some embodiments, the plurality of openings 454 can be arranged in a variety of different and/or random configurations across the surface of the diffusing element 452.

In some embodiments, the fenestrated inlet 450 can include a plurality of grooves (e.g., the inner seal groove 456 and outer seal groove 458) that are concentrically aligned about the diffusing element 452. In some examples, the plurality of grooves (e.g., the inner seal groove 456 and outer seal groove 458) can receive a plurality of seals (e.g., inner seal 410 and outer seal 420). In some examples, the inner seal groove 456 and outer seal groove 458 are sufficiently large (e.g., indented) such that only a portion of the plurality of seals (e.g., inner seal 410 and outer seal 420) can protrude from the surface of the fenestrated inlet 450. In some embodiments, this also allows the inner seal 410 and outer seal 420 to be secured in the fenestrated inlet 450 of the lid 400.

In some embodiments, the lid 400 can include an inner seal 410 and an outer seal 420. As discussed above, in some examples, the fenestrated inlet 450 can include a plurality of grooves, such as the grooves 456, 458 that can receive seals. In some embodiments, the inner seal 410 and outer seal 420 are toroid shaped and are secured in the inner seal groove 456 and outer seal groove 458, respectively. In some embodiments, the inner seal groove 456 and outer seal groove 458 are configured to engage the second pod of a smaller size and the first pod of a larger size, respectively. In some embodiments, the inner seal 410 and outer seal 420 are constructed of a rubber or elastomeric material that can conform with the circumference of each of the beverage pods. The inner seal 410 and outer seal 420 can conform to the circumference of the beverage pod to form a seal to inhibit or avoid the escape of fluid as the beverage is prepared.

In some embodiments, the lid 400 can include a distal lumen 430. In some examples, the distal lumen 430 can be located on the distal surface of the lid 400 and can provide a fluid connection through the lid 400. In some embodiments, the distal lumen 430 has an opening 440 that can be configured to receive or connect to a fluid dispenser.

The lid 400 can provide an inlet for fluid during a beverage preparation operation. For example, fluid can flow past the opening 440 and through the distal lumen 430. In certain examples, the fluid can be retained in the space 442 between the fenestrated inlet 450 and distal lumen 430. In some embodiments, the space 442 and plurality of openings 454 on the diffusing element 452 can allow the fluid to be dispensed throughout the beverage pod. In some embodiments, this allows the even distribution of fluid through the beverage pod and inhibits or prevents a concentration of fluid from developing in any portion of the beverage pod. In some embodiments, the plurality of openings 454 can also provide for a consistent or gradual filling of the beverage pod as the plurality of openings 454 on the fenestrated inlet 450 limits (e.g., slows, restricts) the inflow of water into the beverage pod. In some embodiments, as will be discussed below, the lid 400 can actuate the locking mechanism 1100 to secure the inserted beverage pod.

With reference to FIGS. 5A-5C, as previously indicated, the brew chamber unit 300 can include the inner portion 500. In some embodiments, the inner portion 500 can include a body 510. The body 510 can be configured to receive a second pod type and/or size, such as a pod for preparing espresso-based drinks. In various embodiments, the second pod size is smaller than the first pod size, such as in height, diameter, and/or volume.

The distal end of the body 510 can include an inner ledge 512 and a distal lip 514. In some embodiments, the inner ledge 512 can be spaced below the distal lip 514. In some examples, as seen in FIG. 3B, the inner ledge 512 can accommodate the inner seal 410 discussed above. In some embodiments, the inner seal 410 has a thickness that can engage with the inner ledge 512. As discussed above, this can form a seal to inhibit or prevent fluid from escaping the inner portion 500.

With continued reference to FIGS. 5A-5C, in some examples, the inner portion 500 can include an outer retention structure 520 that can be disposed about the body 510. In some variants, the outer retention structure 520 can be attached on the distal end of the body 510. The outer retention structure 520 can be attached to the body 510 so as to form an interior opening 528. As discussed above, the interior opening 528 can retain the spring 800 such that the inner portion 500 acts as a floating insert within the outer portion 310. In some embodiments, the interior opening 528 can retain the spring 800 when compressed. In some embodiments, the outer retention structure 520 includes a distal ledge 522 and a proximal ledge 526 that can form a retention groove 524. As will be discussed below, in some embodiments, the locking mechanism 1100 can interact with the retention groove 524 to secure the inner portion 500 and to inhibit or prevent axial movement of the inner portion 500 after the lid 400 is secured.

In certain embodiments, the inner portion 500 can include an outlet structure 530. In some examples, the outlet structure 530 can be attached to the proximal end of the body 510. The outlet structure 530 can include a lumen 534 that provides a coaxial opening 532 through the outlet structure 530. In some embodiments, the lumen 534 provides a fluid connection from the body 510 through the outlet structure 530.

In some examples, the outlet structure 530 includes a valve 540 that can be retained in the lumen 534 by the valve retention cylinder 550. In certain variants, the valve 540 can be retained within the lumen 534 by the outlet structure 530 or another structure that allows the valve 540 to move relative to the lumen 534. As seen in FIGS. 3B and 3C, in some embodiments, the valve retention cylinder 550 can be retained in the lumen 534 by the structure of the proximal end of the lumen 534. In some examples, the valve 540 has a diameter that can be less than the diameter of the valve retention cylinder 550 so as to retain the valve 540 within the lumen 534. In some embodiments, the diameter of the distal end 542 can be greater than the inner diameter of the valve retention cylinder 550 such that the distal end 542 of the valve rests against the distal end of the valve retention cylinder 550 and seals the opening 532 to the lumen 534 from the inside of the inner portion 500. In some embodiments, the valve 540 can include a narrow lumen 546 that runs through the length of the valve 540. As will be described in more detail below, in certain embodiments, the narrow lumen 546 of the valve 540 can provide another outlet for the prepared beverage and can also serve to retain pressure within the inner portion 500.

In operation, in some embodiments, the inner portion 500 can be partially disposed within the spring 800 and can float within the outer portion 310 such that it can be axially moveable within the outer portion 310. As will be discussed in more detail below, the mobility of the inner portion 500 can allow the brew chamber unit 300 to accommodate beverage pods of a variety of sizes. As will also be discussed below, in some embodiments, the outlet structure 530 and valve 540 can be configured to dispense the prepared beverage. As will be shown, in some embodiments, the beverage can be dispensed either by engaging the valve actuator 360 with the valve 540 within the outlet structure 530. In some embodiments, the beverage can be dispensed by forcing the prepared beverage through the narrow lumen 546 of the valve 540.

Figure 6A:
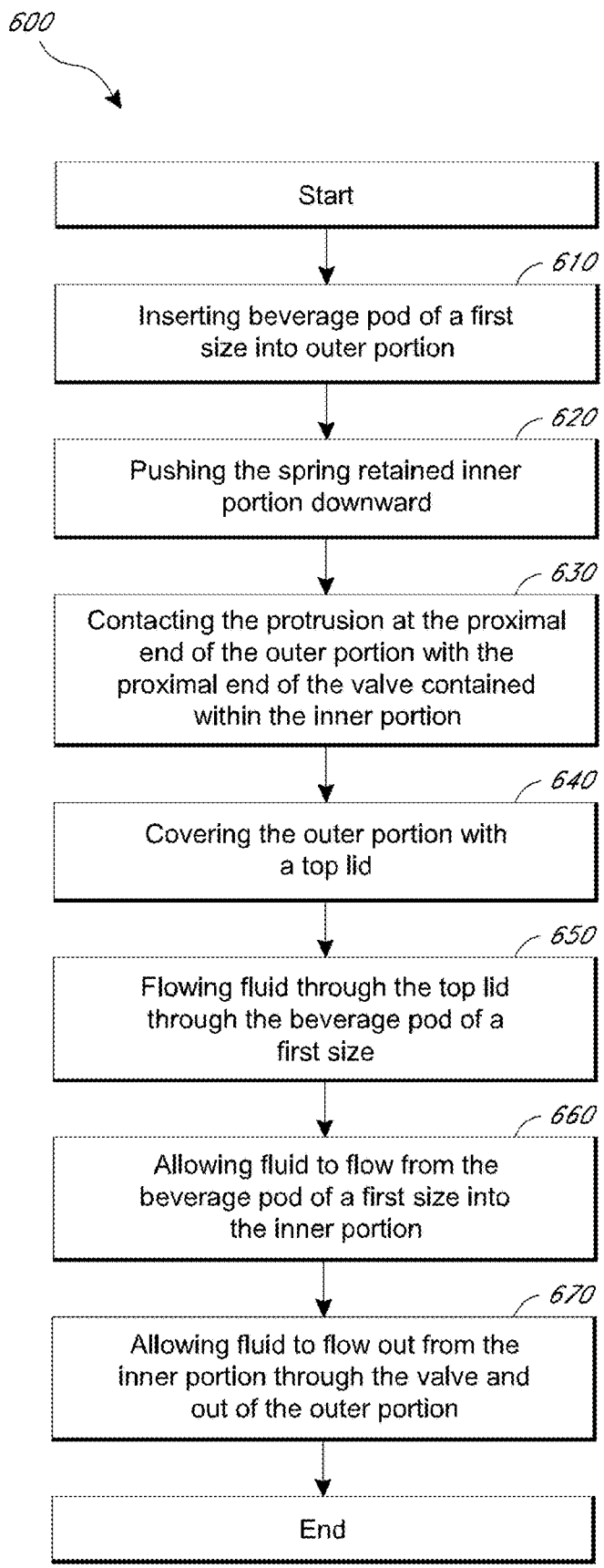
FIG. 6A schematically illustrates an embodiment of a method for brewing a beverage pod of a first size using an embodiment of a brew chamber unit.
Figure 6B:
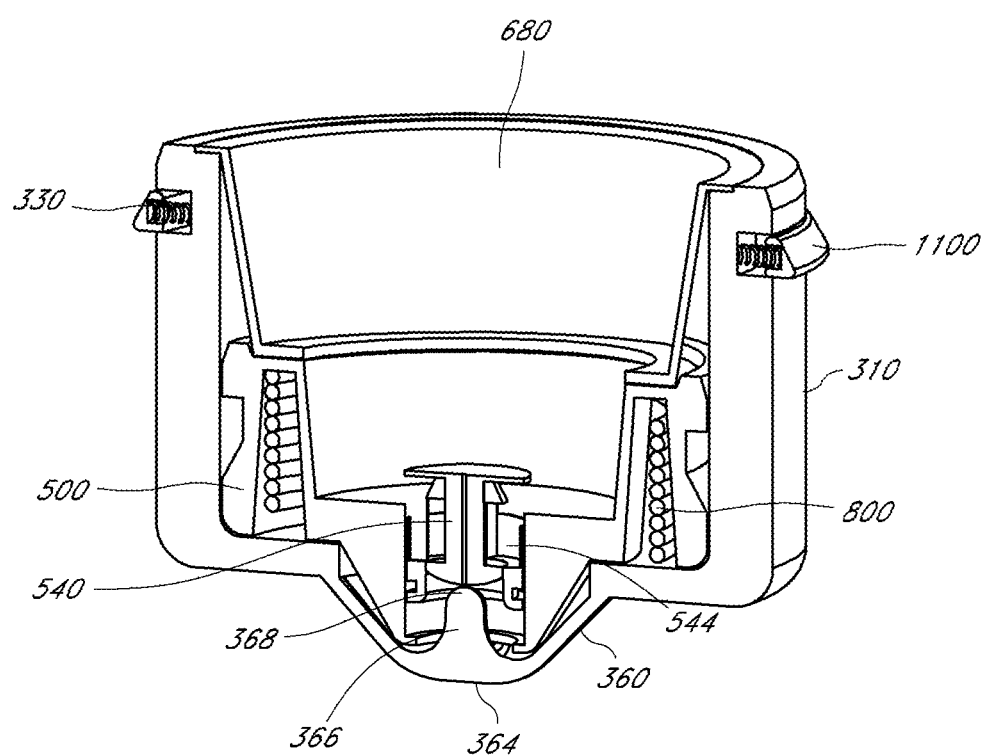
FIGS. 6B and 6C illustrate cross-sectional views of the brew chamber unit of FIG. 3A along a second axis with an inserted beverage pod of a first size, with and without the lid of FIG. 4A.
Figure 6C:
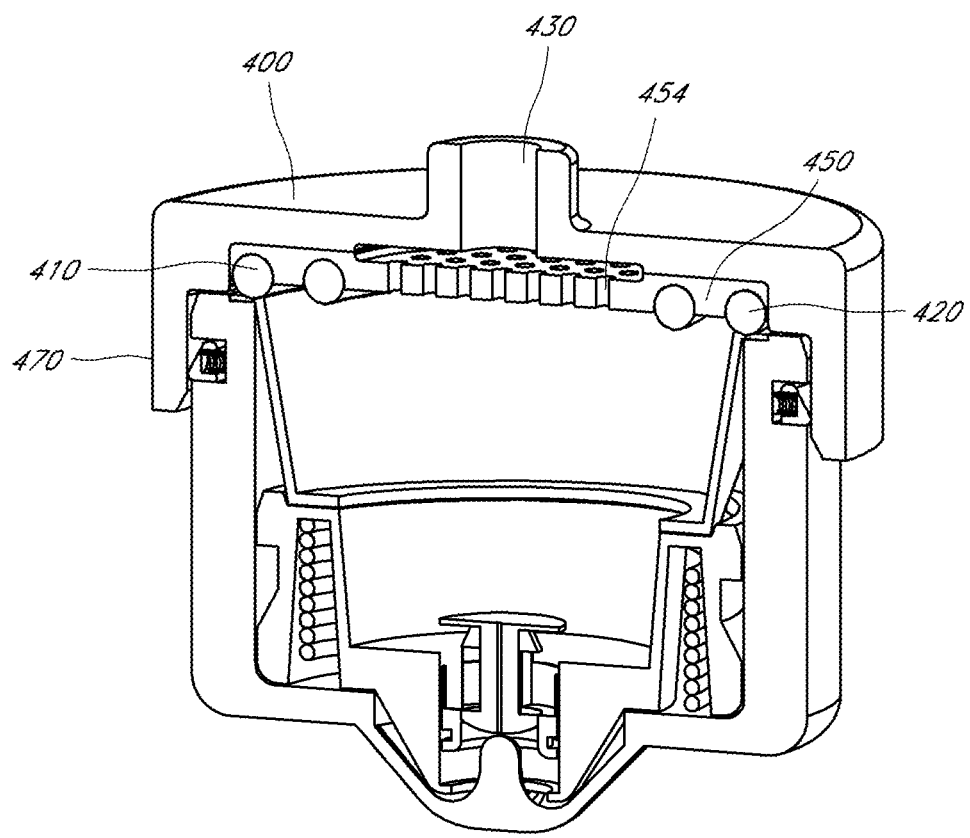

FIG. 6A schematically illustrates a method for brewing a beverage pod of a first size 600 wherein the brew chamber unit 300 is shown to accommodate a beverage pod of a first size 680 (e.g., wherein the pod has a greater diameter). FIGS. 6B-6C illustrate cross-sectional views of the brew chamber unit 300 with and without the lid 400 with the beverage pod of a first size 680 inserted.

As shown, in block 610, in some embodiments, the method can include inserting a beverage pod of a first size 680. In some implementations, the beverage pod of a first size 680 can be used for preparing brewed coffee drinks. In some embodiments, the beverage pod of a first size 680 has a filter covering on the distal and proximal end of the beverage pod of a first size 680. In some examples, the filter seals in the beverage component (e.g., inhibits or prevents solids from exiting, such as coffee grounds or tea leaves) but can be sufficiently permeable to allow fluid to enter and exit the beverage pod of a first size 680. As can be seen in FIGS. 6B and 6C, in some examples, the beverage pod of a first size 680 has a base diameter that can be the same as the inner ledge 512 of the inner portion 500. In some variants, the inner ledge 512 can allow the beverage pod of a first size 680 to sit on the distal end of the inner portion 500. Further, in some variants, the distal lip 514 on the distal end of the inner portion 500 can be disposed about the base of the beverage pod of a first size 680 to secure the beverage pod of a first size 680.

Some embodiments include placing the beverage pod of a first size 680 on the inner portion 500. Certain embodiments include block 620, which includes pushing the inner portion 500 downward, such as by applying force to the inner portion 500 via the pod of a first size 680. Some embodiments include compressing the spring 800 with the inner portion 500. For example, FIGS. 6B and 6C illustrate the spring 800 in a compressed state. In some embodiments, compression of the spring 800 and/or movement the inner portion 500 downward can accommodate the beverage pod of a first size 680. As discussed earlier, the inner portion 500 can compress the spring 800 to accommodate the beverage pod of a first size 680 such that the beverage pod of a first size 680 fits entirely within the body 312 of the outer portion 310.

The method can include block 630 wherein the pushing down of the inner portion 500 causes the protrusion 366 to contact the proximal end 544 of the valve 540 so as to move the valve 540 in a distal direction. As illustrated in FIGS. 6B and 6C, the height of the beverage pod of a first size 680 pushes the inner portion 500 in a proximal direction such that the outlet structure 530 is pushed into the valve actuator 360. In some embodiments, the lumen 534 of the outlet structure 530 can be positioned above the protrusion 366 of the valve actuator 360 such that the tip 368 of the protrusion 366 can be brought in contact with the proximal end 544 of the valve 540. The profile of the protrusion 366 pushes the valve 540 distally such that the distal end 542 protrudes from the base of the inner portion 500 to allow a fluid connection between the inner portion 500 and the lumen 534. As will be discussed below, this fluid connection allows the prepared beverage to be dispensed.

The method can include block 640 which can include covering the outer portion 310 with a lid 400. As seen in FIG. 6C, the lid 400 can be attached to the outer portion 310 such that it is disposed about the distal shelf 320 of the outer portion 310. In some embodiments, the lid 400 can be attached or secured on the outer portion 310 through a mechanical structure (e.g., a lever or a lock) that can be actuated by the user. In some embodiments, the lid 400 can be attached or secured on the outer portion 310 through a motorized mechanism. As will be discussed below, the brew chamber unit 300 can have a locking mechanism 1100 that can be actuated by the attachment of the lid 400 to the outer portion 310.

As described above, the lid 400 can include a plurality of seals. A first of the seals can be configured to sealingly engage the beverage pod of a first size 680 as the lid 400 is attached to inhibit or prevent fluid from spilling out as the beverage is prepared. As described above for FIGS. 4A and 4B, the fenestrated inlet 450 of the lid 400 can retain an inner seal 410 and an outer seal 420. In this embodiment, because of the larger diameter of the beverage pod of a first size 680, the outer seal 420 can be shaped to sealingly engage the beverage pod of a first size 680. As described above, the outer seal 420 can be constructed of a material that can compress and conform with the distal rim of the beverage pod of a first size 680 in order to form a seal.

Some embodiments include securing the lid 400 to the outer portion 310. Certain embodiments include block 650 which can include flowing fluid through the lid 400 into the beverage pod of a first size 680. As described above, and seen in FIG. 6C, the lid 400 can have a distal lumen 430 on the distal end that can be configured to receive or connect to a fluid dispenser. In operation, fluid can flow through the distal lumen 430 and through the plurality of openings 454 on the fenestrated inlet 450. As described above, the plurality of openings 454 on the fenestrated inlet 450 can allow the fluid to be spread across the surface of the beverage pod of a first size 680. This can serve the purpose of evenly filling the beverage pod of a first size 680. As well, in some examples where the beverage pod of a first size 680 has a filter covering the distal end, the fenestrated inlet 450 inhibits or prevents fluid from directly flowing into the beverage pod of a first size 680 which can cause the filter to distort and/or tear. As the fluid enters into the beverage pod of a first size 680, the fluid can interact with the beverage component (e.g., coffee grounds, tea leaves, beverage mix) so as to prepare the beverage.

Some embodiments include flowing fluid through the distal lumen 430 and into the beverage pod of a first size 680. Certain implementations of the method can include block 660 with recites allowing fluid (e.g., prepared beverage) to flow from the beverage pod of a first size 680 into the inner portion 500. In some embodiments, the proximal end of the beverage pod of a first size 680 that is facing the inner surface of the inner portion 500 can be composed of a filter that allows the prepared beverage to pass through. In some embodiments, the proximal end of the beverage pod of a first size 680 has a valve that can be temperature, mechanically, or pressure activated. A variety of examples are described in U.S. Patent Application No. 62/082,452, filed Nov. 20, 2014, the entirety of which is incorporated by reference herein. For example, the valve can be a bi-material valve, a mesh or other substrate impregnated with a material that melts away, or a thermal shear film. In some embodiments, the valve is a film that is configured to by ruptured (e.g., by contact with a sharp tip), such as during insertion of the pod or in response to a certain pressure being achieved. In some embodiments, activation of the valve opens an outlet or otherwise allows the prepared beverage to flow out of the beverage pod of a first size 680 and/or into the inner portion 500.

The method can include block 670, which includes allowing fluid (e.g., prepared beverage) to flow out from the beverage pod of a first size 680 and/or the inner portion 500. For example, the fluid can pass through the opening 532 and lumen 534 of the outlet structure 530. As described above, insertion of the beverage pod of a first size 680 can engage (e.g., push) the inner portion 500 downward, which can engage the proximal end 544 of the valve 540 with the protrusion 366 of the valve actuator 360. In some embodiments, the protrusion 366 engages (e.g., pushes) the valve 540. This can displace the valve 540 (see FIG. 6B) and/or can open a passage in the lumen 534 of the outlet structure 530, thereby providing a fluid communication path through the inner portion 500. In some embodiments, the beverage exits the beverage pod of a first size 680 and enters a portion of the inner portion 500, such as the lumen 534. In certain implementations, the beverage exits the lumen 534 and passes through the opening 352 in the outer portion 310. In various embodiments, the beverage is dispensed, such as into a user's cup or other vessel.

In some embodiments, after the prepared beverage is dispensed, the beverage pod of a first size 680 can be removed from the outer portion 310. In some examples, after the beverage pod of a first size 680 is removed, the spring 800 can expand to return the inner portion 500 back to its original position within the outer portion 310. As will be seen below, the interaction between the spring 800 and inner portion 500 facilitates the conversion of the brew chamber unit 300 from one that can brew beverages from a beverage pod of a first size 680 to beverages from a beverage pod of a second size.

Figure 7A:
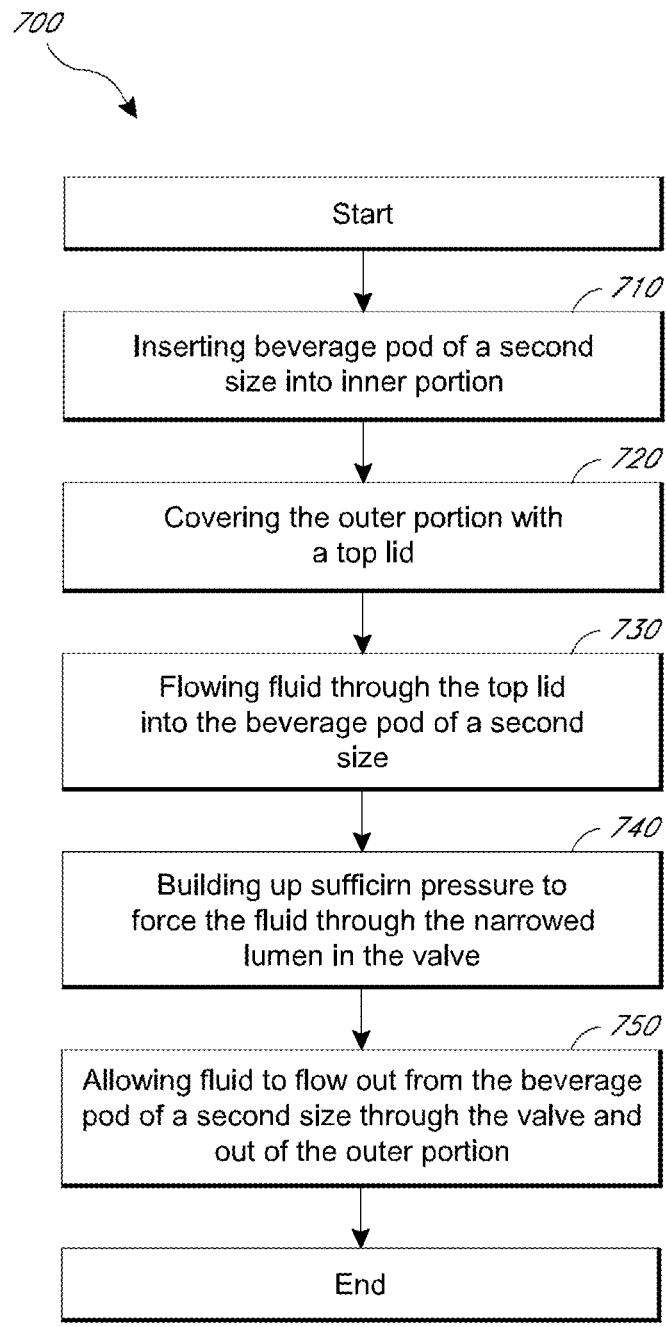
FIG. 7A schematically illustrates an embodiment of a method for brewing a beverage pod of a second size using an embodiment of a brew chamber unit.
Figure 7B:
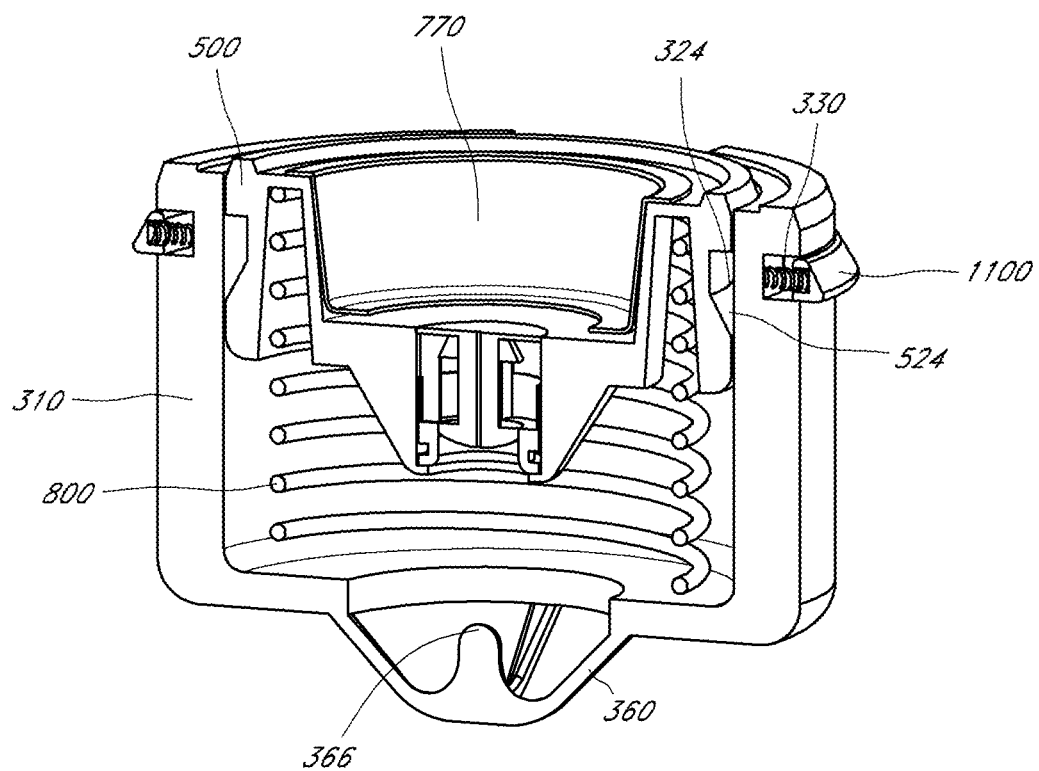
FIGS. 7B and 7C illustrate cross-sectional views of the brew chamber unit of FIG. 3A along a second axis with an inserted beverage pod of a second size, with and without the lid of FIG. 4A.
Figure 7C:
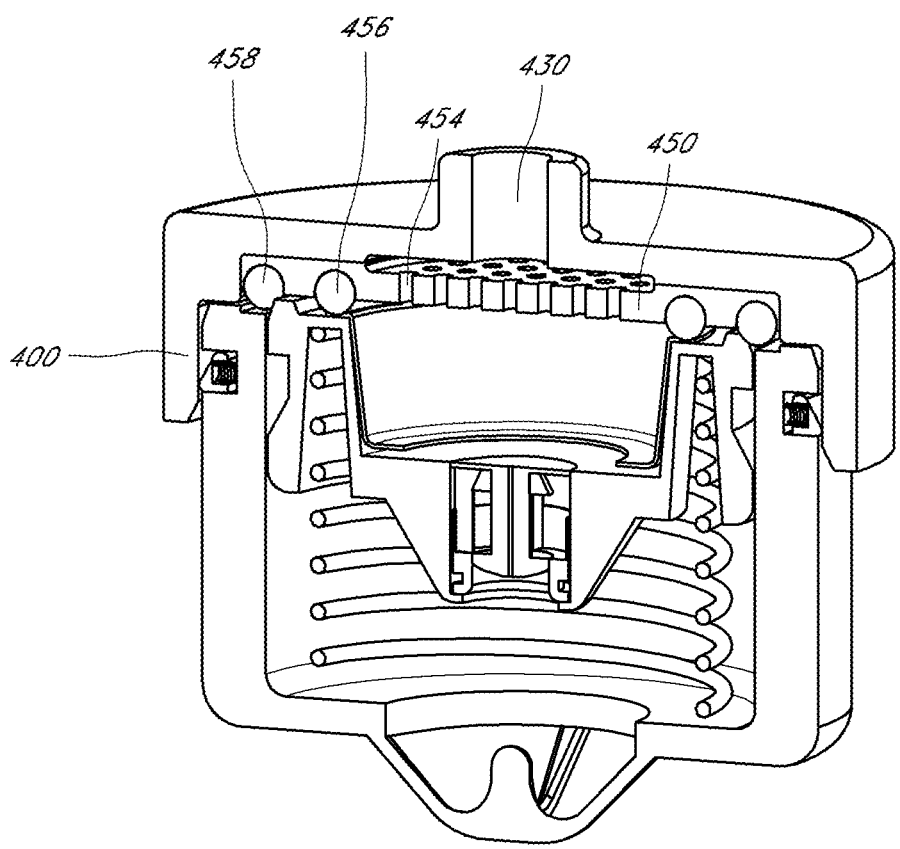

FIG. 7A schematically illustrates a method for brewing a beverage pod of a second size 700 wherein the brew chamber unit 300 is shown to accommodate a beverage pod of a second size 770 (e.g., wherein the pod has a smaller diameter). FIGS. 7B and 7C illustrate cross-sectional views of the brew chamber unit 300 with and without the lid 400 with the beverage pod of a second size 770 inserted.

As shown in block 710, in some embodiments, the method can include inserting a beverage pod of a second size 770 into the brew chamber unit 300. In some implementations, the beverage pod of a second size 770 can be used to prepare espresso drinks. In some embodiments, the beverage pod of a second size 770 can be used to prepare a variety of other drinks. In some embodiments, the beverage pod of a second size 770 can have a filter covering both the proximal and distal ends of the beverage pod of a second size 770. The filter can help to seal in the beverage component (e.g., coffee grounds, tea leaves) but can be sufficiently permeable to allow fluid to enter and exit the beverage pod of a second size 770. As can be seen in FIGS. 7B and 7C, the beverage pod of a second size 770 can have a diameter that fits into the body 510 of the inner portion 500. In some examples, because the beverage pod of a second size 770 fits into the body 510 of the inner portion 500, the inner portion 500 is not pushed in a proximal direction so as to compress the spring 800.

The method can include block 720, which can include covering the outer portion 310 with a lid 400. As seen in FIG. 7C, the lid 400 can be attached to the outer portion 310 such that it is disposed about the distal shelf 320 of the outer portion 310. As discussed above, in some embodiments, the lid 400 can be attached or secured on the outer portion 310 through a mechanical structure (e.g., a lever or a lock) that can be actuated by the user. In some embodiments, the lid 400 can be attached or secured on the outer portion 310 through a motorized mechanism.

As described above, the lid 400 can be configured to attach to the outer portion 310 and the brew chamber unit 300 can include the locking mechanism 1100. In some implementations, the locking mechanism 1100 can be actuated by the attachment of the lid 400 to the outer portion 310. For example, a portion of the locking mechanism 1100 can engage with the retention groove 524 on the outer retention structure 520 of the inner portion 500 so as to inhibit or prevent axial movement of the inner portion 500, as is described in more detail below.

In some variants, the lid 400 can sealingly engage the inserted beverage pod as the lid 400 is attached to the outer portion 310. As discussed above, in some examples, the circular fenestrated inlet 450 of the lid 400 can retain an inner seal 410 and an outer seal 420. In this embodiment, because the beverage pod of a second size 770 can fit into the body 510 of the inner portion 500, the inner seal 410 is shaped to engage and seal the beverage pod of a second size 770 to inhibit or prevent fluid from spilling out of the beverage pod of a second size 770. As described above, the inner seal 410 can be constructed of a material that can compress and conform with the distal rim of the beverage pod of a second size 770 in order to form a seal.

Some embodiments include securing the lid 400 to the outer portion 310. Some variants include block 730, which can include flowing fluid through the lid 400 into the beverage pod of a second size 770. As described above, FIG. 7C illustrates the lid 400 which has a distal lumen 430 on the distal end that is configured to receive or connect to a fluid dispenser. In operation, fluid can flow through the distal lumen 430 and through the plurality of openings 454 on the fenestrated inlet 450. As described above, the plurality of openings 454 on the fenestrated inlet 450 allows the fluid to spread across the surface of the beverage pod of a second size 770. In some examples, the fenestrated inlet 450 inhibits or prevents fluid from directly flowing into the beverage pod of a second size 770 which can cause the filter to distort and/or tear. As the fluid enters into the beverage pod of a second size 770, the fluid interacts with the beverage component (e.g., coffee grounds, tea leaves, beverage mix, etc.) so as to prepare the beverage.

Some embodiments include flowing fluid through the distal lumen 430 and into the beverage pod of a second size 770. Certain implementations of the method can include block 740 and block 750 that describes the building up of sufficient pressure in the beverage pod of a second size 770 to force the fluid (e.g., prepared beverage) through the narrow lumen 546 such that the prepared beverage is dispensed from the beverage pod of a second size 770. In some embodiments where the size of the beverage pod of a second size 770 can be smaller, unlike in the method for brewing a beverage pod of a first size 600 shown in FIGS. 6A-6C, the inner portion 500 is not pushed in a proximal direction such that the outlet structure 530 contacts the valve actuator 360.

In this embodiment, the distal end 542 of the valve 540 seals the opening 532 in the inner portion 500 such that there is not a fluid connection between the body 510 of the inner portion 500 and the lumen 534. In some embodiments, because the prepared beverage is unable to filter out of the beverage pod of a second size 770 and out of the lumen 534 of the inner portion 500, pressure builds within the beverage pod of a second size 770. In some examples, the beverage pod of a second size 770 is used to prepare a beverage such as espresso. Some beverages can be prepared by forcing a high pressure fluid (e.g., water) through a beverage component. In some examples, the inside of the beverage pod of a second size 770 is pressurized to at least approximately 9 bars of pressure. In some embodiments, the inside of the beverage pod of the second size 770 can be pressurized to at least approximately: 5 bars, 7 bars, 9.5 bars, 11 bars, values between the aforementioned values, or other values. In some embodiments, the brewer machine is configured to pressurize the beverage pod of the second size 770 to between about 8 bars and about 10 bars (e.g., for preparing espresso). In some embodiments, the brewer machine is configured to pressurize the beverage pod of the first size 680 to between about 1 psi and about 6 psi (e.g., for preparing brewed coffee).

In some variants, because of the size of the narrow lumen 546, fluid does not readily dispense from the beverage pod of a second size 770 until sufficient pressure has built up to force the prepared beverage through the narrow lumen 546 of the valve 540. In some examples, where for instance an espresso drink is desired, the increased pressure within the beverage pod of a second size 770 helps to provide the characteristic flavor to the espresso beverage. In some examples, the increased pressure can provide a shorter brewing time and/or a stronger concentration of a beverage, compared to drinks prepared in at about atmospheric pressure. In some cases, an increase in pressure can change the extraction rate and/or profile. This can help explain why espresso brewed at about 9 bars of pressure can yield about four times the strength of coffee brewed from a pod at about 3 psi, and in less time.

As illustrated above, the prepared beverage can be dispensed in different ways depending on the size of the beverage pod. In some embodiments, the beverage is dispensed through the valve 540 located in the outlet structure 530 of the inner portion 500. In some examples where a larger beverage pod is inserted (e.g., the beverage pod of a first size 680), the beverage is dispensed by moving the valve 540 axially in a distal direction. In certain variants where a smaller beverage pod is inserted (e.g., the beverage pod of a second size 770), the beverage is dispensed through the narrow lumen 546 running coaxially in the center of the valve 540. In addition, the aforementioned structures, systems, and methods can be also used with embodiments of the brew chamber unit 300 wherein the outer portion 310 and the inner portion 500 lack structures that limit or facilitate the dispensing of the beverage.

Figure 8A:
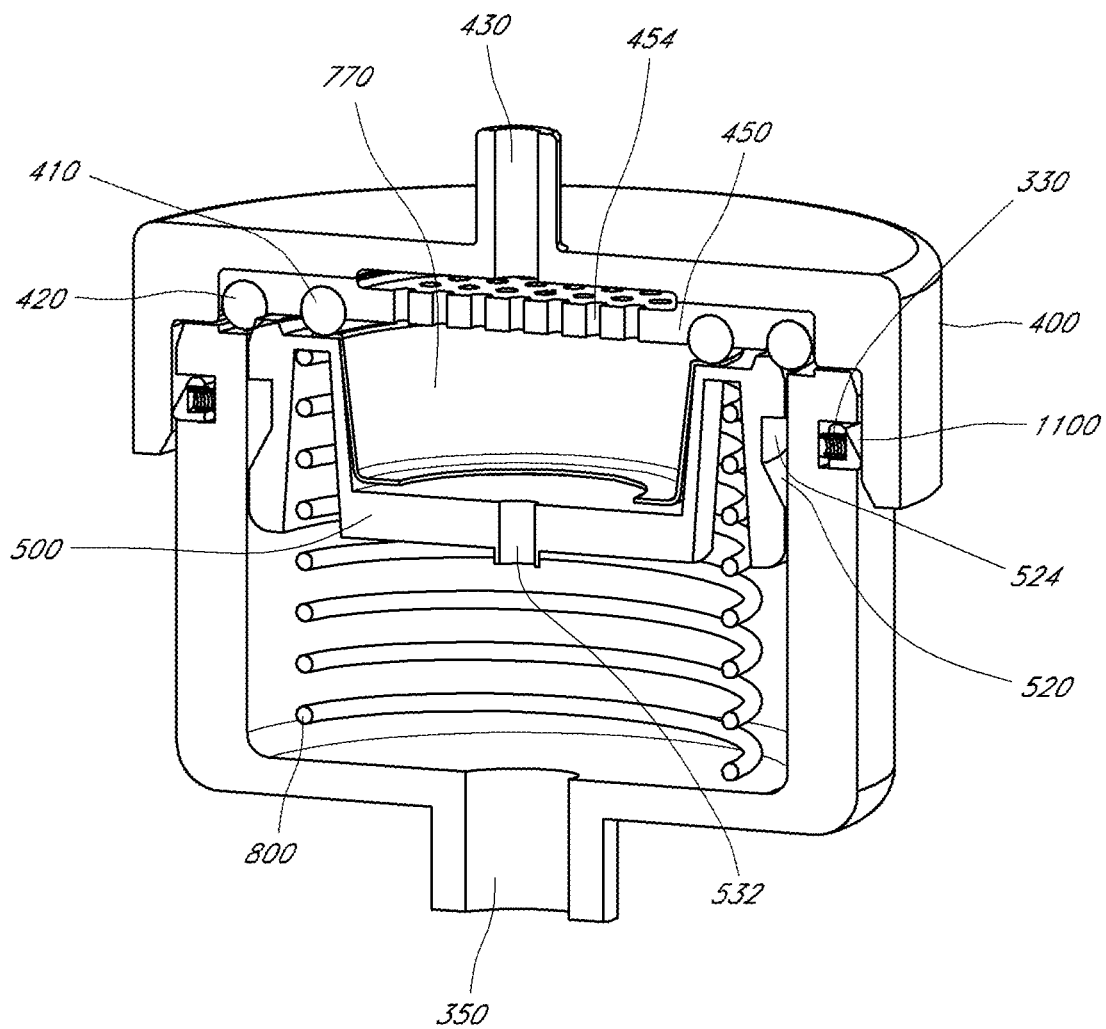
FIGS. 8A and 8B illustrate cross-sectional views of another embodiment of a brew chamber unit along a second axis with an inserted beverage pod of a first and second size, respectively.
Figure 8B:
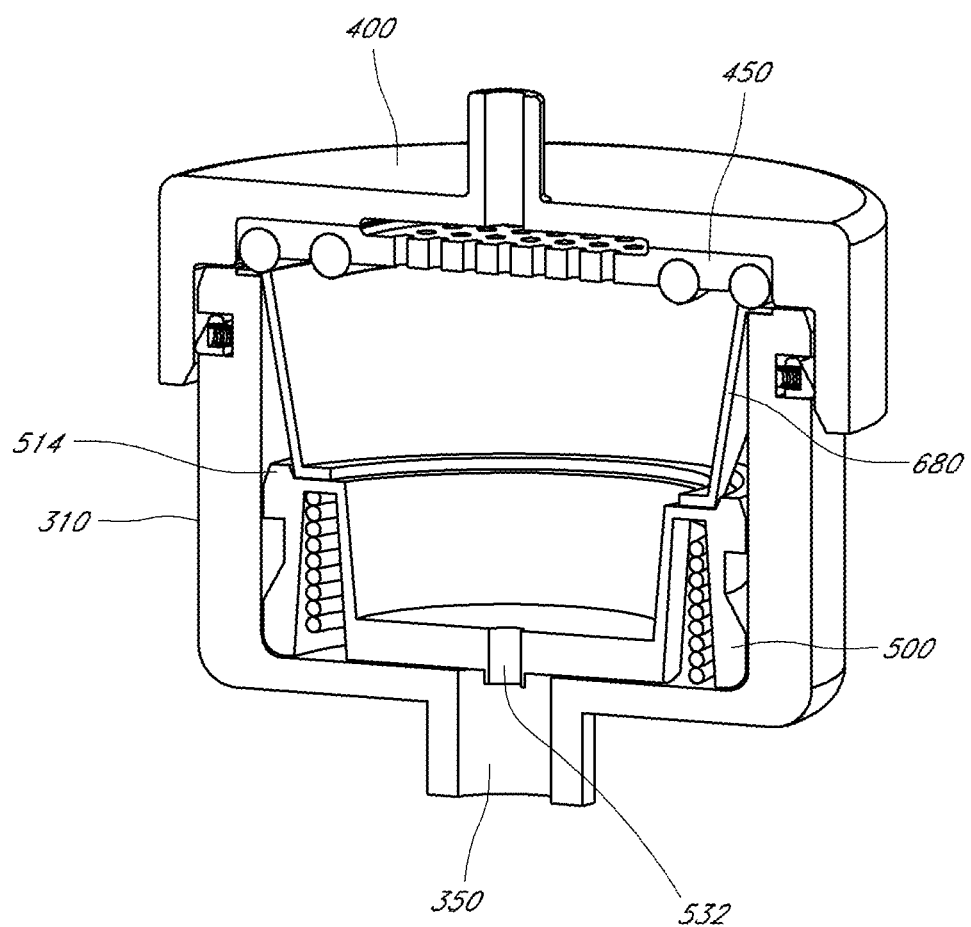

FIGS. 8A and 8B respectively illustrate cross-sectional views of the brew chamber unit 300 with the beverage pod of a second size 770 and the beverage pod of a first size 680 inserted. In some implementations, the inner portion 500 does not include the valve 540 or valve retention cylinder 550 within the opening 532. As well, the outer portion 310 does not include the valve actuator 360. However, the other portions of the brew chamber unit 300 described above remain the same.

In this embodiment, the dispensing of the prepared beverage differs in that the flow of the prepared beverage can be controlled by the beverage pod itself. As discussed above, the beverage pod can include a filter on both the proximal and distal ends of the beverage pod. To control the dispensing of the prepared beverage from the proximal end of the beverage pod, the beverage pod can have a variety of different structures. Certain examples of beverage pod structures are described in U.S. patent application Ser. No. 14/191,225, filed Feb. 26, 2014, the entirety of which is incorporated by reference herein. In some embodiments, the base of the beverage pods can further have a conformation that includes a plurality of openings that allow the beverage to flow from the base of the beverage pod. Examples of some embodiments of the base structure of such beverage pods are described in U.S. patent application Ser. No. 14/205,197, filed Mar. 11, 2014, the entirety of which is incorporated by reference herein.

Finally, in some embodiments, the beverage pod can include a variety of valves that can be temperature, mechanically, or pressure activated. As discussed previously, some examples are described in U.S. Patent Application No. 62/082,452, filed Nov. 20, 2014.

As described above, the lid 400 can be disposed about the outer surface of the distal shelf 320. The lid 400 and the outer portion 310 can be configured to secure a pod within the brew chamber unit 300 in order to inhibit or avoid the escape of water (e.g., except through a beverage outlet of the pod). In some embodiments, the brew chamber unit 300 can include a locking mechanism 1100 that interacts with the lid 400 and secures (e.g., maintain generally stationary relative to) the inner portion 500 to the outer portion 310 as the beverage is prepared.

Figure 9A:
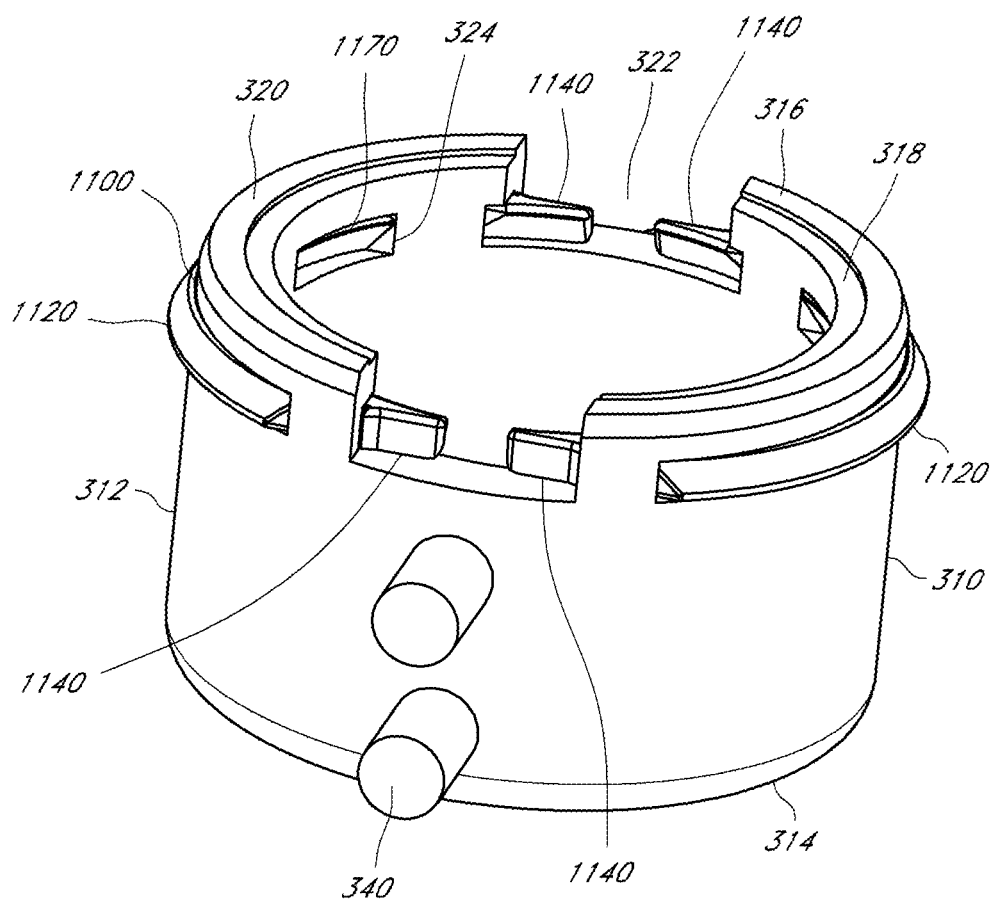
FIG. 9A illustrates a perspective view of an embodiment of the outer portion and a locking mechanism of the brew chamber unit of FIGS. 8A and 8B.
Figure 9B:
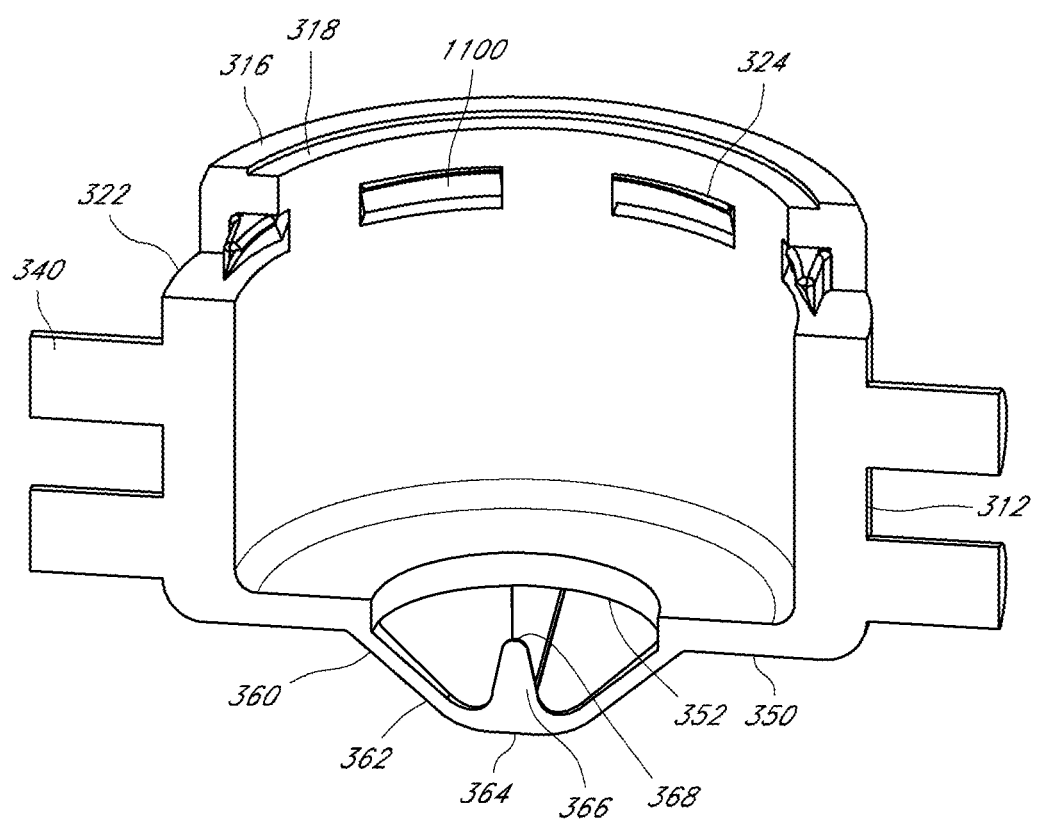
FIG. 9B illustrates a cross-sectional view of the embodiment of FIG. 9A along a first axis.
Figure 9C:
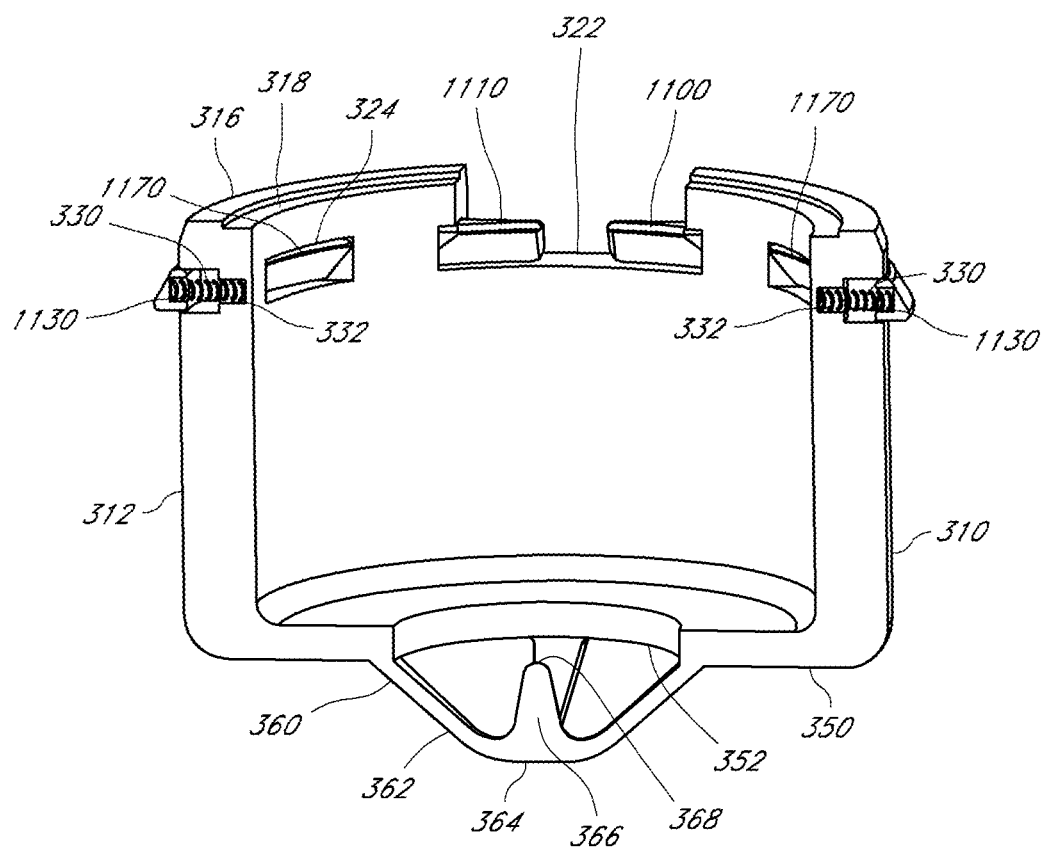
FIG. 9C illustrates a cross-sectional view of the embodiment of FIG. 9A along a second axis.
Figure 10:
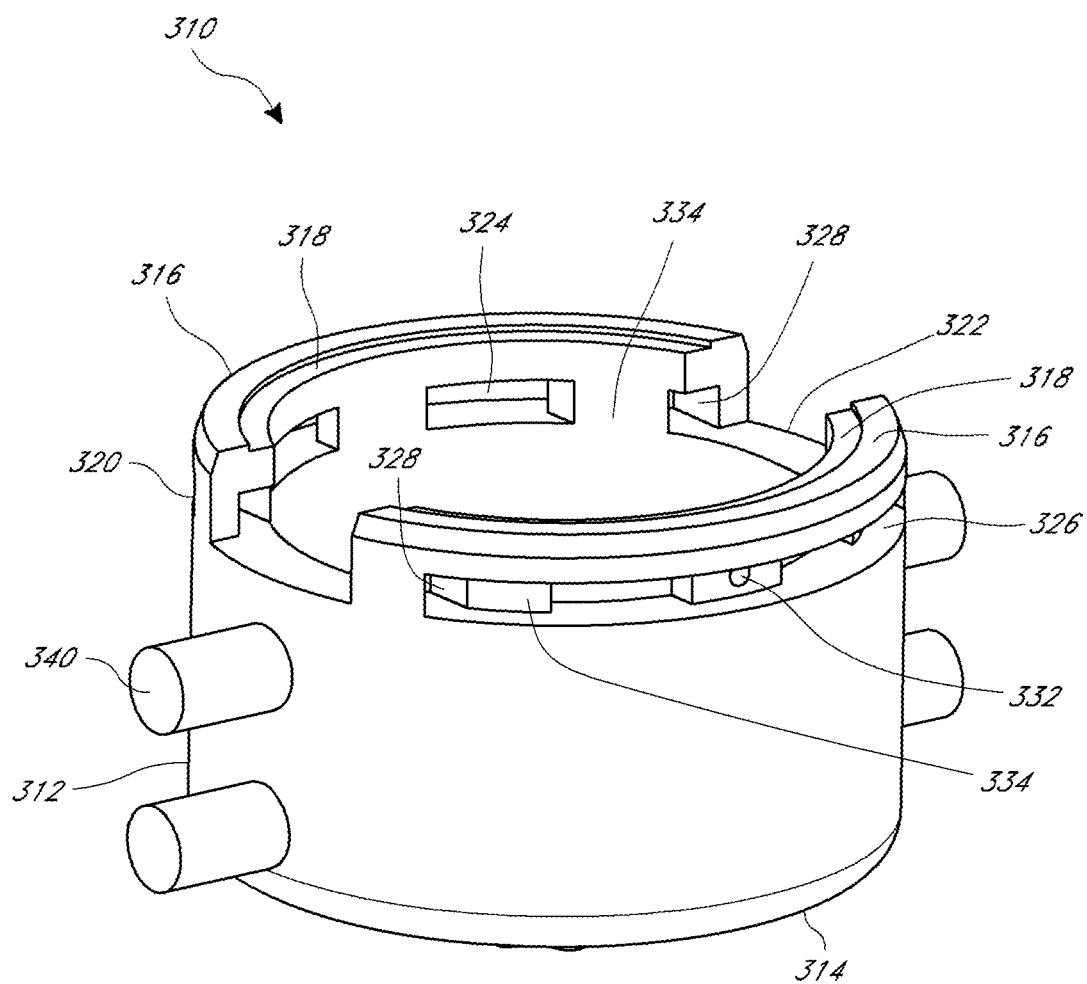
FIG. 10 illustrates a perspective view of the outer portion of FIG. 9A.
Figure 11:
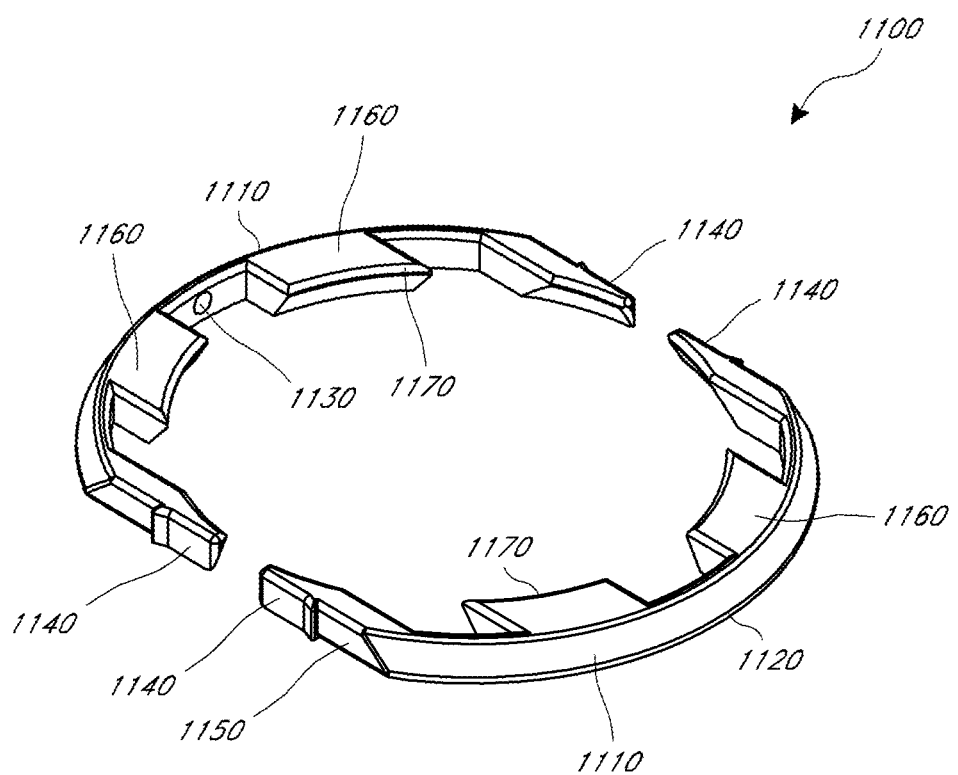
FIG. 11 illustrates a perspective view of the locking mechanism of FIG. 9A.

FIGS. 9-13 illustrate the structure and movement of the locking mechanism 1100 within the brew chamber unit 300. FIGS. 9A-9C illustrate perspective and cross-sectional views of the outer portion 310 with locking mechanism 1100 disposed within the inner ledge 318 of the outer portion 310. FIG. 10 illustrates a perspective view of the outer portion 310. FIG. 11 illustrates a perspective view of the locking mechanism 1100 that can be composed of two semi-circle 1110 parts. FIG. 12A schematically illustrates a method for securing a beverage pod of a first size 1200 wherein the method illustrates the locking mechanism 1100 as it engages with a beverage pod of a first size 680. FIGS. 12B-12D illustrate exploded and cross-sectional views of the brew chamber unit 300 and locking mechanism 1100 after the beverage pod of a first size 680 is inserted. FIG. 13A schematically illustrates a method for securing a beverage pod of a second size 1300 wherein the method illustrates the locking mechanism 1100 as it engages with a beverage pod of a second size 770. FIGS. 13B-13D illustrate exploded and cross-sectional views of the brew chamber unit 300 and locking mechanism 1100 after the beverage pod of a second size 770 is inserted.

FIG. 9A illustrates a perspective view of a locking mechanism 1100 retained in the distal shelf 320 of the outer chamber 310. FIG. 9B illustrates a cross-sectional view of the outer portion 310 with the locking mechanism 1100 along a first axis. FIG. 9B provides a view of both portions of the locking mechanism 1100 as it is positioned within the distal shelf 320. FIG. 9C illustrates a cross-sectional view of the outer portion 310 with the locking mechanism 1100 along a second axis and shows a cross-sectional view of both the semi-circles 1110.

FIG. 10 illustrates an example of the outer portion 310 without the locking mechanism 1100 inserted and provides an illustration of the structure of the distal shelf 320. As discussed above, in some examples, the distal shelf 320 can be located on the distal end of the body 312 of the outer portion 310. In some embodiments, the distal shelf 320 is composed of two portions, wherein each portion of the distal shelf 320 can be separated by a gap 322. In some examples, each portion of the distal shelf 320 has a plurality of windows 324 that can be formed by a plurality of pillars 334. In some embodiments, the pillars 334 can be connected to the inner ledge 318 and the distal end of the body 312. In some embodiments, each portion of the distal shelf 320 can include an inner ledge 318.

In some examples, the inner ledge 318 and the plurality of windows 324 can form an interior pathway 326 that can retain the locking mechanism 1100. In some variants, the interior pathway 326 for each of the portions of the distal shelf 320 can include a plurality of side openings 328. In some embodiments, a hole 332 can be located on the central pillars 334 on each portion of the distal shelf 320. In some embodiments, the holes 332 can accommodate a portion of a movable structure, such as a spring 330. Some embodiments include, such as within the holes 332, other compressible members (e.g., rubber or other elastomer members) that can be compressed and/or are moveable within the holes 332.

FIG. 11 illustrates an example of the locking mechanism 1100. In some embodiments, the locking mechanism 1100 can include two semi-circles 1110. In some examples, each semi-circle 1110 can include a hole 1130 that extends partially through the body of the semi-circle 1110. As described above, in some examples, the holes 1130 can accommodate a portion of a movable structure, such as a spring 330. In some embodiments, each of the semi-circle 1110 can include a plurality of narrowed ends 1140. In some variants, the semi-circle 1110 can include indented ends 1150 that are located proximate to the narrowed ends 1140. In some examples, the semi-circle 1110 can include an outer ledge 1120 that slopes downward.

In some embodiments, the base of the semi-circle 1110 is wider than the top of the semi-circle 1110. In some examples, the interior of each of the semi-circles 1110 can have a plurality of rectangular structures 1160 that has an inner ledge 1170. In some variants, each of the inner ledges 1170 has a slope that extends inward such that the top of the rectangular structures 1160 is wider than the bottom of the rectangular structures 1160.

In operation, as shown in FIGS. 9A-9C, a spring 330 can extend between the hole 1130 of the semi-circle 1110 of the locking mechanism 1100 and the hole 332 of the outer portion 310. Each of the semi-circles 1110 can be positioned within the interior pathway 326 of each portion of the distal shelf 320. In some examples, the indented ends 1150 can be retained through the side openings 328 such that the narrowed ends 1140 of each of the semi-circles 1110 can protrude into the gap 322. In some embodiments, the plurality of rectangular structures 1160 can extend through the windows 324 and can be retained in the interior pathway 326 of the distal shelf 320. In some variants, the outer ledge 1120 of each of the semi-circles 1110 can protrude past the distal shelf 320. As discussed above, by compressing the distal shelf 320 into the interior pathway 326 of the distal shelf 320, the plurality of rectangular structures 1160 can extend past the windows 324 such that they protrude into the inner portion of the outer portion 310. As will be discussed, in some embodiments, the inner ledge 1170 of each of the rectangular structures 1160 can interact with portions of the brew chamber unit 300.

Figure 12A:
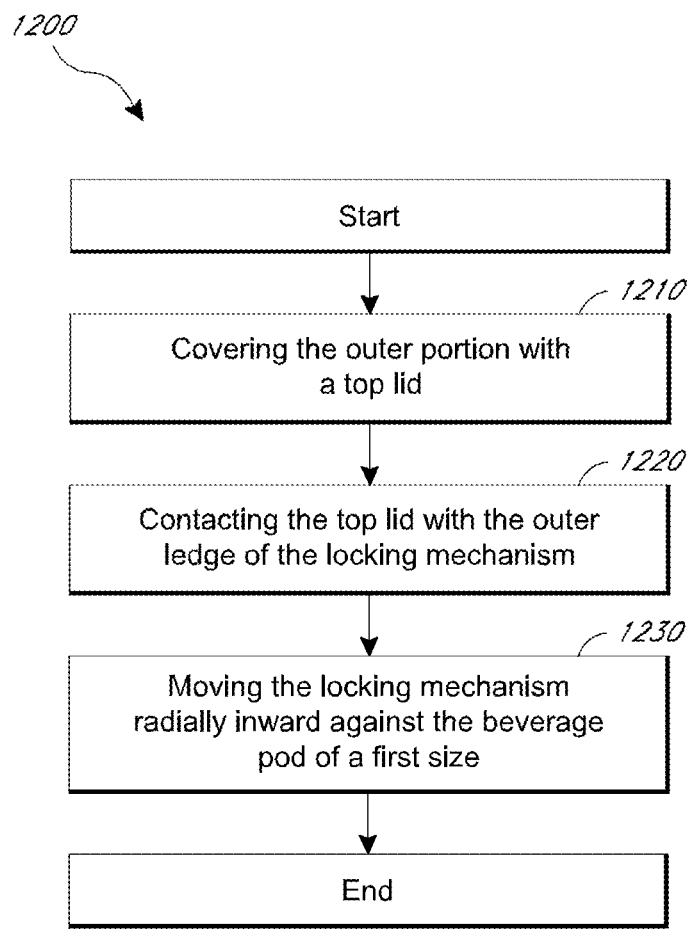
FIG. 12A schematically illustrates an embodiment of a method for locking a lid with an embodiment of a brew chamber with an inserted beverage pod of a first size.
Figure 12B:
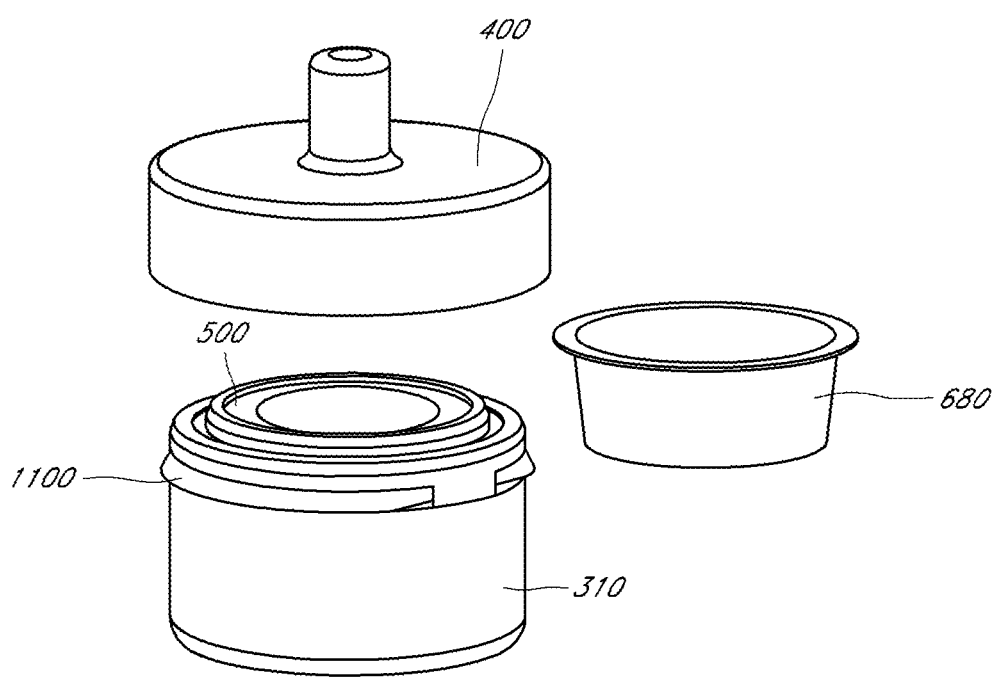
FIGS. 12B-12D illustrate illustrative components associated with the method of FIG. 12A.
Figure 12C:
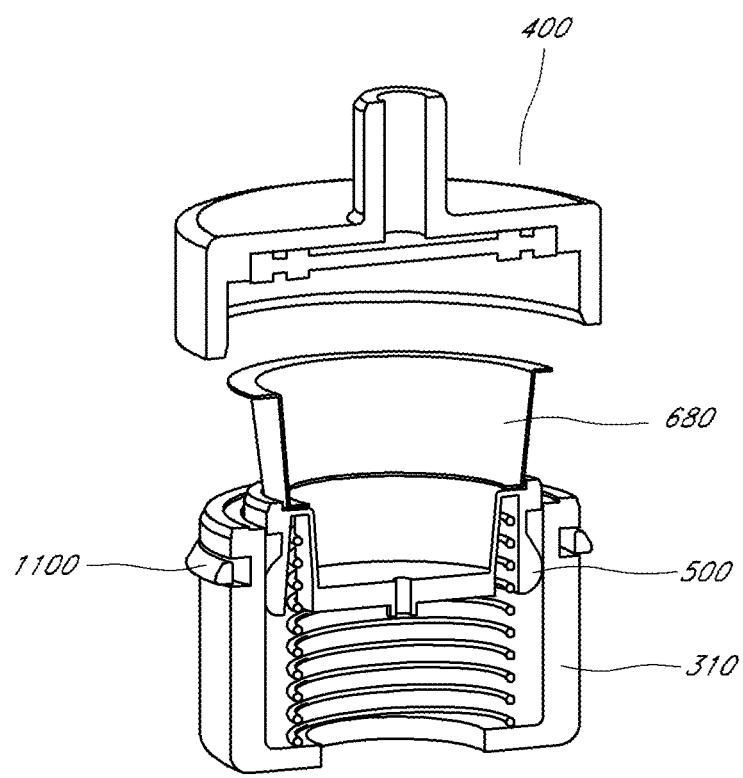
Figure 12D:
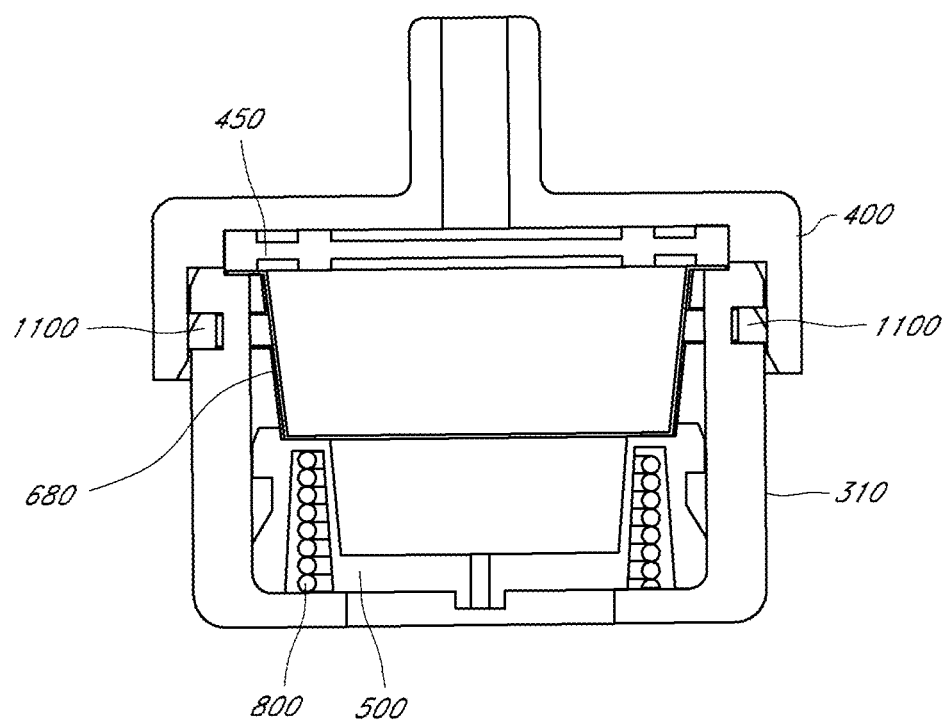

FIG. 12A schematically illustrates a method for securing a beverage pod of a first size 1200 wherein the brew chamber unit 300 is shown to accommodate a beverage pod of a first size 680 (e.g., wherein the pod has a greater diameter). FIGS. 12B-12D illustrate a variety of views of the brew chamber unit 300 as the beverage pod of a first size 680 is inserted.

As shown in block 1210, in some embodiments, the method can include covering the outer portion 310 with a lid 400. As discussed above with regard to the method for brewing a beverage pod of a first size 600, a beverage pod of a first size 680 can be placed into the outer portion 310, distal to the inner portion 500. Because the base of the beverage pod of a first size 680 can have a greater diameter than the distal mouth of the inner portion 500, as the beverage pod of a first size 680 is inserted, the spring 800 is compressed as the inner portion 500 is moved in a proximal direction to accommodate the beverage pod of a first size 680. The lid 400 can be placed over the distal shelf 320 of the outer portion 310.

In some embodiments, the method can include block 1220, which includes contacting the lid 400 with the outer ledge 1120 of the locking mechanism 1100 (e.g., when the lid 400 covers the distal end of the outer portion 310). As can be seen in FIG. 12D, as the lid 400 is placed over the distal shelf 320 of the outer portion 310, the rim of the lid 400 can contact the outer ledge 1120 of the locking mechanism 1100. As will be described below, in some embodiments, as the lid 400 is placed over the distal shelf 320 of the outer portion 310, the rim of the lid 400 can interact with the outer ledge 1120 to retract the locking mechanism 1100 into the interior pathway 326 of the distal shelf 320.

Some embodiments include engaging (e.g., contacting) the lid 400 with the outer ledge 1120 of the locking mechanism 1100. Some implementations of the method can include block 1230, which includes moving the locking mechanism 1100 radially inward. In some embodiments, this movement causes the inner ledge 1170 of the rectangular structures 1160 to push against the beverage pod of a first size 680. As described earlier, the spring 330 can retain the locking mechanism 1100 to provide radial movement within the interior pathway 326. In some examples, the lid 400 can engage the slanted surface of the outer ledge 1120 at the narrowest portion. In some variants, the locking mechanism 1100 can move incrementally inward as the lid 400 is disposed about the distal shelf 320.

In certain embodiments, as the locking mechanism 1100 moves radially inward, the plurality of rectangular structures 1160 can extend from the windows 324. This can allow the inner ledge 1170 of the rectangular structures 1160 to engage with structures on the interior of the outer portion 310. In the example shown in FIG. 12D, the inner ledge 1170 of the rectangular structures 1160 can interact with the outer surface of the beverage pod of a first size 680. In some embodiments, the inner ledge 1170 can provide pressure to the outer surface of the beverage pod of a first size 680 so as to center it on the distal end of the inner portion 500.

Figure 13A:
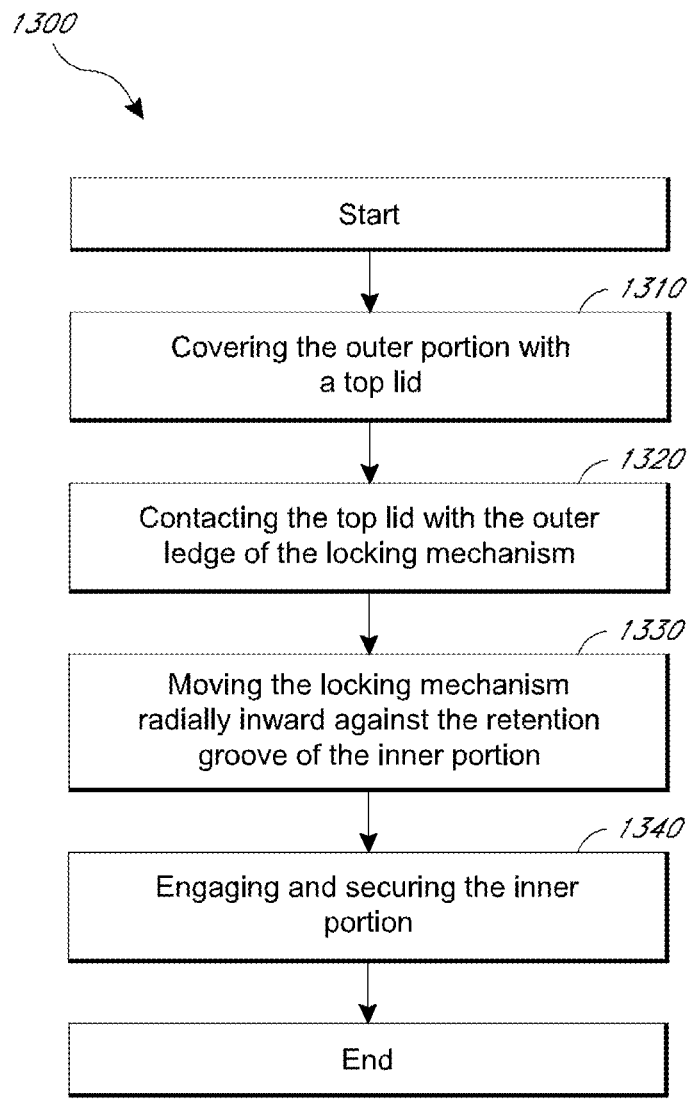
FIG. 13A schematically illustrates an embodiment of a method for locking a lid with an embodiment of a brew chamber with an inserted beverage pod of a second size.
Figure 13B:
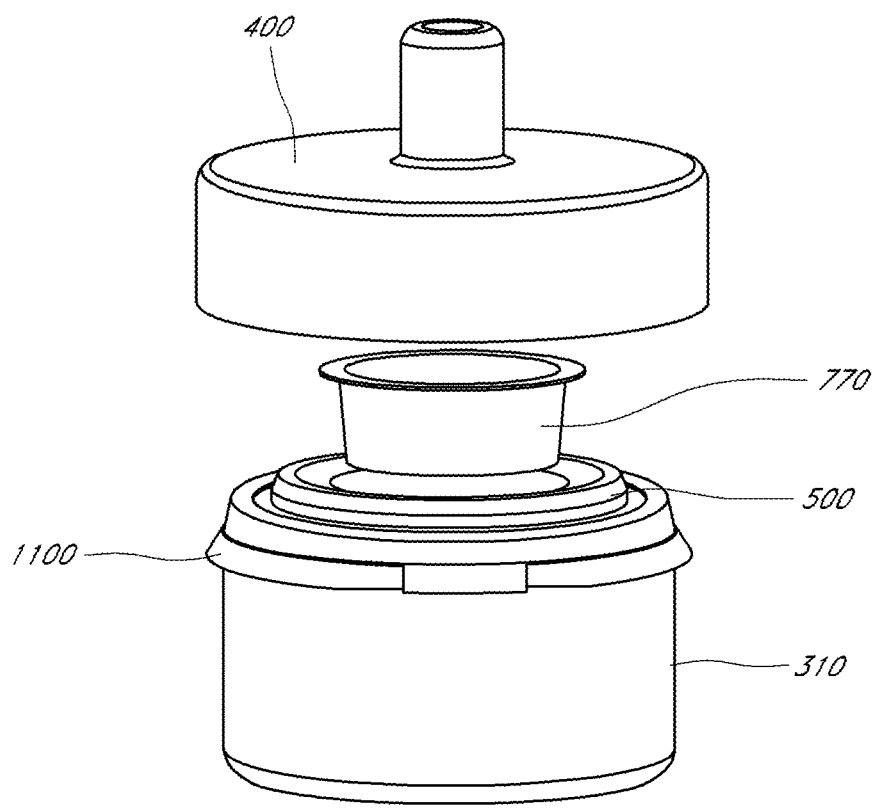
FIGS. 13B-13D illustrate illustrative components associated with the method of FIG. 13A.
Figure 13C:
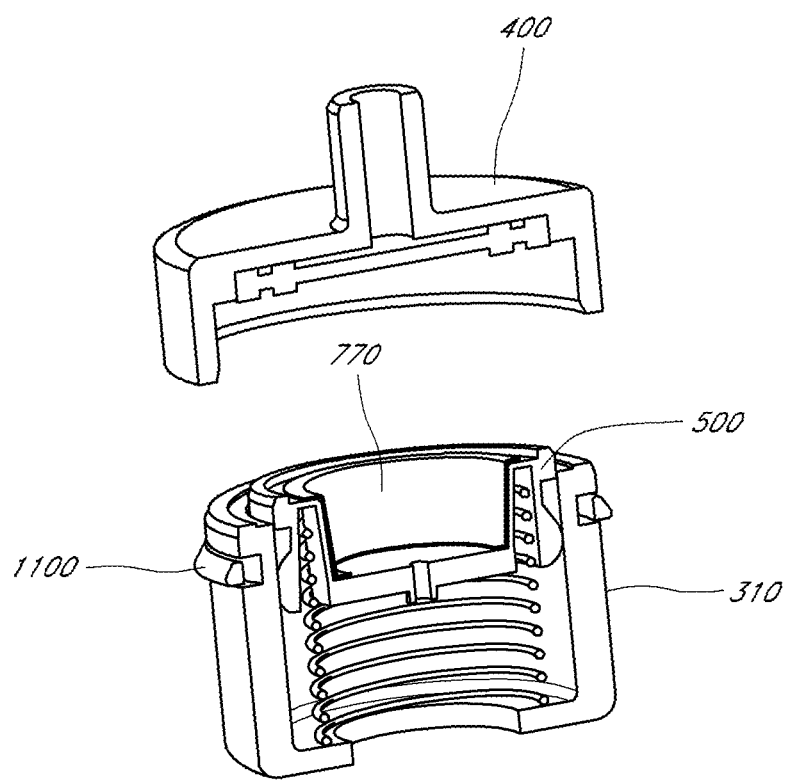
Figure 13D:
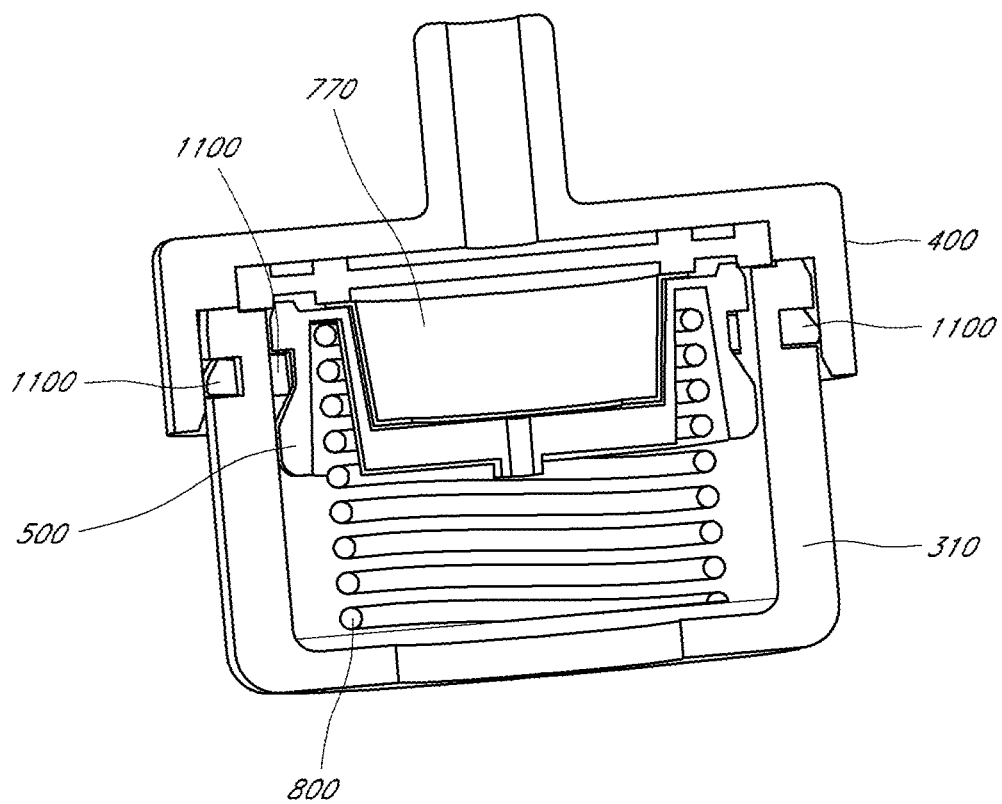

FIG. 13A schematically illustrates a method for securing a beverage pod of a second size 1300 wherein the brew chamber unit 300 is shown to accommodate a beverage pod of a second size 770 (e.g., wherein the pod has a smaller diameter). FIGS. 13B-13D illustrate a variety of views of the brew chamber unit 300 as the beverage pod of a second size 770 is inserted.

In some embodiments, the method for securing a beverage pod of a second size 1300 is similar to the method for securing a beverage pod of a first size 1200 with regard to the locking mechanism 1100. However, as will be discussed, the locking mechanism 1100 can interact with the inner portion 500 to secure the position of the beverage pod of a second size 770. As discussed above, in some embodiments, the beverage pod of a second size 770 can be used for preparing a beverage such as espresso. In some embodiments, the locking mechanism 1100 can retain the beverage pod of a second size 770 in a position within the outer portion 310, which can aid in maintaining an elevated pressure within the beverage pod of a second size 770.

As shown in block 1310, in some embodiments, the method can include covering the outer portion 310 with a lid 400. As discussed above with regard to the method for brewing a beverage pod of a second size 700, a beverage pod of a second size 770 can fit within the inner portion 500. In some examples, because of the size of the beverage pod of a second size 770, the inner portion 500 is not compressed axially within the outer portion 310. As was discussed above, and is seen in FIG. 13D, the lid 400 can be placed over the distal shelf 320 of the outer portion 310.

As the lid 400 is placed over the distal shelf 320 of the outer portion 310, the method can include block 1320 which can include contacting the lid 400 with the outer ledge 1120 of the locking mechanism 1100. As can be seen in FIG. 13D, in some examples, as the lid 400 is placed over the distal shelf 320 of the outer portion 310, the rim of the lid 400 can contact the outer ledge 1120 of the locking mechanism 1100. As will be described below, in some embodiments, as the lid 400 is placed over the distal shelf 320 of the outer portion 310, the rim of the lid 400 can interact with the outer ledge 1120 to retract the locking mechanism 1100 into the interior pathway 326 of the distal shelf 320.

Certain embodiments include block 1330, which can comprise moving the locking mechanism 1100 (e.g., radially inward) against the beverage pod of a second size 770, such as in response to the lid 400 contacting the outer ledge 1120 of the locking mechanism 1100. As described earlier, in some examples, the locking mechanism 1100 is movably retained within the distal shelf 320 by a spring 330 that allows radial movement of the locking mechanism 1100 within the interior pathway 326.

In some embodiments, the outer ledge 1120 can have a sloped surface that allows the locking mechanism 1100 to move radially inward as the rim of the lid 400 moves proximally over the distal shelf 320 of the outer portion 310. The slanted surface can allow the lid 400 to engage with the outer ledge 1120 at the narrowest portion of the locking mechanism 1100 such that the locking mechanism 1100 moves incrementally inward as the lid 400 is disposed about the distal shelf 320. In some examples, as the outer ledge 1120 of the locking mechanism 1100 moves radially inward, the rectangular structures 1160 of the locking mechanism 1100 protrude from the windows 324.

Some embodiments include block 1340, which can comprise engaging and/or securing the inner portion 500 with the locking mechanism 1100, such as in response to the locking mechanism 1100 moving radially inward. As described earlier, the inner portion 500 can include a retention groove 524 that is formed between the distal ledge 522 and the proximal ledge 526. In some embodiments, the surface of the retention groove 524 can be sloped at an angle similar to the inner ledge 1170. As illustrated in FIG. 13D, the inner ledge 1170 of the rectangular structures 1160 can engage the inner portion 500 at the retention groove 524 to secure the inner portion 500 against the outer seal 420 of the lid 400. As discussed above in the method for brewing a beverage pod of a second size 700, to brew a beverage, such as espresso, it can be desirable to maintain an elevated pressure within the beverage pod of a second size 770. In some embodiments, securing the position of the inner portion 500 facilitates maintaining the inner portion 500 in place (e.g., generally stationary with respect to the outer portion 310) as pressure builds within the inner portion 500.

Certain Beverage Pods

As described above, the brew chamber unit of the brewer machine can be configured to receive a beverage pod of a first size 680 and a beverage pod of a second size 770. For example, in some embodiments, a beverage pod for producing a brewed coffee drink and a beverage pod for producing an espresso-based drink can each be received in the brew chamber unit.

In certain embodiments, the beverage pods are configured to facilitate the beverage preparation process. For example, the beverage pods (e.g., the beverage pod of a first size 680, the beverage pod of a second size 770) can contain structures (e.g., within the base of the pod) to provide support for a filter in the pod as the beverage is brewed. This can provide support to retain the filter shape as the beverage is prepared, which in turn can reduce the likelihood of the filter distending or tearing due to the force of the fluid flow through the filter.

Figure 14A:
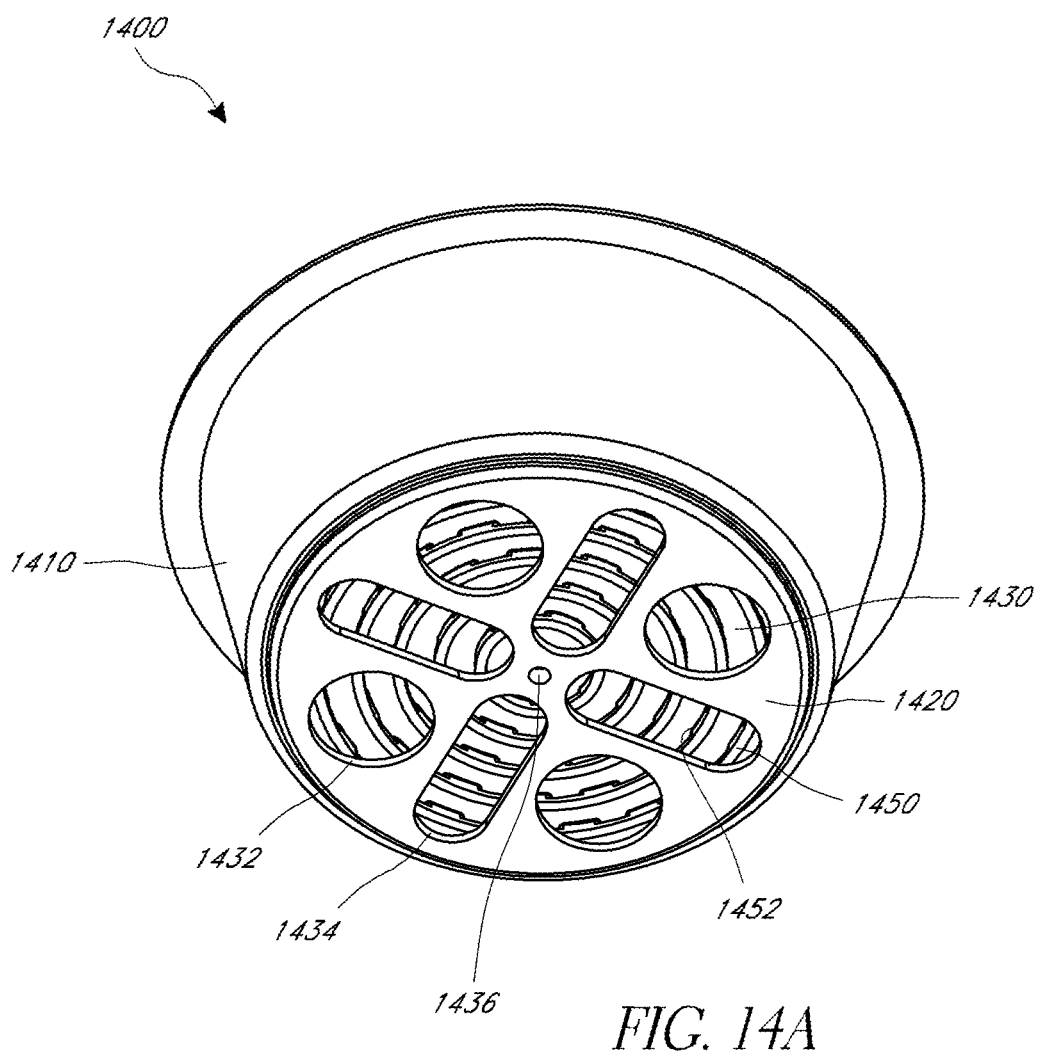
FIGS. 14A and 14B illustrate a plurality of views of an embodiment of a pod base structure in a beverage pod of a first size.
Figure 14B:
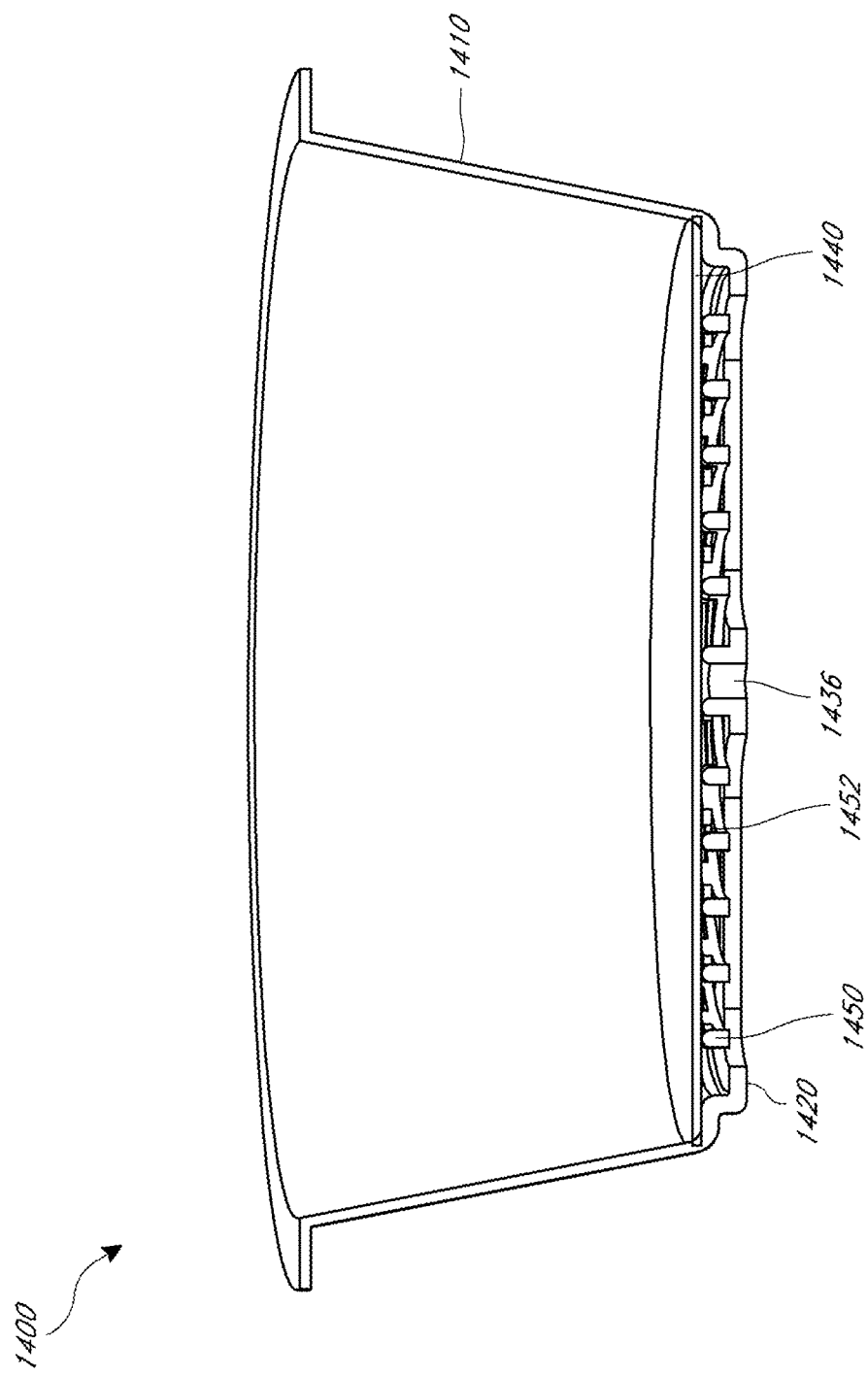
Figure 14C:
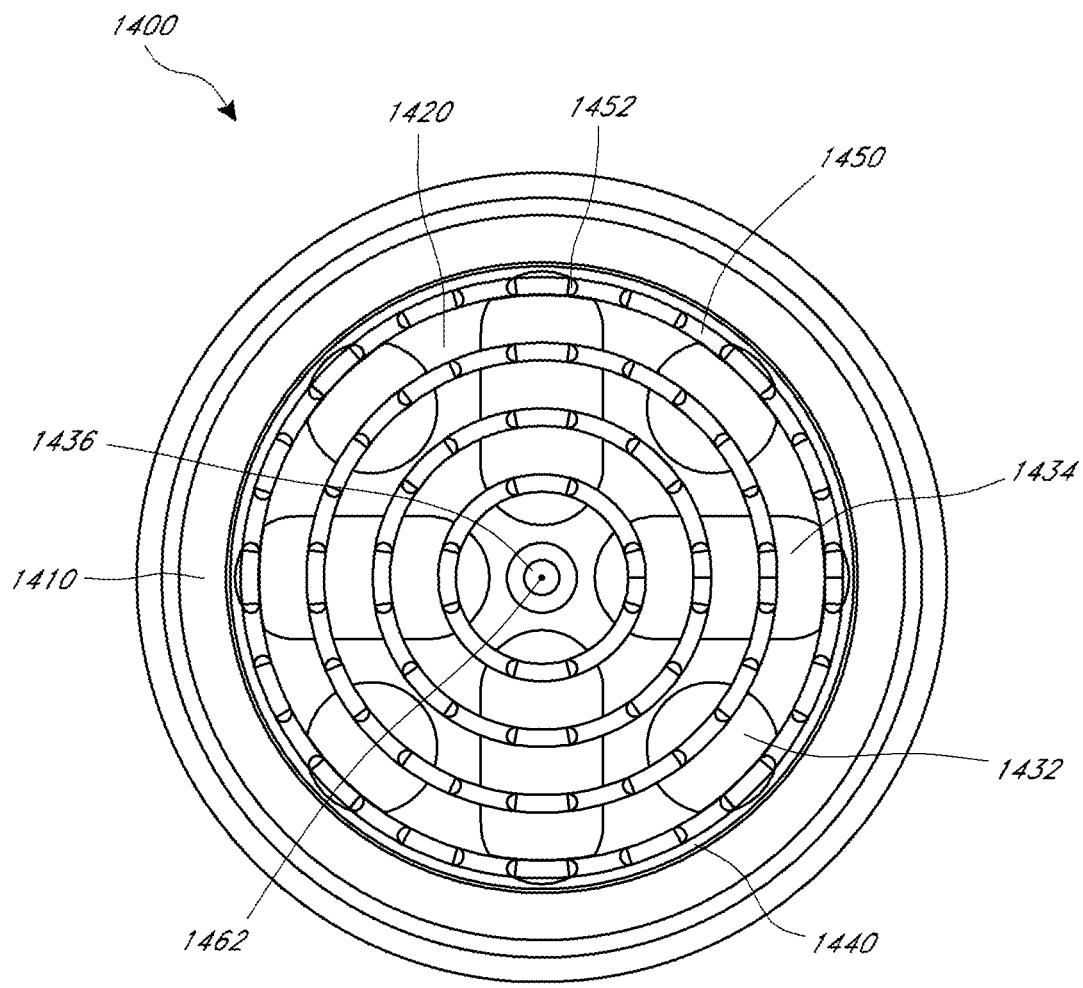
FIGS. 14C and 14D illustrate a plurality of views of an embodiment of a pod base structure in a beverage pod of a second size.
Figure 14D:
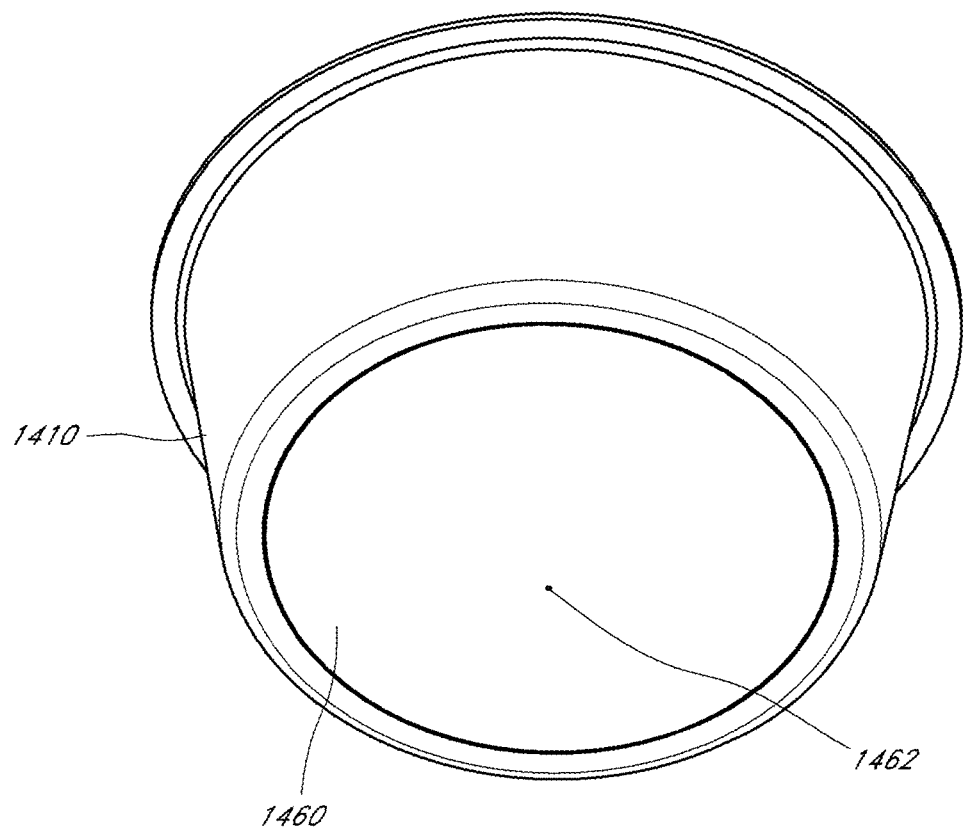

FIGS. 14A-14D illustrate an embodiment of the pod base structure 1400 that can be incorporated into various beverage pods to provide support for the base. FIGS. 14A and 14B illustrate the pod base structure 1400 as incorporated into a beverage pod of a first size 680 (e.g., a beverage pod of a larger diameter to prepare beverages such as coffee). FIGS. 14C and 14D illustrate the pod base structure 1400 as incorporated into a beverage pod of a second size 770 (e.g., a beverage pod of a smaller diameter to prepare beverages such as espresso). As will be discussed in more detail below, the pod base structure 1400 can be accommodated for beverage pods of a variety of sizes.

FIGS. 14A and 14B illustrate an embodiment of the pod base structure 1400 as incorporated into a beverage pod of a first size 680. In some embodiments, the pod base structure 1400 can include a base 1420 (e.g., on a proximal end) and a film 1440 (e.g., a membrane). The base 1420 can form the bottom of the pod body 1410. As can be seen in FIG. 14A, the base 1420 can include a plurality of openings 1430. The openings can come in a variety of shapes and sizes. In some implementations, such as shown in FIG. 14A, the design of the openings 1430 of the base 1420 can include a plurality of circular openings 1432 and rounded rectangular openings 1434. As shown, some variant have two rounded rectangular openings 1434 (e.g., capsule-shaped openings) located and spaced apart along a first axis and two rounded rectangular openings 1434 located and spaced apart along a second (e.g., perpendicular) axis. A circular opening 1432 can be located between each pair of rounded rectangular openings 1434. In the example shown in FIG. 14A, a center hole 1436 is located in the center of the design described.

In some embodiments, the pod base structure 1400 can include a plurality of concentric rings 1450. As seen in FIG. 14B, in some examples, the plurality of concentric rings 1450 can be located between the film 1440 and the base 1420 to elevate the film 1440 away from the surface of the base 1420. In some embodiments, the plurality of concentric rings 1450 can include a plurality of protrusions 1452 that are evenly spaced along the concentric rings 1450. In some examples, the protrusions 1452 can help to spread the pressure of beverage component and fluid within the pod body 1410 across the base of the concentric rings 1450 such that the film 1440 can better retain its structure and shape. The example shown in FIG. 14A illustrates the plurality of concentric rings 1450 as including four rings of decreasing sizes. However, the plurality of concentric rings 1450 can include any number of rings in order to provide the desired support for the base of the pod body 1410. Similarly, the size, shape, and placement of the plurality of protrusions 1452 can be varied to provide the desired support for the base of the pod body 1410.

As discussed above, in some embodiments, the beverage pod can be configured to brew a beverage, such as espresso. Some such embodiments are configured to withstand an elevated pressure during brewing, such as at least about 9 bar of pressure. FIGS. 14C and 14D illustrate an embodiment of a beverage pod for the brewing of such beverages. The beverage pod can include a restrictor 1460, such as a small hole 1462 (e.g., a diameter less than about 0.3 mm). The hole 1462 can be located at the center of the restrictor 1460. As discussed previously with regard to the method for brewing beverages as illustrated in FIGS. 7A-7C, the restrictor 1460 can inhibit or prevent fluid within the pod body 1410 from flowing from the pod body 1410 pre-maturely. The size of the hole 1462 can allow pressure to build within the pod body 1410 while incrementally releasing the beverage from the pod body 1410.

Figure 15A:
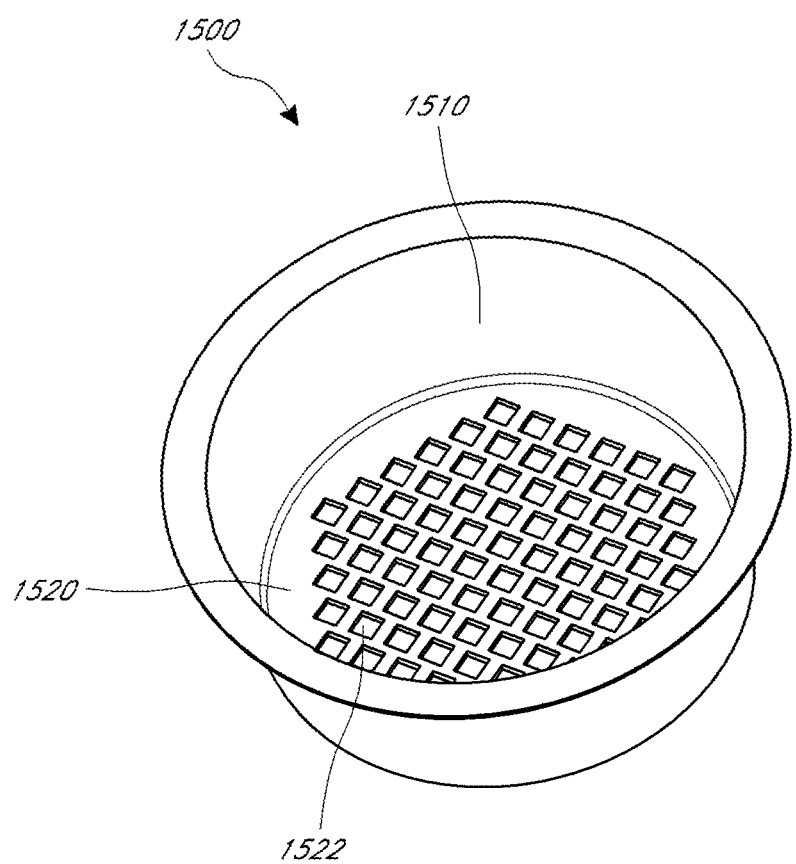
FIGS. 15A-15C illustrate a plurality of views of another embodiment of a pod base structure in a beverage pod of a first and second size, respectively.
Figure 15B:
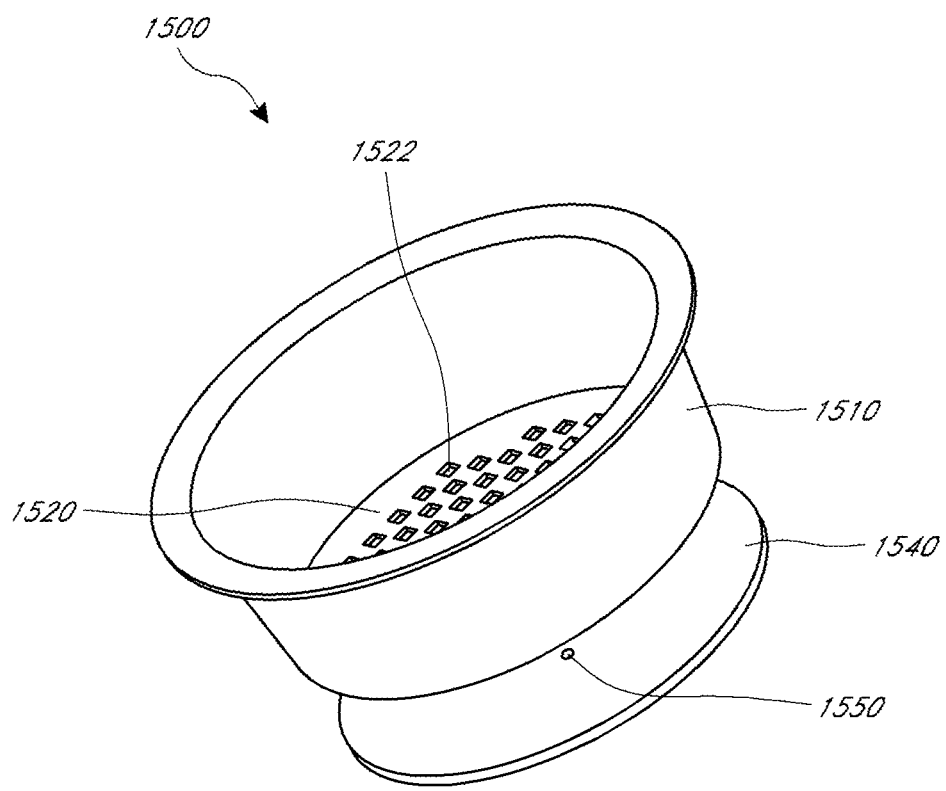
Figure 15C:
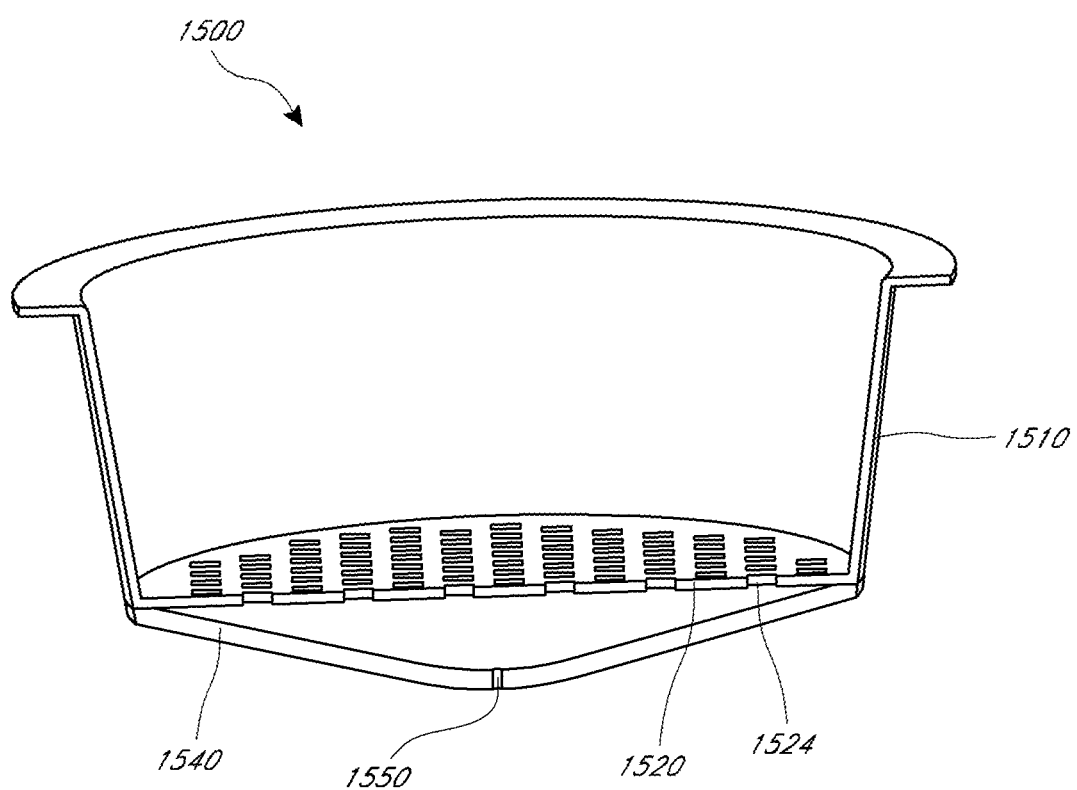

FIGS. 15A-15C illustrate a pod base structure 1500 that can be incorporated into various beverage pods to provide support for the base. FIG. 15A illustrates the pod base structure 1500 as incorporated into a beverage pod of a first size 680 (e.g., a beverage pod of a larger diameter to prepare coffee drinks). FIGS. 15B and 15C illustrate the pod base structure 1500 as incorporated into a beverage pod of a second size 770 (e.g., a beverage pod of a smaller diameter to prepare espresso drinks) Like the pod base structure 1400, the pod base structure 1500 can be adapted for beverage pods of a variety of sizes.

The pod base structure 1500 shown in FIGS. 15B and 15C can provide a similar purpose of providing support for a filter (not pictured here) within the pod body 1510. In some embodiments, the pod base structure 1500 does not include a structure that elevates the filter from the base 1520 (e.g., the plurality of concentric rings 1450). In some embodiments, the pod base structure 1500 includes a pod body 1510 that has a base 1520 with a plurality of rectangular windows 1522. In some implementations, as seen in FIG. 15A, the plurality of rectangular windows 1522 can be spaced across the base 1520 in a hexagonal pattern. The windows in the base 1520 can be a variety of shapes and sizes, such as circles, triangles, rectangles, squares, polygons, or any other type of design. The conformation of the windows can be of any variety of conformations.

As discussed above, in some embodiments, the base 1520 can provide support for the filter. This can inhibit or prevent the filter from tearing as a result of the pressure of fluid and beverage component in the pod body 1510 during the beverage brewing process. FIGS. 15B and 15C illustrate a pod base structure 1500 adapted for use in a beverage pod for brewing beverages. In some embodiments, the beverage pod 1500 can include a restrictor 1540 with a small hole 1550 (e.g., located in about the center of the restrictor 1540). In some embodiments, the size of the hole 1550 is configured to build-up pressure within the pod body 1510 as may be beneficial in preparing some beverages, such as espresso. Some embodiments do not include the restrictor 1540 and/or are otherwise configured to reduce or prevent a pressure increase during a beverage preparation operation, such as when preparing brewed coffee.

Rotatable Drawers

Figure 16C:
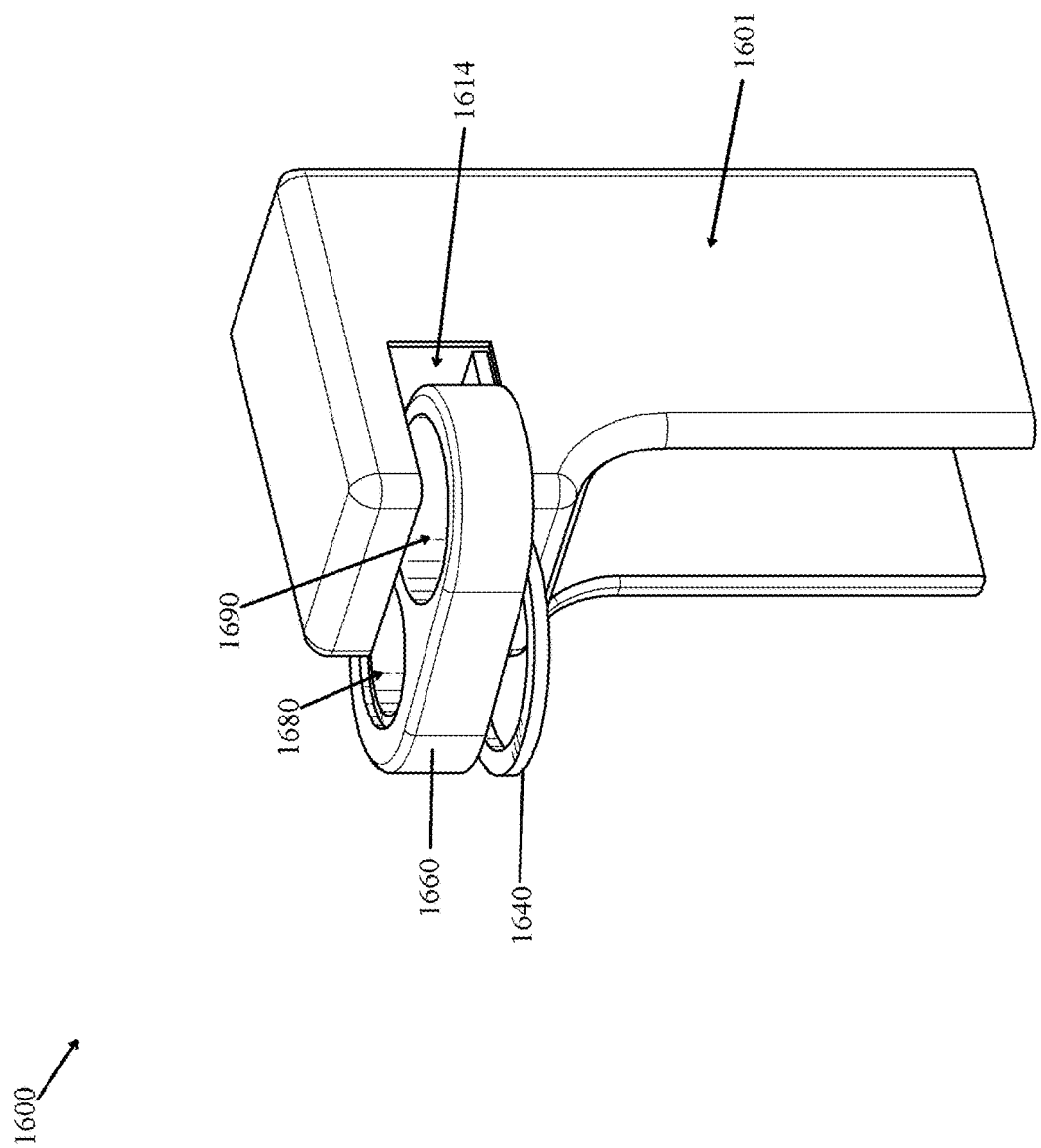
FIG. 16C illustrates a side perspective view of an example of the brewer machine of FIG. 16A in a third configuration.

FIGS. 16A-16F illustrate an example of a brewer machine 1600. The brewer machine 1600 may include a rotatable drawer. The brewer machine 1600 may comprise a tray 1640 and a drawer 1660. As will be described in further detail herein, the drawer 1660 may comprise two beverage pod receptacles. As discussed in more detail below, the receptacles can be configured to receive different sizes of beverage pods, such as a coffee beverage pod and an espresso beverage pod. In various embodiments, the brewer machine includes a housing 1601. As shown in FIG. 16A, the brewer machine 1600 may comprise a front end portion 1602 and an opposing rear end portion 1604, and a right side portion 1606 and a left side portion 1608. In some embodiments, the front end portion 1602 of the brewer machine 1600 may be configured to face a user of the brewer machine 1600. The brewer machine 1600 may comprise a bottom end 1610 configured to facilitate placement of the brewer machine 1600 on a surface (e.g., a tabletop, a countertop), and an opposing upper end 1612.

The brewer machine 1600 may comprise a first opening 1614 above a second opening 1616. As shown in FIG. 16A, the first opening 1614 may extend across an entire length of a lateral dimension of the front end portion 1602, and/or along a portion of a lateral dimension of the right side portion 1606 and along a portion of a lateral dimension of the left side portion 1608. For example, the opening 1614 may be bordered by at least in part by one or more surfaces on a front end portion 1602 of the housing 1601, one or more surfaces on the right side portion 1606 and one or more surfaces on the left side portion 1608 of the housing 1601. The first opening 1614 may be shaped and/or dimensioned such that at least a portion of the drawer 1660 and the tray 1640 can be moved through the first opening 1614, as will be described in further detail below.

In some embodiments, the brewer machine 1600 may comprise a second opening 1616. The second opening 1616 may be configured to receive a receptacle for beverage generated by the brewer machine 1600. For example, the second opening 1616 may be positioned below the first opening 1614 and may comprise a shape and/or dimension configured to receive a beverage receptacle (e.g., a cup) into which beverage generated by the brewer machine 1600 can be delivered.

FIG. 16A illustrates the brewer machine 1600 in a first configuration and FIG. 16B illustrates the brewer machine 1600 in a second configuration. In the first configuration shown in FIG. 16A, the tray 1640 and the drawer 1660 may be in a retracted position. For example, the tray 1640 and the drawer 1660 may be positioned within or substantially within the housing 1601 in the first configuration. In the second configuration shown in FIG. 16B, the tray 1640 and the drawer 1660 may be extended through the first opening 1614 such that a portion of the tray 1640 and a portion of the drawer 1660 may be positioned externally of the housing 1601, for example presenting a user with one of the two beverage pod receptacles (e.g., beverage pod receptacle 1690).

FIG. 16C illustrates the brewer machine 1600 in a third configuration. In the third configuration shown in FIG. 16C, a portion of the tray 1640 may be extended through the first opening 1614 and positioned externally of the housing 1601. In some embodiments, the drawer 1660 may be positioned entirely externally of the housing 1601 and/or may be rotated relative to the tray 1640. For example, a first beverage pod receptacle 1680 and a second beverage pod receptacle 1690 of the drawer 1660 may be positioned entirely externally of the housing 1601. The drawer 1660 may be rotatable around a vertical axis relative to the tray 1640. For example, the drawer 1660 may be seated on the tray 1640 and rotated relative to the tray 1640 around the vertical axis. FIG. 16C illustrates that the drawer 1660 can be rotated relative to the tray 1640 around the vertical axis such that the drawer 1660 is perpendicular or substantially perpendicular to the tray 1640. In some embodiments, the first opening 1614 may be shaped and/or dimensioned to allow rotation of the drawer 1660 relative to the tray 1640, for example providing sufficient clearance for the drawer 1660 such that the drawer 1660 may be rotated.

In some embodiments, the drawer 1660 can be rotated clockwise. In some embodiments, the drawer 1660 can be rotated counterclockwise. In some embodiments, the drawer 1660 can be fully rotatable, for example being rotatable around 360°. In some embodiments, the drawer can be rotated up to about 180° clockwise and counterclockwise.

Rotation of the drawer 1660 may be effected manually and/or by one or more motorized components. For example, a user may exert force upon the drawer 1660 to extract the drawer 1660 from the housing 1601 and/or to rotate the drawer 1660 to the desired position. In some embodiments, such operations are motorized.

In some embodiments, the first beverage pod receptacle 1680 may be initially presented to a user by the drawer 1660. For example, in response to receiving a user request to access a beverage pod receptacle (e.g., via a user interface connected with a processor (not shown)), the drawer 1660 may be extended through the first opening 1614 such that a portion of the drawer 1660 and tray 1640 may be positioned externally of the housing 1601 to present the user with the first beverage pod receptacle 1680. If the user wishes to access the second beverage pod receptacle 1690, the user may manually rotate the drawer 1660 (e.g., clockwise or counterclockwise) such that the first beverage pod receptacle 1680 is rotated away from the user and the second beverage pod receptacle 1690 is rotated toward the user. The drawer 1660 may be rotated until the drawer 1660 is again aligned with the tray 1640, such that the second beverage pod receptacle 1690 is presented to the user.

A reverse process may be performed to rotate the drawer 1660 to present the first beverage pod receptacle 1680 if the second beverage pod receptacle 1690 is initially presented. For example, a user may rotate the drawer 1660 clockwise or counterclockwise to position the beverage pod receptacle 1680 towards the front end portion 1602 of the brewer machine 1600.

In some embodiments, rotation of the drawer 1660 may be effected by one or more motorized components. For example, the brewer machine 1600 may activate one or more motorized components to rotate the drawer 1660 in response to a user request to access a beverage pod receptacle.

Figure 16D:
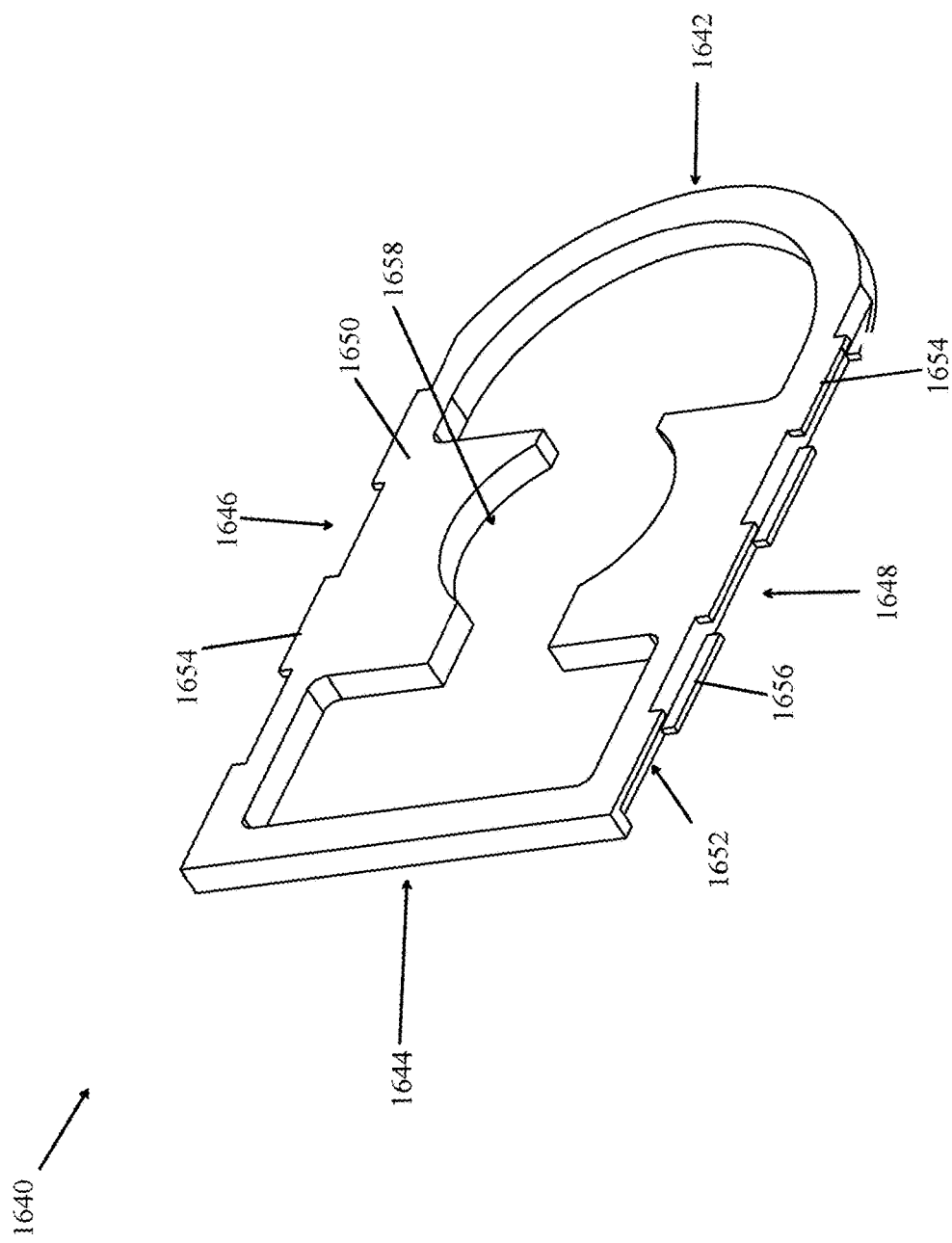
FIG. 16D illustrates a top down perspective view of a tray of the brewer machine in FIG. 16A.

FIG. 16D illustrates a top perspective view of the tray 1640. The tray 1640 may comprise a front edge 1642 and a rear edge 1644, and a right edge 1646 and a left edge 1648. The tray 1640 may comprise an upper surface 1650 and an opposing bottom surface 1652. In some embodiments, the drawer 1660 may be positioned over the upper surface 1650. For example, the drawer 1660 may be seated on the upper surface 1650.

The tray 1640 may comprise a plurality of protrusions extending from the right edge 1646 and the left edge 1648. The tray 1640 may comprise a plurality of protrusions 1654 extending laterally from an upper portion of the right edge 1646 and the left edge 1648, and/or a plurality of protrusions 1656 extending laterally from a lower portion of the right edge 1646 and the left edge 1648. As shown, in some variants, the protrusions 1654, 1656 may extend from the upper and lower portions in alternate fashion. As shown in FIG. 16D, the tray 1640 may comprise three of each of the protrusions 1654 and 1656 on each of the right edge 1646 and the left edge 1648. In some embodiments, an upper surface of the protrusions 1656 and a lower surface of the protrusions 1654 may be at a vertical distance apart such that the protrusions 1656, 1654 may be configured to engage with one or more corresponding protrusions on another component of the brewer machine 1600 to facilitate movement of the tray 1640 into and out of the housing 1601. For example, one or more other components of the brewer machine 1600 may comprise corresponding tracks for engaging with. In some embodiments, at least a portion of the protrusions corresponding to the protrusions 1656, 1654 may be on an interior surface of the housing 1601. For example, the protrusions 1656, 1654 may be configured to engage with one or more corresponding protrusions of the brewer machine 1600 such that movement of at least a portion of the tray 1640 into and/or out of the housing 1601 may be guided by the corresponding protrusions.

As shown in FIG. 16D, the tray 1640 may comprise an opening 1658. The opening 1658 may comprise a shape for coupling to the drawer 1660. As shown in FIG. 16D, a center portion of the opening 1658 may have an engaging shape, such as a partial circle shape. The engaging shape may be configured to engage with a corresponding shape on a bottom of the drawer 1660, as will be described in further detail herein, such that the drawer 1660 may be rotated relative to the tray 1640.

Figure 16E:
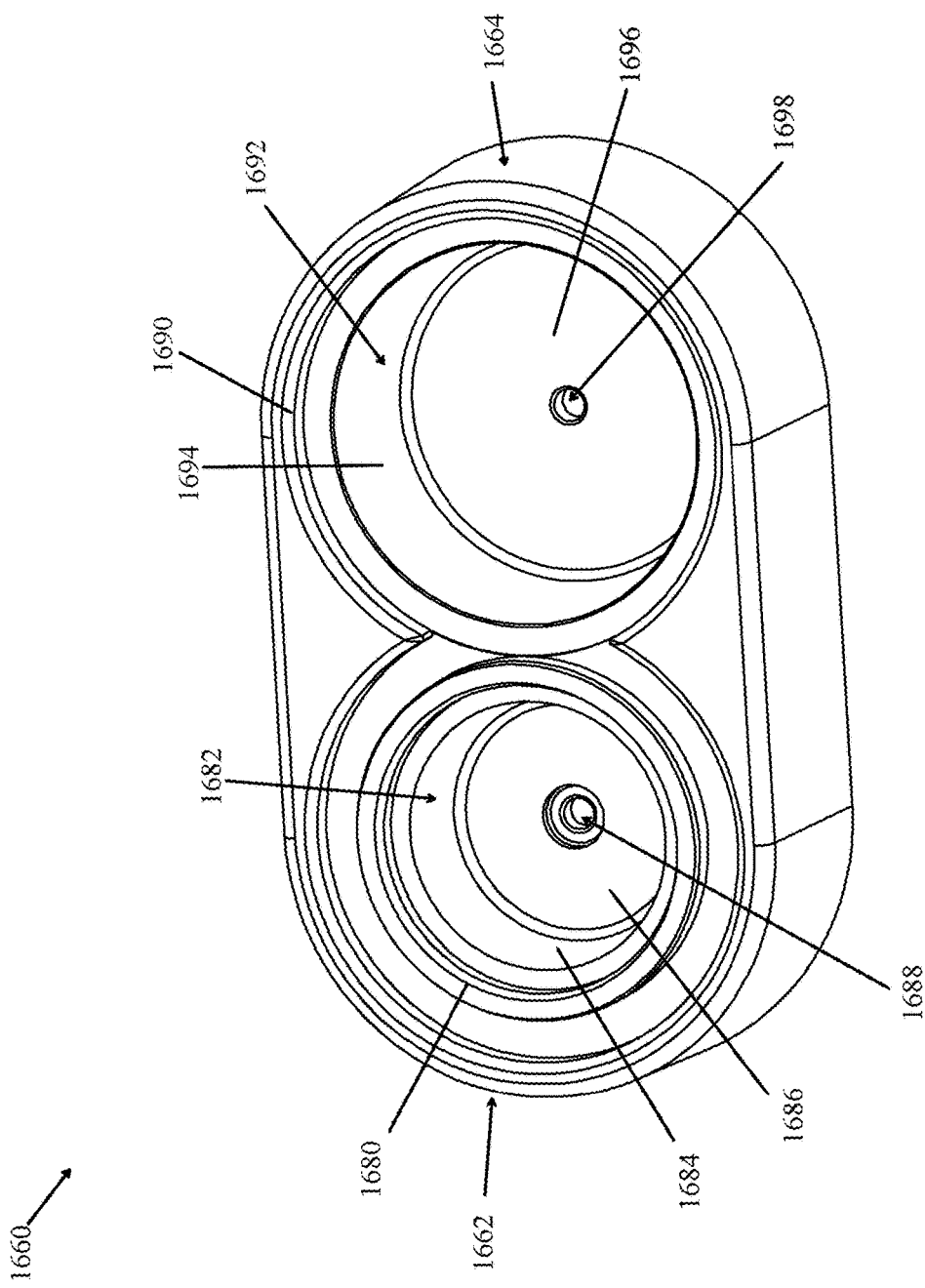
FIG. 16E illustrates a top down perspective view of a drawer of the brewer machine in FIG. 16A.

Referring to FIG. 16E, a top down perspective view of the drawer 1660 is illustrated. The drawer 1660 may comprise a first end 1662 and a second opposing end 1664. The first end 1662 and/or the second opposing end 1664 may be presented to the user through the first opening 1614 in the brewer machine 1600, depending on the position to which the drawer 1660 is rotated.

The drawer 1660 may comprise a first beverage pod receptacle 1680 proximate to the first end 1662 and a second beverage pod receptacle 1690 proximate to the second opposing end 1664. For example, the first beverage pod receptacle 1680 may be initially presented to a user if the first end of the drawer 1660 is initially positioned externally of the housing 1601, or vice versa. In some embodiments, the first beverage pod receptacle 1680 can be configured to receive a beverage pod having a size smaller than that of the second beverage pod receptacle 1690. In some embodiments, the first beverage pod receptacle 1680 may be configured to receive a beverage pod configured to brew an espresso drink. In some embodiments, the second beverage pod receptacle 1690 may be configured to receive a beverage pod configured to brew a coffee drink or another type of drink. In some embodiments, the first beverage pod receptacle 1680 and/or the second beverage pod receptacle 1690 may be configured to receive a beverage pod configured to brew a drink other than an espresso drink and a coffee drink, respectively. For example, the first beverage pod receptacle 1680 and/or the second beverage pod receptacle 1690 can be configured to accept a beverage pod for producing tea, hot chocolate, cider, juice, or otherwise.

The first beverage pod receptacle 1680 may comprise a first beverage pod receptacle recess 1682. The recess 1682 can be bordered by a first beverage pod receptacle sidewall portion 1684 and a first beverage pod receptacle bottom portion 1686. The first beverage pod receptacle bottom portion 1686 may comprise an opening 1688. The second beverage pod receptacle 1690 may comprise a second beverage pod receptacle recess 1692. The recess 1692 can be bordered by a second beverage pod receptacle sidewall portion 1694 and a second beverage pod receptacle bottom portion 1696. The second beverage pod receptacle bottom portion 1696 may comprise an opening 1698.

The opening 1688 of the first beverage pod receptacle 1680 and the opening 1698 of the second beverage pod receptacle 1690 can be configured to permit flow of fluid therethrough. For example, beverage generated by a beverage pod received in the first beverage pod receptacle 1680 or the second beverage pod receptacle 1690 may pass through the opening 1688 or the opening 1698, respectively, such that the beverage may be delivered to a beverage receptacle (e.g., a cup). In some embodiments, the openings 1688, 1698 may be configured to align with an opening of the tray 1640 (e.g., opening 1658) such that beverage generated within the brewer machine 1600 may be delivered to a beverage receptacle.

Figure 16F:
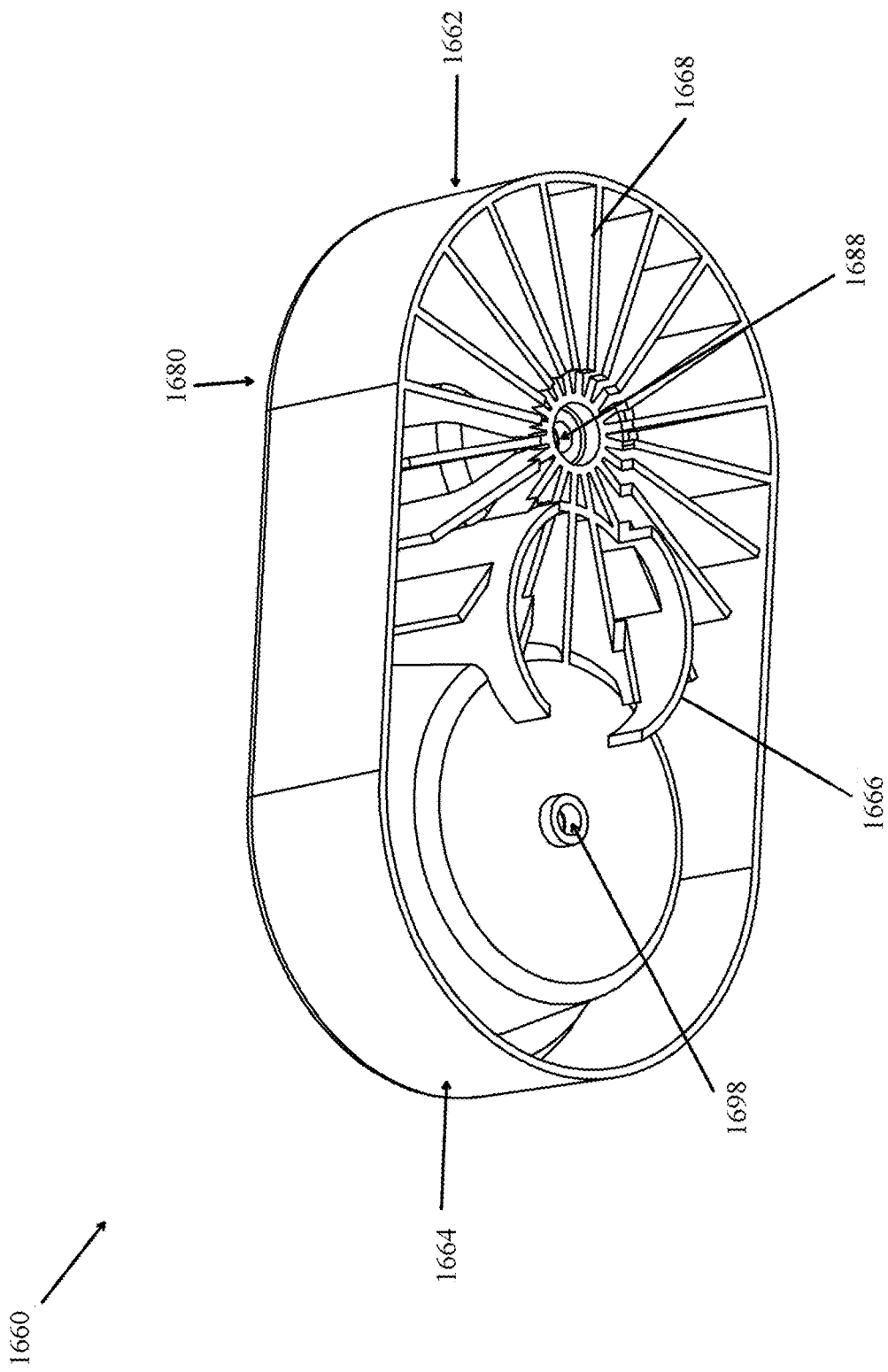
FIG. 16F illustrates a bottom perspective view of the tray of FIG. 16E.

FIG. 16F illustrates a bottom perspective view of the drawer 1660. The drawer 1660 may comprise a tray engaging protrusion 1666 on a bottom surface for engaging with the opening 1658 of the tray 1640. The tray engaging protrusion 1666 may be placed within the corresponding drawer engaging portion of opening 1658 on the tray 1640 such that the drawer 1660 may be maintained over the tray 1640 and/or the drawer 1660 can be rotated relative to the tray 1640. For example, the tray engaging protrusion 1666 may be dimensioned and/or shaped to engage with the drawer engaging portion of opening 1658 on the tray 1640.

As shown in FIG. 16F, the drawer 1660 may comprise one or more support features 1668 on a bottom surface. In some embodiments, at least a portion of the support features 1668 may be positioned below the first beverage pod receptacle 1680. For example, the support features 1668 may be positioned below or substantially below the first beverage pod receptacle 1680. The one or more support features 1668 may provide mechanical support for the first beverage pod receptacle 1680. In some embodiments, the support features 1668 may facilitate maintaining structural form and/or structural integrity of the first beverage pod receptacle 1680, for example during generating of a beverage from a beverage pod received within the first beverage pod receptacle 1680. In some embodiments, generating the beverage using the beverage pod received within the first beverage pod receptacle 1680 may comprise a high pressure process. For example, pressures of greater than about 9 bars may be used for generating the beverage, such as for generating an espresso drink. In some embodiments, the support features 1668 may be configured to facilitate maintaining structural form and/or integrity of the first beverage pod receptacle 1680 during beverage generating processes at pressures of greater than about 9 bars.

As shown in FIG. 16F, in some embodiments, the support features 1668 may have a radial configuration. For example, the support features 1668 may comprise portions which are arranged under or substantially under the first beverage pod receptacle 1680, and which extend laterally from a center portion under the first beverage pod receptacle 1680 to sidewall portions of the drawer 1660.

Linearly Movable Drawers

Figures 17C, 17D:
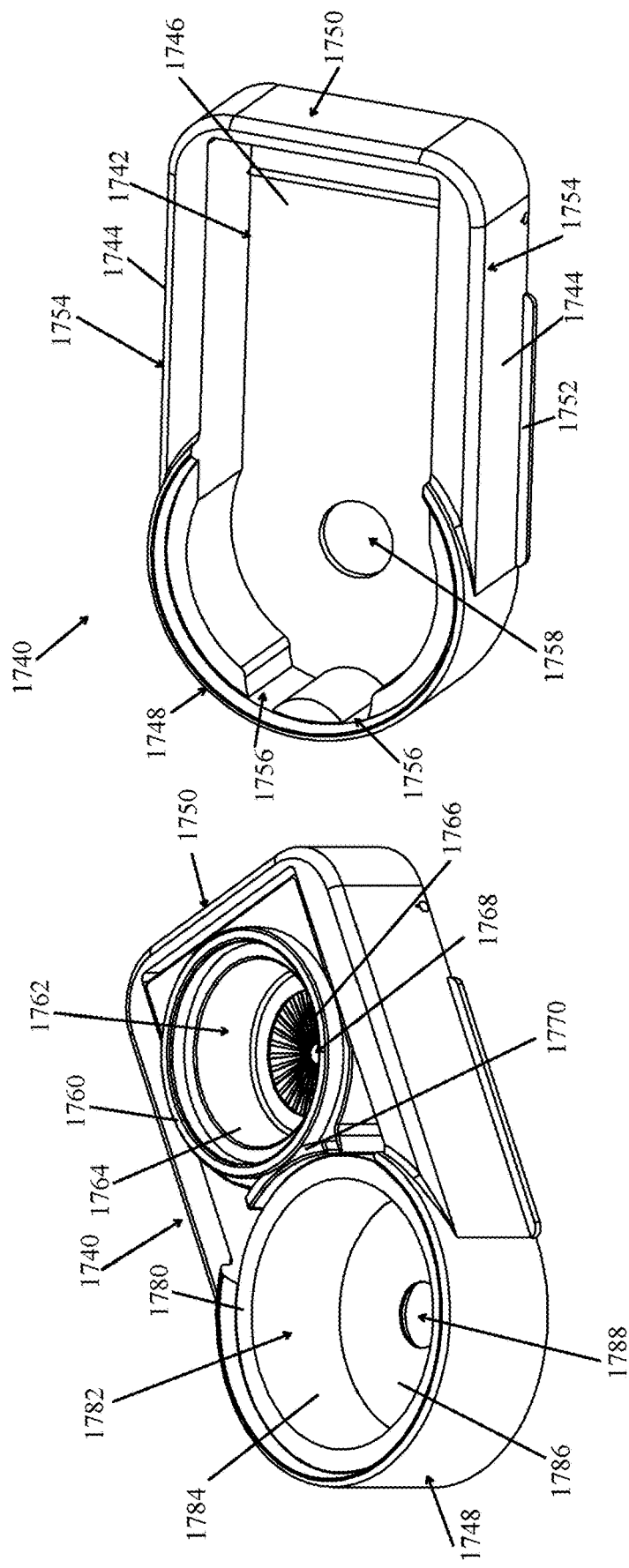
FIG. 17C illustrates a top down perspective view of the beverage pod receptacles positioned with a drawer of the brewer machine of FIG. 17A.
FIG. 17D illustrates a top down perspective view of a drawer of the brewer machine of FIG. 17A.

FIGS. 17A-17D illustrate schematics of an example of another brewer machine 1700. The brewer machine 1700 may comprise a drawer, which may be linearly movable. As is discussed in more detail below, the drawer can be configured to facilitate loading and/or unloading of beverage pods from the brewer machine 1700. In some embodiments, the drawer includes a brew chamber for a larger pod and a sliding brew chamber for a small pod positioned behind. The back edge of the larger chamber can be the front edge of the smaller chamber, such as is shown in FIG. 17C. In certain implementations, to switch from use of the larger brew chamber to the smaller brew chamber (e.g., make an espresso), the smaller chamber is slid forward (either by the user or by some user selected mechanism) to present itself, such as is shown in FIGS. 17A and/or 18C. Some embodiments include a mechanism (e.g., a lever) for opening, closing, and/or clamping the drawer. The mechanism can be manually operated or motorized. In some embodiments, the smaller and larger chambers are both maintained within the brewer machine. In certain implementations, when a user wants to brew coffee, they push the smaller chamber out of the way (e.g., rearwardly) in order to gain access to the larger chamber; and when the user wants to prepare an espresso beverage, slide the smaller chamber forward to gain access to that chamber.

As shown in FIG. 17A, the brewer machine 1700 may comprise a front end portion 1702 and an opposing rear end portion 1704, and a right side portion 1706 and a left side portion 1708. In some embodiments, the front end portion 1702 of the brewer machine 1700 may be configured to face a user of the brewer machine 1700. The brewer machine 1700 may comprise a bottom end portion 1710 configured to facilitate placement of the brewer machine 1700 on a surface (e.g., a tabletop, a countertop), and an opposing upper end portion 1712. In various embodiments, the brewer machine 1700 may comprise a housing 1701.

The brewer machine 1700 may comprise a first opening 1714, and a second opening 1716 below the first opening 1714. In some embodiments, the first opening 1714 may extend across at least a portion of a lateral dimension of the front end portion 1702. For example, the opening 1714 may be bordered by one or more surfaces on a front end portion 1702 of the housing 1701. In some embodiments, the first opening may extend along at least a portion of a lateral dimension of the right side portion 1706 and along at least a portion of a lateral dimension of the left side portion 1708. For example, the opening 1714 may be bordered by one or more surfaces on a front end portion 1702 of the housing 1701, and one or more surfaces on the right side portion 1706 and one or more surfaces on the left side portion 1708 of the housing 1701.

As shown in FIG. 17A, the brewer machine 1700 may comprise a drawer 1740. In some embodiments, at least a portion of the drawer 1740 may be insertable into the housing 1701 through the first opening 1714. In some embodiments, the first opening 1714 may be shaped and/or dimensioned such that at least a portion of the drawer 1740 can be moved into or out of the housing 1701 through the first opening 1714.

The second opening 1716 may be configured to receive a beverage receptacle for beverage generated by the brewer machine 1700. For example, the second opening 1716 may be positioned below the first opening 1714 and may comprise a shape and/or dimension configured to receive a beverage receptacle (e.g., a cup) into which beverage generated by the brewer machine 1700 can be delivered.

The drawer 1740 may be configured to receive two beverage pod receptacles, for example one behind the other within the drawer 1740, as will be described in further detail herein. As shown in FIG. 17A, in a first configuration, a portion of the drawer 1740 can extend beyond the front end portion 1702 of the brewer machine 1700 such that a first beverage pod receptacle 1760 within the drawer 1740 can be presented to a user. FIG. 17B illustrates a second configuration. The second configuration may comprise a portion of the drawer 1740 extended beyond the front end portion 1702 such that a second beverage pod receptacle 1780 within the drawer 1740 can be presented to a user. For example, a user may insert a beverage pod or remove a used beverage pod from the first beverage pod receptacle 1760 or the second beverage pod receptacle 1780 presented to the user by the extended drawer 1740.

In some embodiments, a portion of the drawer 1740 may be moved in a linear fashion through the first opening 1714. In some embodiments, movement of a portion of the drawer 1740 through the first opening 1714 can be effected manually by a user, such as by the user pulling the drawer 1740 or pushing the drawer 1740. In some embodiments, movement of the drawer 1740 can be effected by one or more motorized components in response to user input (e.g., user input received via a user interface in communication with a processor (not shown)). For example, a portion of the drawer 1740 may be moved out of the housing 1701 and through the first opening 1714 in response to an input (e.g., a request provided via a user interface to insert or remove a beverage pod from a beverage pod receptacle seated in the drawer 1740). The drawer 1740 can be moved back into the housing 1701, such as after the user has indicated completion of the insertion or removal.

As described herein, in a first configuration, the drawer 1740 in an extended position may present the first beverage pod receptacle 1760 to the user. For example, the first beverage pod receptacle 1760 may be initially seated in a front portion in the drawer 1740 such that the first beverage pod receptacle 1760 is positioned externally of the housing 1701 when at least a portion of the drawer 1740 is extended through the first opening 1714. The second beverage pod receptacle 1780 may be placed in the front portion of the drawer 1740, according to a second configuration, such that the second beverage pod receptacle 1780 is presented to the user. Some embodiments include a sliding portion, such as a tray that is received in and/or slides relative to the drawer 1740.

In some embodiments, swapping the positions of the first beverage pod receptacle 1760 and the second beverage pod receptacle 1780 within the drawer 1740 may be effected manually. For example, a user may effect swapping of the position of the first beverage pod receptacle 1760 and the second beverage pod receptacle 1780 within the drawer 1740.

In some embodiments, the brewer machine 1700 may receive a request entered by a user to access a beverage pod receptacle. For example, the brewer machine 1700 may include a user interface in communication with a processor. In some implementations, the brewer machine 1700 may, in response to a command from the user, present the user with one of two beverage pod receptacles received within the drawer 1740. For example, as shown in FIG. 17A, the first beverage pod receptacle 1760 may be seated in a front portion of the drawer 1740 and the second beverage pod receptacle 1780 may be seated in a rear portion of the drawer 1740 such that the first beverage pod receptacle 1760 is presented to the user as the drawer 1740 is extended through the first opening 1714. In some embodiments, to access the second beverage pod receptacle 1780, the first beverage pod receptacle 1760 is removed from the drawer 1740 and the second beverage pod receptacle 1780 is moved forward (e.g., by pulling and/or sliding the second beverage pod receptacle 1780). In some embodiments, the user may remove the second beverage pod receptacle 1780 from the drawer 1740 and place the first beverage pod receptacle 1760 in the rear portion of the drawer 1740. The second beverage pod receptacle 1780 may then be repositioned within the drawer 1740 and placed in the front portion of the drawer 1740. The user may then place a beverage pod in the second beverage pod receptacle 1780 to prepare the desired beverage. In some variants, the second beverage pod receptacle is moved (e.g., slid) over the first beverage pod receptacle 1760.

In some embodiments, when the second beverage pod receptacle 1780 is presented to the user and the user desires to access the first beverage pod receptacle 1760, the user may remove the second beverage pod receptacle 1780 and perform a similar process to remove and/or swap the beverage pod receptacles such that the second beverage pod receptacle 1780 is positioned in the rear portion of the drawer 1740 and the first beverage pod receptacle 1760 is positioned in the front portion of the drawer 1740.

In some embodiments, swapping placement of the first beverage pod receptacle 1760 and the second beverage pod receptacle 1780 within the drawer 1740 can be effected by one or more motorized components. For example, the brewer machine 1700 may receive an input from a user requesting access to the first beverage pod receptacle 1760 or the second beverage pod receptacle 1780. In response, the brewer machine 1700 may initiate one or more commands to one or more motorized components to swap the position of the first beverage pod receptacle 1760 and the second beverage pod receptacle 1780. In some embodiments, swapping placement of the first beverage pod receptacle 1760 and the second beverage pod receptacle 1780 can be effected through a combination of manual operation and motorized components.

In some embodiments, the second beverage pod receptacle 1780 may be stored externally of the housing 1701. For example, the second beverage pod receptacle 1780 may not be stored within the drawer 1740 when the second beverage pod receptacle 1780 is not in use. In some embodiments, in response to user input to access a beverage pod receptacle, the drawer 1740 may present to the user the first beverage pod receptacle 1760. In some embodiments, to access the second beverage pod receptacle 1780, the first beverage pod receptacle 1760 may be moved from the front portion to the rear portion of the drawer 1740, and the second beverage pod receptacle 1780 can be retrieved from an external storage and placed in the front portion of the drawer 1740. In some embodiments, when a user is presented with the second beverage pod receptacle 1780 and the user wishes to access the first beverage pod receptacle 1760, the second beverage pod receptacle 1780 may be removed from the drawer 1740 for storage externally of the housing 1701.

FIG. 17C illustrates a top down perspective view of drawer 1740 and the first beverage pod receptacle 1760 and the second beverage pod receptacle 1780 seated the drawer 1740. The drawer 1740 may have a front end portion 1748 and a rear end portion 1750. The front end portion 1748 may be the portion presented to a user as the drawer 1740 is extended beyond the front end portion 1702 through the first opening 1714. In the configuration shown in FIG. 17C, the second beverage pod receptacle 1780 is positioned proximate to the front end portion 1748 while the first beverage pod receptacle 1760 may be positioned proximate to the rear end portion 1750. In some embodiments, the first beverage pod receptacle 1760 can be configured to receive a beverage pod smaller than that of the second beverage pod receptacle 1780.

As shown in FIG. 17C, the first beverage pod receptacle 1760 may comprise a recess 1762. The recess 1762 can be bordered by a sidewall portion 1764 and a bottom portion 1766. The bottom portion 1766 may comprise an opening 1768. In some embodiments, the opening 1768 can be configured to align with a corresponding opening of the drawer 1740 when the first beverage pod receptacle 1760 is placed proximate to the front end portion 1748 of the drawer 1740. For example, the opening 1768 may be configured to align with a corresponding opening of the drawer 1740 (e.g., opening 1758) when the first beverage pod receptacle 1760 is positioned proximate to the front end portion 1748 of the drawer 1740, such that beverage generated by a pod placed within the first beverage pod receptacle 1760 may pass through the opening 1768, and through the opening of the drawer 1740 into a beverage receptacle.

The first beverage pod receptacle 1760 may comprise one or more drawer engaging protrusions 1770 configured for insertion into corresponding one or more beverage pod receptacle engaging features on the drawer 1740. In some embodiments, the drawer engaging protrusions 1770 may be positioned against a portion of the second beverage pod receptacle 1780 when the first beverage pod receptacle 1760 is seated behind the second beverage pod receptacle 1780 in the drawer 1740, such as in a first configuration as described herein. Mating between the beverage pod receptacle engaging features on the drawer 1740 and the drawer engaging protrusions 1770 on first beverage pod receptacle 1760, and/or positioning of the drawer engaging protrusions 1770 against a portion of the second beverage pod receptacle 1780, may reduce or prevent undesired movement of the beverage pod receptacle 1760.

In some embodiments, the first beverage pod receptacle 1760 may have a configuration configured to slide back and forth within the drawer 1740, including back and forth in a linear fashion. For example, the first beverage pod receptacle 1760 may comprise one or more features configured to engage with corresponding track features on the drawer 1740 such that the back and forth movement of the first beverage pod receptacle 1760 within the drawer 1740 may be guided by the track features.

The second beverage pod receptacle 1780 may comprise a recess 1782. The recess 1782 can be bordered by a sidewall portion 1784 and a bottom portion 1786. The bottom portion 1786 may comprise an opening 1788. In some embodiments, the opening 1788 can be configured to align with a corresponding opening of the drawer 1740 when the second beverage pod receptacle 1780 is placed proximate to the front end portion 1748 of the drawer 1740. For example, the opening 1788 may be configured to align with a corresponding opening of the drawer 1740 (e.g., opening 1758) when the second beverage pod receptacle 1780 is positioned proximate to the front end portion 1748 of the drawer 1740, such that beverage generated by a pod placed within the second beverage pod receptacle 1780 may pass through the opening 1788, and through the opening of the drawer 1740 into a beverage receptacle.

FIG. 17D illustrates the brewer machine drawer 1740 in further detail. The drawer 1740 may comprise a recess 1742 that is bordered by a sidewall portion 1744 and a bottom portion 1746. The drawer 1740 may have a front end portion 1748, rear end portion 1750, and side portions 1754 extending between the front end portion 1748 and the rear end portion 1750. The drawer 1740 may have front end portion 1748 comprising a curvature. As described herein, the first beverage pod receptacle 1760 and the second beverage pod receptacle 1780 may be seated within the recess 1742.

In some embodiments, the drawer 1740 may have one or more features for engaging with one or more other components of the brewer machine 1700. For example, each of the side portions 1754 of the sidewall portion 1744 may comprise an engaging protrusion 1752. As shown in FIG. 17D, the drawer 1740 may comprise an engaging protrusion 1752 along at least a portion of an exterior bottom edge of side portions 1754 of the sidewall portion 1744. In some embodiments, the engaging protrusions 1752 may be shaped and/or dimensioned for insertion into a corresponding groove on the one or more other components of the brewer machine 1700 to guide the movement of the drawer 1740 through the first opening 1714. In various embodiments, the drawer 1740 slides relative to the housing 1701 via sliding engagement between the protrusions 1752 and corresponding track features.

As shown in FIG. 17D, the drawer 1740 may comprise one or more beverage pod receptacle engaging features 1756. The beverage pod receptacle engaging features 1756 may be on the front end portion 1748 of the sidewall portion 1744 and/or may be configured to engage with one or more corresponding features on a beverage pod receptacle. FIG. 17D illustrates two beverage pod receptacle engaging recesses 1756 configured to receive two corresponding drawer engaging protrusions on a beverage pod receptacle. The two beverage pod receptacle engaging recesses 1756 may be configured to mate with the two corresponding drawer engaging protrusions on a beverage pod receptacle (e.g., the drawer engaging protrusions 1770 on the first beverage pod receptacle) to reduce or prevent undesired movement of the beverage pod receptacle.

Further referring to FIG. 17D, the drawer 1740 may comprise an opening 1758 on the drawer bottom portion 1746. In some embodiments, the opening 1758 may be configured to align with an opening of a beverage pod receptacle seated in a front portion of the drawer 1740 (e.g., a first beverage pod receptacle 1760 or a second beverage pod receptacle 1780) such that beverage generated by a pod placed within the beverage pod receptacle may first pass through the opening of the beverage pod receptacle and then pass through the opening 1758 to a beverage receptacle. For example, a beverage receptacle, such as a cup, may be placed underneath and aligned with the opening 1758 such that the beverage can be delivered into the cup from the brewer machine through the first opening 1758.

FIGS. 18A-18D illustrate an example of the brewer machine 1800 comprising a drawer 1840 that can be moved into and at least partially out of the brewer machine 1800. In various embodiments, the brewer machine 1800 can include any of the features of the brewer machine 1700. For example, the brewer machine 1800 can include the drawer 1740, first beverage pod receptacle 1760 and/or second beverage pod receptacle 1780.

Figure 18A:
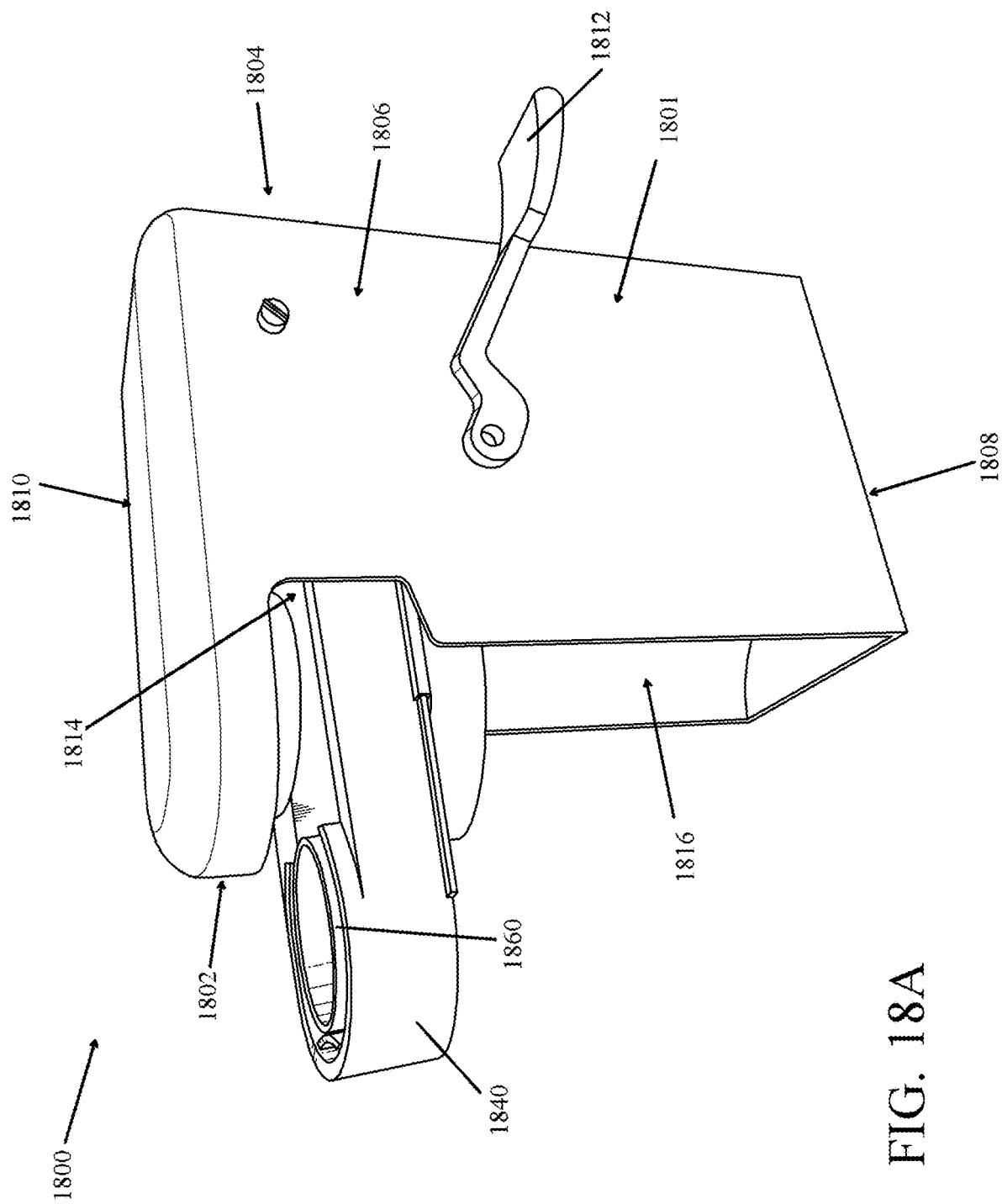
FIG. 18A illustrates a side perspective view of a brewer machine in a first configuration.

FIG. 18A illustrates a side perspective view of the brewer machine 1800 in a first configuration. As shown, the brewer machine 1800 may comprise a front end portion 1802, an opposing rear end portion 1804, and side portions 1806 extending between the front end portion 1802 and the rear end portion 1804. The brewer machine 1800 may comprise a bottom end portion 1808 configured to facilitate placement of the brewer machine 1800 on a surface, and an opposing upper end 1810. In some embodiments, the brewer machine 1800 may comprise a housing 1801.

The brewer machine 1800 may comprise a first opening 1814 and a second opening 1816 on the front end portion 1802, where the second opening 1816 can be below the first opening 1814. In some embodiments, the second opening 1816 may be configured to receive a beverage receptacle for beverage generated by the brewer machine 1800.

As shown in FIG. 18A, at least a portion of the drawer 1840 may be moved through the first opening 1814 such that the drawer 1840 may be moved into or at least partially out of the housing 1801. The front end portion 1802 of the brewer machine 1800 may be configured to face a user of the brewer machine 1800. FIG. 18A illustrates the drawer 1840 partially extended out from the front end portion 1802 of the brewer machine 1800 such that a first beverage pod receptacle 1860 is presented to a user.

The brewer machine 1800 may comprise a lever 1812. A user may move the lever 1812 to move the drawer 1840. For example, the lever 1812 may transfer force exerted by a user upon the lever 1812 to the drawer 1840 such that the drawer 1840 may be moved through the first opening 1814 without any motorized components. In some embodiments, the lever 1812 can be coupled directly or indirectly (e.g., with a mechanical linkage) to the drawer 1840 such that rotational force exerted upon the lever 1812 can be transformed into linear movement by the drawer 1840. For example, the lever 1812 may be rotated towards a user or away from a user to slide drawer 1840 linearly through the first opening 1814 to move the drawer 1840 at least partially into or out of the housing 1801.

Figure 18B:
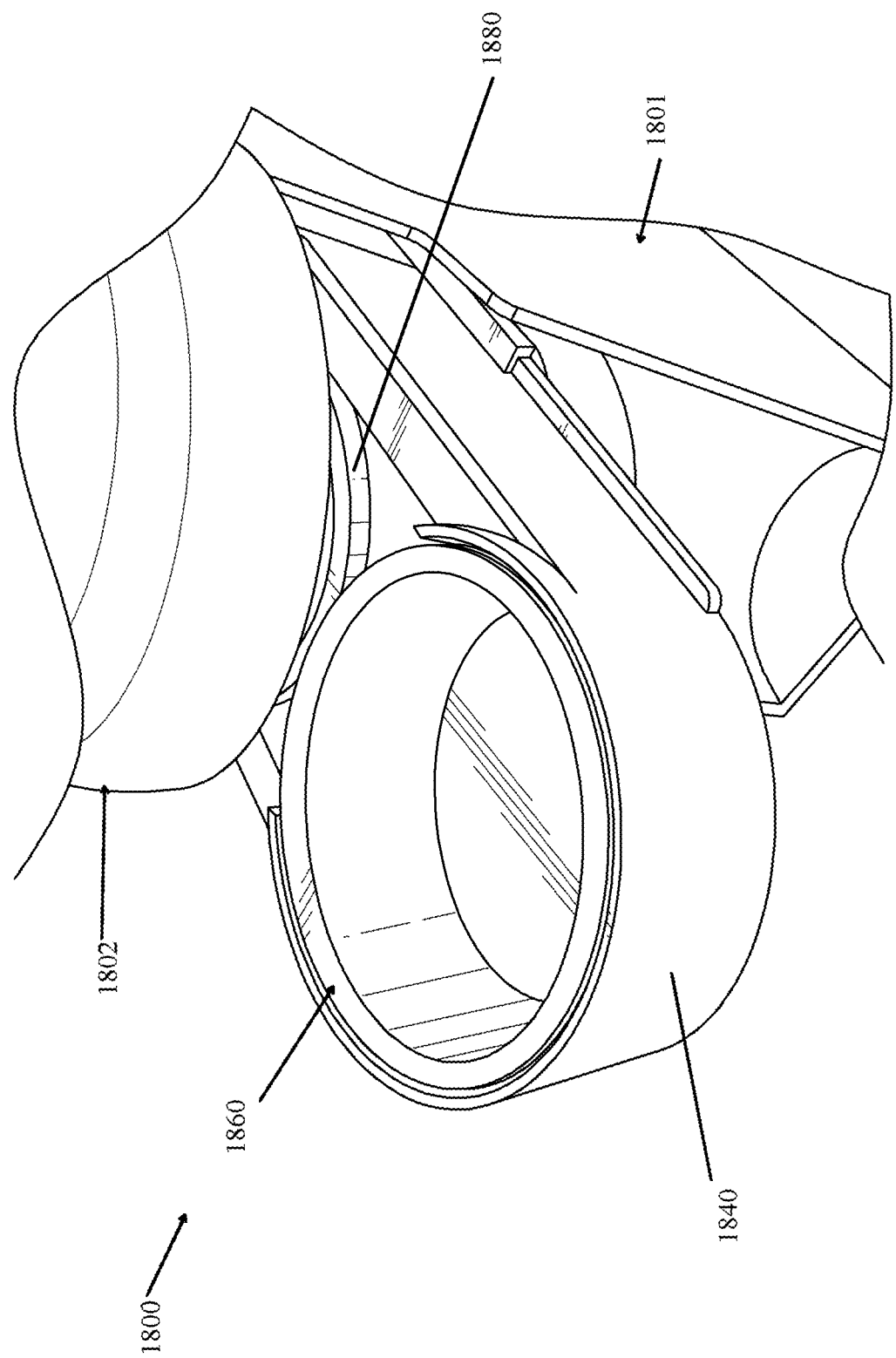
FIG. 18B illustrates a top down perspective view of a portion of the brewer machine of FIG. 18A.

FIG. 18B illustrates a top down perspective view of a portion of the brewer machine 1800 in the first configuration. A first beverage pod receptacle 1860 is presented to a user by the drawer 1840 in the first configuration. As shown in FIG. 18B, a second beverage pod receptacle 1880 may be seated within the drawer 1840 behind the first beverage pod receptacle 1860.

Figure 18C:
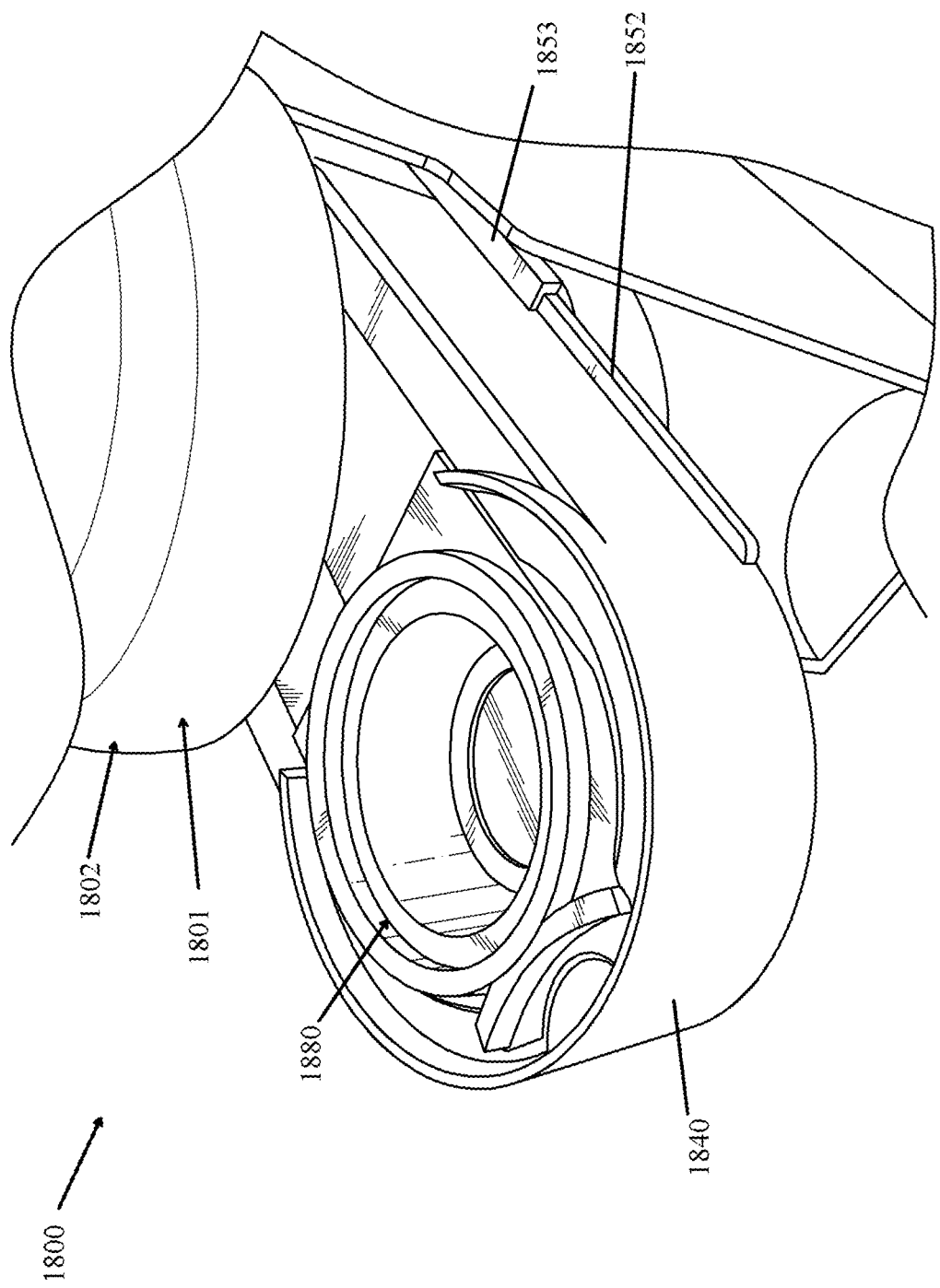
FIG. 18C illustrates a top down perspective view of a portion of the brewer machine of FIG. 18A in a second configuration

FIG. 18C illustrates a top down perspective view of a portion of the brewer machine 1800 in a second configuration. As shown in FIG. 18C, the second beverage pod receptacle 1880 is presented to a user by the drawer 1840 in the second configuration.

Figure 18D:
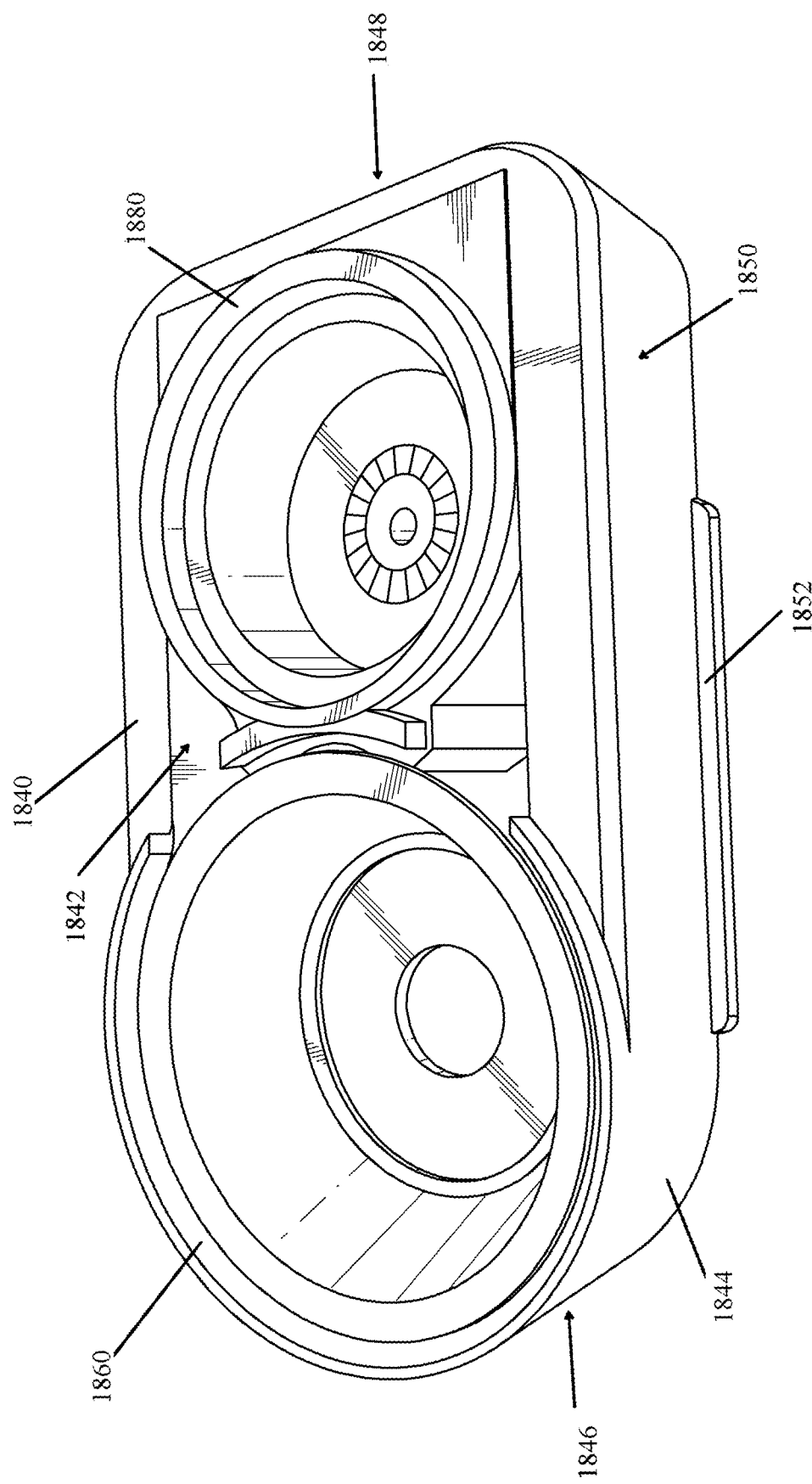
FIG. 18D illustrates a top down perspective view of some components of the brewer machine of FIG. 18A.

FIG. 18D illustrates a top down perspective view of the first beverage pod receptacle 1860 and the second beverage pod receptacle 1880 seated within a recess 1842 of the drawer 1840. The recess 1842 may be bordered by sidewall portions 1844 and a bottom portion. The drawer 1840 can have a front end portion 1846, an opposing rear end portion 1848 and side portions 1850 extending between the front end portion 1846 and the opposing rear end portion 1848. As shown in FIG. 18D, in one configuration (e.g., the first configuration of FIGS. 18A and 18B), the first beverage pod receptacle 1860 may be seated in front of the second beverage pod receptacle 1880.

In some embodiments, the first beverage pod receptacle 1860 may be initially seated in a front portion in the drawer 1840 such that the first beverage pod receptacle 1860 is positioned externally of the housing 1801 when at least a portion of the drawer 1840 is extended through the first opening 1814 and positioned externally of the housing 1801. In some embodiments, the first beverage pod receptacle 1860 may be configured to receive a beverage pod having a size larger than that of the second beverage pod receptacle 1880. The positioning of the first beverage pod receptacle 1860 and the second beverage pod receptacle 1880 within the drawer 1840 may be swapped depending on which beverage pod receptacle a user desires to access. Some embodiments include a sliding portion, such as a tray that is received in and/or slides relative to the drawer 1840.

In some embodiments, swapping the positions of the first beverage pod receptacle 1860 and the second beverage pod receptacle 1880 within the drawer 1880 can be effected manually. For example, in a first configuration, a user may be presented with a first beverage pod receptacle 1860. The first beverage pod receptacle 1860 may be seated in the front portion of the drawer 1840, and the second beverage pod receptacle 1880 can be seated behind the first beverage pod receptacle 1860. When a user wishes to access the second beverage pod receptacle 1880 instead, the user may remove the first beverage pod receptacle 1860 from the drawer 1840. The user may subsequently pull the second beverage pod receptacle 1880 forward. For example, the second beverage pod receptacle 1780 can be slid along tracks in the drawer 1840. In some embodiments, a user can remove the second beverage pod receptacle 1880. The user may re-insert the first beverage pod receptacle 1860 into the drawer and push the first beverage pod receptacle 1860 to the back of drawer. The user may place the second beverage pod receptacle 1880 back into the drawer 1840 by placing the second beverage pod receptacle 1880 in the front portion of the drawer 1840.

If the second beverage pod receptacle 1880 is presented to the user, the user may remove the second beverage pod receptacle 1880 and perform a similar process to swap the positioning of the beverage pod receptacles such that the second beverage pod receptacle 1880 is positioned in the rear portion of the drawer 1840 and the first beverage pod receptacle 1860 is positioned in the front portion of the drawer 1840.

In some embodiments, swapping of the first beverage pod receptacle 1860 and the second beverage pod receptacle 1880 within the drawer 1840 can be effected by one or more motorized components. For example, the brewer machine 1800 may receive an input from a user (e.g., via a user interface in communication with a processor) requesting access to the first beverage pod receptacle 1860 or the second beverage pod receptacle 1880, and the brewer machine 1800 may initiate one or more commands to one or more motorized components to swap the positions of the first beverage pod receptacle 1860 and the second beverage pod receptacle 1880 if the initial configuration would not present the user with the desired beverage pod receptacle. In some embodiments, rotation of the first beverage pod receptacle 1860 and the second beverage pod receptacle 1880 within the drawer 1840 can be effected through a combination of manual operation and motorized components.

As shown in FIG. 18D, the drawer 1840 may comprise an engaging protrusion 1852 extending laterally from a bottom edge of a side portion of the sidewall portions 1844. The engaging protrusion 1852 may extend along at least a portion of an exterior bottom edge of a side portion 1850 of the sidewall portions 1844. In some embodiments, the engaging protrusions 1852 may be shaped and/or dimensioned to be inserted into corresponding grooves 1853 of the brewer machine 1800, such as is shown in FIG. 18C. This can facilitate guiding movement of the drawer 1840 (e.g., through the first opening 1814 and/or linearly outward).

FIGS. 19-21 illustrate an example of a portion of a brewer machine 1900. The brewer machine portion 1900 can comprise a drawer that can be linearly moved to present a user with one of two beverage pod receptacles received within the drawer.

Figure 19A:
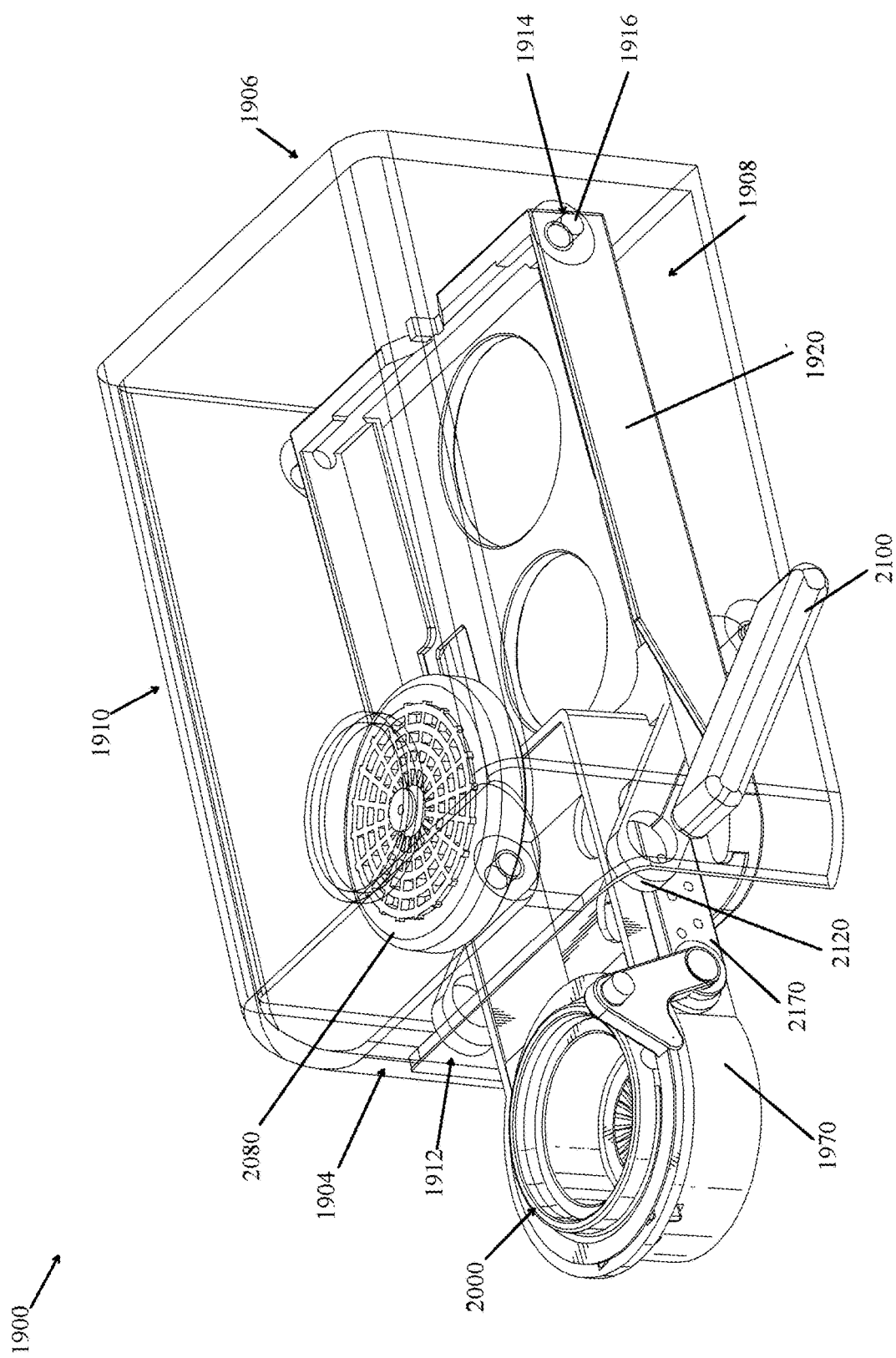
FIGS. 19A and 19B illustrate side perspective views of a brewer machine portion.

FIG. 19A illustrates a side perspective view of the brewer machine portion 1900 in a first configuration. The brewer machine portion 1900 can include a shell portion 1902. In some embodiments, the shell portion 1902 may be a part of a housing of the brewer machine portion 1900. For purposes of presentation, the shell portion 1902 is illustrated as being transparent. The shell portion 1902 may include a front portion 1904, an opposing rear portion 1906, and a right side portion 1908 and a left side portion 1910 extending between the front portion 1904 and the opposing rear portion 1906. In some embodiments, the front portion 1904 may be configured to face a user.

The brewer machine portion 1900 can include a tray 1920 and a drawer 1970. The drawer 1970 may be seated on the tray 1920. For example, as shown in FIG. 19A, the shell portion 1902 may comprise an opening 1914 on the right side portion 1908, and a fastener 1916 may be inserted through the opening 1914 to couple the tray 1920 to the shell portion 1902 (e.g., by inserting the fastener 1916 also through a corresponding opening on the tray 1920).

Figure 20A:
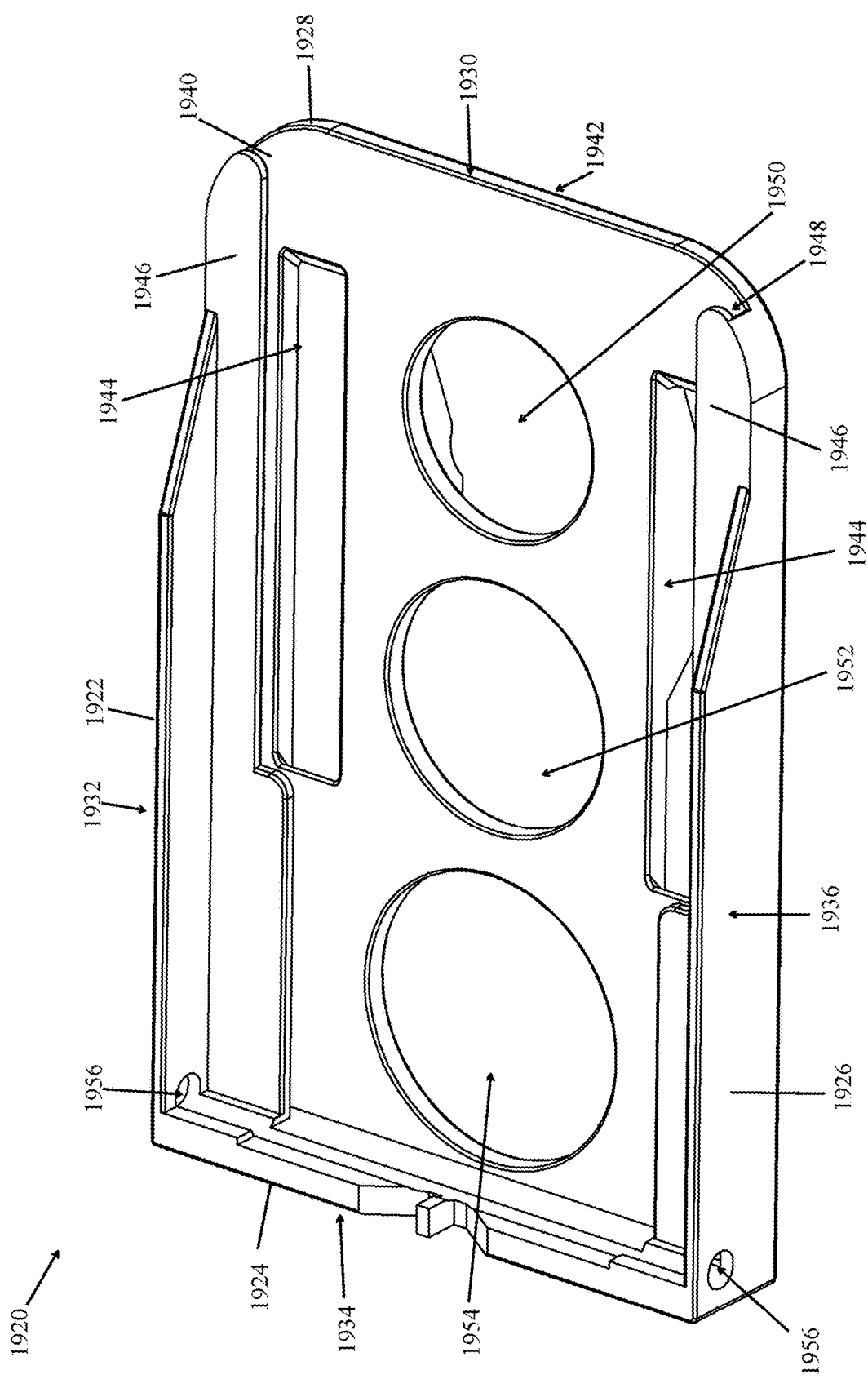
Figure 20B:
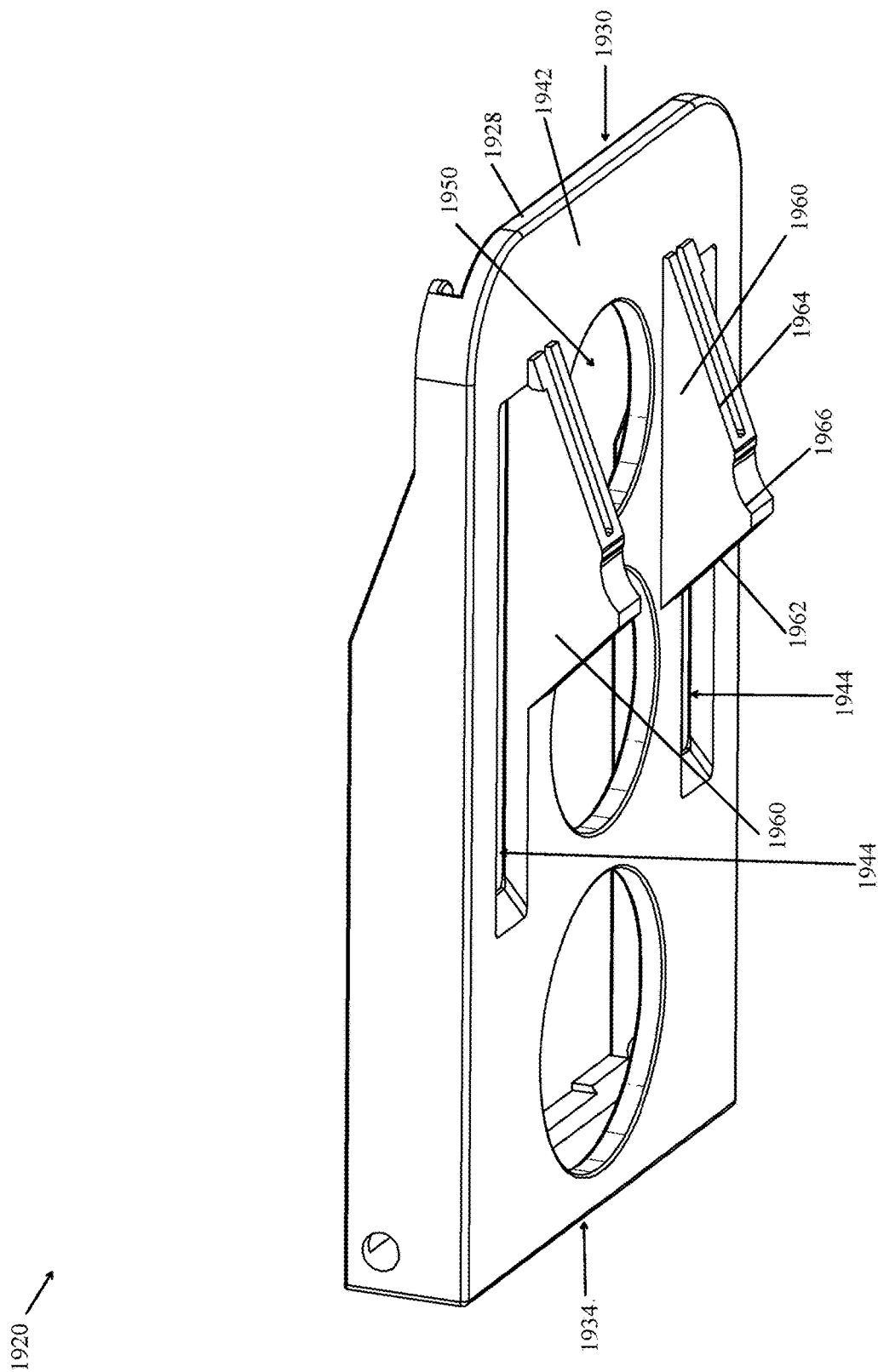
Figure 20C:
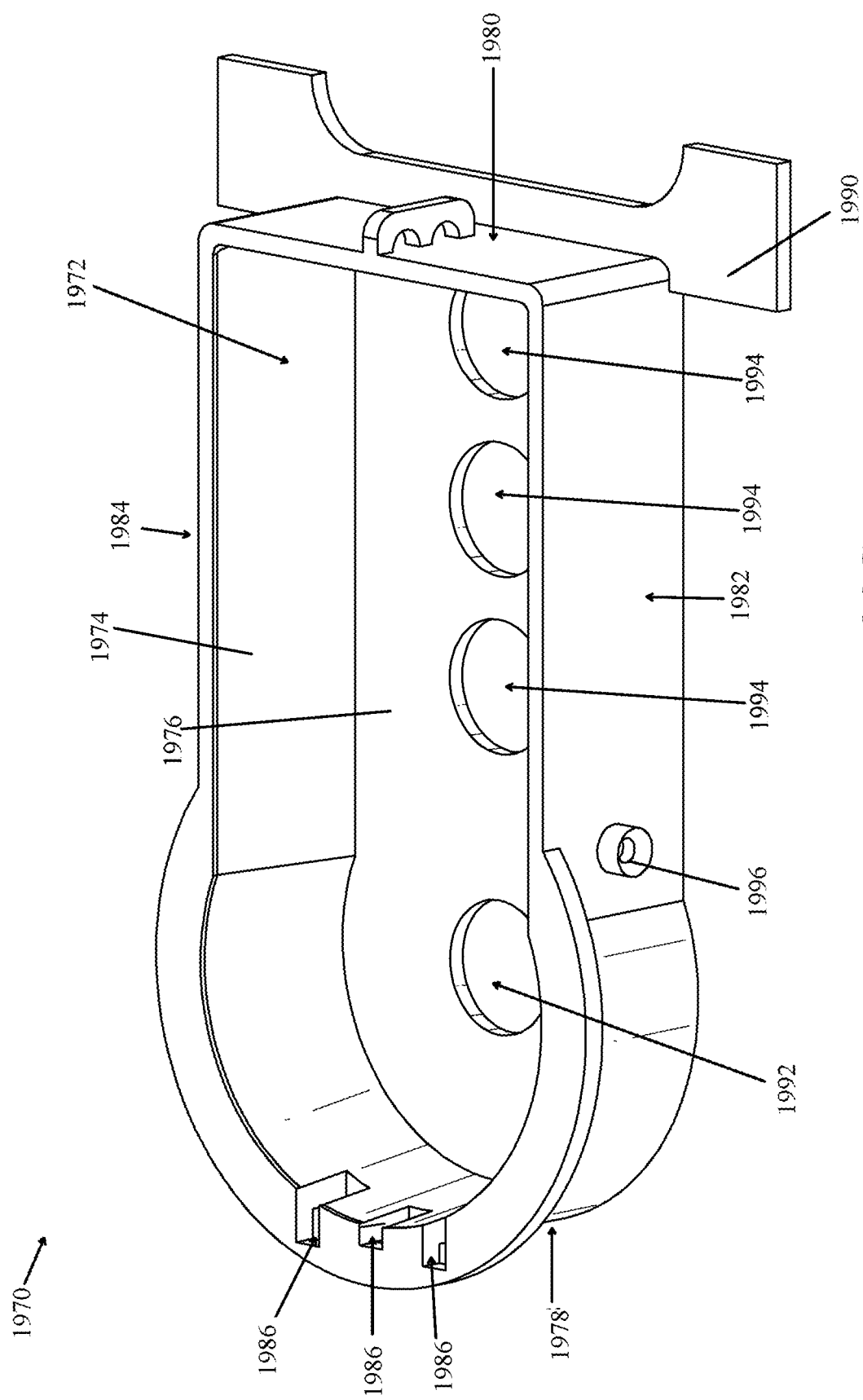
Figure 20F:
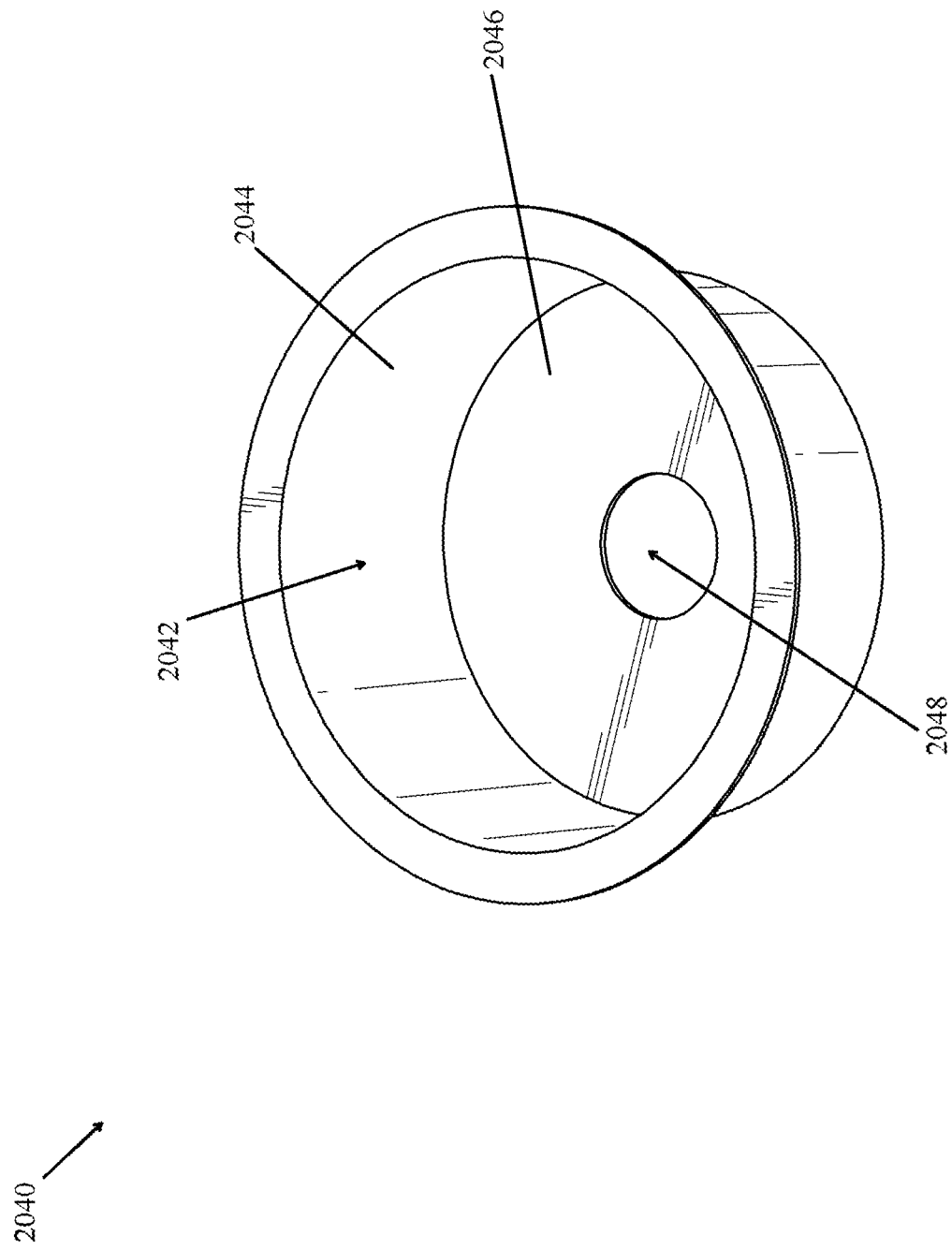
Figure 20G:
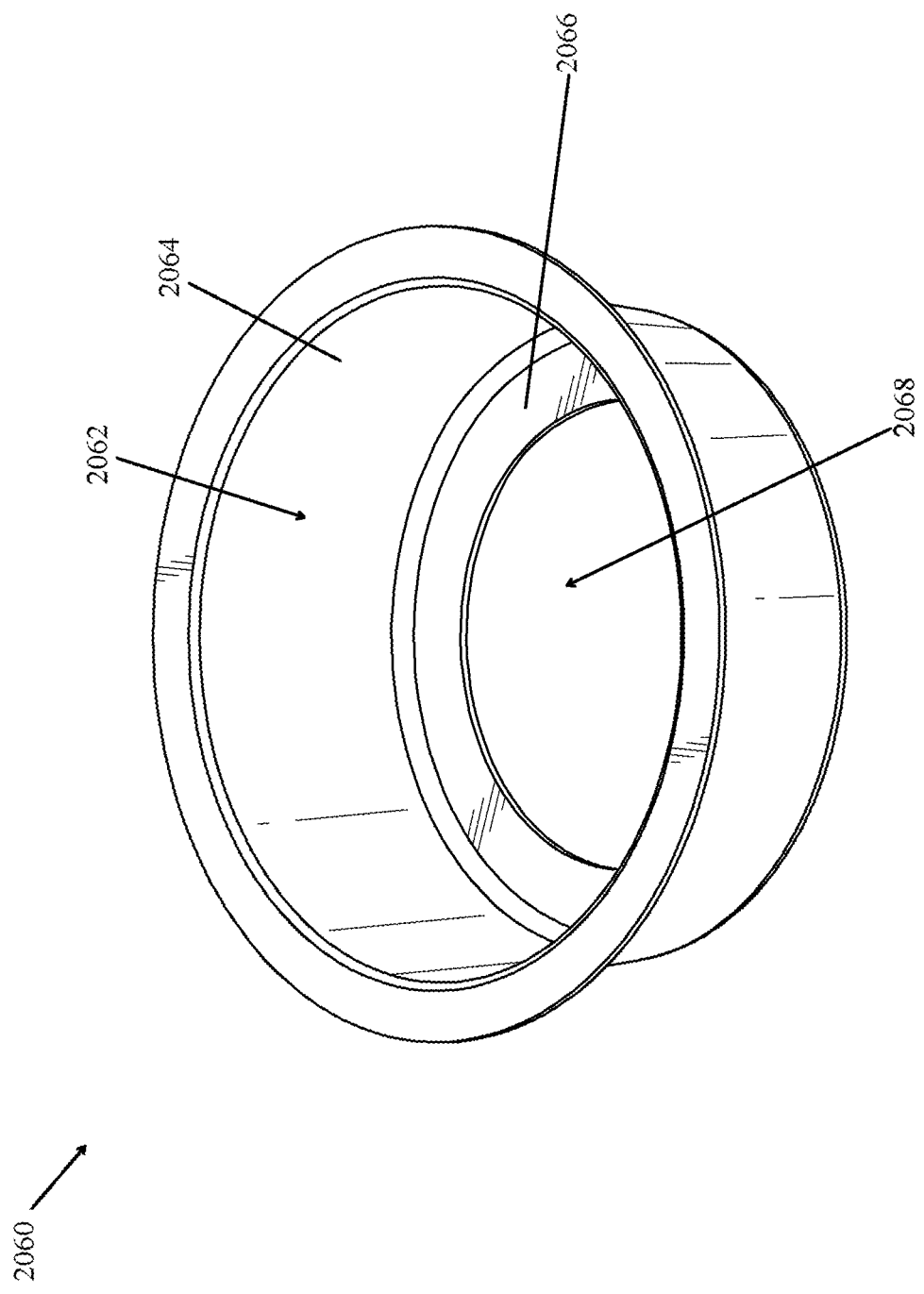

The drawer 1970 may be configured to receive a first beverage pod receptacle 2000 and a second beverage pod receptacle 2060 (e.g., as shown in FIG. 20G). For example, the first beverage pod receptacle 2000 may be configured to receive a first type of beverage pod (e.g., an espresso beverage pod) and the second beverage pod receptacle 2060 may be configured to receive a second type of beverage pod (e.g., a coffee beverage pod). In some embodiments, the first beverage pod receptacle 2000 and the second beverage pod receptacle 2060 may be configured to receive a beverage pod other than an espresso beverage pod and a coffee beverage pod, respectively. For example, the second beverage pod receptacle 2060 may be configured to receive a beverage pod for producing tea, juice, cider, hot chocolate, or other drinks. The second beverage pod receptacle 2060 may be positioned behind the first beverage pod receptacle 2000 in the drawer 1970 in a first configuration, as shown in FIG. 19A. The first beverage pod receptacle 2000 and the second beverage pod receptacle 2060 may be configured to engage with a showerhead 2080. For example, a liquid-tight seal may be formed between the first beverage pod receptacle 2000 or the second beverage pod receptacle 2060, and the showerhead 2080.

The front portion 1904 of the shell portion 1902 may comprise an opening 1912 configured to allow the first beverage pod receptacle 2000 or the second beverage pod receptacle 2060 to be presented to a user. FIG. 19A illustrates a configuration in which a portion of the drawer 1970 may extend through the opening 1912 to position a portion of the drawer 1970 externally of a housing of the brewer machine portion 1900. This can position the first beverage pod receptacle 2000 externally or substantially externally of the housing of the brewer machine portion 1900, and thus present a user with the first beverage pod receptacle 2000. This can enable a user to access the externally positioned first beverage pod receptacle 2000 to insert a beverage pod or to remove a used beverage pod.

Figure 19B:
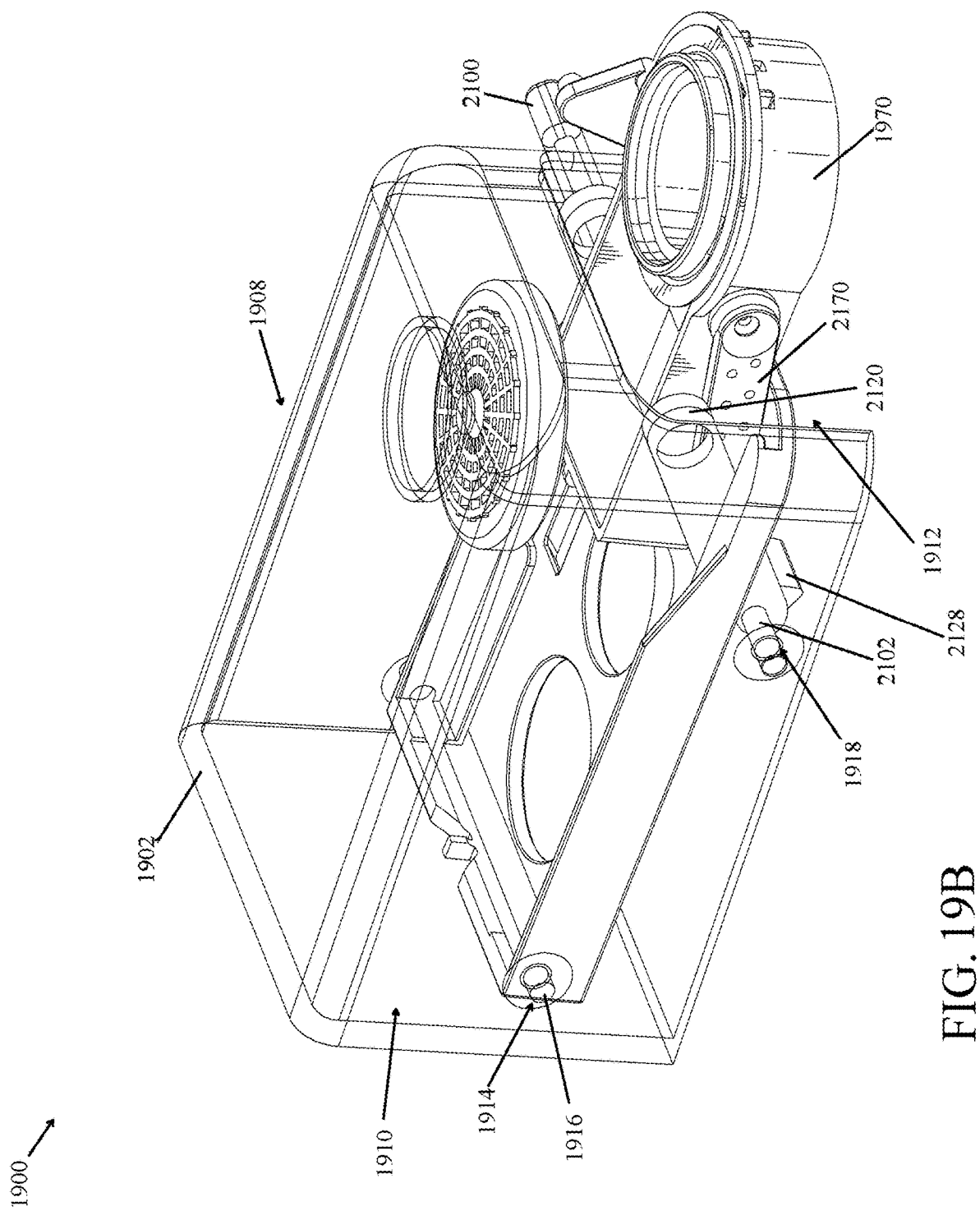

As shown in FIGS. 19A and 19B, some embodiments have a lever 2100, a rotator 2120, and/or a connector component 2170 (e.g., an arm) coupled to a right side of the drawer 1970. Certain variants have a second connector component 2170 coupled to a left side of the drawer 1970. The left side portion 1910 of the shell portion 1902 may comprise an opening 1914 to couple the tray 1920 to the shell portion 1902 (e.g., by inserting the fastener 1916 also through a corresponding opening on the tray 1920). For example, both the right side portion 1908 and the left side portion 1910 may comprise openings 1914 in which corresponding fasteners 1916 may be inserted to facilitate securing of the tray 1920 to the shell portion 1902.

The shell portion 1902 may comprise an opening 1918 on the left side portion 1910 configured to receive a connector shaft 2102. The connector shaft 2102 may be configured to couple the rotator 2120 to the lever 2100 to effect movement of the drawer 1970, as will be described in further detail below.

In some embodiments, in a second configuration, the brewer machine portion 1900 may be configured to present the second beverage pod receptacle 2060 to a user. For example, the second beverage pod receptacle 2060 may be seated in a front portion of the drawer 1970 such that the second beverage pod receptacle 2060 is positioned externally from the brewer machine portion 1900 when a portion of the drawer 1970 is extended through the opening 1912 to position the front portion of the drawer 1970 externally of the brewer machine portion 1900.

In some embodiments, positioning of the first beverage pod receptacle 2000 and the second beverage pod receptacle 2060 within the drawer 1970 may be swapped depending on which beverage pod receptacle a user desires to access. For example, while the first beverage pod receptacle 2000 is seated in the front portion of the drawer 1970 (e.g., such that the first beverage pod receptacle 2000 is positioned externally of the housing of the brewer machine portion 1900 when the drawer 1970 is extended through the opening 1912 of the shell portion 1902), the second beverage pod receptacle 2060 may be seated in the rear portion of the drawer 1970, and vice versa. The second beverage pod receptacle 2060 or the first pod receptacle 2000 may be positioned within or substantially within the shell portion 1902 while the first beverage pod receptacle 2000 or the second beverage pod receptacle 2060 is presented to a user, respectively. In some embodiments, a portion of the second beverage pod receptacle 2060 or the first pod receptacle 2000 may be positioned externally from the shell portion 1902, and a remaining portion of second beverage pod receptacle 2060 or the first pod receptacle 2000 may be positioned within the shell portion 1902, while the first beverage pod receptacle 2000 or the second beverage pod receptacle 2060 is presented to a user, respectively. Placement of the first beverage pod receptacle 2000 or the second beverage pod receptacle 2060 within the drawer 1970 can be effected by a user and/or one or more motorized mechanisms.

In some embodiments, placement of the first beverage pod receptacle 2000 or the second beverage pod receptacle 2060 within the drawer 1970 can be effected manually. For example, a user may effect swapping of the positions of the first beverage pod receptacle 2000 and the second beverage pod receptacle 2060 within the drawer 1970.

In some embodiments, the brewer machine may receive a user input requesting access to a beverage pod receptacle within the brewer machine, such as via a user interface (e.g., a screen or button). In response, the brewer machine may be configured to present the user with one of the two beverage pod receptacles received within the drawer 1970. For example, the brewer machine may move the drawer 1970 such that a portion of the drawer 1970 is external of the shell portion 1902 and one of the two beverage pod receptacles received within the drawer 1970 is presented. The user may swap the positions of the two beverage pod receptacles in the beverage pod receptacle that is not in the desired receptacle. In some embodiments, a user may move the drawer 1970 such that a portion of the drawer 1970 is external of the shell portion 1902 and one of the two beverage pod receptacles received within the drawer 1970 is presented.

For example, as shown in FIGS. 19A and 19B, the first beverage pod receptacle 2000 may be seated in a front portion of the drawer 1970 and the second beverage pod receptacle 2060 may be seated in a rear portion of the drawer 1970, such that the first beverage pod receptacle 2000 is presented to the user as the drawer 1970 is extended through the opening 1912 of the shell portion 1902. As described in more detail below, in some embodiments, the second beverage pod receptacle 2060 can slide into the first beverage pod receptacle 2000. Some variants include a pod holder, such as an insertable adaptor, that can be positioned in the drawer 1970 (e.g., in the first beverage pod receptacle 2000) and/or can be stored externally (e.g., outside the brewer machine). Certain implementations have two pod receptacles in the drawer 1970 that can be swapped by the user.

As described above, the positions of the beverage pod receptacles 2000, 2060 within the drawer 1970 can be swapped, such as manually by a user or via a motorized system. In certain implementations, the second beverage pod receptacle 2060 can be received in the first beverage pod receptacle 2000, such as being slid into the first beverage pod receptacle 2000. In certain embodiments, the beverage pod receptacles 2000, 2060 operate similarly to the beverage pod receptacles 1760, 1780 described above. In some embodiments, to access the second beverage pod receptacle 2060 when the first beverage pod receptacle 2000 is presented, the user may remove the first beverage pod receptacle 2000 from the drawer 1970 and/or move the second beverage pod receptacle 2060 forward (e.g., by pulling the second beverage pod receptacle 2060). In some embodiments, the user may remove the second beverage pod receptacle 2060 from the drawer 1970 and place the first beverage pod receptacle 2000 within the drawer 1970 and subsequently push, for example by sliding, the first beverage pod receptacle 2000 to the rear portion of the drawer 1970. The second beverage pod receptacle 2060 may then be repositioned within the drawer 1970 and placed in the front portion of the drawer 1970. The user may then place a beverage pod in the second beverage pod receptacle 2060 to prepare the desired beverage.

If the second beverage pod receptacle 2060 is initially presented to the user and the user desires to access the first beverage pod receptacle 2000, the user may remove the second beverage pod receptacle 2060 and perform a similar process to swap the beverage pod receptacles, such that the second beverage pod receptacle 2060 is positioned in the rear portion of the drawer 1970 and the first beverage pod receptacle 2000 is positioned in the front portion of the drawer 1970. For example, the user may remove one or both of the first beverage pod receptacle 2000 and the second beverage pod receptacle 2060, and place the second beverage pod receptacle 2060 to the rear portion of the drawer 1970. For example, the user may place the second beverage pod receptacle 2060 into the drawer 1970 and slide the second beverage pod receptacle 2060 to the rear portion of the drawer 1970. The first beverage pod receptacle 2000 may be placed in the front portion of the drawer 1970.

In some embodiments, swapping placement of the first beverage pod receptacle 2000 and the second beverage pod receptacle 2060 within the drawer 1970 can be effected by one or more motorized components. For example, the brewer machine may receive an input from a user requesting access to the first beverage pod receptacle 2000 or the second beverage pod receptacle 2060, such as via a user interface. In response, the brewer machine may initiate one or more commands to one or more motorized components to swap the position of the first beverage pod receptacle 2000 and the second beverage pod receptacle 2060. In some embodiments, swapping placement of the first beverage pod receptacle 2000 and the second beverage pod receptacle 2060 within the drawer 1970 can be effected through a combination of manual operation and motorized components.

In some embodiments, the first beverage pod receptacle 2000 or the second beverage pod receptacle 2060 may be stored externally of the drawer 1970 when the first beverage pod receptacle 2000 or the second beverage pod receptacle 2060 is not in use, respectively. In some embodiments, the first beverage pod receptacle 2000 or the second beverage pod receptacle 2060 may be stored externally from the housing of the brewer machine portion 1900 when the first beverage pod receptacle 2000 or the second beverage pod receptacle 2060 is not in use, respectively. For example, the first beverage pod receptacle 2000 may be stored externally from the drawer 1970 when it is not in use and when the second beverage pod receptacle 2060 is being used. In some embodiments, the second beverage pod receptacle 2060 may be removed from the front portion of the drawer 1970 and the first beverage pod receptacle 2000 may be placed within the drawer 1970 such that the first beverage pod receptacle 2000 can be used instead. In some embodiments, the first beverage pod receptacle 2000 may be placed within the drawer 1970 and slid into position in the front portion of the drawer 1970, replacing the second beverage pod receptacle 2060 in the front portion of the drawer 1970. One or more of these operations may be effected manually by a user and/or by motorized components. As mentioned above, some embodiments can include a pod holder, such as an adaptor. The adaptor can be configured to convert the first beverage pod receptacle 2000 and/or the second beverage pod receptacle 2060 to a different size or shape, such as a size and shape to receive a different beverage pod type. In some embodiments, the adaptor is configured to be removed and/or stored externally, such as being stored outside of the brewer machine.

FIG. 20A illustrates a top down perspective view of the tray 1920. The tray 1920 may have a front end 1930, an opposing rear end 1934, a right side 1932 and a left side 1936. The tray 1920 may have a bottom portion 1928, a right sidewall portion 1922, a rear sidewall portion 1924, and a left sidewall portion 1926.

As shown in FIG. 20A, the tray bottom portion 1928 can have an upper surface 1940 and opposing lower surface 1942. As described herein, the drawer 1970 may be seated on the tray 1920. In some embodiments, the drawer 1970 can be seated on the upper surface 1940 of the tray bottom portion 1928.

FIG. 20A illustrates that each of the tray right sidewall portion 1922 and the left sidewall portion 1926 may comprise drawer engaging protrusions 1946 extending laterally into an interior of the tray 1920. In some embodiments, the drawer engaging protrusions 1946 may extend along an entire or substantially entire length of each of the right sidewall portion 1922 and the left sidewall portion 1926. As shown in FIG. 20A, the drawer engaging protrusions 1946 may be positioned at a distance above the upper surface 1940 of the tray bottom portion 1928 to provide grooves 1948 between the tray bottom portion 1928 and the drawer engaging protrusions 1946. In some embodiments, the drawer engaging protrusions 1946 can be positioned at a distance from the upper surface 1940 of the tray bottom portion 1928 such that one or more corresponding tray engaging protrusions on the drawer 1970 may be placed within the grooves 1948.

As will be described in further detail herein, the drawer 1970 may be configured to move (e.g., slide) relative to the tray 1920. In some embodiments, the drawer 1970 can be configured to move back and forth relative to the tray 1920. For example, the drawer 1970 may move back and forth in a linear fashion relative to the tray 1920. One or more tray engaging protrusions on the drawer 1970 may be inserted into the grooves 1948 such that the one or more tray engaging protrusions on the drawer 1970 may slide back and forth within the grooves 1948.

As shown in FIG. 20A, a rear portion of the drawer engaging protrusions 1946 may have a width larger than that of a front portion of the drawer engaging protrusions 1946, for example to facilitate stabilization of the drawer 1970 on the tray 1920 when the one or more corresponding tray engaging drawer 1970 are placed within the grooves 1948.

The tray bottom portion 1928 may comprise a pair of openings 1944, such as rectangular or substantially rectangular openings. The openings 1944 may be shaped and/or dimensioned to permit extension therethrough of one or more components configured to effect movement of the drawer 1970. For example, the openings 1944 may be configured to permit extension therethrough of the connector components 2170 and/or the rotator 2120. In some embodiments, each of the openings 1944 may extend along a portion of the length of the tray bottom portion 1928, and may be positioned proximate to each of the right sidewall portion 1922 and the left sidewall portion 1926, respectively, to permit extension therethrough of a connector component 2170 and/or a portion of the rotator 2120.

Referring again to FIG. 20A, the tray bottom portion 1928 may include a first opening 1950, a second opening 1952, and/or a third opening 1954, such as along a center portion. For illustrative purposes, FIG. 20A illustrates each of the first opening 1950, the second opening 1952, and the third opening 1954 having a circular or substantially circular shape. Other shapes may also be suitable. In some embodiments, the first opening 1950 may be configured to align with an opening of a beverage pod receptacle (e.g., a first beverage pod receptacle 2000 or a second beverage pod receptacle 2060), and a corresponding opening of the drawer 1970, such that beverage generated by a pod placed within the beverage pod receptacle may pass through the openings of the beverage pod receptacle and drawer 1970, and then the first opening 1950 in the tray 1920 to be delivered to a beverage receptacle. For example, a beverage receptacle, such as a cup, may be placed underneath and aligned with the first opening 1950 such that the beverage can be delivered into the cup from the brewer machine through the first opening 1950. In some embodiments, the second opening 1952 and the third opening 1954 may be included to reduce a weight and/or material used to form the tray 1920. For example, the second opening 1952 and the third opening 1954 may be formed in the tray 1920 such that a tray having desired structural strength can be provided while also providing a tray with a desired weight.

As shown in FIG. 20A, each of the right sidewall portion 1922 and the rear sidewall portion 1924 may have an opening 1956 proximate to a rear end portion 1934 of the tray 1920. The openings 1956 may be configured to permit securing of the tray 1920 to the shell portion 1902. For example, a pin and/or other fastener may be inserted within the opening 1956 and a corresponding opening on the shell portion 1902 to secure the tray 1920 to the shell portion 1902.

Referring to FIG. 20B, a bottom side perspective view of the tray 1920 is shown. The tray bottom portion 1928 may have a pair of rotator engaging protrusions 1960 extending from the lower surface 1942. The rotator engaging protrusions 1960 may be positioned on the lower surface 1942 to facilitate desired engagement of the tray 1920 with the rotator 2120. For example, as shown in FIG. 20B, a rotator engaging protrusions 1960 may extend from the lower surface 1942 along at least a portion of the openings 1944 and may be positioned between the openings 1944 and the first opening 1950. As discussed in further detail below (e.g., in connection with FIG. 21E), the protrusions 1960 can be configured to facilitate movement of the drawer 1970 relative to the tray 1920.

In some embodiments, each of the rotator engaging protrusions 1960 may have a generally triangular or substantially triangular shape. For example, a rotator engaging protrusion 1960 may have a first edge 1962 and a second edge 1964, the first edge 1962 facing a rear end 1934 of the tray 1920 and the second edge 1964 facing a front end 1930 of the tray 1920. In some embodiments, the first edge 1962 may have a length shorter than that of the second edge 1964.

In some embodiments, the first edge 1962 may be linear or substantially linear. In some embodiments, the second edge 1964 may have a portion comprising a concave arc 1966. The concave arc 1966 may be configured to engage with the rotator 2120, such as a cam 2128 (see FIG. 21A). The concave arc 1966 may be positioned on the second edge 1964 proximate to the point where the first edge 1962 meets the second edge 1964. The relative lengths of the first edge 1962 and the second edge 1964, and/or the shape and/or positioning of the concave arc 1956 on the second edge 1964 may be selected to provide desired engagement of the tray 1920 with the rotator 2120 to facilitate movement of the drawer 1970 relative to the tray 1920.

Referring to FIG. 20C, a top perspective view of the drawer 1970 is shown. The drawer 1970 can have a recess 1972 bordered by a sidewall 1974 and a bottom portion 1976. As previously mentioned, the first beverage pod receptacle 2000 and the second beverage pod receptacle 2060 may be received in the recess 1972. The sidewall 1974 can have a front sidewall portion 1978, a rear sidewall portion 1980, a right sidewall portion 1982, and an opposing left sidewall portion 1984. In some embodiments, the front sidewall portion 1978 may comprise a curvature. For example, the curvature of the front sidewall portion 1978 may be selected to substantially correspond with the curvature of a beverage pod receptacle.

In some embodiments, the front sidewall portion 1978 can include one or more features to engage a beverage pod receptacle. As shown in FIG. 20C, the front sidewall portion 1978 of the drawer 1970 may include a plurality of beverage pod receptacle engaging openings 1986 for receiving corresponding protrusions on a beverage pod receptacle (e.g., a first beverage pod receptacle 2000). Three such beverage pod receptacle engaging openings 1986 are shown in FIG. 20C. More or fewer such openings may be included, and may depend on the number of corresponding protrusions on the beverage pod receptacle. A beverage pod receptacle engaging opening 1986 may have a shape and/or dimension configured to accommodate a corresponding protrusion on a beverage pod receptacle such that the corresponding protrusion may be inserted into and/or through the opening 1986 to prevent or reduce movement (e.g., rotation) of the beverage pod receptacle within the drawer 1970.

The drawer 1970 may comprise a tray engaging protrusion 1990 configured to engage with one or more corresponding grooves on the tray 1920 (e.g., the grooves 1948 of the tray 1920). The tray engaging protrusion 1990 may extend laterally from a bottom edge of the drawer rear sidewall portion 1980, and/or from a bottom edge of at least a portion of the left sidewall portion 1984 and the right sidewall portion 1982. As shown in FIG. 20C, in some embodiments, the tray engaging protrusion 1990 may comprise a portion extending laterally to the right side, left side, and the rear of the drawer 1970. The extent to which the tray engaging protrusion 1990 extends laterally from the drawer 1970 may be selected such that the drawer 1970 is seated at a desired position relative to the tray 1920. For example, the tray engaging protrusion 1990 may extend a length from a right and a left side of the drawer 1970 such that when the tray engaging protrusion 1990 is inserted into corresponding grooves 1948 on the tray 1920, the right sidewall portion 1982 and the left sidewall portion 1984 of the drawer 1970 are equidistant or substantially equidistant from the right sidewall and left sidewall of the tray 1920, respectively.

As shown in FIG. 20C, the tray engaging protrusion 1990 may comprise a portion extending laterally to the rear of the drawer 1970. In some embodiments, the extent to which the tray engaging protrusion 1990 extends laterally to the rear of the drawer 1970 may be determined to provide a tray engaging protrusion 1990 have a desired size to provide secure coupling of the drawer 1970 to the tray 1920.

FIG. 20C illustrates the tray engaging protrusion 1990 as a continuous or substantially continuous protrusion. In some embodiments, the tray engaging protrusion 1990 may comprise a plurality of distinct protrusions. For example, the tray engaging protrusion 1990 may comprise a first protrusion and a second separate protrusion, each extending laterally from the drawer 1970.

In some embodiments, a tray engaging protrusion may be positioned elsewhere on the drawer 1970. For example, a tray engaging protrusion may be positioned along a bottom edge of a right sidewall portion 1982 and/or along a bottom edge of a left sidewall portion 1984. For example, the drawer 1970 may comprise a plurality of distinct tray engaging protrusions positioned along a bottom edge of a right sidewall portion 1982 and/or a left sidewall portion 1984 of the drawer 1970.

The bottom portion 1976 of the drawer 1970 may comprise a plurality of openings. As shown in FIG. 20C, the bottom portion 1976 may comprise a first opening 1992 in a front portion of the drawer 1970, and three openings 1994 extending through the bottom portion 1976 in a rear portion of the drawer 1970. For illustrative purposes, FIG. 20C illustrates each of the first opening 1992, and the three openings 1994 as having a circular or substantially circular shape. Other shapes may also be suitable. The first opening 1992 may be positioned in a front portion of the drawer bottom portion 1976. In some embodiments, the first opening 1992 may be configured to align with an opening of a beverage pod receptacle (e.g., a first beverage pod receptacle 2000 or a second beverage pod receptacle 2060) and an opening of a tray 1920, such that beverage generated by a pod placed within the beverage pod receptacle may pass through the opening of the beverage pod receptacle, the first opening 1992, and a corresponding opening on the tray 1920 to be delivered to a beverage receptacle. In some embodiments, the three openings 1994 may be included to reduce a weight and/or material used to form the drawer 1970. For example, the three openings 1994 may be formed in the drawer 1970 such that a drawer having desired structural strength can be provided while also providing a drawer with a desired weight.

The drawer 1970 may comprise a fastener receiving feature 1996 on each of the right sidewall portion 1982 and the left sidewall portion 1984 configured to facilitate coupling between the drawer 1970 and a connector component 2170.

FIG. 20D illustrates a bottom perspective view of a base portion 2010 of the first beverage pod receptacle 2000. FIG. 20E illustrates a top perspective view of the base portion 2010. The first beverage pod receptacle base portion 2010 may comprise a recess 2012 bordered by a base portion sidewall 2014 and a base portion bottom 2016. As described in further detail herein, a first beverage pod receptacle insert 2040 (e.g., as shown in FIG. 20F) may be positioned in the recess 2012, and a beverage pod may in turn be received in the insert 2040.

The first beverage pod receptacle base portion 2010 may comprise a rim 2020. In some embodiments, the rim 2020 may be configured to couple to a first beverage pod receptacle engaging feature 2084 on the showerhead 2080 to provide a liquid-tight seal between the showerhead 2080 and the first beverage pod receptacle 2000.

In some embodiments, as shown in FIG. 20D, the first beverage pod receptacle base portion 2010 may comprise a plurality of support features 2022. For example, the support features 2022 may be configured to position the recess 2012 at a desired location (e.g., elevate the bottom 2016 of the first beverage pod receptacle base portion 2010 to a desired position) within the brewer machine portion 1900. In some embodiments, the support features 2022 may be configured to reduce or eliminate lateral movement of the first beverage pod receptacle 2000 within the drawer 1970 (e.g., by providing contact with one or more sidewalls of the drawer 1970 such that the first beverage pod receptacle 2000 may be securely positioned within the drawer 1970). In some embodiments, the support features 2022 may be configured to facilitate maintaining a structural form and/or integrity of the base portion 2010 during one or more high pressure processes (e.g., pressure of greater than about 9 bars) used for generating beverages from a beverage pod received within the base portion 2010.

In some embodiments, the support features 2022 may reduce friction between the base portion 2010 and the drawer 1970, for example facilitating sliding movement of the base portion 2010 relative to the drawer 1970. In some embodiments, the support features 2022 may provide reduced surface area contact between the base portion 2010 and the drawer 1970 to facilitate movement of the base portion 2010 within the drawer 1970. As shown in FIG. 20D, in some embodiments, the support features 2022 on a bottom surface may comprise a plurality of linear parallel or substantially linear parallel portions extending from a front end of the base portion 2010 to an opposing rear end of the base portion 2010.

In some embodiments, base portion 2010 may be configured to move (e.g., slide) within the drawer 1970. For example, the base portion 2010 may comprise one or more protrusions extending laterally from a side of the base portion 2010 configured to engage with corresponding features on the drawer 1970 to guide movement of the base portion 2010 within the drawer 1970. In some embodiments, the drawer 1970 may comprise track features to which the protrusions may be slidably engaged for guiding movement of the base portion 2010 within the drawer 1970.

The first beverage pod receptacle base portion 2010 may comprise a plurality of drawer engaging protrusions 2024. The drawer engaging protrusions 2024 may have a shape and/or dimension configured for insertion into corresponding openings on the drawer 1970. As described herein, for example, insertion of the drawer engaging protrusions 2024 into corresponding openings on the drawer 1970 (e.g., openings 1986) may reduce or eliminate undesired movement of the first beverage pod receptacle 2000.

As shown in FIG. 20D, the first beverage pod receptacle base portion 2010 may comprise an opening 2026. The opening 2026 may extend through the bottom 2016 such that fluid may pass from the recess 2012 through the opening 2026. As described in further detail herein, the opening 2026 may be configured to align with a corresponding opening of the insert, the drawer 1970 and/or the tray 1920.

FIG. 20F illustrates a top perspective view of the insert 2040 of the first beverage pod receptacle 2000. In some embodiments, the insert 2040 can be received in and/or placed over the base portion 2010. For example, at least a portion of the insert 2040 may be seated within the recess 2012 of the base portion 2010 such that a beverage pod is received within the recess 2042 of the insert 2040.

The insert 2040 may comprise a recess 2042 bordered by a sidewall 2044 and a bottom 2046. The bottom may comprise an opening 2048. In some embodiments, the opening 2048 can be configured to align with a corresponding opening of the first beverage pod receptacle base portion 2010 (e.g., opening 2026), the drawer 1970 (e.g., opening 1992) and/or the tray 1920 (e.g., opening 1950). In some embodiments, the opening 2048 may be configured to align with a corresponding opening of the base portion 2010, the drawer 1970 and the tray 1920, such that beverage generated by a pod placed within the first beverage pod receptacle 2000 may pass through the opening 2048, and through the openings of the base portion 2010, drawer 1970 and tray 1920 to be delivered to a beverage receptacle. In various embodiments, the insert 2040 may be configured to receive an espresso beverage pod. In some embodiments, the insert 2040 may be configured to receive a pod for a beverage other than espresso.

FIG. 20G illustrates a top perspective view of the second beverage pod receptacle 2060. In some embodiments, the second beverage pod receptacle 2060 may be configured to receive a beverage pod having a size larger than that of the first beverage pod receptacle 2000. The second beverage pod receptacle 2060 may comprise a recess 2062 bordered by a sidewall 2064 and a bottom 2066. The bottom may comprise an opening 2068. In some embodiments, the opening 2068 can be configured to align with a corresponding opening of the drawer 1970 (e.g., opening 1992) and/or the tray 1920 (e.g., opening 1950). In some embodiments, the opening 2068 may be configured to align with a corresponding opening of the drawer 1970 and tray 1920, such that beverage generated by a pod placed within the beverage pod receptacle 2060 may pass through the opening 2068, and through the openings of the drawer 1970 and the tray 1920 to be delivered to a beverage receptacle. In various embodiments, the second beverage pod receptacle 2060 may be configured to receive a coffee beverage pod. In some embodiments, the second beverage pod receptacle 2060 may be configured to receive a pod for a beverage other than coffee.

Figure 20I:
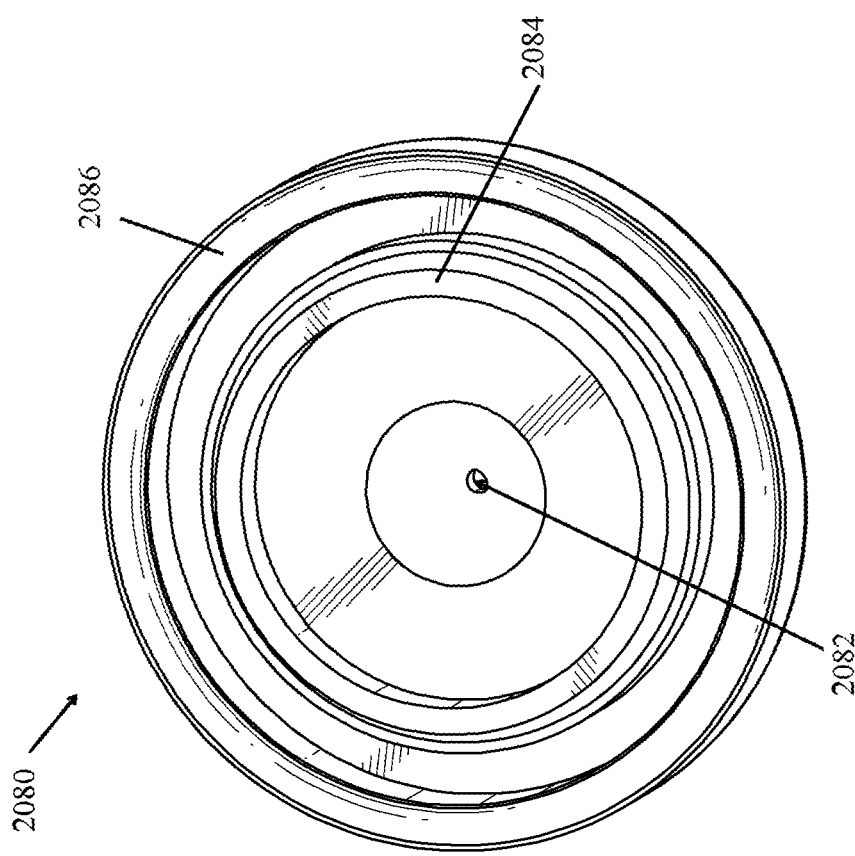
Figure 20H:
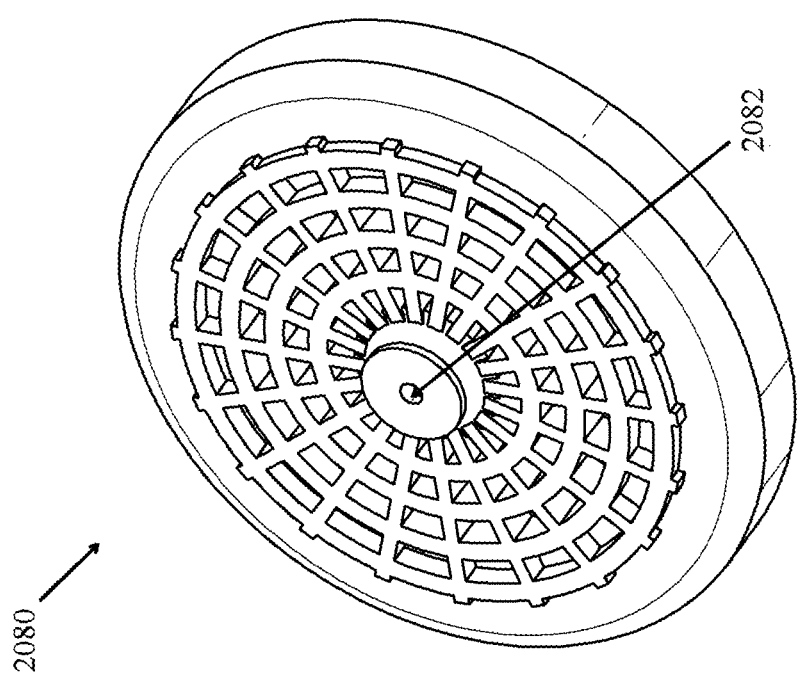

FIG. 20H illustrates a top perspective view of the showerhead 2080. The showerhead 2080 may include an opening 2082 on a center or substantially a center of the showerhead 2080. The showerhead 2080 can be dimensioned such that the showerhead 2080 can be fitted over the first beverage pod receptacle 2000 and the second beverage pod receptacle 2060. For example, the showerhead 2080 may form a seal with the first beverage pod receptacle 2000 or the second beverage pod receptacle 2060. The opening 2082 can be configured to permit delivery of fluid through the showerhead 2080 to the first beverage pod receptacle 2000 or the second beverage pod receptacle 2060, such as to generate a desired beverage.

FIG. 20I illustrates a bottom perspective view of the showerhead 2080. The showerhead 2080 may comprise a first beverage pod receptacle engaging feature 2084 and a second beverage pod receptacle engaging feature 2086. The first beverage pod receptacle engaging feature 2084 and the second beverage pod receptacle engaging feature 2086 may be configured to form a liquid-tight seal with the first beverage pod receptacle 2000 and the second beverage pod receptacle 2060, respectively. In some embodiments, the first beverage pod receptacle engaging feature 2084 and the second beverage pod receptacle engaging feature 2086 may have a shape and/or dimension to provide desired engagement with the corresponding beverage pod receptacle. For example, as shown in FIG. 20I, each of the first beverage pod receptacle engaging feature 2084 and the second beverage pod receptacle engaging feature 2086 may have a circular or substantially circular shape (e.g., to engage with a circular or substantially circular feature on the corresponding beverage pod receptacle). For example, when the first beverage pod receptacle engaging feature 2084 or the second beverage pod receptacle engaging feature 2086 is engaged with the corresponding beverage pod receptacle, liquid delivered through the opening 2082 on the showerhead 2080 to the beverage pod in the beverage pod receptacle to generate the beverage may be desirably sealed within the enclosure formed by the beverage pod receptacle and the showerhead 2080. In some embodiments, as described herein, the first beverage pod receptacle engaging feature 2084 may be configured to couple to a rim 2020 of the first beverage pod receptacle base portion 2010 to provide a liquid-tight seal between the showerhead 2080 and the first beverage pod receptacle 2000.

FIG. 21A illustrates a back side perspective view of the rotator 2120. FIG. 21B illustrates a front side perspective view of the rotator 2120. The rotator 2120 may comprise a first arm 2122 and a second arm 2124, and a connector rod 2126 extending between the first arm 2122 and the second arm 2124. The first arm 2122 and the second arm 2124 may be perpendicular or substantially perpendicular to the connector rod 2126.

Each of the first arm 2122 and the second arm 2124 of the rotator 2120 may comprise an opening 2130 into which a connector (e.g., a shaft) may be inserted for coupling the rotator 2120 to the lever 2100. The connector rod 2126 may comprise a corresponding hole extending through the length of the rod such that the connector may be inserted through the opening 2130 in the first arm 2122, through the connector rod 2126, and then through the opening 2130 in the second arm 2124. For example, force exerted on the lever 2100 to rotate the lever 2100 may be transferred to the connector, which can in turn be transferred to the rotator 2120.

The rotator 2120 may comprise a pair of tray engaging features 2128. The tray engaging features 2128 may be on the connector rod 2126. At least a portion of the tray engaging features 2128 may have an exterior surface comprising a curvature. The curvature may be asymmetrical. In some embodiments, at least a portion of the curved surface may engage with a corresponding curvature on a rotator engaging protrusion 1960 of a tray such that rotation of the rotator 2120 may effect movement of the drawer relative to the tray 1920. In some embodiments, at least a portion of the tray engaging features 2128 comprises a linear portion. Some implementations include openings 2132, 2134 and/or a slit 2136, one or more of which can be attached to the connector component 2170.

Figures 21C, 21D:
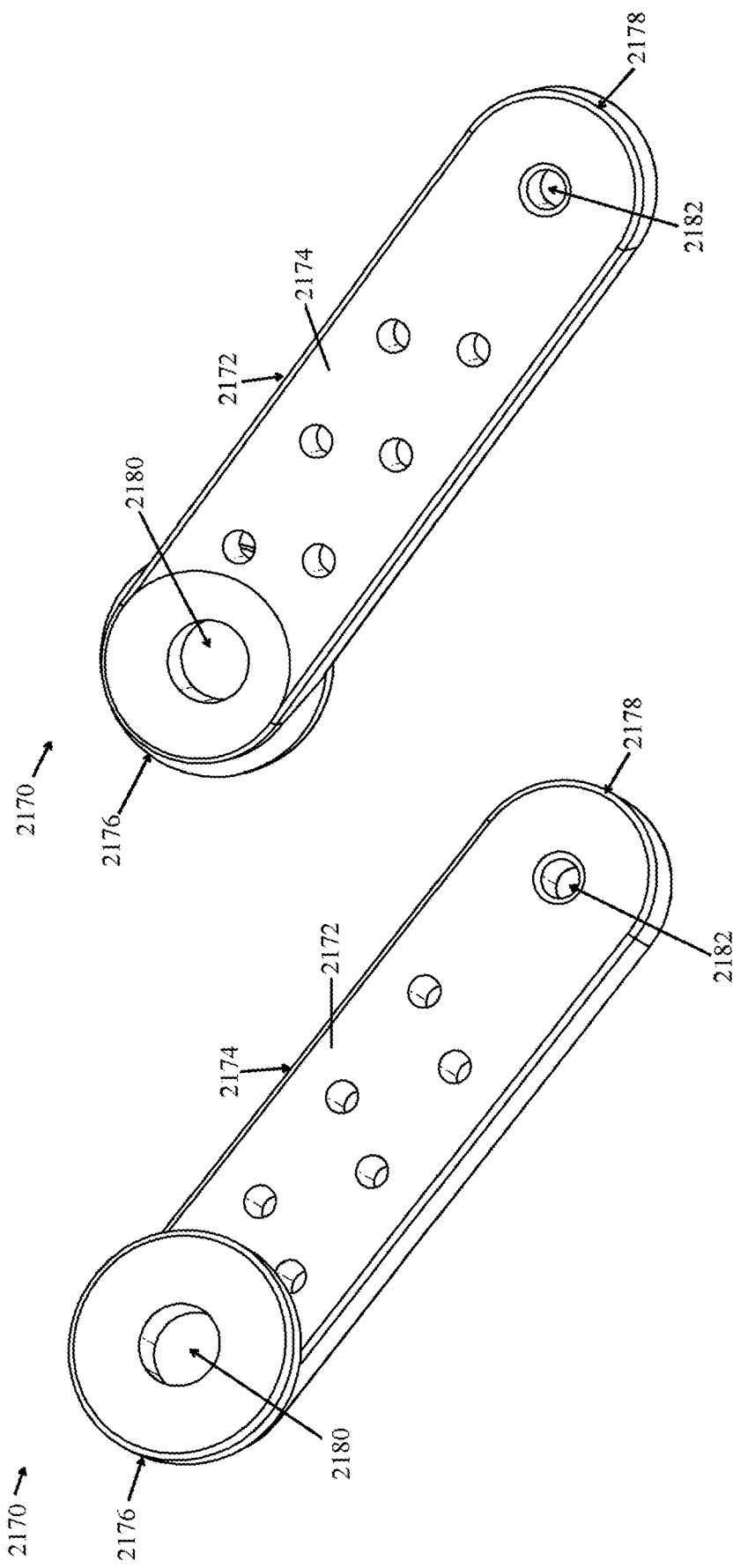

FIG. 21C illustrates a first side perspective view of the connector component 2170. FIG. 21D illustrates a second side perspective view of the connector component 2170. In the first side perspective view, a first surface 2172 of the connector component 2170 is shown. In the second perspective view, a second opposing surface 2174 of the connector component 2170 is shown.

The connector component 2170 may comprise a first end 2176 and a second opposing end 2178. The connector component 2170 may comprise a first opening 2180 proximate to the first end 2172 and a second opening 2182 proximate to the second opposing end 2178. As described herein, the connector component 2170 may be configured to provide linkage between the rotator 2120 and the drawer 1970. In some embodiments, a fastener may be inserted through the first opening 2180 to couple the connector component 2170 to the drawer 1970. In some embodiments, the connector component 2170 is connected with the rotator 2120, such as with a rotatable connection (e.g., a pinned connection).

Figure 21E:
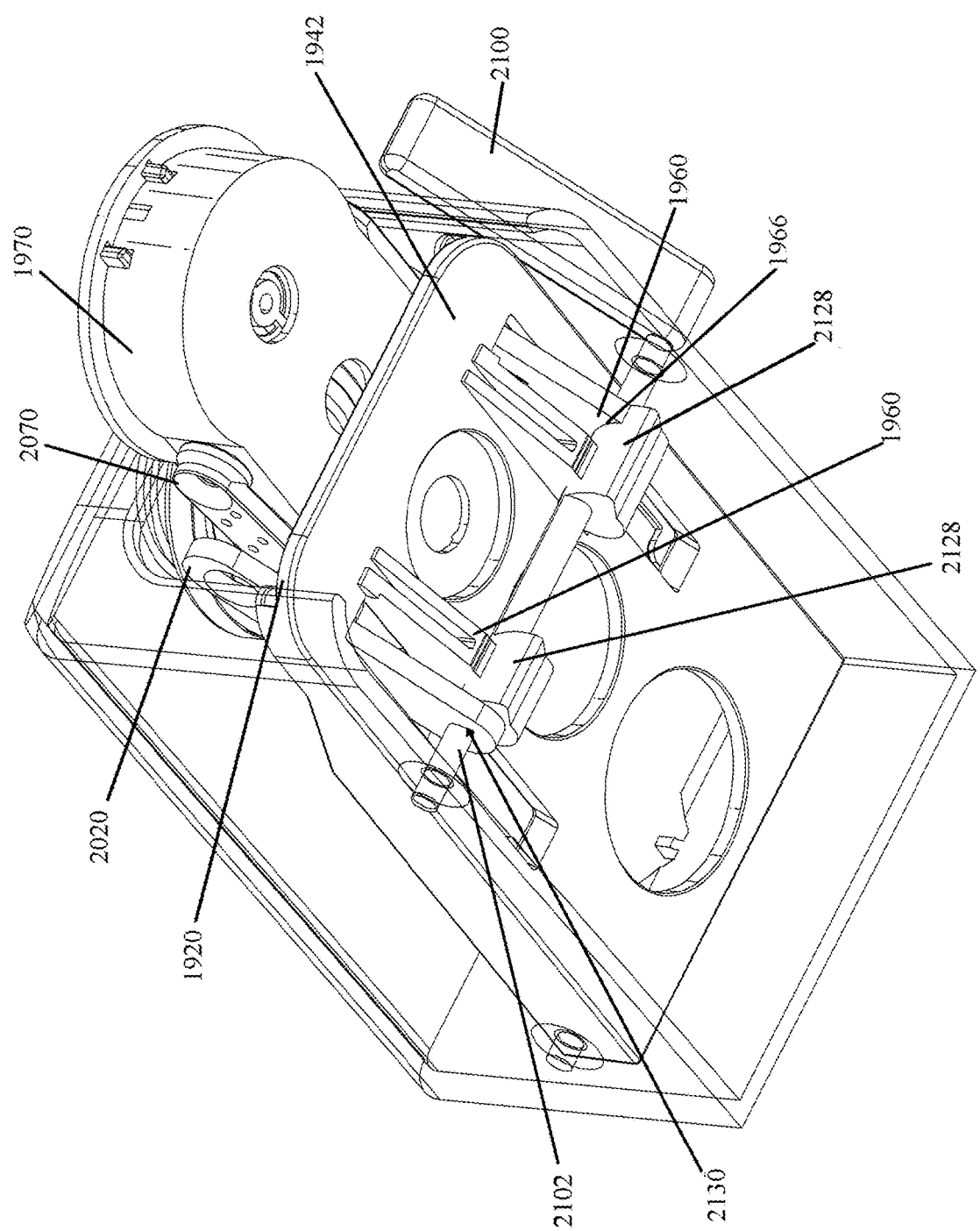

FIG. 21E illustrates a bottom perspective view of the brewer machine portion 1900. A lower surface 1942 of the tray bottom portion 1928 is shown in FIG. 21E. As shown in FIG. 21E, the pair of rotator engaging protrusions 1960 on the lower surface 1942 may be configured to engage with the rotator 2120. In some embodiments, the tray engaging features 2128 on the rotator 2120 may be in contact with a corresponding rotator engaging protrusion 1960 on the tray lower surface 1942. For example, a portion of a curved surface of the tray engaging features 2128 may be in contact with the concave curve portion 1966 of the rotator engaging protrusion 1960.

In some embodiments, the rotational force exerted upon the lever 2100 may be transformed into linear movement of the drawer 1970. For example, the rotational force exerted upon the lever 2100 by a user may be transferred to the rotator 2120 via the connector shaft component 2102 coupled to the lever 2100 and inserted through the opening 2130 of the rotator 2120. For example, the rotational force exerted upon the lever 2100 may rotate the connector shaft component 2102, which in turn may rotate the rotator 2120, thereby rotating the first arm 2122 and the second arm 2124 of the rotator 2120 relative to the tray 1920. The rotator 2120 may be pressed against the tray 1920 through contact between the tray engaging features 2128 on the rotator 2120 and corresponding rotator engaging protrusions 1960 on the tray 1920 such that the rotating first arm 2122 and second arm 2124 of the rotator 2120 may move the connector components 2170 coupled to each of the right side and left side of the drawer 1970, effecting linear movement of the drawer 1970.

Figure 21G:
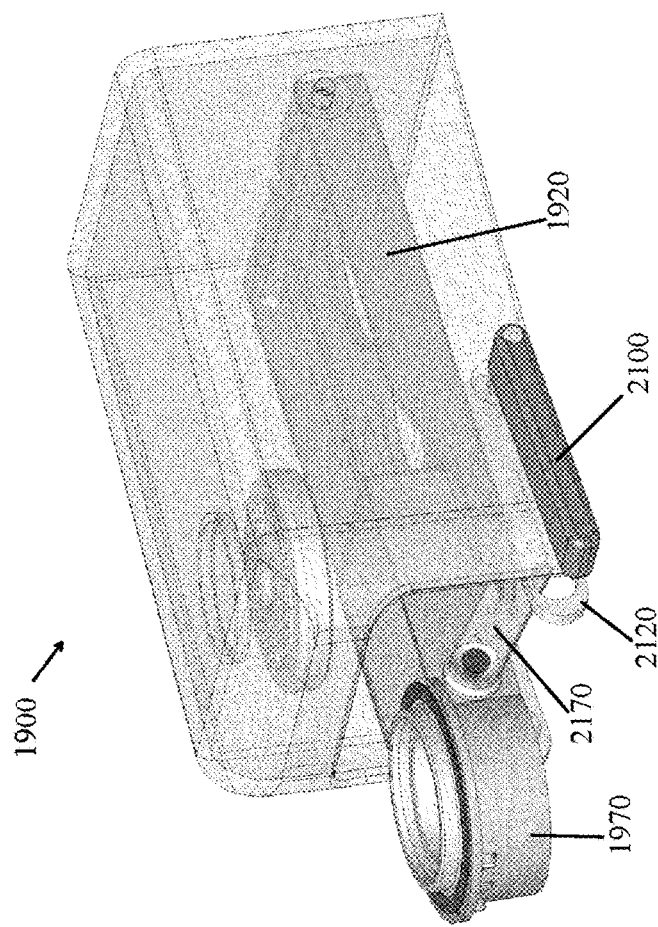
Figure 21F:
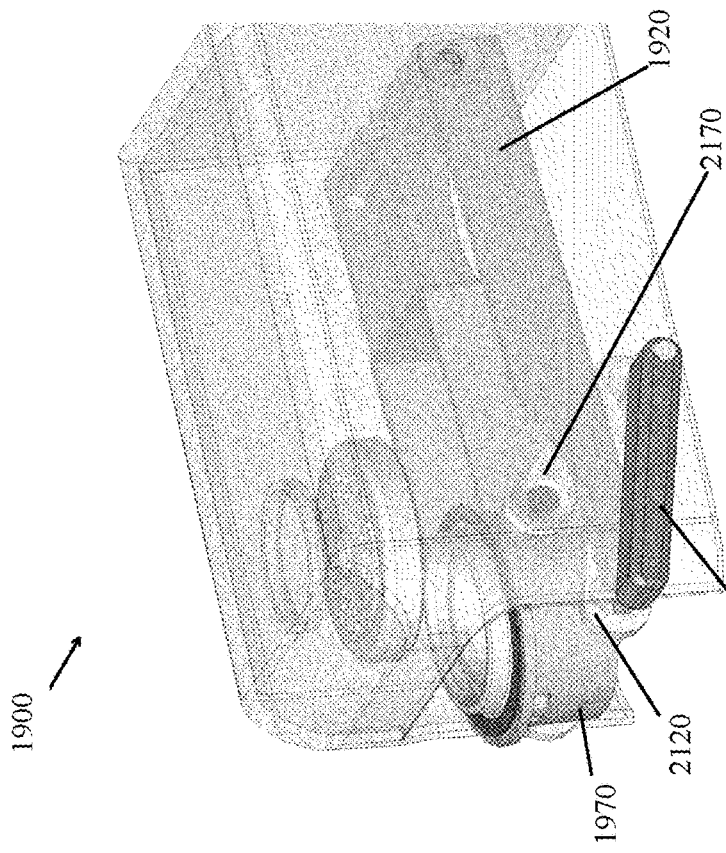

FIGS. 21F and 21G illustrate an example of the movements of the lever 2100, rotator 2120 and connector component 2170 to effect movement of the drawer 1970. For example, the connector component 2170 may be rotated such that a portion of the connector component 2170 is below the tray 1920.

FIGS. 21H and 21I illustrate another example of the movements of the lever 2100, rotator 2120 and connector component 2170 to effect movement of the drawer 1970. For example, the connector component 2170 may remain above the tray 1920 as the drawer 1970 is moved relative to the tray 1920.

Lever Linkage Assemblies with Circumferentially Offset Members

Figure 22:
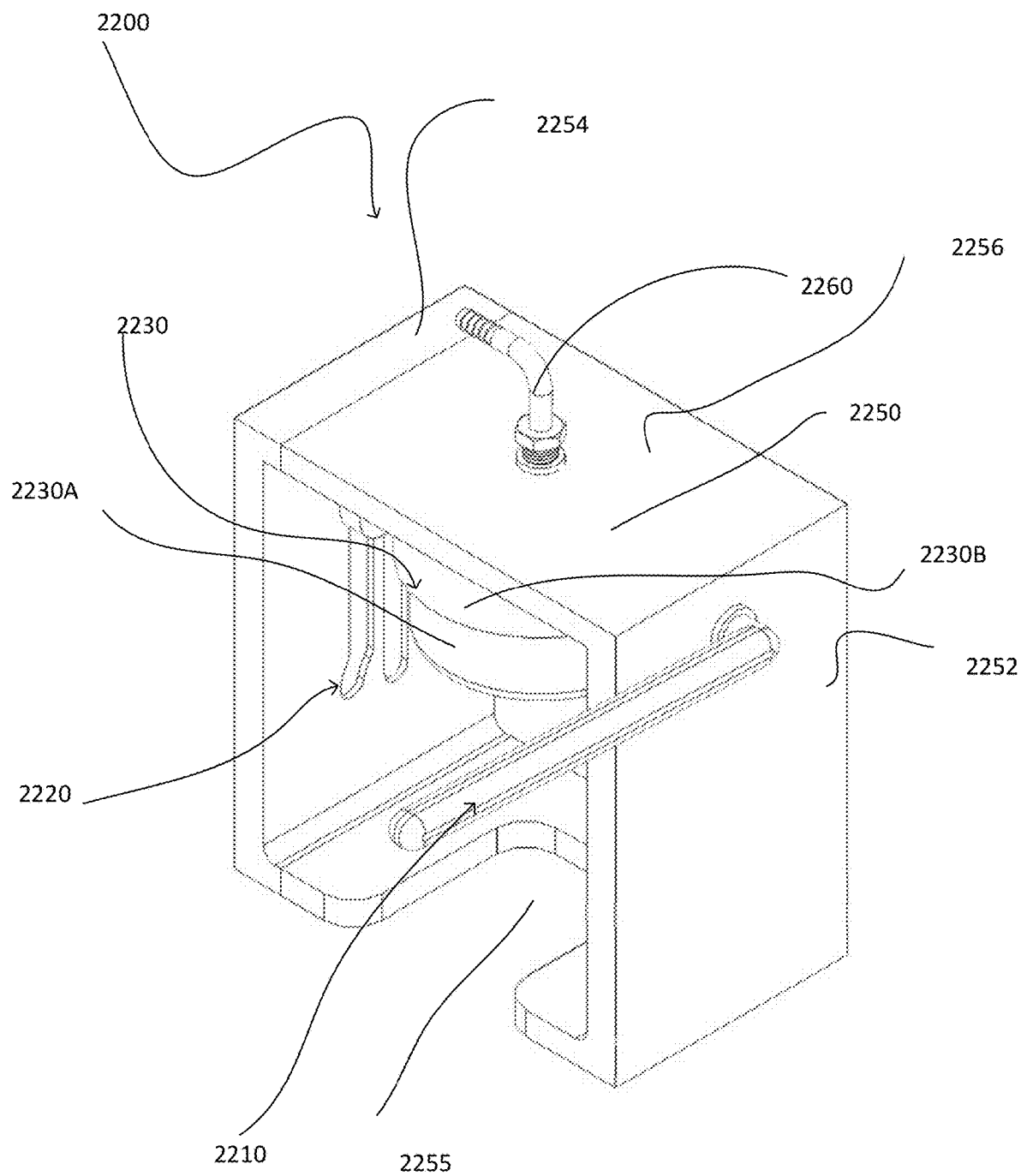
FIG. 22 illustrates a perspective view of an embodiment of a brewer machine with a lever assembly.

FIG. 22 illustrates a perspective view of an embodiment of a brewer machine 2200. As shown, the brewer machine 2200 can include a lever assembly, which can be configured to open and close a brew chamber unit 2230. For example, the brewer machine 2200 can be configured to open the brew chamber unit 2230 to allow a user to insert or remove a beverage pod, and can be configured to close the brew chamber unit 2230 to facilitate preparing a beverage in the brew chamber unit 2230.

The brewer machine 2200 can comprise a lever 2210, a sliding track 2220, and housing 2250. As shown, some embodiments include a brew chamber unit 2230 connected with a fluid inlet 2260. The housing 2250 can comprise a cup receiving recess 2255, such as to enable a user to place a cup under the brew chamber unit 2230 to dispense a beverage into the cup. The brew chamber unit 2230 can comprise a movable member 2230A configured to move between a closed position and an open position. The brew chamber unit 2230 can be configured to receive a beverage pod, such as a single-serve beverage pod.

As shown, the housing 2250 can have a box-like shape. Some embodiments include a first sidewall 2252, a second sidewall 2254, and a top surface 2256 connecting the first and second sidewalls 2252, 2254. The sliding track 2220 can be disposed on the first and second sidewalls 2252, 2254. In various embodiments, the housing 2250 is configured to support and enable movement of the brew chamber unit 2230.

The brew chamber unit 2230 can be similar or identical to, and can include any one or any combination of features of, any of the previously described brew chamber units. For example, the brew chamber unit 2230 can be similar or identical to the brew chamber unit 300 of FIG. 3A. As shown in FIG. 22, the brew chamber unit 2230 can comprise a stationary member 2230B configured to mate with the movable member 2230A. For example, the stationary member 2230B can be similar or identical to the previously described lid 400 and the movable member 2230A can be similar or identical the previously described outer portion 310 (containing, e.g., the inner portion 500). In various embodiments, the stationary member 2230B and the movable member 2230A move relative to each other, thereby opening and closing the brew chamber unit 2230. This can enable the brew chamber unit 2230 to receive a beverage pod (e.g., in the open position) and/or envelop a beverage pod (e.g., in a closed position). The movable member 2230A can comprise a fluid outlet, such as a discharge assembly, as discussed above.

As shown, the lever 2210 can have the form of an elongate member, which can aid in providing mechanical advantage in moving the movable member 2230A. In some embodiments, the lever 2210 can comprise a handle bar connected to the first sidewall 2252 and crank members. In certain embodiments, between the open and closed positions of the brew chamber unit 2230, the lever 2210 is configured to be rotated at least about: 45°, 60°, 80°, 90°, 100°, 120°, values between the aforementioned values, or other values.

Figure 23:
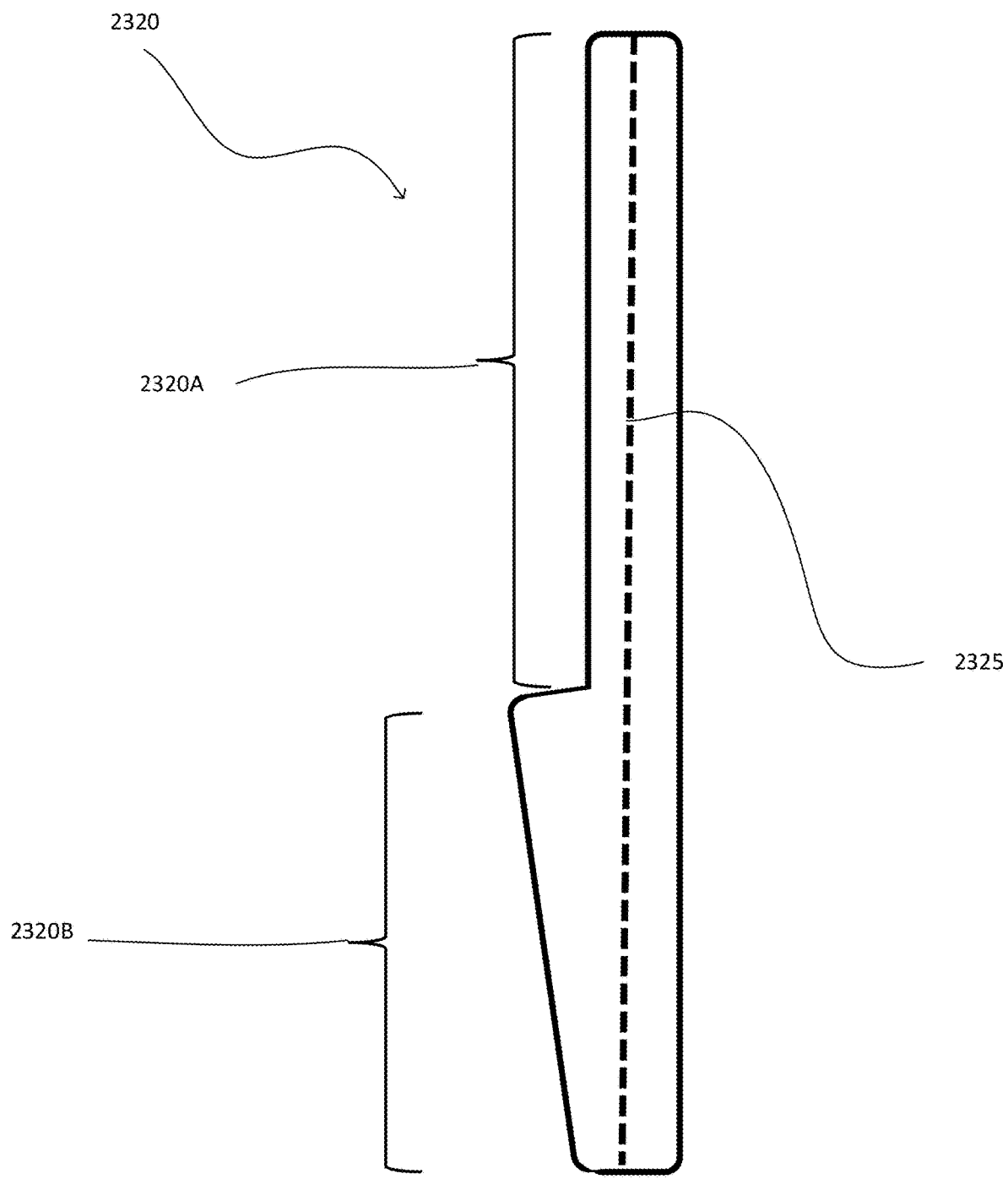
FIG. 23 schematically illustrates an embodiment of a sliding track that can be included in the brewer machine of FIG. 22.

In some implementations, the brewer machine 2200 includes a sliding track, such as a sliding track schematically shown in FIG. 23. The sliding track 2320 can be a recessed slot in the housing 2250, such as in the sidewall 2252. In certain implementations, the sliding track 2320 is configured to aid in tilting the brew chamber unit 2230 in the open position, such as angling the brew chamber unit 2230 toward a user.

In some embodiments, the sliding track 2320 can comprise protrusions. In some embodiments, the sliding track 2320 can comprise rails, such as a T-shaped rail configuration comprising inner sidewalls. The sliding track 2320 can comprise a straight portion 2320A and a longitudinal axis 2325. In some embodiments, the longitudinal axis 2325 can comprise a longitudinal axis of the straight portion 2320A.

Figure 30A:
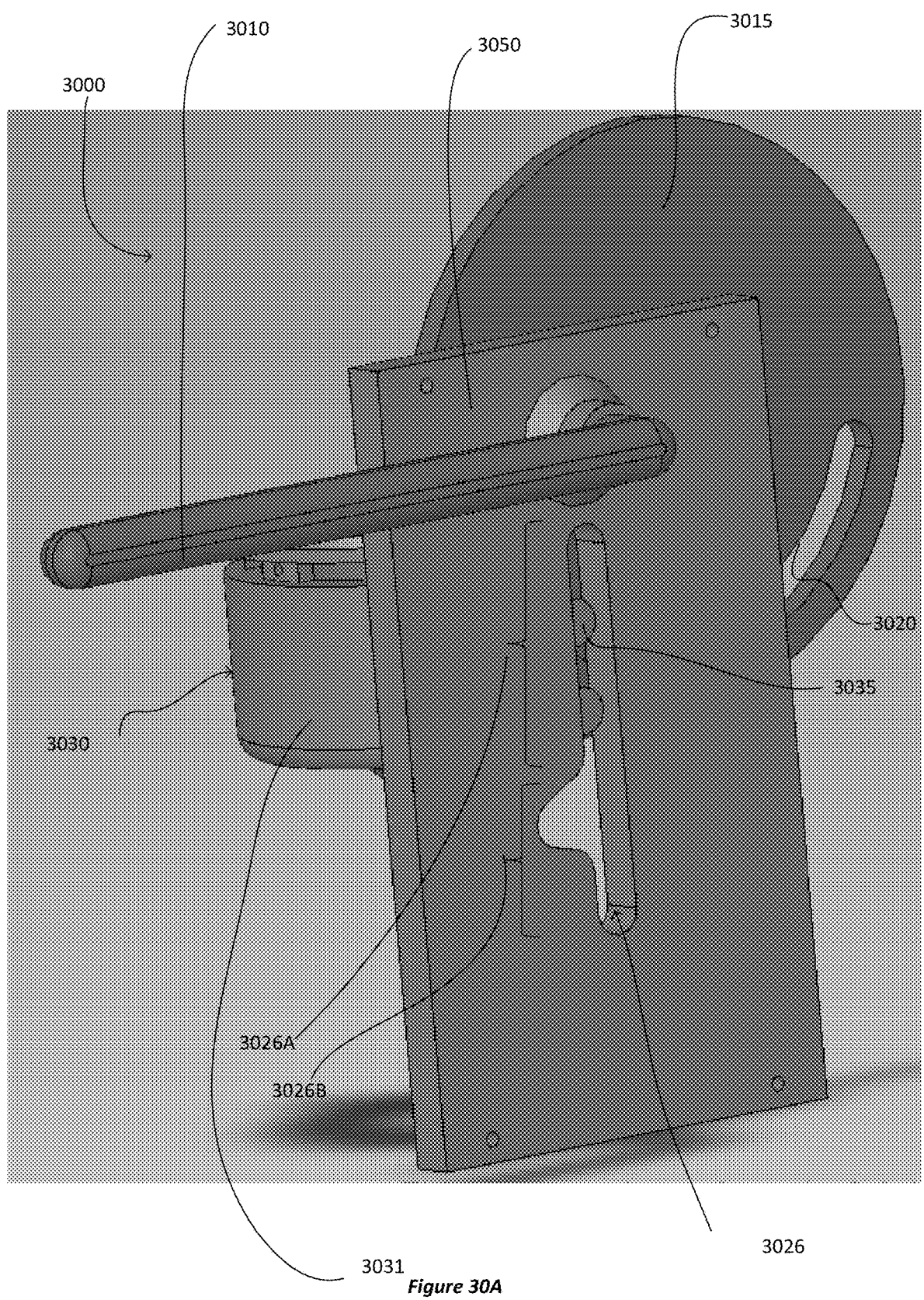
FIG. 30A illustrates a side perspective view of another embodiment of a brewer machine with a cam assembly having a circular cam.

In some implementations, the sliding track 2320 includes an incline portion 2320B. The incline portion 2320B can comprise a recessed area generally having a greater width than the width of the straight portion 2320A. For example, as shown in FIG. 23, the incline portion 2320B can comprise a recessed portion beginning from a portion having a significantly increased width at a junction of the straight portion 2320A and the incline portion 2320B to an end of the sliding track 2320 where the width tapers. In some embodiments, as shown in FIG. 30A, the incline portion 3026B can comprise a portion comprising a cut-out structure on the sliding track. In some embodiments, as shown in FIG. 23, the incline portion 2320B can comprise a portion having a longitudinal axis forming an angle with the straight portion 2320A.

The vertical length of the straight portion 2320A can be at least about 1.5 times the length of the incline portion 2320B. The vertical length of the straight portion 2320A can be at least about 2 times the length of the incline portion 2320B. The vertical length of the straight portion 2320A can be between about 2.5 to about 10 times the length of the incline portion 2320B. The vertical length of the straight portion 2320A can be between about 3 to about 8 times the length of the incline portion 2320B. The vertical length of the straight portion 2320A can be between about 3.5 to about 6 times the length of the incline portion 2320B.

Figure 24A:
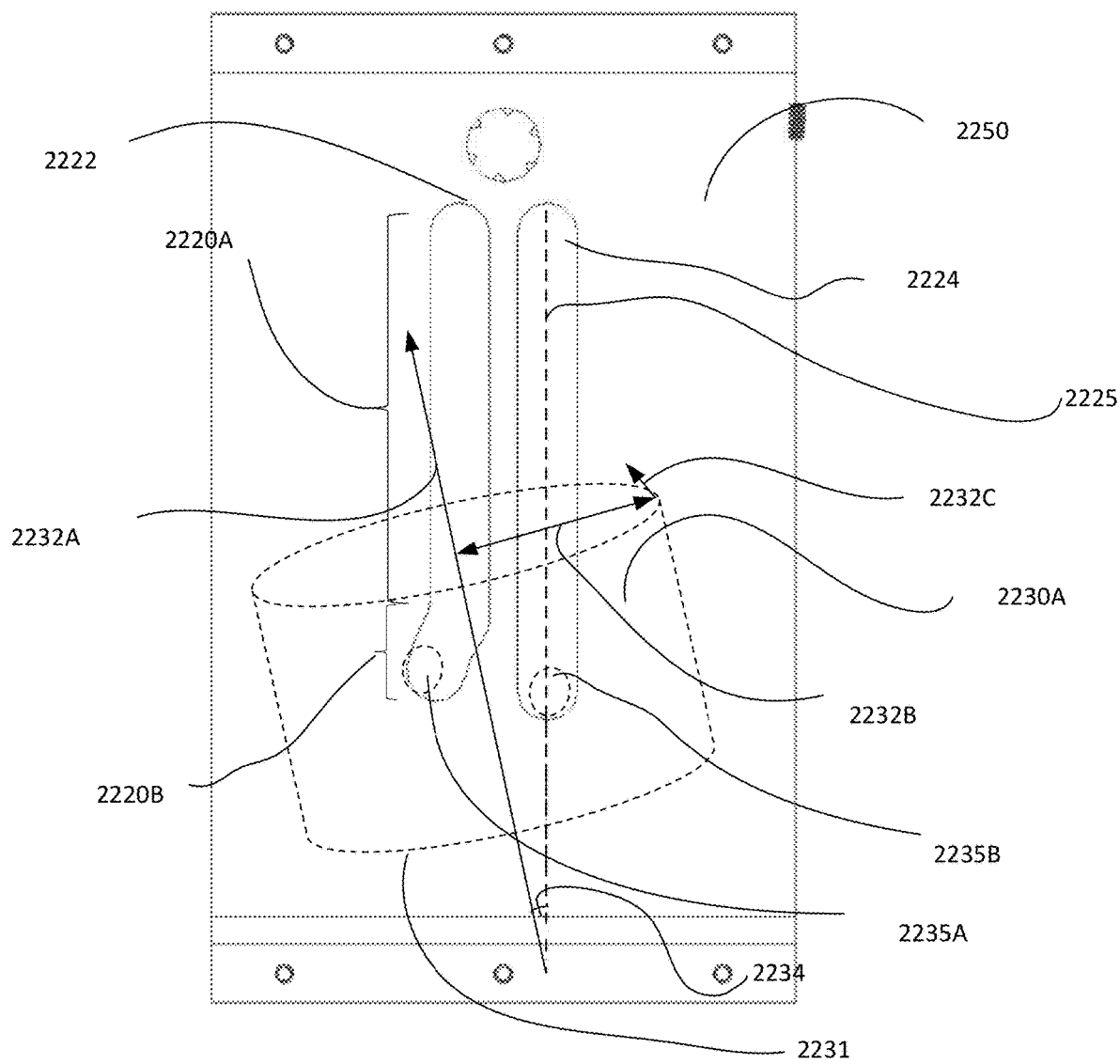
FIGS. 24A and 24B are partial cross-sectional views showing a track in a sidewall of the brewer machine of FIG. 22, with a brew chamber unit superimposed in dashed lines.

FIG. 24A is a partial schematic drawing showing the brewer machine in an open position. As shown, the brew chamber unit 2230 can be tilted relative to a vertical axis. For example, the brew chamber unit 2230 can include an axial axis 2232A that is not parallel and not perpendicular with a vertical axis. To facilitate tilting and/or movement of the brew chamber unit 2230 relative to the housing 2250, the brewer machine can comprise sliding tracks, such as tracks disposed on a sidewall 2254 of the housing 2250. The sliding tracks can comprise a first track 2222 and a second track 2224. As shown in FIG. 24A, the first track 2222 can comprise a straight portion 2220A and an incline portion 2220B. The incline portion 2220B can form an angle with a longitudinal angle of the straight portion 2220A. The angle 2221 can be at least about 2 degrees. The angle 2221 can be at least about 5 degrees and/or less than or equal to about 90 degrees. The angle 2221 can be at least about 10 degrees and/or less than or equal to about 70 degrees. The angle 2221 can be at least about 20 degrees and/or less than or equal to about 60 degrees.

The second track 2224 can comprise a longitudinal axis 2225. In some embodiments, the longitudinal axis 2225 of the second track 2224 can be generally parallel to a longitudinal axis of the straight portion 2220A of the first track.

In some implementations, the brew chamber unit 2230 can have a generally cylindrical shape. As previously mentioned, the brew chamber unit 2230 can include an axial center axis 2232A. As shown, the brew chamber unit 2230 can comprise a body portion 2231, a radial axis 2232B and a circumferential axis 2232.

In some embodiments, the brew chamber unit 2230 includes one or more securing structures, such as cams or arms projecting outward from a generally cylindrical body portion of the brew chamber unit 2230. As shown, the securing structures can be circumferentially offset from each other. This can enable the different securing structures to engage distinct tracks, as is described in more detail below.

The securing structures can be configured to slide along the tracks. For example, a first securing structure 2235A can be configured to slide along the first track 2222 and a second securing structure 2235B can be configured to slide along the second track 2224. The first and second securing structures 2235A, 2235B can be offset and/or spaced apart from each other. For example, one of the securing structures (e.g., the structure 2235A) can be located closer to a top of the brew chamber unit 2230 than the other of the securing structures (e.g., the structure 2235B).

FIG. 24A illustrates an example of the position of the brew chamber unit 2230 in the open position. As shown, the first securing structure 2235A can be located in the incline portion 2220B. In the open position, a stationary member, such as the stationary member 2230B (shown in FIG. 22), can be spaced away from the movable member 2230A to enable a beverage pod to be inserted or removed from the brew chamber unit 2230.

As shown, the movable member 2230A can be tilted (e.g., angled) with respect to a vertical axis. For example, the movable member 2230A can be tilted toward front of the brewer machine 2200 to facilitate access by a user. In some embodiments, in the open position, the axial center axis 2232A can form an angle 2234 with the longitudinal axis 2225. The angle 2234 can be at least about 2 degrees. The angle 2234 can be at least about 5 degrees and/or less than or equal to about 90 degrees. The angle 2234 can be at least about 10 degrees and/or less than or equal to about 70 degrees. The angle 2234 can be at least about 20 degrees and/or less than or equal to about 60 degrees. In some embodiments, movable member 2230A can be configured to manually adjust the angle 2234, such as by adjusting the position of the securing structure 2235A.

The tilting can occur in the open position. For example, in the open position, the first securing structure 2235A can be in the incline portion 2220B of the first track 2222 forming an angle 2221 with the straight portion 2220A. In the open position, the second securing structure 2235B can remain in the second track 2224 having a generally straight longitudinal axis 2225. The change in locations of the securing structures 2235A, 2235B relative to the tracks 2222, 2224 can tilt the movable member 2230A.

Figure 24B:
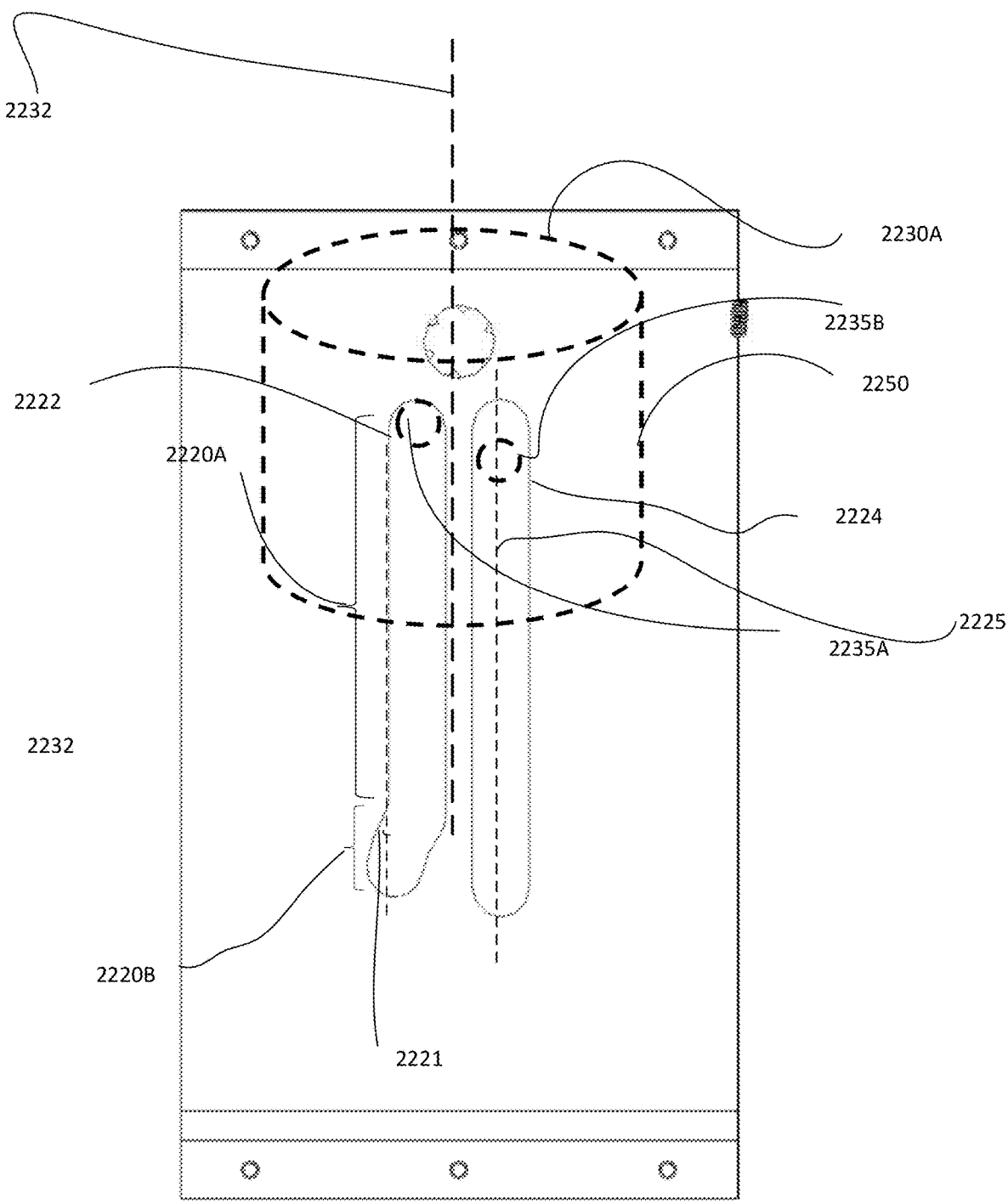

FIG. 24B illustrates an example of the position of the brew chamber unit 2230 in the closed position. In the closed position, the axial center axis 2232A can be substantially parallel with the longitudinal axis 2225. In the closed position, the stationary member 2230B can be sealingly connected with the movable member 2230A to form the brew chamber unit 2230 for brewing of a beverage therein. The first securing structure 2235A can be in the straight portion 2220A of the first track 2222. The second securing structure 2235B at a fixed distance from the first securing structure 2235A can remain in the second track 2224. The fixed distance between the first securing structure 2235A and the second securing structure 2235B can orient the movable member 2230A, such that the movable member 2230A can be sealingly connected with the stationary member 2230B.

Figure 25A:
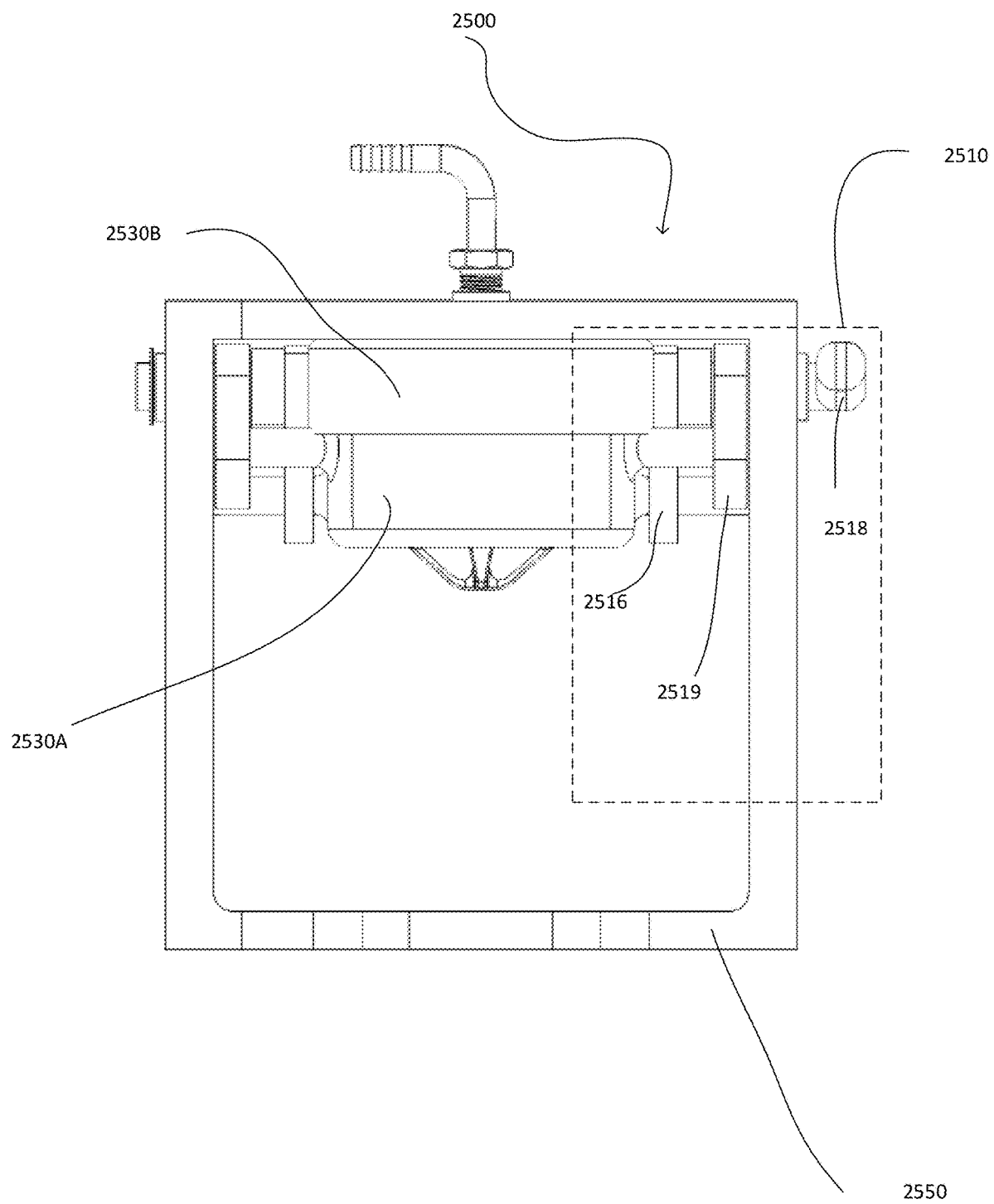
FIG. 25A illustrates a front view of the brewer machine of FIG. 22.
Figure 25B:
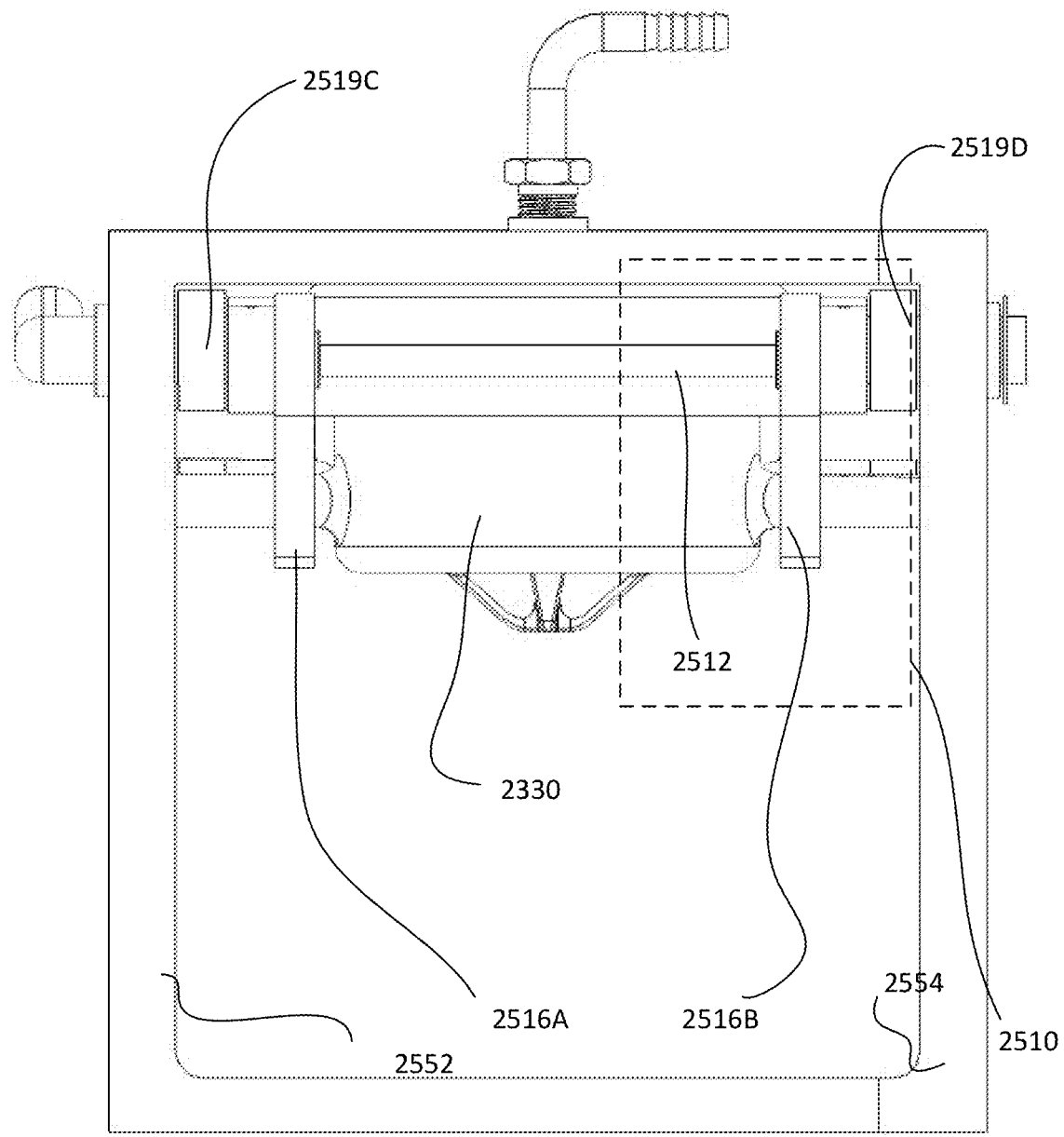
FIG. 25B illustrates a rear view of the brewer machine of FIG. 22.
Figure 25C:
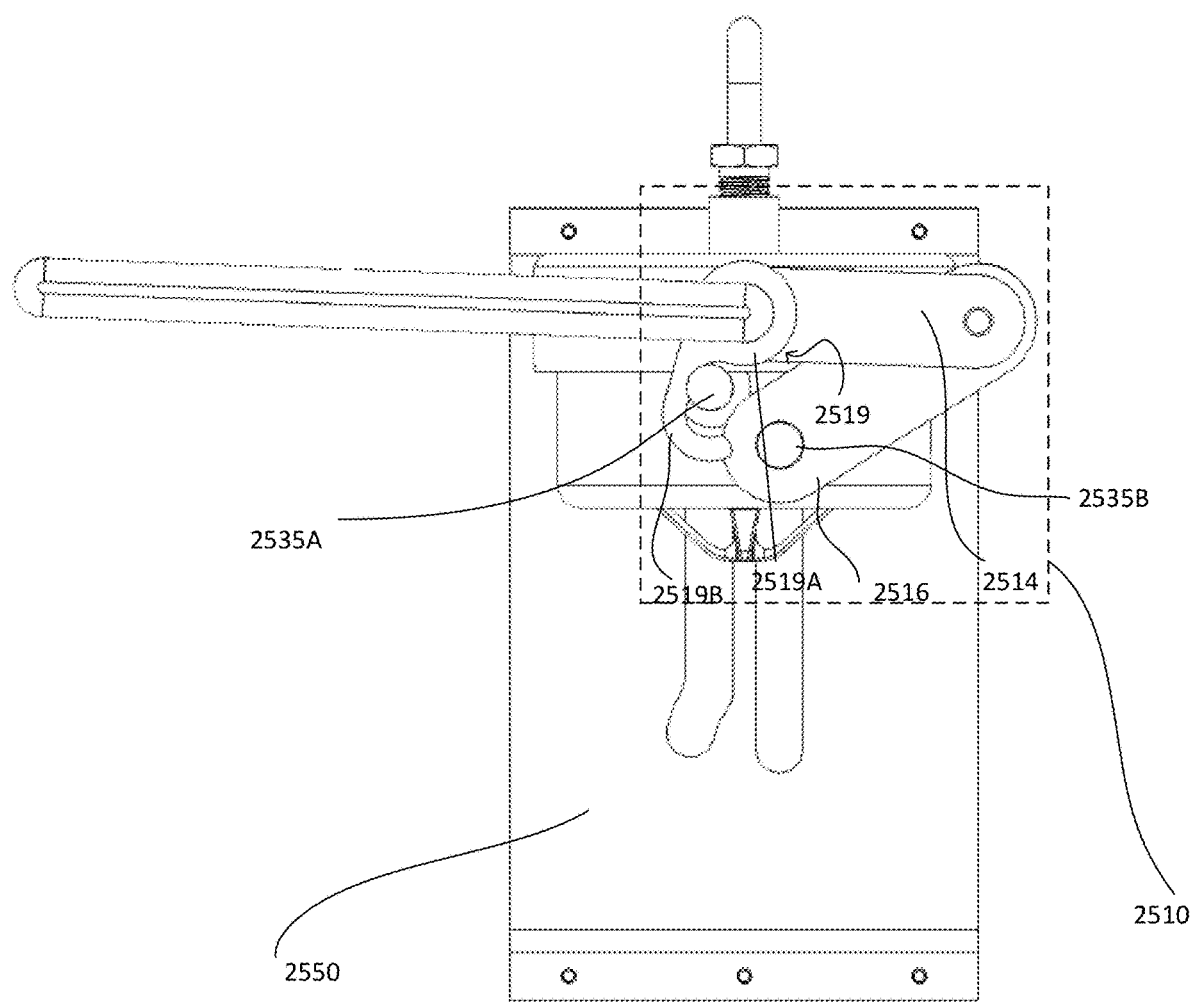
FIG. 25C illustrates a side view of the brewer machine of FIG. 22.
Figure 25D:
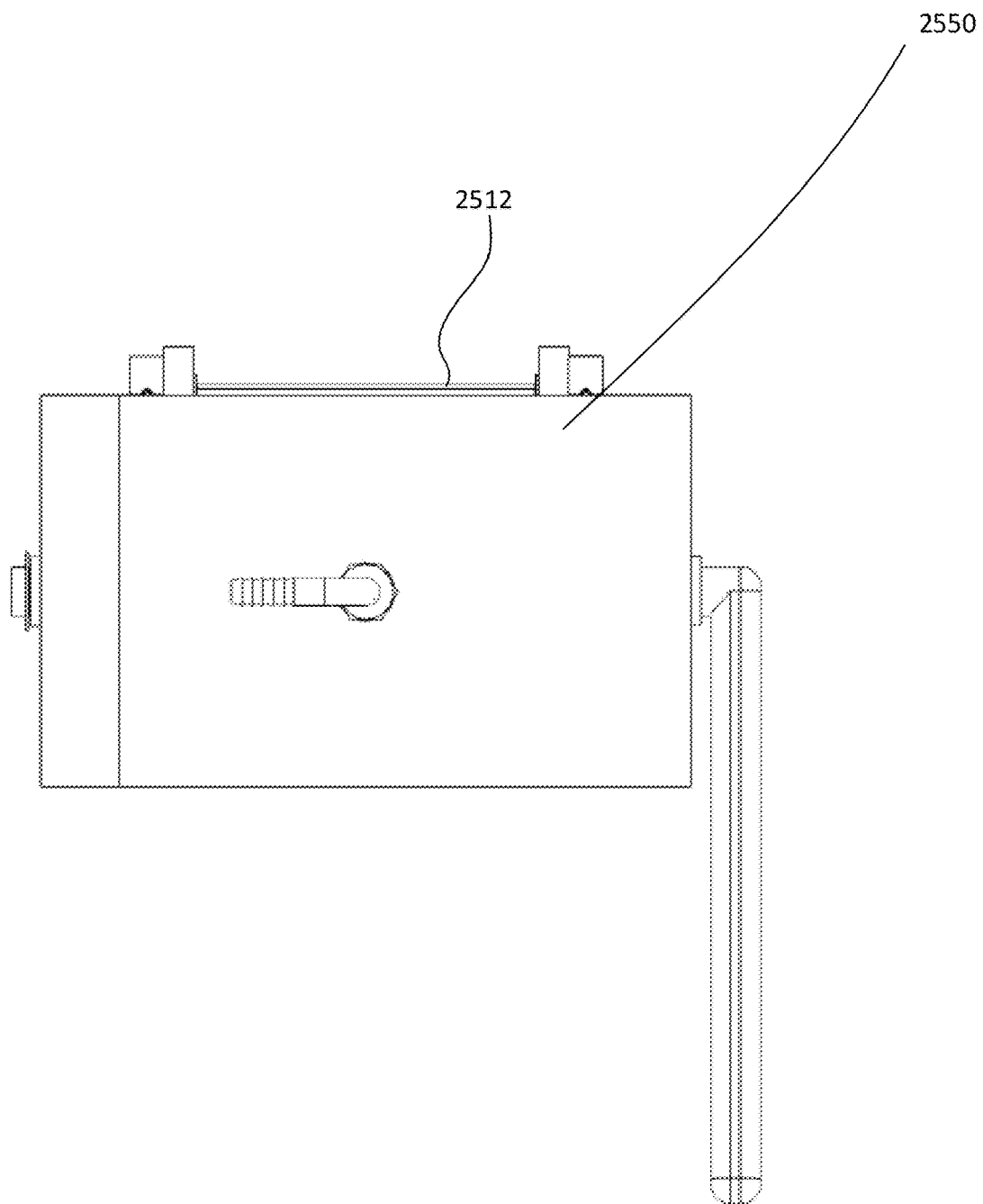
FIG. 25D illustrates a top view of the brewer machine of FIG. 22.

The closed position is also shown in FIG. 25C and is described in more detail below. FIGS. 25A-25D illustrate various different views of the brewer machine of FIG. 22. FIG. 25A illustrates a front view of the brewer machine of FIG. 22. FIG. 25B illustrates a back view of the brewer machine of FIG. 22. FIG. 25C illustrates a side view of the lever assembly of FIG. 22. FIG. 25D illustrates a top down view of the brewer machine of FIG. 22. As shown, the brewer machine can include a lever assembly, which can comprise a crank-type mechanism. The crank-type mechanism can be used to open and close the brew chamber unit. The lever assembly 2500 can comprise a lever 2510. As shown, the lever 2510 can comprise a connecting pin 2512, crank rods 2514, and/or a handle bar 2518. The handle bar 2518 can be pivotably connected to the housing. In some embodiments, the lever 2510 includes one or more hook members 2519. The hook members 2519 can be configured to engage the first securing structure when the brew chamber unit is in and/or near the closed position. The hook members 2519 can comprise a hook body portion 2519A and a hooking portion 2519B. The hook body portion 2519A can be fixedly connected to the handle bar 2518. The hooking portion 2519B can have a hook shape and can be configured to hook around one or more of the securing structures 2535A, 2535B of the brew chamber unit when the brew chamber unit is in the closed position. For example, as shown in FIG. 25C, the hooking portion 2519B can engage with the securing structure 2535A. The hook members 2519 can comprise a first hook member 2519C and a second hook member 2519D. The first and second hook members 2519C, 2519D are each located on sides of a brew chamber unit 2330 near the first sidewall 2552 and the second sidewall 2554 of the housing 2550, respectively.

FIG. 25C illustrates an example of the position of the brew chamber unit 2330 in the closed position. In the closed position, the stationary member 2530B can be sealingly connected with the movable member 2530A. The axial center axis of the movable member 2530A and an axial center axis of the stationary member 2530B can be coaxial. The movable member can move from the open position to the closed position while the securing structures 2535A, 2535B slide along the first and second tracks 2522, 2524. Before the movable member 2530A sealingly connects with the stationary member 2530B, the first securing structure 2535A can move out of the incline portion 2220B of the first track and slide along the straight portion 2220A of the first track (shown in FIG. 24B). The brew chamber unit 2330 can be not tilted in the closed position. For example, the coaxial center axes of the movable member 2530A and the stationary member 2530B can be substantially parallel with the vertical axis of the brewer machine 2200.

In some embodiments, the lever 2510 includes one or more rotating rod 2516. The rotating rod 2516 can comprise a first rotating rod 2516A and a second rotating rod 2516B each located on sides of the brew chamber unit 2330 near the first sidewall 2552 and the second sidewall 2554 of the housing 2550, respectively. A rotating rod, such as the first rotating rod 2516A, can comprise a first opening and a second opening. The first rotating rod 2516A can be rotatably connected to a crank rod 2514 on one end and rotatably connected to a securing structure 2534A on the other end. The hook member 2519 can be fixedly connected to the handle bar 2518 and/or the crank rod 2514.

Certain embodiments are configured such that a user can operate the handle bar 2518 by pivoting the handle bar. For example, in some embodiments, the user can open the lever assembly 2500 by pivoting the handle bar 2518 upward or in a clockwise direction (e.g., from the vantage point of FIG. 25C). The user can close the lever assembly 2500 by pivoting the handle bar 2518 downward or in a counter-clockwise direction (e.g., from the vantage point of FIG. 25C). The lever 2510 can be configured such that the full range of the pivoting motion of the handle bar 2518 can be less than about 180 degrees. For example, the full range of the pivoting motion of the handle bar 2518 can be about 50 degrees to about 120 degrees. The full range of the pivoting motion of the handle bar 2518 can be about 90 degrees. The pivoting motion can be limited to the front of the device. In some embodiments, the lever 2510 can comprise an electronic actuation mechanism comprising a plurality of inputs. The user may operate the lever between the open position and the closed position by operating such inputs.

Linkage Assemblies with Circumferentially Aligned Members

Figure 26:
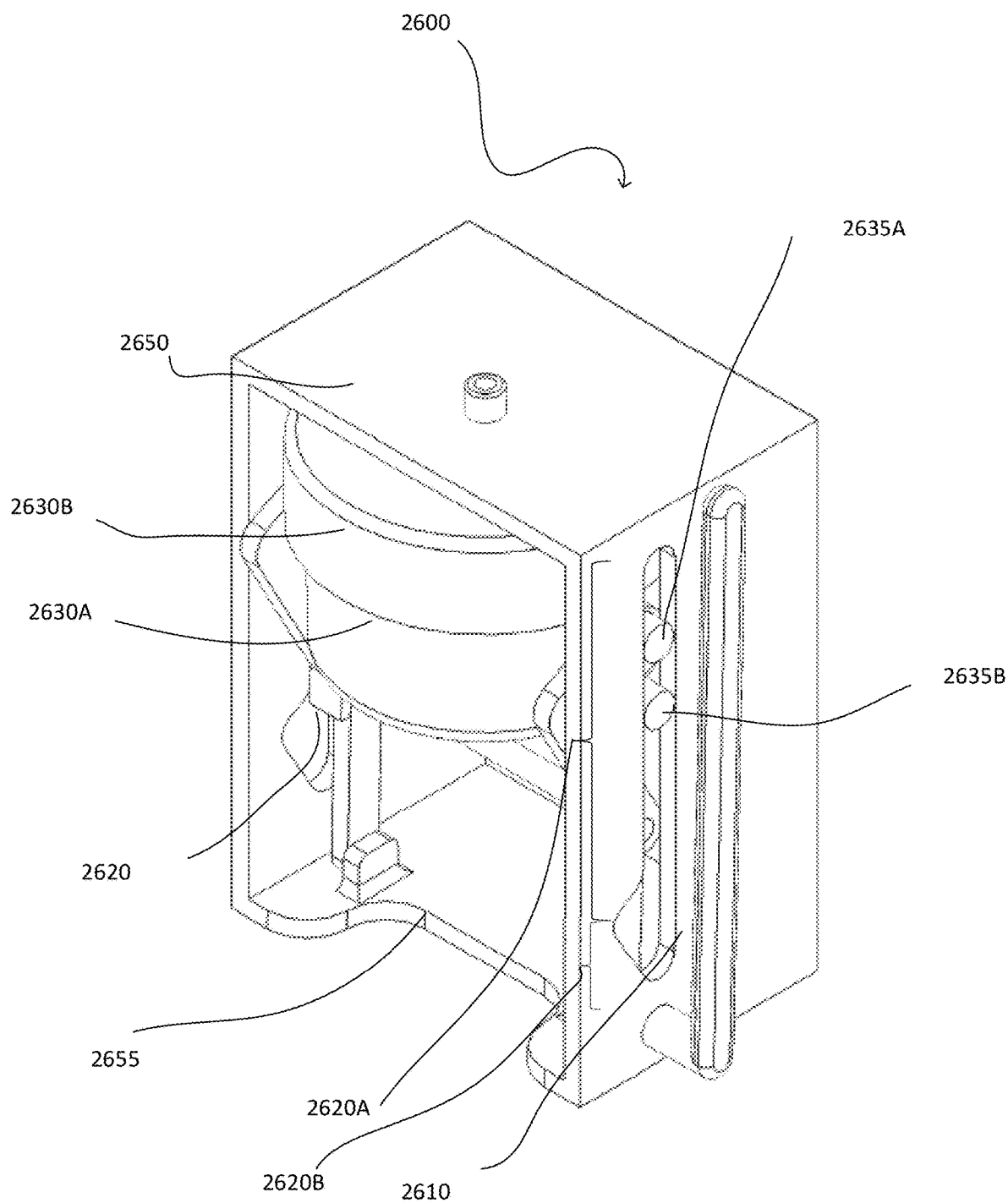
FIG. 26 illustrates a perspective view of another embodiment of a brewer machine with a lever assembly having rotating rods.

FIG. 26 illustrates a perspective view of another embodiment of a brewer machine 2600. As shown, the brewer machine 2600 can include a lever assembly, which can include rotating rods (e.g., L-shaped rotating rods). The lever assembly can comprise a housing 2650, a sliding track 2620, a lever 2610, and a fluid inlet 2660. The housing 2650 can comprise a cup receiving recess 2655.

Certain embodiments include a brew chamber unit 2630. The brew chamber unit 2630 can comprise a movable member 2630A movable between a closed position and an open position. Some embodiments include a stationary member 2630B. The brew chamber unit 2630 can be configured to receive a beverage pod in an open position. The brew chamber unit 2630 can be similar or identical to, and can include any one or any combination of features of, any of the previously described brew chamber units, such as the brew chamber unit 300.

In some embodiments, the brew chamber unit 2630 includes one or more securing structures 2635A, 2635B. As shown, in some embodiments, the securing structures 2635A, 2635B include cams or arms that project outward from a body portion of the brew chamber unit 2630. As is also shown, the securing structures can be circumferentially aligned with each other. This can enable the different securing structures to engage a common track. For example, as is shown, the securing structures 2635A, 2635B can each be received in the track 2620.

Figure 27A:
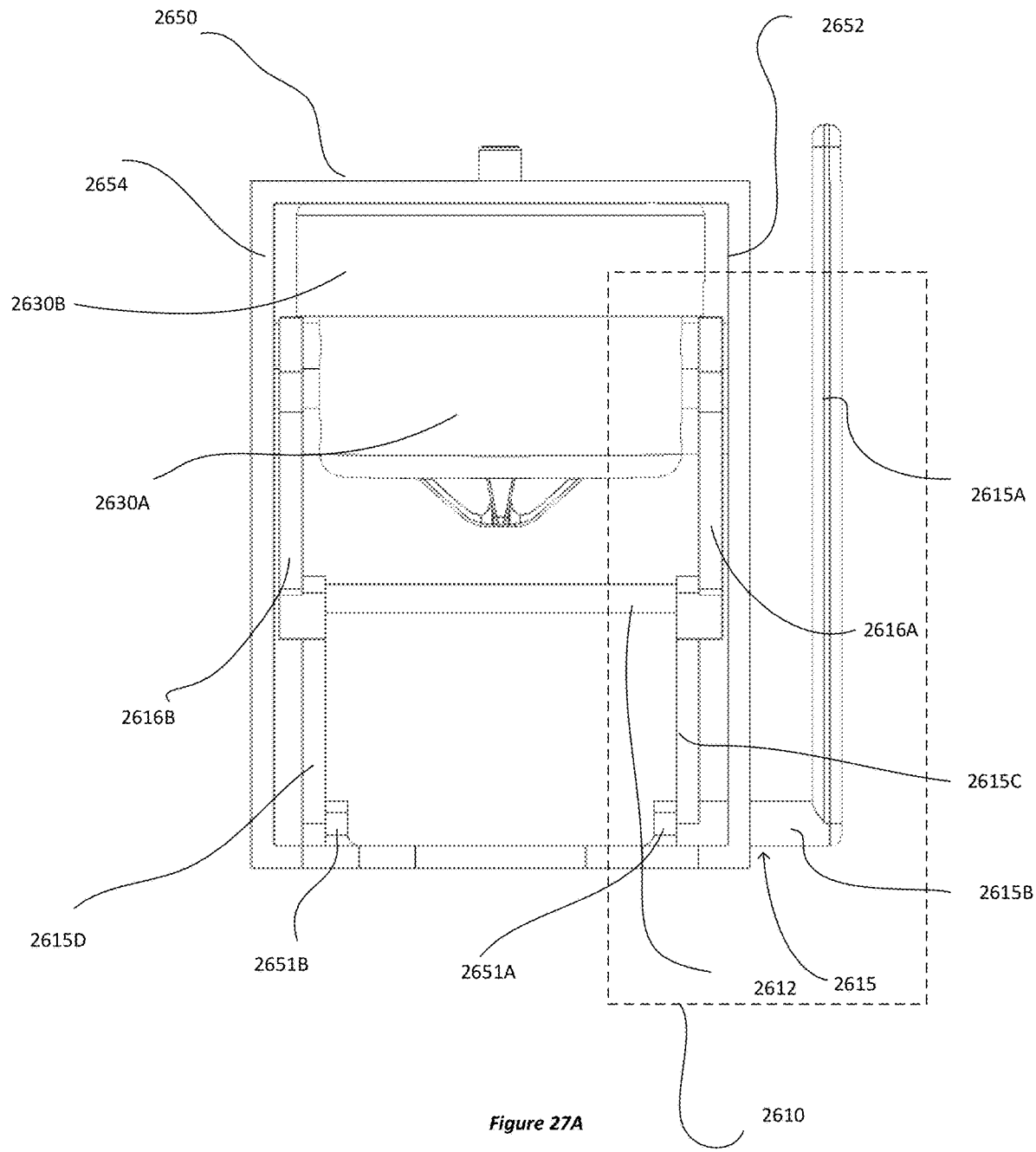
FIG. 27A illustrates a front view of the brewer machine of FIG. 26.
Figure 27B:
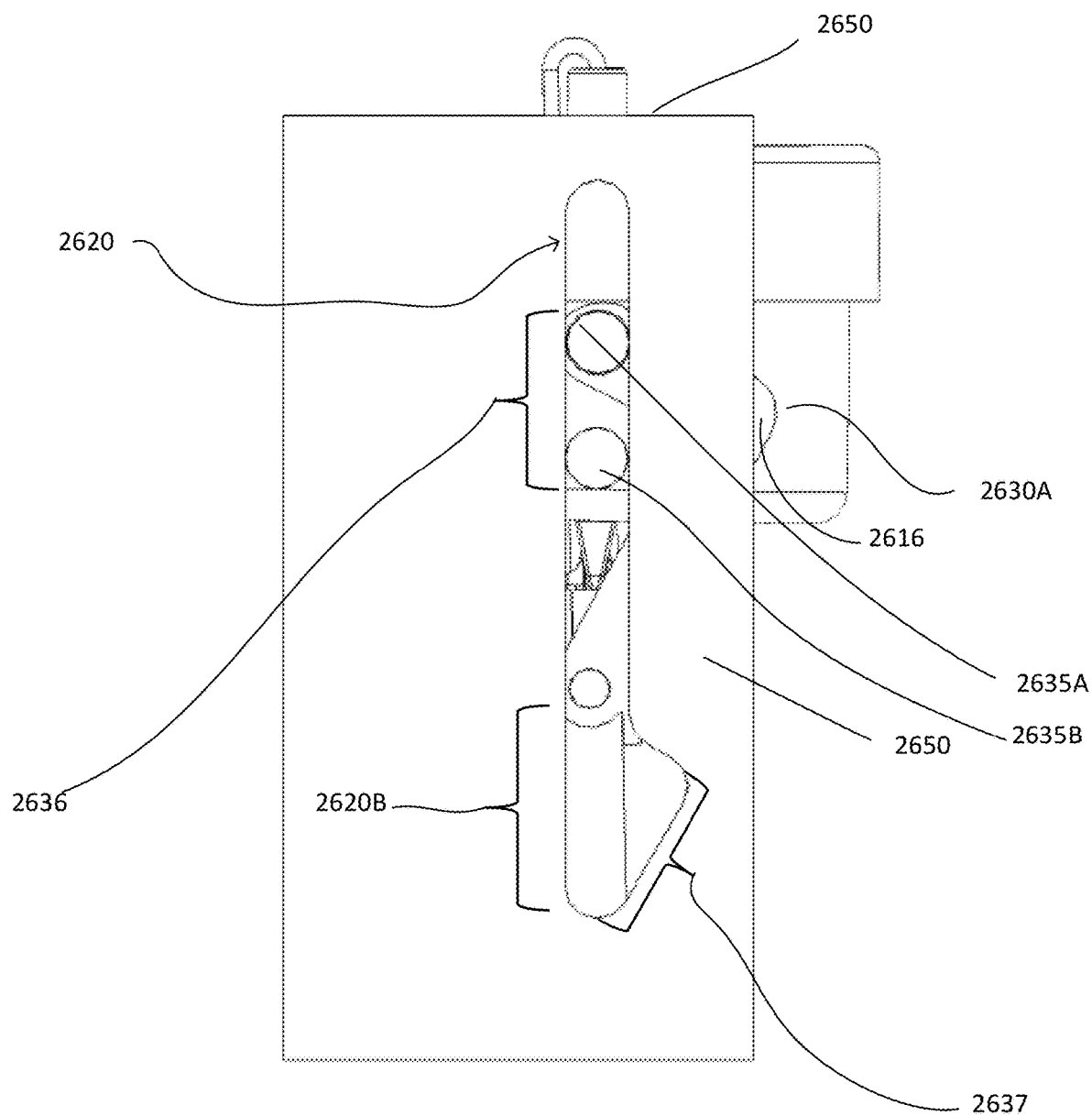
FIG. 27B illustrates a side view of the brewer machine of FIG. 26.

In some embodiments, in a closed position of the brew chamber unit 2630, the securing structures 2635A, 2635B are both received in a generally straight portion 2620A of the track 2620. In some variants, as is illustrated, in the closed position of the brew chamber unit 2630, the securing structures 2635A, 2635B are generally aligned along a vertical axis (e.g., a vertical line can be passed through the radial centers of the securing structures 2635A, 2635B). In some embodiments, in the open position, the securing structures 2635A, 2635B are received in an inclined and/or generally triangular portion 2620B of the track 2620. In some variants, in the open position of the brew chamber unit 2630, the securing structures 2635A, 2635B are not aligned along the vertical axis. FIG. 27A illustrates a front view of the lever assembly of FIG. 26. The housing 2650 can comprise a sliding track 2620 and a housing hinge tab 2651. The housing hinge tab 2651 can comprise a first hinge tab 2651A, and a second hinge tab 2651B. FIG. 27B illustrates a side view of the lever assembly of FIG. 26. The movable member 2630A can comprise a first securing structure 2635A and a second securing structure 2635B. The first and second securing structures 2635A, 2635B can be spaced apart to form a distance 2636. The distance 2636 can comprise the farthest line between a point on the circumference of the first securing structure 2635A and a point on the circumference of the second securing structure 2635B. The sliding track 2620 can comprise an incline portion 2620B. The incline portion can comprise an incline length 2637 tilted at an angle away from the vertical axis of the lever assembly. The incline length 2637 can be greater than the distance 2636.

In some embodiments, the lever 2610 can comprise one or more connecting rods 2616 (e.g., L-shaped connection rods), a handle 2615 (e.g., U-shaped handle), and a connecting pin 2612. The connecting rod 2616 can comprise a first rod 2616A and a second rod 2616B. The first and second rods 2616A, 2616B can each be located on sides of the brew chamber unit 2630. For example, the first and second rods 2616A, 2616B can be located near the first sidewall 2652 and the second sidewall 2654 of the housing 2650, respectively. The rotating pin 2612 can connect the first and second rods 2616A, 2616B.

Figure 27C:
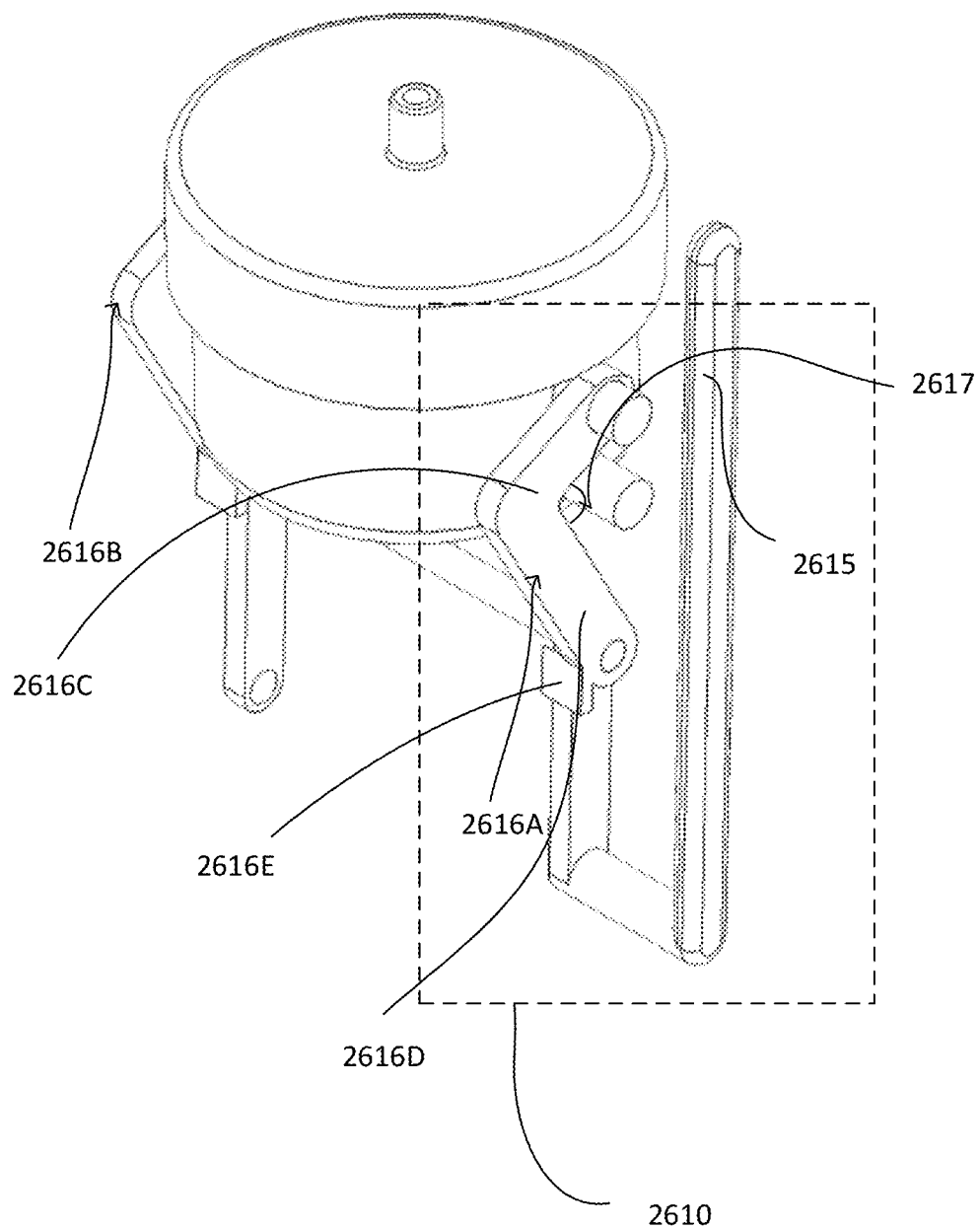
FIG. 27C illustrates a perspective view of certain components of the brewer machine of FIG. 26.

FIG. 27C illustrates a perspective view of certain components of the lever assembly of FIG. 26. As shown in FIG. 27C, each connecting rod 2616A, 2616B can comprise a first connecting rod portion 2616C, a second connecting rod portion 2616D. The first and second connecting rod portions 2616C, 2616D can form a rod angle 2617. The rod angle 2617 can be an included angle. The rod angle 2617 can be between about 20 degrees to about 120 degrees. The rod angle 2617 can be between about 40 degrees to about 100 degrees. The rod angle 2617 can be about 90 degrees.

In some embodiments, one or more of the rods 2616A, 2616B includes a stop structure 2616E. The stop structure 2616E can be configured to limit a rotation of the rod 2616. For example, in a rod 2616, rotating in the counter-clockwise direction from the open position to the closed position, the stop structure 2616E can inhibit or prevent further movement of the rod 2616 in the counter-clockwise direction by abutting against a portion of the U shaped handle 2615 in the closed position.

The handle 2615 can comprise a handle portion 2615A, a connecting pin portion 2615B, and a rotation arm portion 2615C. The handle 2615 can be rotatably connected to the housing 2650. For example, a portion of the handle 2615 can be connected to the first hinge tab 2651A. The rotation arm portion 2615C can be rotatably connected to the rod. The handle 2615 can be connected to first sidewall 2552 of the housing 2650. In some embodiments, the lever 2610 can comprise a rotating rod 2516 located opposite the handle 2615 and near the second sidewall 2554. The rotating rod 2615D can be shaped and sized as the rotation arm portion 2615C. The rotating rod 2615D can be rotatably connected to the second hinge tab 2651B.

In the closed position, the lever 2610 can be in a generally vertical orientation. For example, the handle 2615 of the lever can be generally along a vertical axis of the brewer machine 2600. A user may operate the brewer machine 2600 to an open position by operating the lever, for example, by pulling the lever 2610. The lever 2610 can be pulled towards the user to rotate. The rotating arm portion 2615C can rotate with the rotation of the lever 2610, and the connecting pin 2612 can move towards the user. As the connecting pin 2612 rotates, the rotating rods 2616A, 2616B connected to the rotating arm portion 2615C can rotate. For example, the first connecting rod portion 2616C can rotate in a clockwise direction as the lever 2610 rotates in a counter-clockwise direction. The rotating rods 2616A, 2616B connected to the first securing structure 2635A of the movable member 2630A can move the first securing structure 2635A vertically downward as the lever 2610 is pulled. For example, the first securing structure 2635A can slide along the sliding track 2620 as the rotating rods 2616A, 2616B rotate.

In the open position, the movable member 2630A can be in a tilted configuration, such as the movable member 2230A (shown in FIG. 24A). For example, the movable member can comprise first and second structures 2635A, 2635B forming a line generally parallel to the axial center axis of the movable member 2630. The line formed by the first and second structures 2635A, 2635B can tilt as the first and second structures 2635A, 2635B move to an incline portion 2620B. The first securing structure 2635A is rotated toward the user in the open position.

In the open position, the lever 2610 can be in a generally horizontal orientation. For example, the handle 2615 of the lever can form about a 90 degree angle with a vertical axis of the brewer machine 2600. A user may operate the brewer machine 2600 to a closed position from an open position by operating the lever 2610, for example, by pushing the lever 2610. The lever 2610 can be pushed away from the user to rotate. The connecting pin 2612 can move away from the user as the user pushes the lever. The first connecting rod portion 2616C can rotate in a counter-clockwise direction as the lever 2610 rotates in a clockwise direction when closing. The rotating rods 2616A, 2616B can move the first securing structure 2635A vertically upward.

In the closed position, the movable member 2630A can be in an upright configuration shown in FIGS. 27A-27C. For example, the movable member can comprise first and second structures 2635A, 2635B forming a line parallel to the axial center axis of the movable member 2630A. As the user operates the brewer machine 2600 to close, the first and second structures 2635A, 2635B slide along a straight portion of the sliding track, such as the straight portion 2320A (see FIG. 23).

Translating Lid

FIGS. 28A-28E show views of a brewer machine with a brew chamber unit with a movable and/or pivotable upper portion. For example, a lid of the brew chamber unit can be configured to move relative to a lower portion of the brew chamber unit. In some implementations, such a design is called a "can crusher" arrangement due to certain similarities to an apparatus for collapsing aluminum cans.

The brew chamber unit can be similar or identical to, and can include any one or any combination of features of, any of the previously described brew chamber units. For example, the brew chamber unit can be similar or identical to the brew chamber unit 300 of FIG. 3A. As shown, the brew chamber unit 2830 can comprise a movable member 2830A and a stationary member 2830B.

Figure 28A:
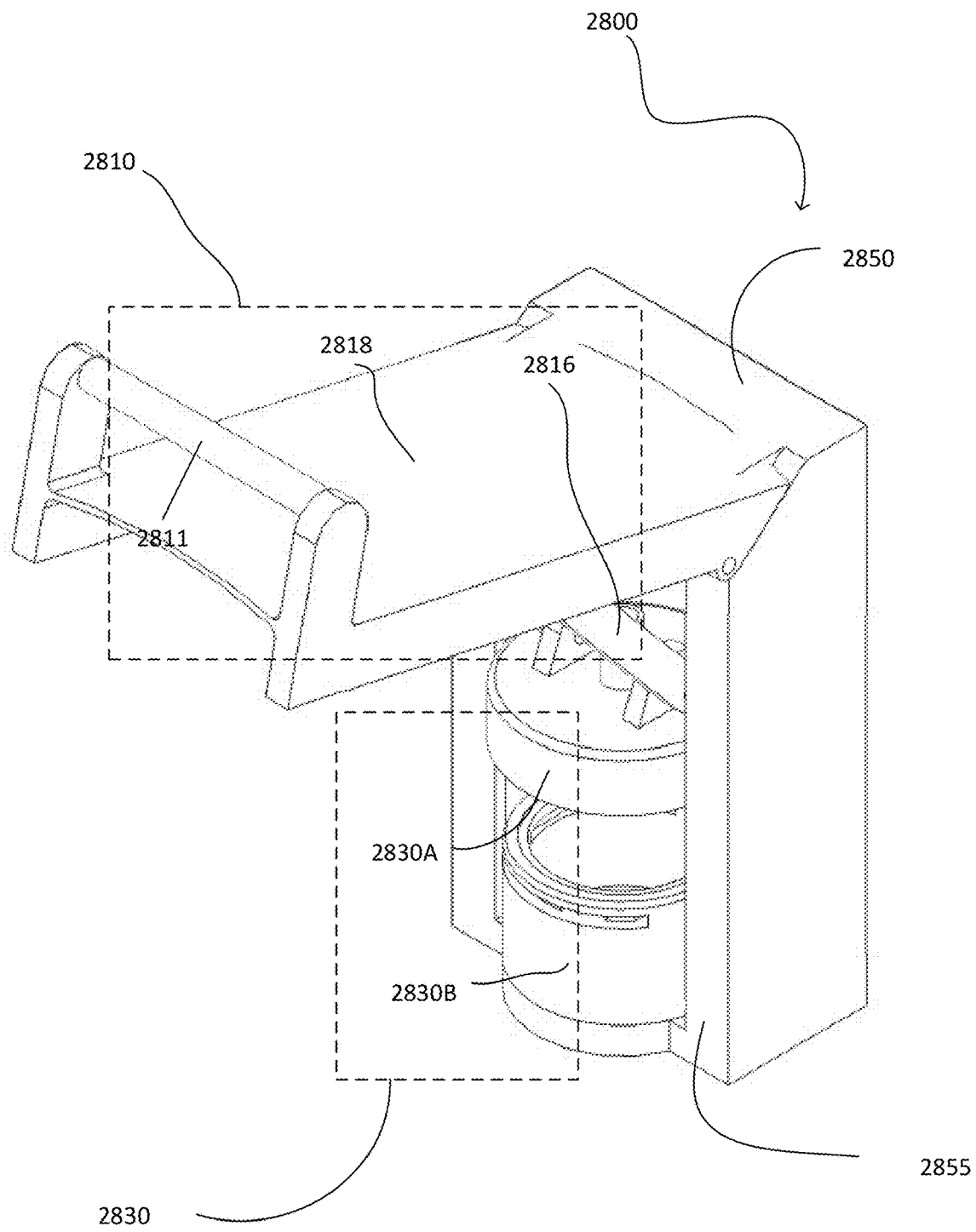
FIG. 28A illustrates a perspective view of another embodiment of a brewer machine with a lever assembly having a pivoting lid.
Figure 28B:
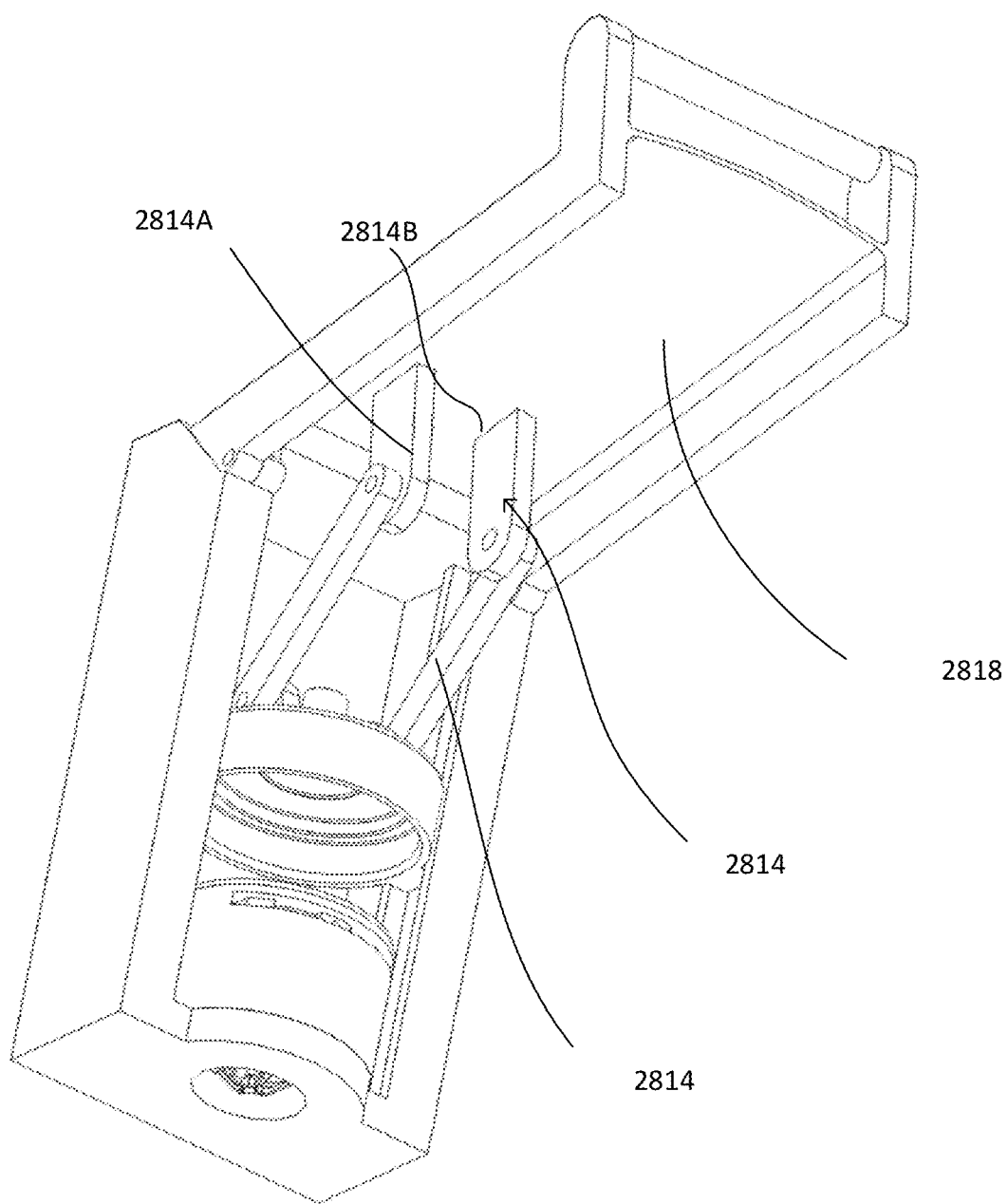
FIG. 28B illustrates a bottom perspective view of the brewer machine of FIG. 28A.
Figure 28C:
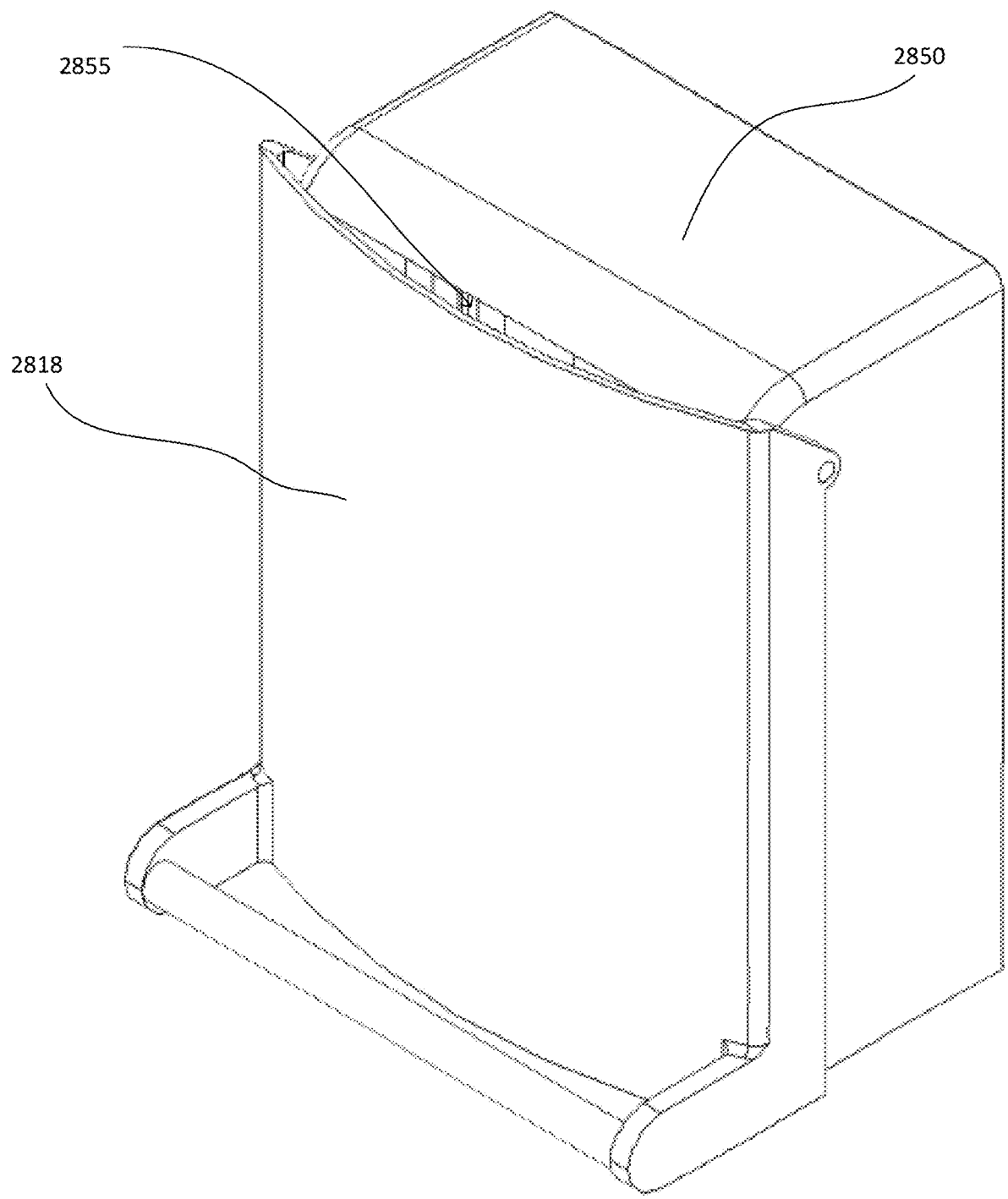
FIG. 28C illustrates a perspective view of the brewer machine of FIG. 28A in a closed position.

The lever assembly 2800 can comprise a housing 2850, sliding track 2820, and lever 2810. The housing can comprise an open front surface 2855. The lever 2810 can comprise a pivoting lid 2818 and rotating rods 2816. FIG. 28C illustrates a perspective view of the lever assembly of FIG. 28A in a closed position. As shown in FIG. 28C, the pivoting lid 2818 can be configured to cover a portion of the open front surface 2855 in the closed position. The pivoting lid 2818 can comprise a lid handle 2811.

In some embodiments, the movable member 2830A of the brew chamber unit can comprise a body portion 2829 and/or movable member hinge tabs 2831A, 2831B. The movable member 2830A can be movable between the closed position (e.g., as shown in FIGS. 28C and 28E) and the open position (e.g., as shown in FIGS. 28A and 28B). During a closing motion or operation, the movable member 2830A can be configured to move generally downward. In an opening motion or operation, the movable member 2830A can be configured to move generally upward.

FIG. 28B illustrates a bottom perspective view of the lever assembly of FIG. 28A. The pivoting lid 2818 can comprise one or more arms 2814 on the pivoting lid. The arms can comprise a first arm 2814A and a second arm 2814B. The arms 2814 can be rotatably connected to the rotating rods 2816. The rotating rods 2816 can rotatably connect the arms 2814 and the movable member 2830A. For example, the rotating rods 2816 can rotatably connect with the movable member hinge tabs 2831A, 2831B. In various embodiments, rotation of the lid can be converted into translation of the movable member 2830A. For example, when the lid is rotated outward and/or away from the stationary member 2830B, the movable member 2830A translates upward and/or away from the stationary member 2830B. This can allow a user access to the interior of the brew chamber unit, such as to insert or remove a beverage pod. In some implementations, when the lid is rotated downward and/or toward the stationary member 2830B, the movable member 2830A translates downward and/or toward the stationary member 2830B. This can sealingly engage the movable member 2830A, stationary member 2830B and/or otherwise configure the brew chamber unit for preparing a beverage therein.

As shown in FIG. 28C, in some embodiments, the lid 2818 provides a cover and/or shield for the brewer machine. For example, in the closed position of brew chamber unit, the lid 2818 can inhibit or prevent a user from accessing the brew chamber unit with a finger, thereby reducing the chance of harm. In some variants, in the closed position of brew chamber unit and/or during non-operation (e.g., storage) of the brewer machine, the lid 2818 can obscure visual observation of the brew chamber unit. This can provide a streamlined and clean appearance and/or can enhance the aesthetics of the brewer machine.

Figure 28D:
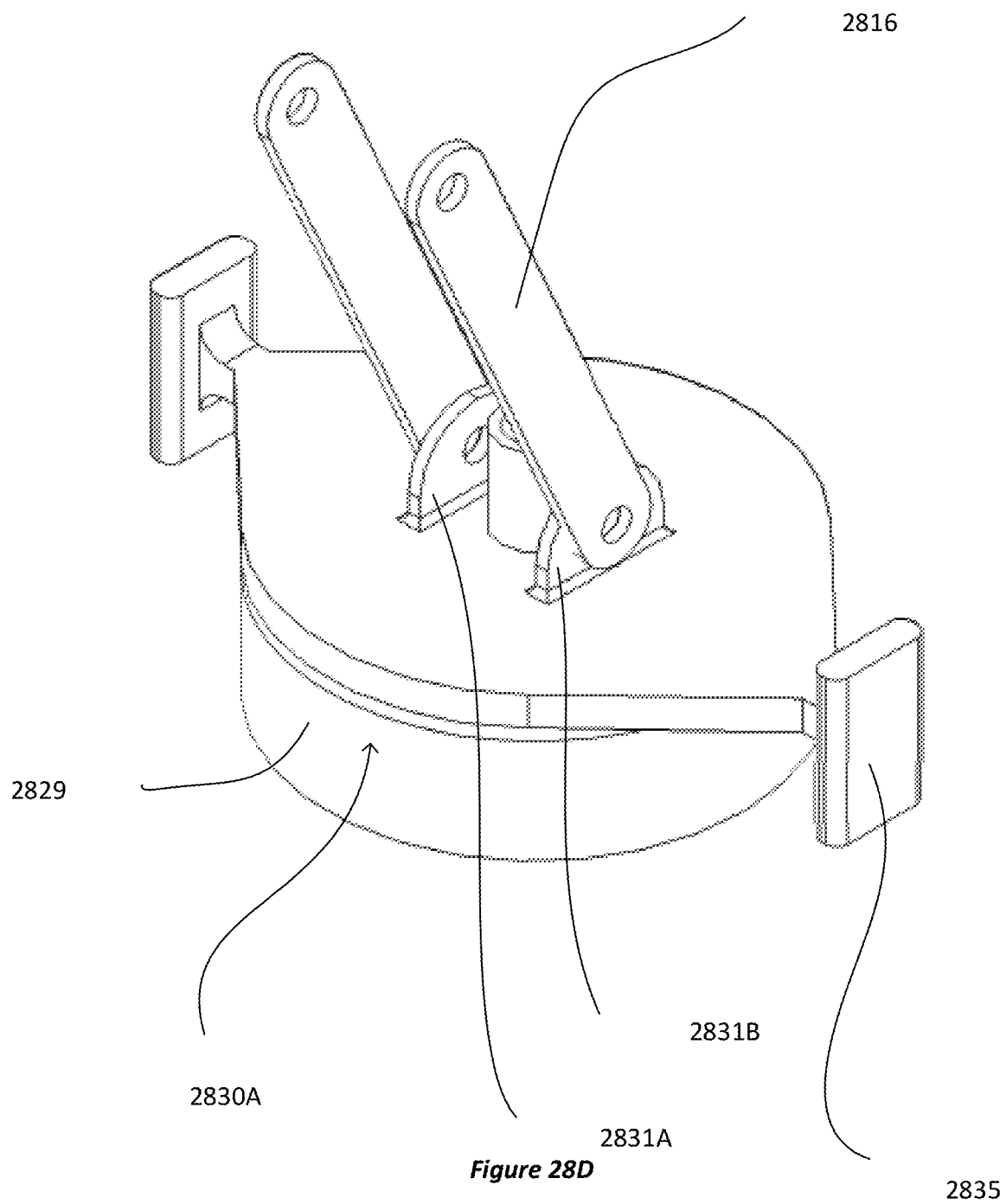
FIG. 28D illustrates a perspective view of certain components of the brewer machine of FIG. 28A.
Figure 28E:
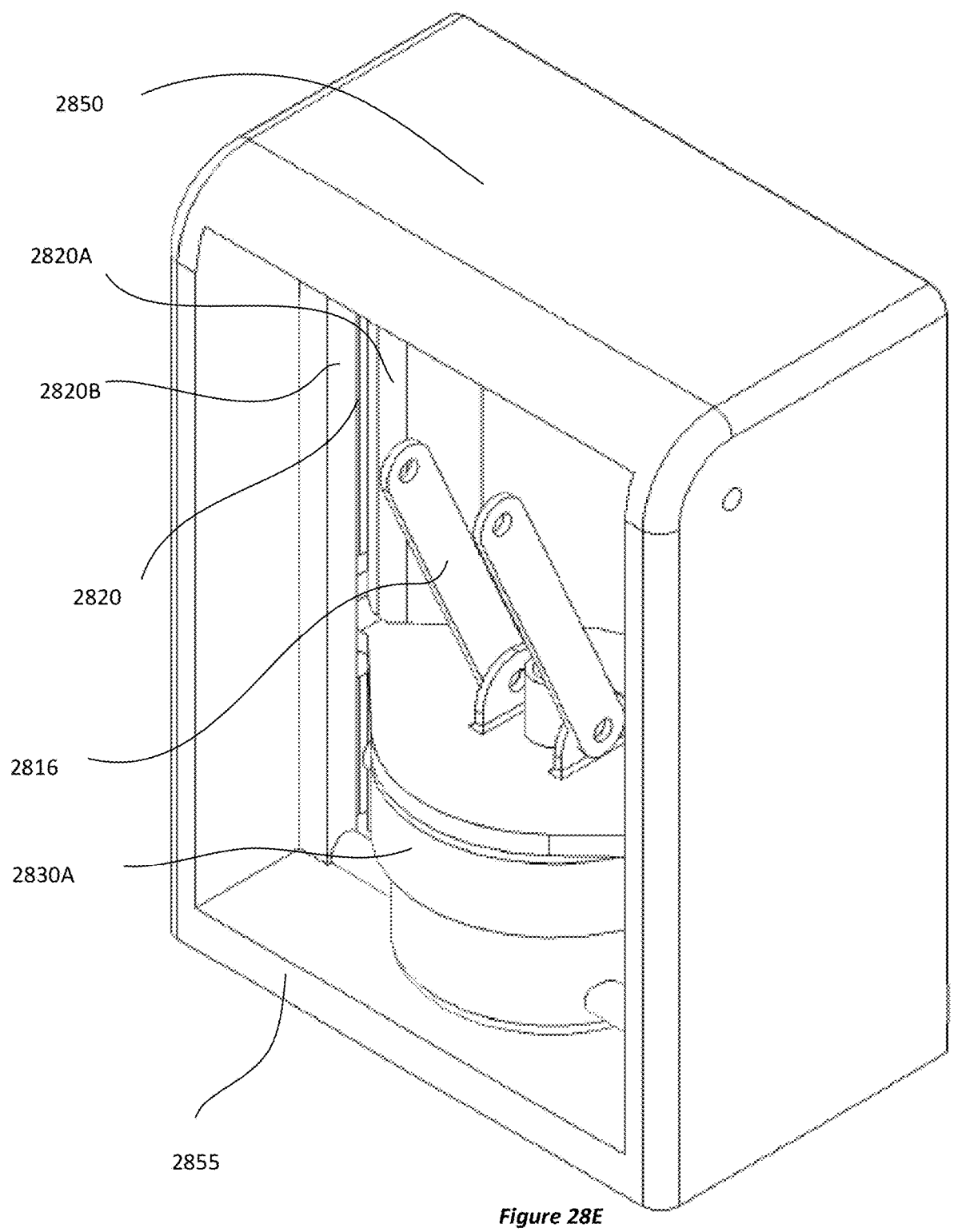
FIG. 28E illustrates a perspective view of certain components of the brewer machine of FIG. 28A in a closed position.

FIG. 28D illustrates a perspective view of certain components of the lever assembly of FIG. 28A. As shown in FIG. 28D, the movable member 2830A can comprise securing structures 2835. The securing structures 2835 can have a flange shape having a generally flat distal surface. The flange shape of the securing structures 2835 can be configured to slide along the sliding track 2820 shown in FIG. 28E. FIG. 28E illustrates a perspective view of certain components of the lever assembly of FIG. 28A in a closed position. The sliding track 2820 can comprise side rails 2820A, 2820B configured to accept the securing structures 2835.

Curved Tracks

Figure 29A:
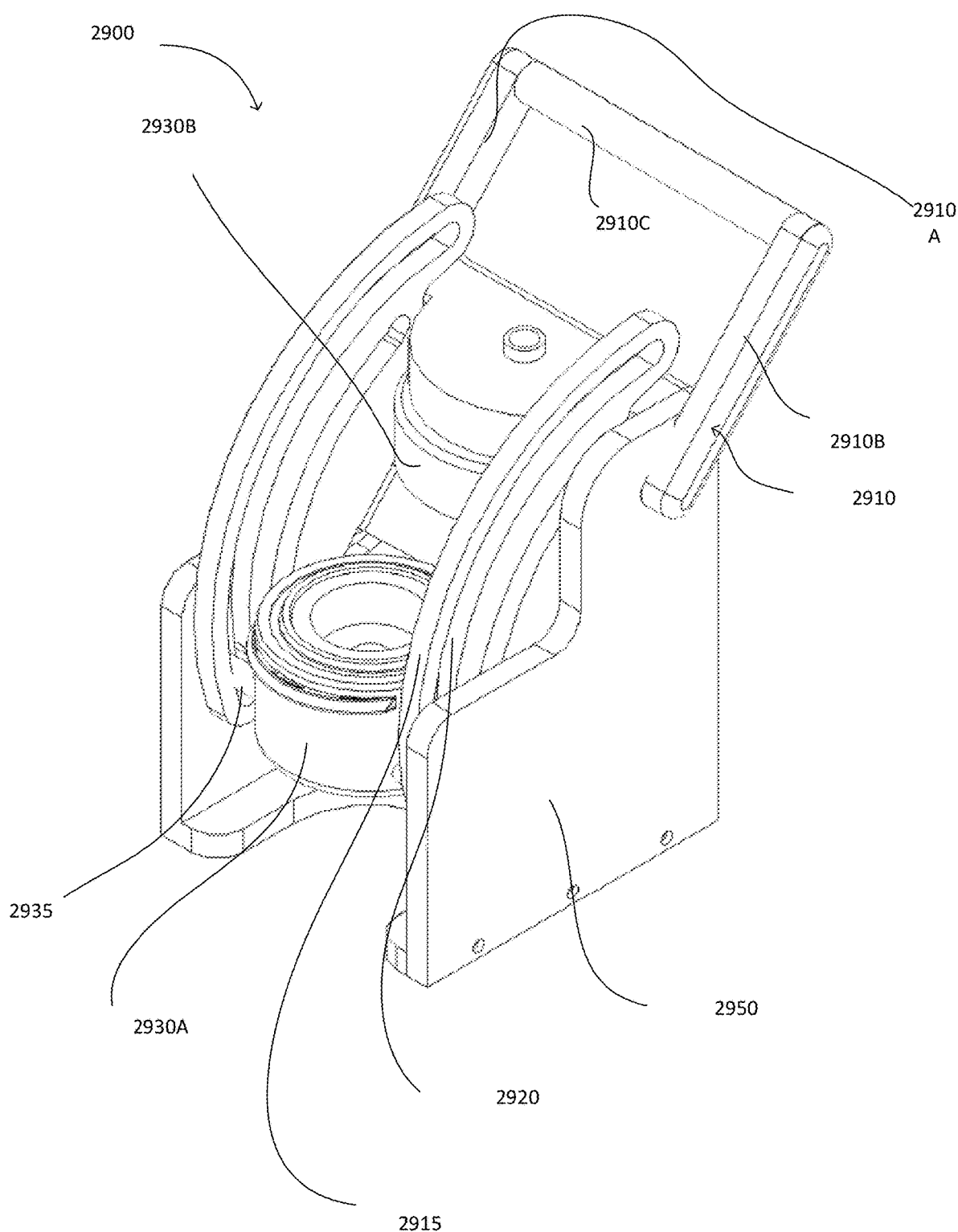
FIG. 29A illustrates a perspective view of another embodiment of a brewer machine with a cam assembly.
Figure 29B:
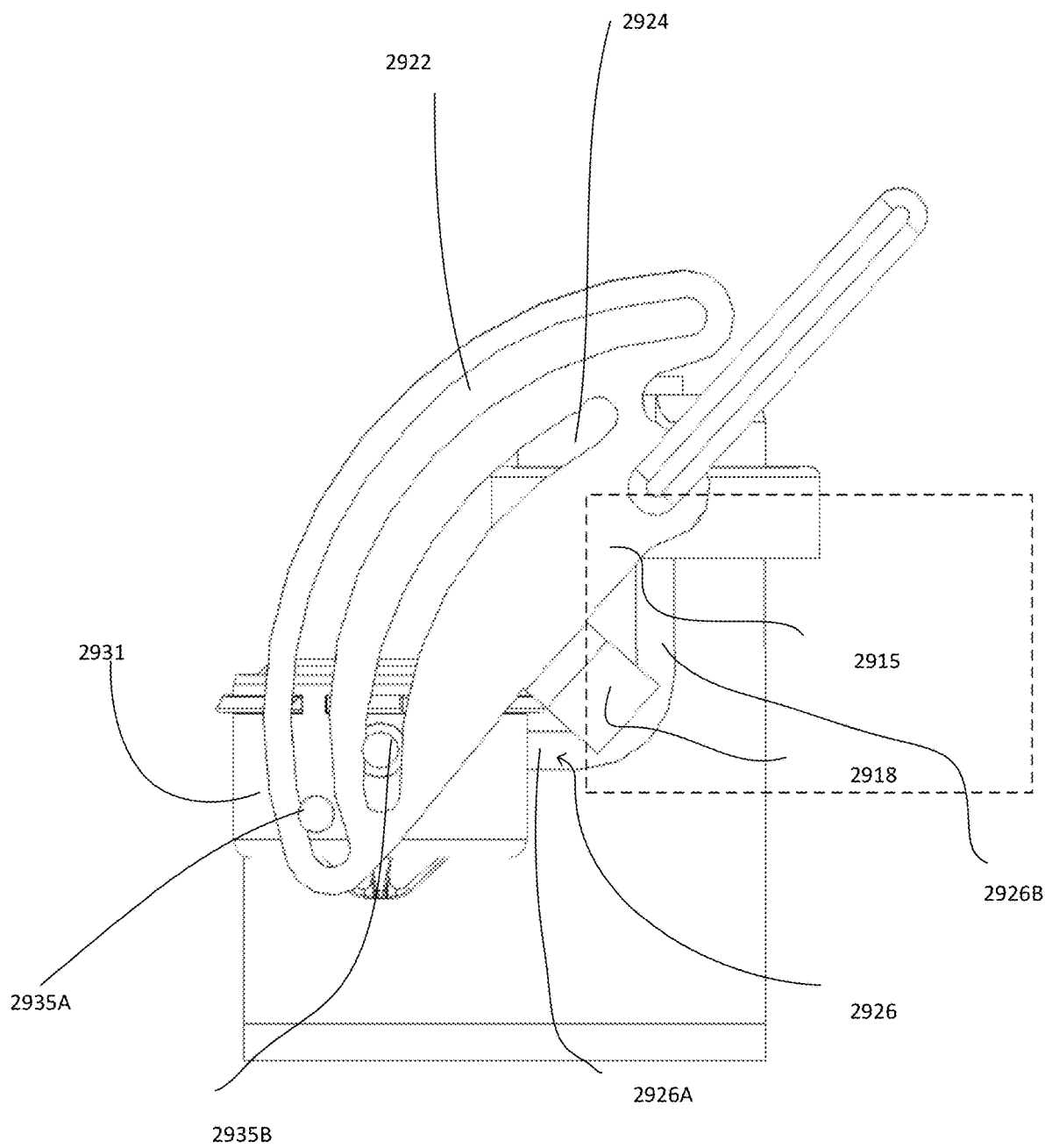
FIG. 29B illustrates a side view of certain components of the brewer machine of FIG. 29A.

FIG. 29A illustrates a perspective view of another embodiment of a brewer machine 2900, which can include a cam assembly. FIG. 29B illustrates a side view of certain components of the cam assembly of FIG. 29A. The cam assembly can comprise a housing 2950, which can include a guiding track 2926. In some embodiments, the cam assembly includes an actuation handle 2910, which can be pivotably connected to the housing 2950. The actuation handle 2910 can comprise first and second sidebars 2910A, 2910B and a connecting handle 2910C.

As shown, the brewer machine can include a brew chamber unit 2930. The brew chamber unit 2930 can be similar or identical to, and can include any one or any combination of features of, any of the previously described brew chamber units. For example, the brew chamber unit can be similar or identical to the brew chamber unit 300 of FIG. 3A. As shown, the brew chamber unit 2930 can comprise a movable member 2930A and a stationary member 2930B.

In certain embodiments, the brewer machine includes a rotating cam 2915. The rotating cam 2915 can be rotatable between an open position and a closed position. In the open position, the stationary member 2930B can be spaced away from the movable member to enable a beverage pod to be inserted or removed from the brew chamber unit 2930. In the closed position, the stationary member 2930B can be sealingly connected with the body portion 2931 of the movable member 2930A to form a brew chamber unit 2930 for brewing of a beverage therein. In various embodiments, the rotating cam 2915 is configured to be rotated by the actuation handle 2910. For example, the actuation handle 2910 can be fixedly connected to the rotating cam 2915 such that rotation of the actuation handle 2910 causes rotation of the rotating cam 2915.

The rotating cam 2915 can comprise cam plates 2917. The cam plates 2917 can each comprise a sliding track 2920. The sliding track 2920 can comprise a first sliding track 2922 and a second sliding track 2924. The first sliding track 2922 can comprise a first length along the first sliding track 2922. The second sliding track 2924 can comprise a second length along the second sliding track 2922 less than the first length. As shown, the tracks 2922, 2924 can be curved. In some embodiments, the tracks 2922, 2924 are arcs of concentric circles. The sliding track 2920 can be configured to slidingly receive one or more securing structures 2935 of a body portion 2931 of the movable member 2930A. This can enable the brew chamber unit to be opened (e.g., the movable member 2930A to be moved away from the stationary member 2930B) to receive a beverage pod and/or closed (e.g., the movable member 2930A is moved into engagement with the stationary member 2930B) for a beverage preparation operation.

As mentioned above, the housing 2950 can include a guiding track 2926. In some embodiments, the guiding track 2926 comprises two portions connected at about a right angle. For example, the guiding track 2926 can comprise a generally L-shaped track. In some variants, the guiding track 2926 includes a horizontal portion 2926A and a vertical portion 2926B connected to the horizontal portion 2926A. The horizontal portion 2926A and the vertical portion 2926B can form an angle. The angle formed between the horizontal portion 2926A and the vertical portion 2926B can be about 90 degrees. The rotating cam 2915 can comprise a bridge portion 2918 connecting the cam plates 2917. The one or more securing structures 2935 can comprise a first securing structure 2935A configured to slide along the first track 2922, and a second securing structure 2935B configured to slide along the second track 2924.

FIGS. 29A and 29B show the brewer machine 2900 in an open position. The guiding track 2926 can guide the second securing structure 2935B as the second securing structure 2935B moves along the second track 2924. For example, to close the brewer machine 2900, a user may pull the handle 2910C to rotate the cam plates 2917. The first and second structures 2935A, 2935B can slide along the first and second tracks 2922, 2924, and the second securing structure 2935B can slide along the guiding track 2926 during rotation. The first securing structure 2935A can move generally in a horizontal plane along the horizontal portion 2926A. The first securing structure 2935A can move from the horizontal portion 2926A to the vertical portion 2926B. The first securing structure 2935A can move generally in a vertical plane along the vertical portion 2926B. The first securing structure 2935A can be in the vertical portion 2926B in the closed position. The first securing structure 2935A can be in the horizontal portion 2926A in the open position.

Figure 30B:
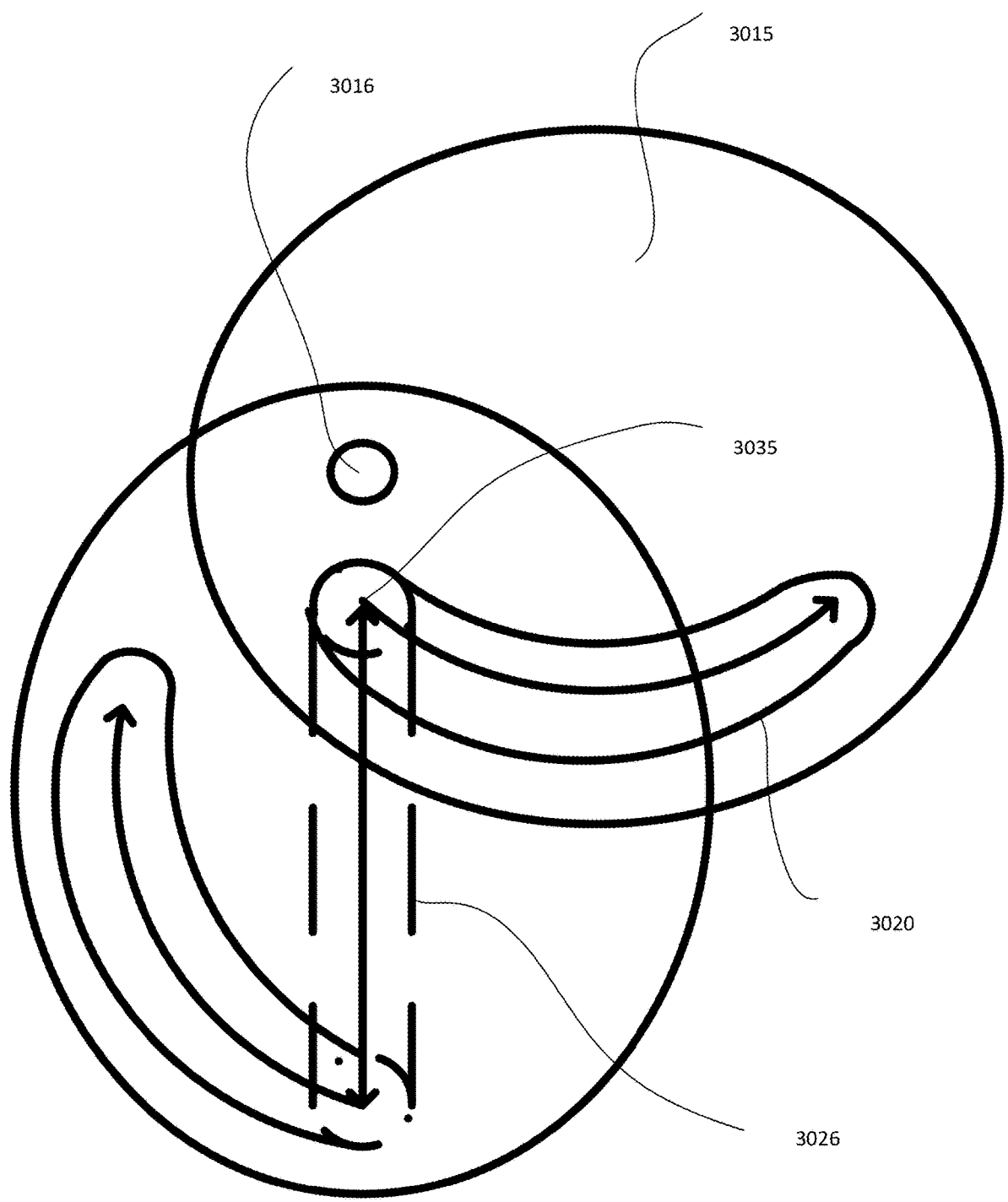
FIG. 30B schematically shows the circular cam of FIG. 30A.

The rotatable cams can have different shapes. FIG. 30A illustrates a side perspective view of another embodiment of a brewer machine with a cam assembly having a curved (e.g., circular) cam. FIG. 30B schematically shows the circular cam of FIG. 30A. The cam assembly 3000 can comprise a housing 3050, a rotating cam 3015, an actuation handle 3010, and a movable member 3030A. The housing 3050 can comprise a guiding track 3026. The guiding track 3026 can comprise a straight portion 3026A and an incline portion 3026B. The guiding track 3026 can comprise a longitudinal axis and the movable member 3030A can comprise an axial center axis. The center axis can form an angle with the longitudinal axis in the open position. When the movable member is in the open position, a plane that is generally parallel with a top of the body portion is not parallel and not perpendicular with the longitudinal axis.

FIG. 30B schematically shows the circular cam of FIG. 30A. The rotating cam 3015 can comprise a rotational axis 3016 and a sliding track 3020. The rotating cam 3015 can be fixedly connected to the actuation handle at the rotational axis 3016. As shown in FIG. 30B, the securing structure 3035 can be configured to slide along a guiding track 3026 while also sliding along the sliding track 3020 as the rotatable cam 3015 rotates around the rotational axis. This can enable the movable member 3030A to be translated along the guiding track 3026 depending on the rotational position of the rotating cam 3015, which can be controlled by the position of the actuation handle 3010.

Flip Up Assembly

Figure 31A:
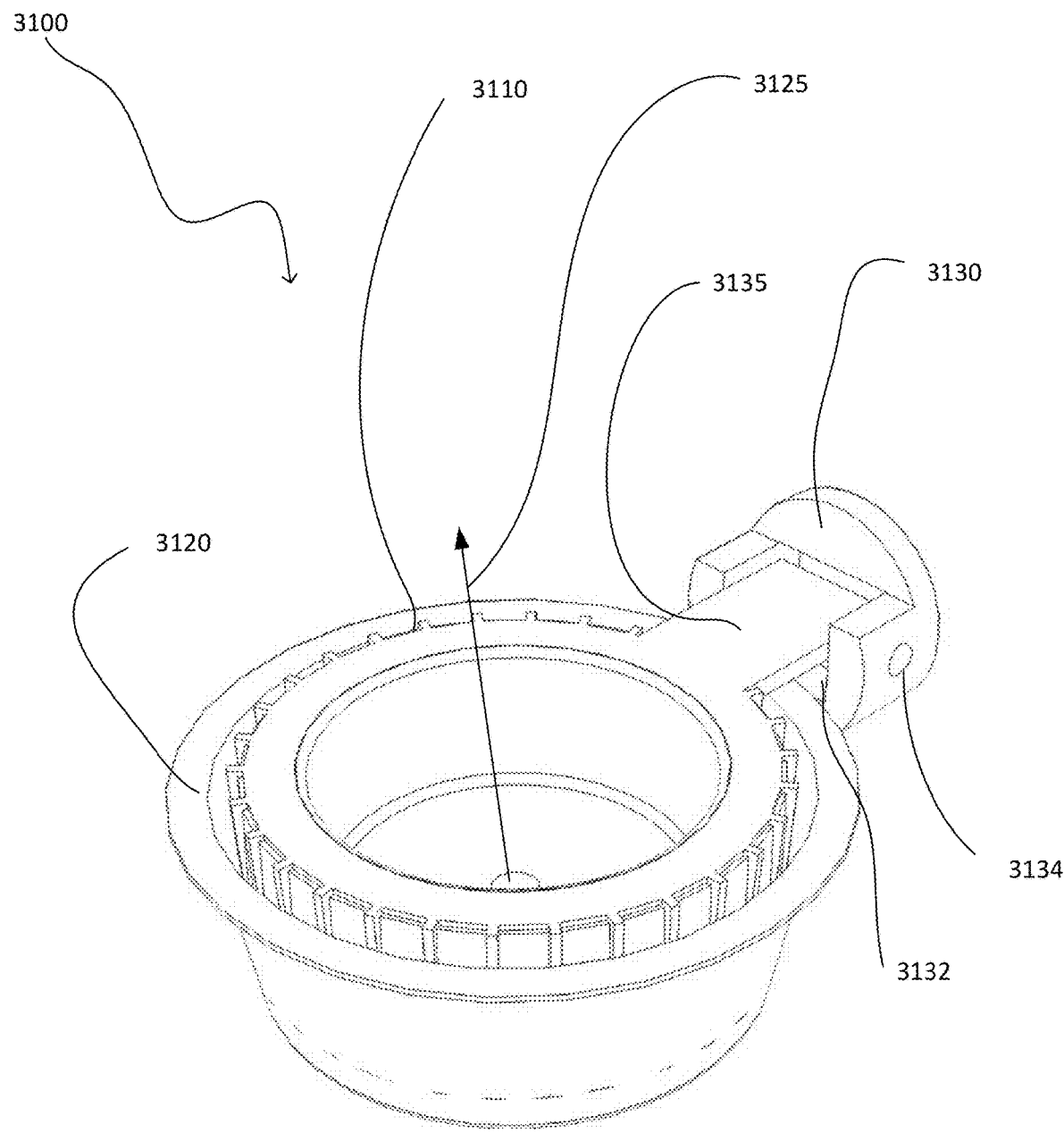
FIG. 31A illustrates a perspective view of an embodiment of a pivotable beverage vessel assembly.

FIG. 31A illustrates a perspective view of an embodiment of a pivotable beverage vessel assembly. The beverage vessel assembly 3100 can comprise a first receptacle 3110, a second receptacle 3120, and a hinge tab 3130. The first receptacle 3110 can comprise an outer circumference. The first receptacle 3110 can be configured to receive a beverage pod having a first diameter, such as a beverage pod for producing espresso. The first receptacle 3110 can comprise a hinge arm 3135 extending from the outer circumference of the first receptacle 3110. The hinge arm 3135 can be hingedly connected to the hinge tab 3130. The first receptacle 3110 can comprise an axial length.

The second receptacle 3120 can comprise an axial center axis 3125. The second receptacle 3120 can be configured to receive the first receptacle 3110 and/or a brewing pod having a second diameter that is greater than the first diameter. In some embodiments, the second receptacle 3120 is configured to receive a pod for producing brewed coffee. The first receptacle 3110 can be pivoted relative to the second receptacle 3120, such as away and out of engagement or toward and into engagement (as shown). For example, the first receptacle 3110 can be configured to pivot around a pivoting axis generally perpendicular with the axial center axis 3125 of the second receptacle 3120, thereby enabling the first receptacle 3110 to pivot relative to the second receptacle 3120. In some variants, the first receptacle 3110 can pivot away from the second receptacle 3120 such that no portion of the first receptacle 3110 overlaps with the axial center axis 3125 when the first receptacle 3110 is pivoted away from the second receptacle 3120. The hinge tab 3130 can comprise a hinge slot 3132 and a hinge pin 3134.

Figures 31B, 31C:
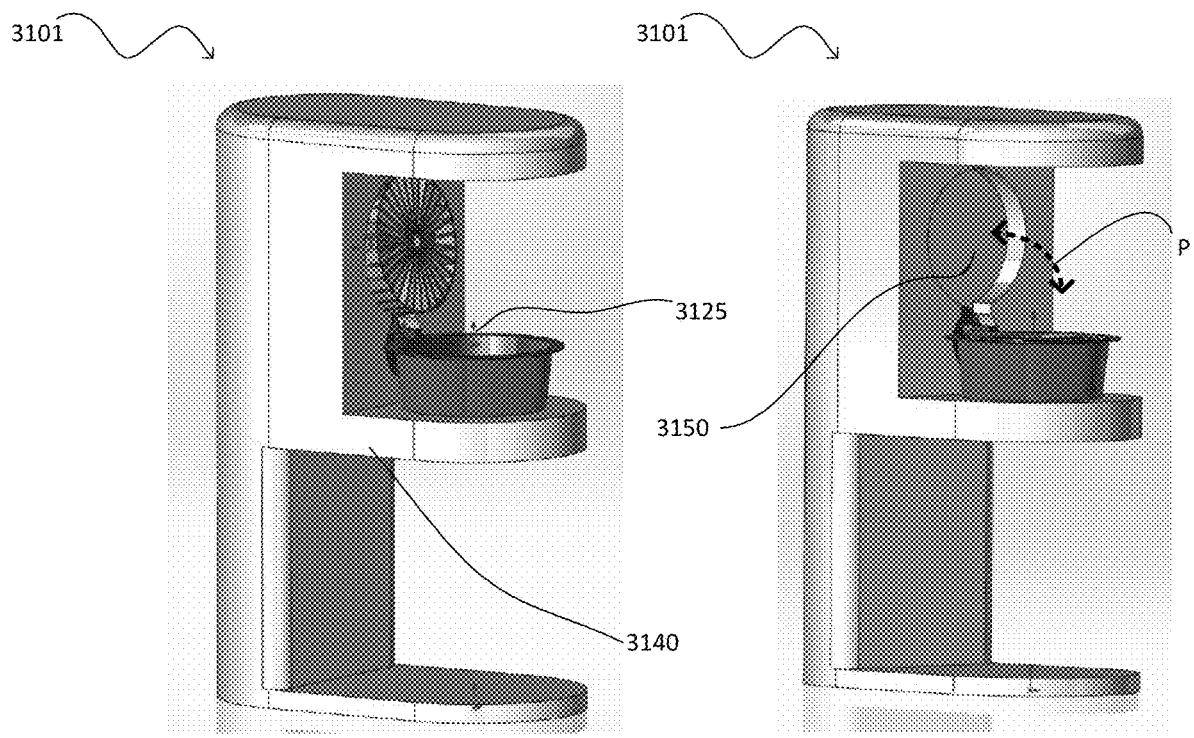
FIGS. 31B-31D show perspective views of a brewer machine having the pivotable beverage vessel assembly of FIG. 31A.
Figure 31D:
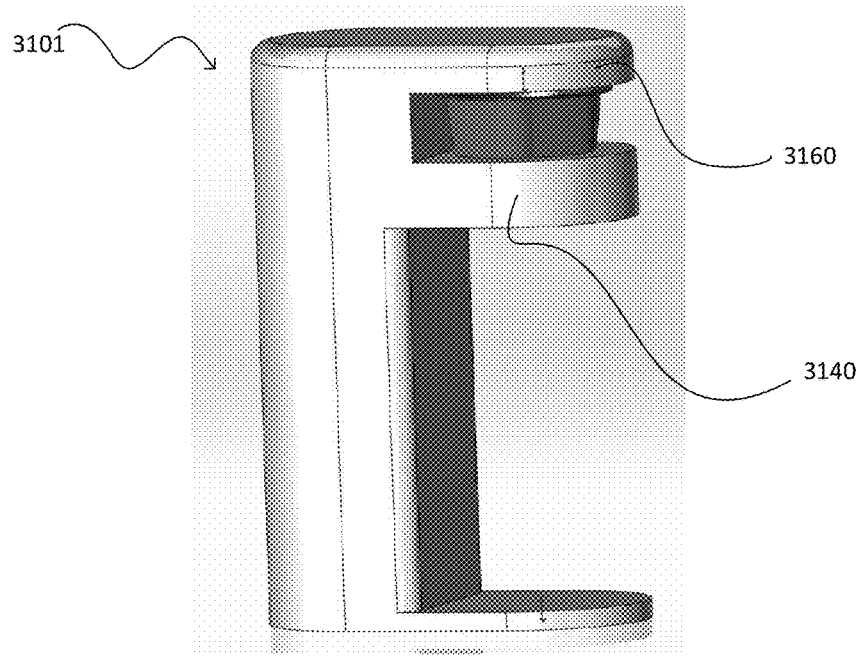

FIGS. 31B-31D show perspective views of brewer machines having the pivotable beverage vessel assembly of FIG. 31A. The brewer machines can comprise a beverage vessel and a housing. The beverage vessel can comprise a first receptacle 3110, a second receptacle 3120, and a hinge tab 3130. The beverage vessel can be connected to the first receptacle 3110 by the hinge tab 3130. The housing 3101 can comprise a movable tray 3140 and a receptacle slot 3150. The movable tray 3140 can be movable along a vertical distance. The receptacle slot 3150 can be configured to receive the first receptacle 3110. For example, the receptacle slot 3150 can comprise an inner circumference greater than the outer circumference of the first receptacle 3110. The receptacle slot 3150 can comprise an axial depth greater than the axial length of the first receptacle 3110.

FIG. 31B shows the brewer machine in a configuration in which the movable tray 3140 is in an open position and the second receptacle 3120 can be accessible, such that the second receptacle 3120 can receive a large beverage pod. FIG. 31C shows the brewer machine in another configuration, in which the first receptacle 3110 is received in the second receptacle 3120. In this configuration, the first receptacle 3110 can be moved away and out of the second receptacle in a pivoting motion, the pivoting motion indicated by the letter "P" in FIG. 31C. As shown in FIG. 31D, in some embodiments, the movable tray 3140 can be moved (e.g., elevated) generally vertically. In some variants, the movable tray 3140 can be moved past at least a portion of the first receptacle 3110 received in the receptacle slot 3150.

Radial Pod Access

FIGS. 32A-32C show perspective views of a brewer machine 3200. In various embodiments, the brewer machine can be configured to allow a beverage pod to be radially inserted into a brew chamber of the brewer machine. In some embodiments, the brewer machine 3200 includes a sleeve mechanism. Some implementations can comprise an outer portion 3210 and an inner portion 3230. The outer portion 3210 can be configured to receive a beverage pod to facilitate the production of a beverage and comprise a chamber 3215. The chamber 3215 can comprise a guiding rail 3218. The guiding rail can extend vertically along an inside surface of the chamber 3215. The sleeve mechanism can comprise a peripheral door 3219. The peripheral door 3219 can be disposed on the outer portion 3210. For example, the peripheral door 3219 can be configured to slide along a portion of a periphery of the outer portion 3210 between an open position and a closed position. In the open position, the outer portion 3210 can comprise a radial opening 3212 configured to allow a beverage pod to be passed therethrough such that the beverage pod enters the chamber 3215 from a radial direction. In the closed position, as shown in FIG. 32C. the outer portion 3210 does not comprise the radial opening and the chamber 3215 is configured to brew a beverage therein.

The inner portion 3230 can be configured to support a beverage pod disposed inside the chamber 3215. The inner portion 3230 can comprise a receptacle holder 3232 and a screw shaft 3234. The receptacle holder 3232 can be generally disposed inside the outer portion. The screw shaft 3234 can be connected to the receptacle holder.

The outer portion 3210 can comprise a fastener structure 3220. The fastener structure 3220 can be connected to the peripheral door 3219, for example. The screw shaft 3234 can be configured to mate with the fastener structure 3220. For example, the screw shaft 3234 can comprise a plurality of helical threads 3235 configured to slide along a corresponding structure in the fastener structure 3220.

A receptacle for receiving a smaller beverage pod, such as an espresso pod, can be used with the sleeve mechanism. FIGS. 34A-34C show perspective views of a sleeve mechanism for a beverage forming apparatus having a small beverage receptacle. The receptacle holder 3232 of the brewer machine 3200 can comprise a beverage pod receptacle having a first diameter smaller than a diameter of the receptacle holder 3232.

Figure 33A:
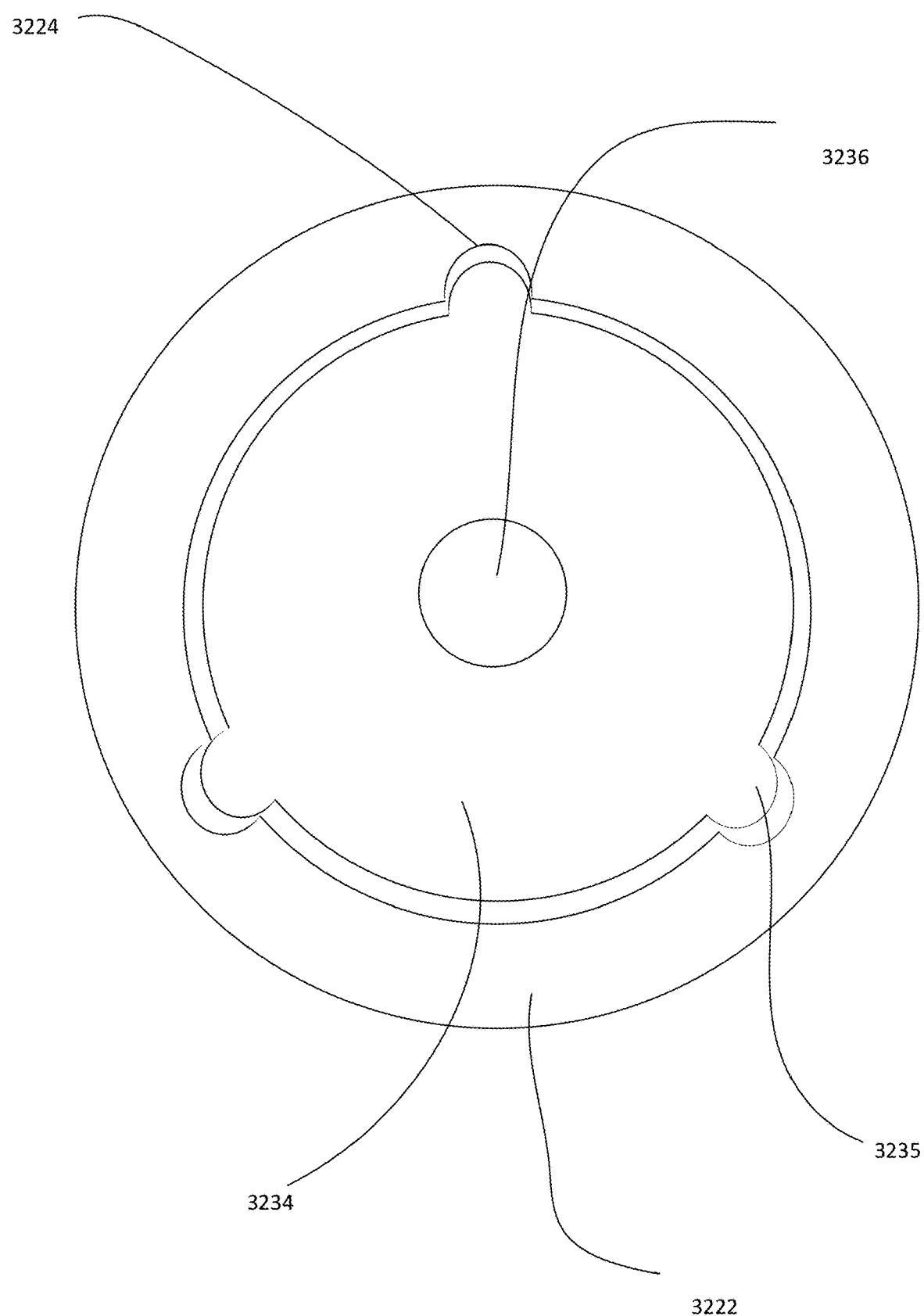
FIG. 33A schematically illustrates a cross-sectional view of a fastener structure and a screw shaft in the sleeve mechanism of FIGS. 32A-32C.
Figure 33B:
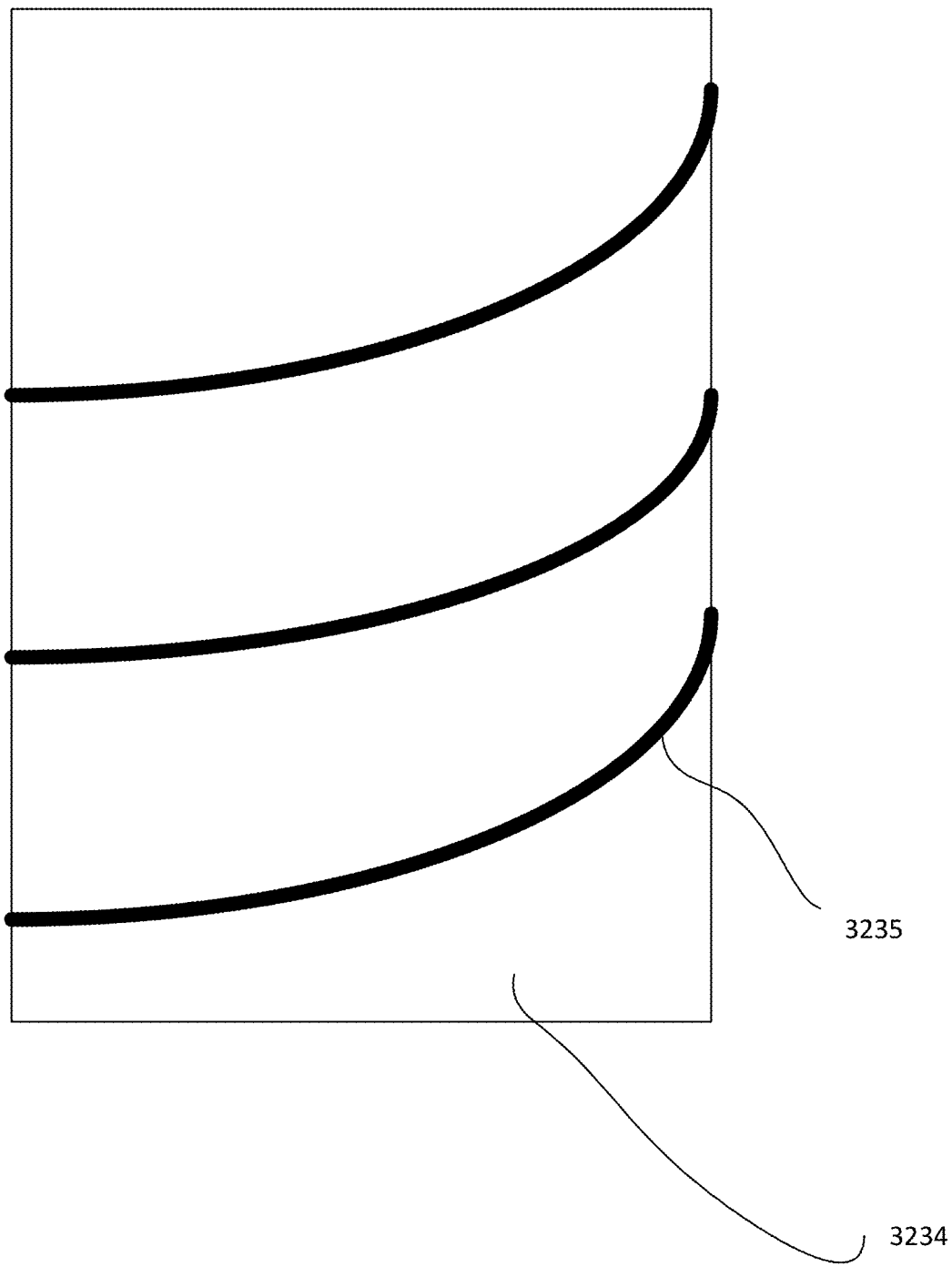
FIG. 33B schematically illustrates a side view of a screw shaft in the sleeve mechanism of FIGS. 32A-32C.

FIG. 33A schematically illustrates a cross-sectional view of a fastener structure and a screw shaft in the sleeve mechanism of FIGS. 32A-32C. FIG. 33B schematically illustrates a side view of a screw shaft in the sleeve mechanism of FIGS. 32A-32C. The fastener structure 3220 can comprise an annular bottom plate 3222. The annular bottom plate 3222 can comprise a plurality of recessed cut-outs 3224. The plurality of recessed cut-outs 3224 can be shaped and sized to correspond to the shape of the plurality of helical threads 3235. The screw shaft 3234 can comprise a fluid outlet 3236. In some embodiments, the recessed cut-outs 3224 can comprise a helical shape.

The receptacle holder 3232 can be generally disposed inside the chamber 3215. The receptacle holder 3232 can comprise a guiding recess (not shown). The guiding recess can be configured to slide along the guiding rail 3218. The receptacle holder 3232 can be vertically movable inside the outer portion 3210 along the guiding rail 3218 by rotating the annular bottom plate 3222.

FIG. 32A shows the brewer machine 3200 in an open position. In the open position, the receptacle holder 3232 can be on the bottom of the chamber 3215. A user may operate the brewer machine 3200 to close the brewer machine 3200 by rotating the peripheral door 3219. The annular bottom plate 3222 can rotate with the peripheral door 3219. For example, the annular bottom plate 3222 can rotate in a clockwise direction as the peripheral door rotates in a clockwise direction. As the annular bottom plate 3222 rotate, the helical threads 3235 can slide along the recessed cut-outs 3224 such that the screw shaft 3234 rotates. For example, the screw shaft 3234 can rotate in a counter-clockwise direction as the peripheral door 3219 rotates in a clockwise direction.

As shown in FIG. 32B, the screw shaft 3234 can move vertically as the helical threads 3235 slides along the recessed cut-outs 3224. For example, the screw shaft 3234 can move upward as the peripheral door 3219 rotates in a clockwise direction. The receptacle holder 3232 connected to the screw shaft 3234 can move from the bottom of the chamber 3215 to the top of the chamber 3215.

FIG. 32C shows the brewer machine 3200 in a closed position. The peripheral door 3219 can be configured to cover the radial opening 3212 in the closed position. For example, when the peripheral door 3219 closes the radial opening 3212, the receptacle holder can be located on the top of the chamber 3215 such that a surface on top of the beverage pod 3250 can be on or near a plate comprising the top of the outer portion 3210.

Certain Terminology

As used herein, the term "beverage" has its ordinary and customary meaning, and includes, among other things, any edible liquid or substantially liquid substance or product having a flowing quality (e.g., juices, coffee beverages, teas, frozen yogurt, beer, wine, cocktails, liqueurs, spirits, cider, soft drinks, flavored water, energy drinks, soups, broths, combinations of the same, or the like).

The term "pod," as used herein, has its ordinary and customary meaning, and includes, among other things, cartridges, capsules, canisters, pucks, pads, and the like, whether or not such pods are capable of and/or configured to be pierced or otherwise ruptured to form an inlet into and/or outlet from the pod.

As used herein, the term "single-serving" has its ordinary and customary meaning, and includes, among other things, a portion of beverage that is customarily consumed by one person. For example, some single-serving beverage pods are configured to produce less than or equal to about 20 fluid ounces (about 600 milliliters) of beverage.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees and the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

SUMMARY

Although this disclosure describes certain embodiments and examples of beverage preparation systems, many aspects of the methods and devices shown and described in the present disclosure may be combined differently and/or modified to form still further embodiments or acceptable examples. All such modifications and variations are intended to be included herein within the scope of this disclosure. Indeed, a wide variety of designs and approaches are possible and are within the scope of this disclosure. For example, although some embodiments have been disclosed in which liquid water is introduced into the pod, the introduction of other liquids (e.g., milk) and/or other phases (e.g., steam) is contemplated as well. While illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. However, the figures are not drawn to scale. Distances, angles, etc. are merely illustrative and do not necessarily bear an exact relationship to actual dimensions and layout of the devices illustrated. Components can be added, removed, and/or rearranged.

Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage preparations systems, components, and related methods have been disclosed. Although the systems have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The following is claimed:

1. A brewer machine configured to receive a first type of beverage pod and a second type of beverage pod, the first and second types of beverage pods having different sizes, the brewer machine comprising:
   a housing, wherein the housing comprises:
      a first opening on a front portion of the housing; and
      a second opening on the front portion of the housing, wherein the second opening is under the first opening and is configured to receive a beverage receptacle;
   a drawer comprising a proximal portion and a distal portion, wherein the proximal portion is configured to be extendable through the first opening, and wherein the drawer is configured to move proximally and distally through the first opening;
   a first beverage pod receptacle, the first beverage pod receptacle configured to receive the first type of beverage pod and configured to slide in a linear fashion independent of the drawer on a track, wherein the brewer machine is configured to present the first beverage pod receptacle in a first configuration; and
   a second beverage pod receptacle within the drawer proximate to an end of the drawer, the second beverage pod receptacle configured to receive the second type of beverage pod, wherein the brewer machine is configured to present the second beverage pod receptacle in a second configuration.

2. The brewer machine of claim 1, wherein the drawer is linearly movable relative to the housing.

3. The brewer machine of claim 1, wherein the drawer further comprises a slidably engaging protrusion feature configured to couple to a corresponding track of the housing for guiding proximal and distal movement of the drawer relative to the housing.

4. The brewer machine of claim 1, wherein, in the second configuration, a portion of the first beverage pod receptacle is positioned in the second beverage pod receptacle within the drawer.

5. The brewer machine of claim 4, wherein the second beverage pod receptacle is configured to receive a coffee beverage pod.

6. The brewer machine of claim 5, wherein the first beverage pod receptacle is configured to receive a beverage pod having a size smaller than that of the second beverage pod receptacle.

7. The brewer machine of claim 6, wherein the first beverage pod receptacle is configured to receive an espresso beverage pod.

8. The brewer machine of claim 1, wherein the insert further comprises a slidably engaging feature configured to couple to a corresponding track is positioned on the drawer for guiding proximal and distal movement of the first beverage pod receptacle relative to the drawer.

9. The brewer machine of claim 1, wherein the first beverage pod receptacle further comprises a support feature on a bottom surface, the support feature of the first beverage pod receptacle configured to engage with a floor of the drawer.

10. The brewer machine of claim 1, wherein the drawer moves through the first opening in a direction that is generally perpendicular to a longitudinal height of the brewer machine.

11. The brewer machine of claim 1, wherein the first beverage pod receptacle is further configured to slide relative to the drawer in a direction that is generally parallel to a direction that the drawer moves through the first opening.

12. The brewer machine of claim 1, wherein the second beverage pod receptacle is configured to be removed from the drawer.

13. The brewer machine of claim 1, wherein the brewer machine is configured to enable the first and second beverage pod receptacles to swap positions.

14. The brewer machine of claim 1, wherein a diameter of the first beverage pod receptacle is less than a diameter of the second beverage pod receptacle.

* * * * *